US011346339B2

(12) United States Patent
Nowell et al.

(10) Patent No.: US 11,346,339 B2
(45) Date of Patent: May 31, 2022

(54) HIGH PRESSURE PUMP

(71) Applicant: Kerr Machine Co., Sulphur, OK (US)

(72) Inventors: Mark S. Nowell, Ardmore, OK (US); Kelcy Jake Foster, Ardmore, OK (US); Micheal Cole Thomas, Ardmore, OK (US); Christopher Todd Barnett, Stratford, OK (US); Nicholas Son, Davis, OK (US); John Keith, Ardmore, OK (US); Guy J. Lapointe, Sulphur, OK (US); Michael Eugene May, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 16/951,895

(22) Filed: Nov. 18, 2020

(65) Prior Publication Data

US 2021/0148349 A1     May 20, 2021

Related U.S. Application Data

(60) Provisional application No. 63/089,882, filed on Oct. 9, 2020, provisional application No. 63/076,587, filed
(Continued)

(51) Int. Cl.
*F04B 53/14* (2006.01)
*F04B 7/00* (2006.01)
(Continued)

(52) U.S. Cl.
CPC .......... *F04B 53/14* (2013.01); *F04B 7/0003* (2013.01); *F04B 7/0084* (2013.01);
(Continued)

(58) Field of Classification Search
CPC .......... F04B 15/02; F04B 17/00; F04B 17/03; F04B 19/04; F04B 19/22; F04B 53/006;
(Continued)

(56) References Cited

U.S. PATENT DOCUMENTS

| 1,316,539 A | 9/1919 | Ford |
| 1,822,682 A | 9/1931 | Weiger |

(Continued)

FOREIGN PATENT DOCUMENTS

| CN | 207974953 U | 10/2018 |
| EP | 2494140 B1 | 5/2017 |

(Continued)

OTHER PUBLICATIONS

International Searching Authority, "PCT International Search Report", dated Mar. 2, 2021, 4 pages.
(Continued)

*Primary Examiner* — Charles G Freay
*Assistant Examiner* — Chirag Jariwala
(74) *Attorney, Agent, or Firm* — Tomlinson McKinstry, P.C.

(57) ABSTRACT

A high pressure pump comprising a fluid end mechanically coupled to a power end. The power end is modular and comprises a crankshaft section, a crosshead section, and a connector section coupled together by a first set of stay rods. The fluid end comprises a plurality of fluid end sections positioned in a side-by-side relationship. Each of the plurality of fluid end sections are attached to the power end using a plurality of second set of stay rods.

18 Claims, 109 Drawing Sheets

Related U.S. Application Data on Sep. 10, 2020, provisional application No. 63/053,797, filed on Jul. 20, 2020, provisional application No. 63/046,826, filed on Jul. 1, 2020, provisional application No. 63/040,086, filed on Jun. 17, 2020, provisional application No. 63/033,244, filed on Jun. 2, 2020, provisional application No. 63/027,584, filed on May 20, 2020, provisional application No. 63/019,789, filed on May 4, 2020, provisional application No. 63/018,021, filed on Apr. 30, 2020, provisional application No. 63/008,036, filed on Apr. 10, 2020, provisional application No. 62/990,817, filed on Mar. 17, 2020, provisional application No. 62/968,634, filed on Jan. 31, 2020, provisional application No. 62/960,194, filed on Jan. 13, 2020, provisional application No. 62/960,366, filed on Jan. 13, 2020, provisional application No. 62/959,570, filed on Jan. 10, 2020, provisional application No. 62/957,489, filed on Jan. 6, 2020, provisional application No. 62/953,763, filed on Dec. 26, 2019, provisional application No. 62/940,513, filed on Nov. 26, 2019, provisional application No. 62/936,789, filed on Nov. 18, 2019.

(51) Int. Cl.

| | |
|---|---|
| *F04B 7/02* | (2006.01) |
| *F04B 53/16* | (2006.01) |
| *F04B 53/00* | (2006.01) |
| *F04B 53/22* | (2006.01) |
| *F16K 15/06* | (2006.01) |
| *E21B 43/26* | (2006.01) |
| *F04B 19/04* | (2006.01) |
| *F04B 19/22* | (2006.01) |
| *F04B 1/0452* | (2020.01) |
| *F04B 1/0538* | (2020.01) |
| *F04B 15/02* | (2006.01) |
| *F04B 53/10* | (2006.01) |
| *F04B 17/00* | (2006.01) |
| *F04B 53/18* | (2006.01) |

(52) U.S. Cl.
CPC .......... *F04B 7/0088* (2013.01); *F04B 7/0208* (2013.01); *F04B 53/007* (2013.01); *F04B 53/162* (2013.01); *F04B 53/22* (2013.01); *F16K 15/063* (2013.01); *E21B 43/2607* (2020.05); *F04B 1/0452* (2013.01); *F04B 1/0538* (2013.01); *F04B 7/0266* (2013.01); *F04B 15/02* (2013.01); *F04B 17/00* (2013.01); *F04B 19/04* (2013.01); *F04B 19/22* (2013.01); *F04B 53/006* (2013.01); *F04B 53/1022* (2013.01); *F04B 53/1032* (2013.01); *F04B 53/18* (2013.01); *F16K 15/066* (2013.01)

(58) Field of Classification Search
CPC ........ F04B 53/007; F04B 53/14; F04B 53/16; F04B 53/162; F04B 53/22; F04B 1/0452; F04B 53/109; E21B 43/2607
See application file for complete search history.

(56) References Cited

U.S. PATENT DOCUMENTS

| | | | |
|---|---|---|---|
| 2,713,522 A | 7/1955 | Petch | |
| 2,756,960 A | 7/1956 | Church | |
| 2,828,696 A | 4/1958 | Wright | |
| 2,856,857 A | 10/1958 | Saalfrank | |
| 3,053,500 A | 9/1962 | Atkinson | |
| 3,146,724 A | 9/1964 | Cornelsen | |
| 3,152,787 A | 10/1964 | Timmons | |
| 3,173,648 A | 3/1965 | McGuire et al. | |
| 3,179,121 A | 4/1965 | Bredtschneider et al. | |
| 3,257,952 A | 6/1966 | McCormick | |
| 3,309,013 A | 3/1967 | Bauer | |
| 3,373,695 A | 3/1968 | Yohpe | |
| 3,427,988 A | 2/1969 | Redman et al. | |
| 3,463,527 A | 8/1969 | Baker | |
| 3,474,808 A | 10/1969 | Elliott | |
| 3,508,849 A | 4/1970 | Weber | |
| 3,589,387 A | 6/1971 | Raymond | |
| 3,679,332 A | 7/1972 | Yohpe | |
| 3,702,624 A | 11/1972 | Fries | |
| 4,047,850 A | 9/1977 | Berthelot | |
| 4,170,214 A | 10/1979 | Gill et al. | |
| 4,174,194 A | 11/1979 | Hammelmann | |
| 4,363,463 A | 12/1982 | Moon, Jr. | |
| 4,388,050 A | 6/1983 | Schuller | |
| 4,467,703 A | 8/1984 | Redwine et al. | |
| 4,470,771 A | 9/1984 | Hall et al. | |
| 4,494,415 A * | 1/1985 | Elliston .................. | F04B 9/045 417/269 |
| 4,520,837 A | 6/1985 | Cole et al. | |
| 4,768,933 A | 9/1988 | Stachowiak | |
| 4,771,801 A | 9/1988 | Crump et al. | |
| 4,773,833 A | 9/1988 | Wilkinson et al. | |
| 4,778,347 A | 10/1988 | Mize | |
| 4,861,241 A | 8/1989 | Gamboa et al. | |
| 4,878,815 A | 11/1989 | Stachowiak | |
| 4,891,241 A | 1/1990 | Hashimoto et al. | |
| 4,948,349 A | 8/1990 | Koiwa | |
| 4,984,970 A | 1/1991 | Eickmann | |
| 5,059,101 A | 10/1991 | Valavaara | |
| 5,073,096 A | 12/1991 | King et al. | |
| 5,127,807 A | 7/1992 | Eslinger | |
| 5,145,340 A | 9/1992 | Allard | |
| 5,207,242 A | 5/1993 | Daghe et al. | |
| 5,226,445 A | 7/1993 | Surjaatmadja | |
| 5,230,363 A | 7/1993 | Winn, Jr. et al. | |
| 5,253,987 A | 10/1993 | Harrison | |
| 5,299,921 A | 4/1994 | Ritcher | |
| 5,302,087 A | 4/1994 | Pacht | |
| 5,362,215 A | 11/1994 | King | |
| 5,370,148 A | 12/1994 | Shafer | |
| 5,507,219 A | 4/1996 | Stogner | |
| 5,524,902 A | 6/1996 | Cornette | |
| 5,605,449 A | 2/1997 | Reed | |
| 5,636,975 A | 6/1997 | Tiffany et al. | |
| D383,053 S | 9/1997 | Schrader et al. | |
| 6,164,318 A | 12/2000 | Dixon | |
| 6,257,626 B1 | 7/2001 | Campau | |
| 6,382,940 B1 | 5/2002 | Blume | |
| 6,419,459 B1 | 7/2002 | Sibbing | |
| 6,544,012 B1 | 4/2003 | Blume | |
| 6,641,112 B2 | 11/2003 | Antoff et al. | |
| 6,910,871 B1 | 6/2005 | Blume | |
| 7,140,211 B2 | 11/2006 | Tremblay | |
| 7,168,440 B1 | 1/2007 | Blume | |
| 7,186,097 B1 | 3/2007 | Blume | |
| 7,290,560 B2 | 11/2007 | Orr et al. | |
| 7,296,591 B2 | 11/2007 | Moe et al. | |
| 7,335,002 B2 | 2/2008 | Vicars | |
| 7,506,574 B2 | 3/2009 | Jensen et al. | |
| 7,513,759 B1 | 4/2009 | Blume | |
| D616,966 S | 6/2010 | Angell | |
| 7,789,133 B2 | 9/2010 | McGuire | |
| 7,828,053 B2 | 11/2010 | McGuire et al. | |
| 7,845,413 B2 | 12/2010 | Shampine et al. | |
| D631,142 S | 1/2011 | Angell | |
| 7,963,502 B2 | 6/2011 | Lovell et al. | |
| 8,083,504 B2 | 12/2011 | Williams et al. | |
| 8,100,407 B2 | 1/2012 | Stanton et al. | |
| 8,240,634 B2 | 8/2012 | Jarchau et al. | |
| 8,317,498 B2 | 11/2012 | Gambier et al. | |
| 8,360,094 B2 | 1/2013 | Steinbock et al. | |
| 8,528,462 B2 | 9/2013 | Pacht | |
| 8,528,585 B2 | 9/2013 | McGuire | |
| 8,701,546 B2 | 4/2014 | Pacht | |
| 9,010,412 B2 | 4/2015 | McGuire | |

(56) References Cited

U.S. PATENT DOCUMENTS

| | | | |
|---|---|---|---|
| D731,035 S | 6/2015 | Lo Cicero | |
| D737,497 S | 8/2015 | Burgess et al. | |
| 9,188,121 B1 | 11/2015 | Dille | |
| D748,228 S | 1/2016 | Bayyouk et al. | |
| 9,260,933 B2 | 2/2016 | Artherholt et al. | |
| 9,328,745 B2 | 5/2016 | Bartlok et al. | |
| 9,371,919 B2 | 6/2016 | Forrest et al. | |
| 9,416,887 B2 | 8/2016 | Blume | |
| 9,435,454 B2 | 9/2016 | Blume | |
| 9,534,473 B2 | 1/2017 | Morris et al. | |
| 9,631,739 B2 | 4/2017 | Belshan | |
| D787,029 S | 5/2017 | Bayyouk et al. | |
| 9,670,922 B2 | 6/2017 | Pacht | |
| 9,732,746 B2 | 8/2017 | Chandrasekaran et al. | |
| 9,791,082 B2 | 10/2017 | Baxter et al. | |
| 9,822,894 B2 | 11/2017 | Bayyouk et al. | |
| D806,241 S | 12/2017 | Swinney et al. | |
| 10,184,470 B2 | 1/2019 | Barnett, Jr. | |
| 10,240,597 B2 | 3/2019 | Bayyouk et al. | |
| 10,352,321 B2 | 7/2019 | Byrne et al. | |
| 10,393,113 B2 | 8/2019 | Wagner | |
| 10,760,567 B2 | 9/2020 | Salih et al. | |
| 10,767,773 B2 | 9/2020 | Lee | |
| 10,871,227 B1* | 12/2020 | Belshan | F16M 1/024 |
| 2002/0166588 A1 | 11/2002 | Dean | |
| 2004/0170507 A1 | 9/2004 | Vicars | |
| 2004/0234404 A1 | 11/2004 | Vicars | |
| 2006/0002806 A1 | 1/2006 | Baxter et al. | |
| 2006/0027779 A1 | 2/2006 | McGuire et al. | |
| 2008/0006089 A1 | 1/2008 | Adnan et al. | |
| 2008/0008605 A1 | 1/2008 | Bauer et al. | |
| 2008/0093361 A1 | 4/2008 | Kennedy et al. | |
| 2008/0279705 A1 | 11/2008 | Wago et al. | |
| 2008/0279706 A1 | 11/2008 | Gambier et al. | |
| 2009/0194717 A1 | 8/2009 | Jarchau et al. | |
| 2010/0243255 A1 | 9/2010 | Luharuka et al. | |
| 2011/0079302 A1 | 4/2011 | Hawes | |
| 2011/0173814 A1 | 7/2011 | Patel | |
| 2011/0189040 A1 | 8/2011 | Vicars | |
| 2011/0206546 A1 | 8/2011 | Vicars | |
| 2011/0206547 A1 | 8/2011 | Kim et al. | |
| 2012/0063936 A1 | 3/2012 | Baxter et al. | |
| 2012/0141308 A1 | 6/2012 | Saini et al. | |
| 2012/0187321 A1 | 7/2012 | Small | |
| 2012/0272764 A1 | 11/2012 | Pendleton | |
| 2013/0020521 A1 | 1/2013 | Byrne | |
| 2013/0105175 A1 | 5/2013 | Mailand et al. | |
| 2013/0112074 A1 | 5/2013 | Small | |
| 2013/0202458 A1 | 8/2013 | Byrne et al. | |
| 2013/0263932 A1 | 10/2013 | Baxter et al. | |
| 2013/0319220 A1 | 12/2013 | Luharuka et al. | |
| 2014/0127062 A1 | 5/2014 | Buckley et al. | |
| 2014/0196570 A1 | 7/2014 | Small et al. | |
| 2014/0196883 A1 | 7/2014 | Artherholt et al. | |
| 2014/0348677 A1 | 11/2014 | Moeller et al. | |
| 2015/0084335 A1 | 3/2015 | Farrell et al. | |
| 2015/0132152 A1 | 5/2015 | Lazzara | |
| 2015/0132157 A1 | 5/2015 | Whaley et al. | |
| 2015/0144826 A1 | 5/2015 | Bayyouk et al. | |
| 2015/0147194 A1 | 5/2015 | Foote | |
| 2015/0211641 A1* | 7/2015 | Pacht | F04B 1/124 251/359 |
| 2015/0219096 A1 | 8/2015 | Jain et al. | |
| 2015/0300332 A1* | 10/2015 | Kotapish | F04B 1/12 417/533 |
| 2016/0025082 A1 | 1/2016 | Byrne et al. | |
| 2016/0123313 A1 | 5/2016 | Simmons | |
| 2016/0160848 A1 | 6/2016 | Toppings et al. | |
| 2017/0002947 A1 | 1/2017 | Bayyouk et al. | |
| 2017/0089473 A1 | 3/2017 | Nowell et al. | |
| 2017/0204852 A1 | 7/2017 | Barnett, Jr. | |
| 2017/0211565 A1* | 7/2017 | Morreale | F04B 39/125 |
| 2017/0218951 A1 | 8/2017 | Graham et al. | |
| 2018/0017173 A1 | 1/2018 | Nowell et al. | |
| 2018/0045187 A1* | 2/2018 | Nagel | F04B 9/045 |
| 2018/0313456 A1 | 11/2018 | Bayyouk et al. | |
| 2019/0011051 A1 | 1/2019 | Yeung | |
| 2019/0049052 A1 | 2/2019 | Shuck | |
| 2019/0136840 A1* | 5/2019 | Kumar | F04B 1/0421 |
| 2019/0136842 A1* | 5/2019 | Nowell | F04B 53/16 |
| 2019/0277279 A1 | 9/2019 | Byrne et al. | |
| 2019/0277341 A1 | 9/2019 | Byrne et al. | |
| 2020/0182240 A1 | 6/2020 | Nowell et al. | |
| 2020/0191146 A1 | 6/2020 | Rinaldi et al. | |
| 2020/0232455 A1 | 7/2020 | Blume | |

FOREIGN PATENT DOCUMENTS

| | | |
|---|---|---|
| WO | 2014144113 A2 | 9/2014 |
| WO | 2017096488 A1 | 6/2017 |
| WO | 2017139348 A1 | 8/2017 |
| WO | 2018197458 A1 | 11/2018 |

OTHER PUBLICATIONS

International Searching Authority, "PCT Written Opinion of the International Searching Authority", dated Mar. 2, 2021, 6 pages.
International Searching Authority, "PCT International Search Report", dated Mar. 2, 2021, 5 pages.
International Searching Authority, "PCT Written Opinion of the International Searching Authority", dated Mar. 2, 2021, 9 pages.
International Searching Authority, "PCT International Search Report", dated Mar. 8, 2021, 3 pages.
International Searching Authority, "PCT Written Opinion of the International Searching Authority", dated Mar. 8, 2021, 8 pages.
International Searching Authority, "PCT International Search Report", dated Mar. 2, 2021, 3 pages.
U.S. Patent and Trademark Office, "Office Action Summary" dated Jun. 4, 2021, 41 pages, Alexandria, VA.
U.S. Patent and Trademark Office, "Office Action Summary" dated Apr. 9, 2021 2021, 38 pages, Alexandria, VA.
U.S. Patent and Trademark Office, "Office Action Summary" dated Mar. 23, 2021, 41 pages, Alexandria, VA.

* cited by examiner

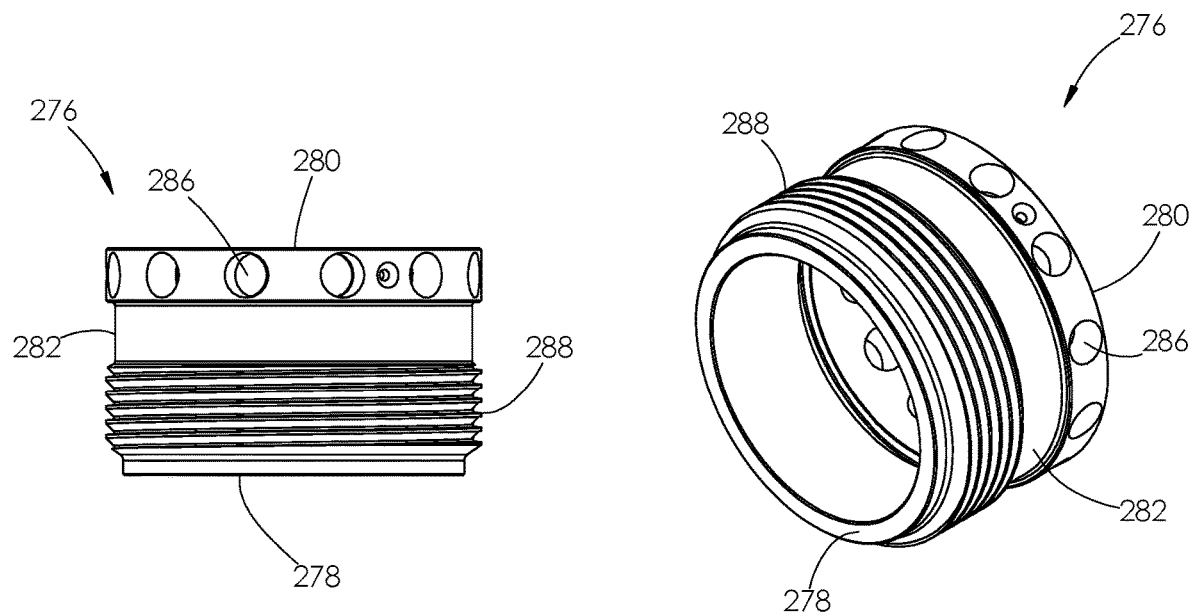
FIG. 43
FIG. 44
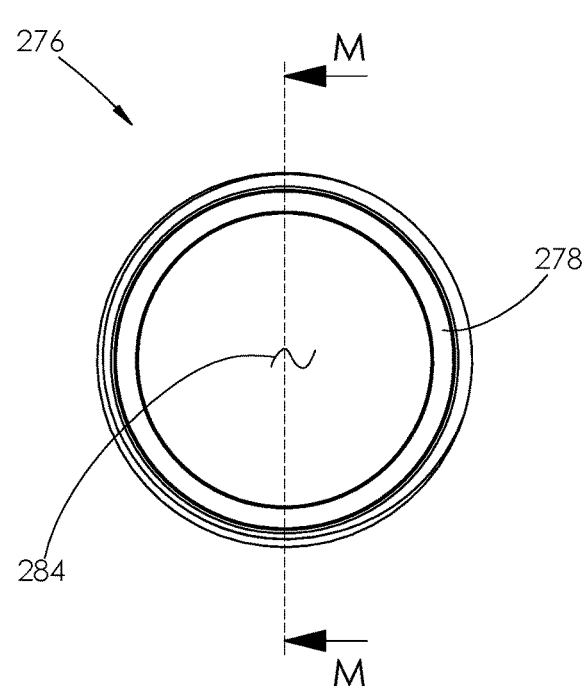
FIG. 45
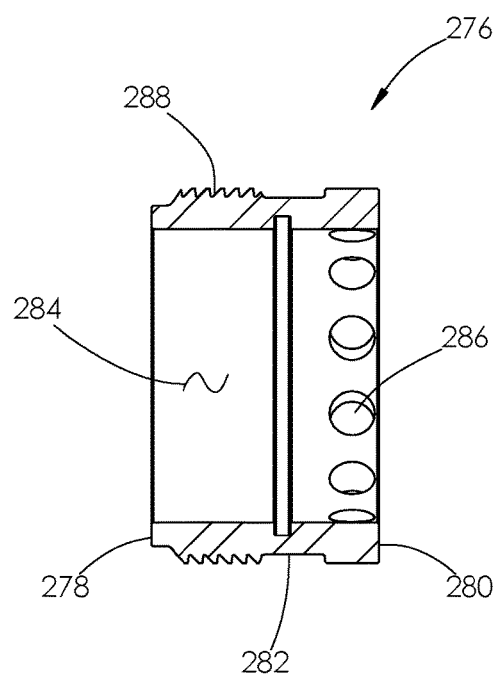
FIG. 46

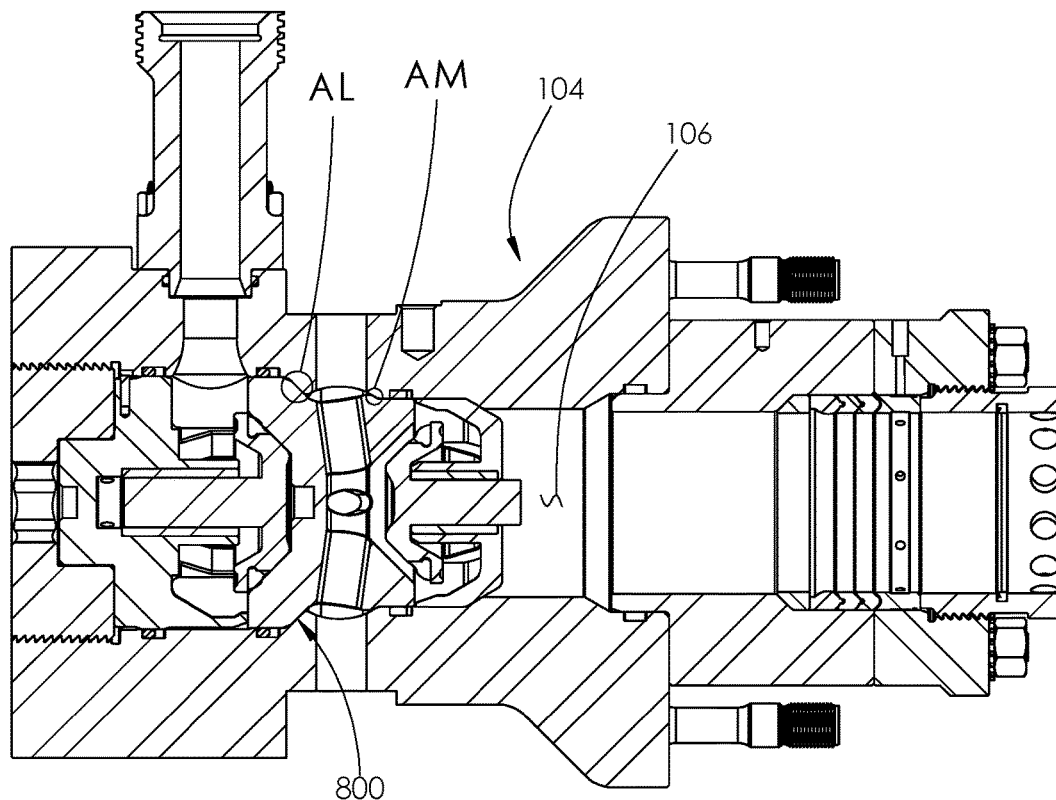
FIG. 118
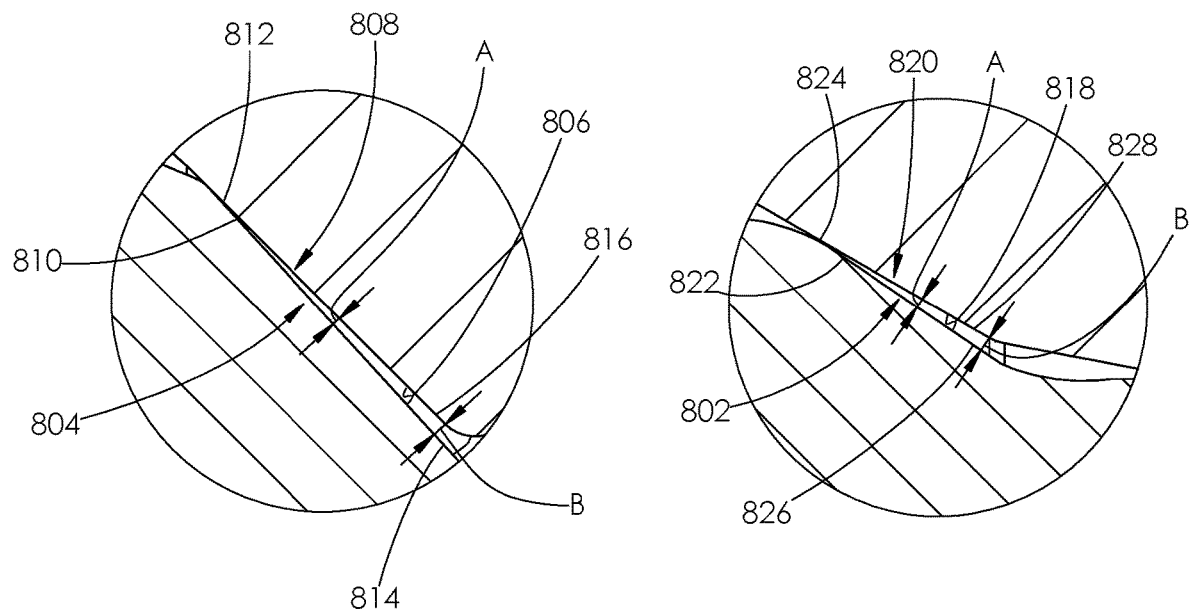
FIG. 119
FIG. 120

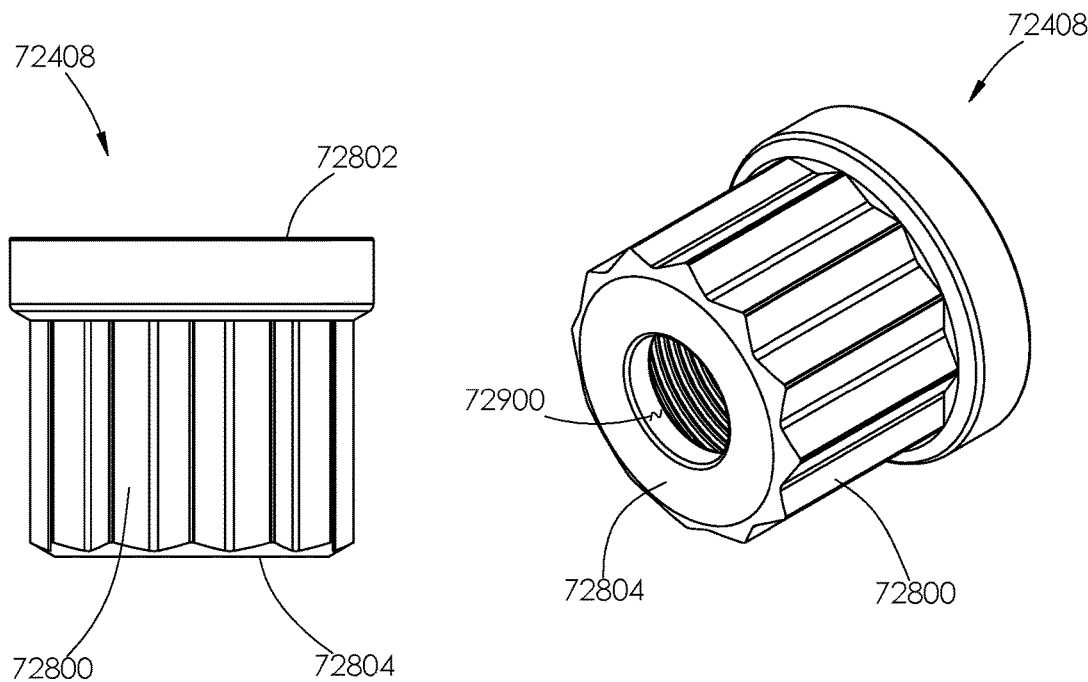
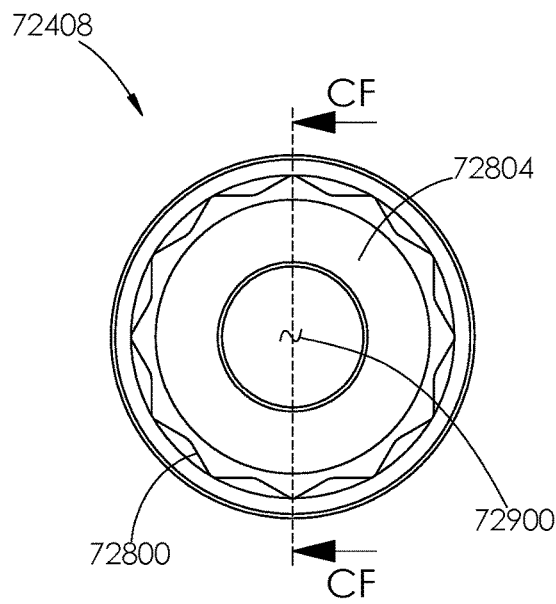
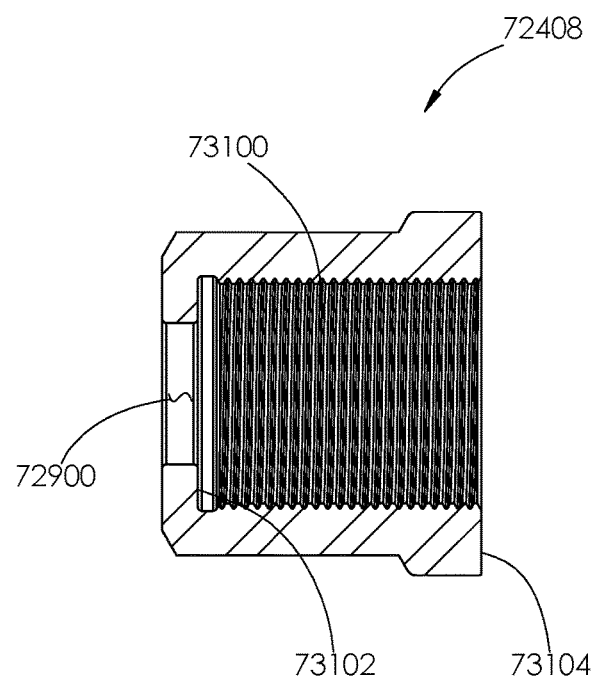
FIG. 154
FIG. 155
FIG. 156
FIG. 157

HIGH PRESSURE PUMP

RELATED APPLICATIONS

This application claims the benefit of the following provisional patent applications: Ser. No. 62/936,789, authored by Thomas et al. and filed on Nov. 18, 2019; Ser. No. 62/940,513, authored by Thomas et al. and filed on Nov. 26, 2019; Ser. No. 62/953,763, authored by Thomas et al. and filed on Dec. 26, 2019; Ser. No. 62/957,489, authored by Foster et al. and filed on Jan. 6, 2020; Ser. No. 62/959,570, authored by Thomas et al. and filed on Jan. 10, 2020; Ser. No. 62/960,194, authored by Foster et al. and filed on Jan. 13, 2020; Ser. No. 62/960,366, authored by Foster et al. and filed on Jan. 13, 2020; Ser. No. 62/968,634, authored by Foster et al. and filed on Jan. 31, 2020; Ser. No. 62/990,817, authored by Thomas et al. and filed on Mar. 17, 2020; Ser. No. 63/008,036, authored by Thomas et al. and filed on Apr. 10, 2020; Ser. No. 63/018,021, authored by Thomas et al. and filed Apr. 30, 2020; Ser. No. 63/019,789, authored by Thomas et al. and filed on May 4, 2020; Ser. No. 63/027,584, authored by Thomas et al. and filed on May 20, 2020; Ser. No. 63/033,244, authored by Thomas et al. and filed Jun. 2, 2020; Ser. No. 63/040,086, authored by Thomas et al. and filed on Jun. 17, 2020; Ser. No. 63/046,826, authored by Thomas et al. and filed on Jul. 1, 2020; Ser. No. 63/053,797, authored by Thomas et al. and filed on Jul. 20, 2020; Ser. No. 63/076,587, authored by Thomas et al. and filed on Sep. 10, 2020; and Ser. No. 63/089,882, authored by Thomas et al. and filed on Oct. 9, 2020. The entire contents of all of the above listed provisional patent applications are incorporated herein by reference.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a hydraulic pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi. The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively deliver about 4,200 gallons per minute or 100 barrels per minute to the wellbore.

In contrast, mud pumps known in the art typically operate at a pressure of less than 8,000 psi. Mud pumps are used to deliver drilling mud to a rotating drill bit within the wellbore during drilling operations. Thus, the drilling mud does not need to have as high of fluid pressure as fracking fluid. A fluid end does not pump drilling mud. A power end used with mud pumps typically has a power output of less than 2,250 horsepower. Mud pumps generally produce a fluid volume of about 150-600 gallons per minute, depending on the size of pump used.

In further contrast, a fluid jetting pump known in the art typically operates at pressures of 30,000-90,000 psi. Jet pumps are used to deliver a highly concentrated stream of fluid to a desired area. Jet pumps typically deliver fluid through a wand. Fluid ends do not deliver fluid through a wand. Unlike fluid ends, jet pumps are not used in concert with a plurality of other jet pumps. Rather, only a single jet pump is used to pressurize fluid. A power end used with a jet pump typically has a power output of about 1,000 horsepower. Jet pumps generally produce a fluid volume of about 10 gallons per minute.

High operational pressures may cause a fluid end to expand or crack. Such a structural failure may lead to fluid leakage, which leaves the fluid end unable to produce and maintain adequate fluid pressures. Moreover, if proppants are included in the pressurized fluid, those proppants may cause erosion at weak points within the fluid end, resulting in additional failures.

It is not uncommon for conventional fluid ends to experience failure after only several hundred operating hours. Yet, a single fracking operation may require as many as fifty (50) hours of fluid end operation. Thus, a traditional fluid end may require replacement after use on as few as two fracking jobs.

During operation of a hydraulic pump, the power end is not exposed to the same corrosive and abrasive fluids that move through the fluid end. Thus, power ends typically have much longer lifespans than fluid ends. A typical power end may service five or more different fluid ends during its lifespan. However, as described below, common failure points are also found in traditional power ends.

With reference to FIG. 3, a traditional power end 34 is shown. The power end 34 comprises a housing 36 having a mounting plate 38 formed on its front end 40. The housing 36 is traditionally a one-piece frame fabricated from steel plate and/or casting to provide a structure to mount a crankshaft and drive apparatus. The housing 36 is very heavy due to the size of the material needed to withstand the forces applied during operation and because of the large mount areas needed to attach the various components.

Continuing with FIG. 3, a plurality of stay rods 42 are attached to and project from the mounting plate 38. The stay rods 42 are typically torqued into threaded holes formed in the mounting plate 38. A fluid end, such as a fluid end 46, attaches to the projecting ends of the stay rods 42, such that the power end 34 supports the weight of the fluid end.

Traditional power ends, like the power end 34, often fail at the mounting plate 38. During operation, high areas of stress concentration are produced at the threaded holes formed in the mounting plate 38 for receiving the stay rods 42. Typical failures include breaking of the threads or areas of the mounting plate 38 adjacent the threaded holes, and weld failures. All of these failures require significant repair to, or complete replacement of, the power end.

Continuing with FIG. 3, a plurality of pony rods 44 are disposed at least partially within the power end 34 and project from openings formed in the mounting plate 38. Each of the pony rods 44 is attached to a crank shaft installed within the housing 36. Rotation of the crank shaft powers reciprocal motion of the pony rods 44 relative to the mounting plate 38. Other common failures in traditional power ends occur due to poor lubrication of the moving parts.

It is known in the art to lubricate the main bearings and connecting rod bearings by forcing pressurized lubricant through a center bore and intersecting cross bores in the crankshaft. It is also known in the art to lubricate the wrist pin, connecting rod end, thrust seat and crosshead by forcing pressurized lubricant into the crosshead bore and intersecting cross bores through the crosshead, thrust seat, and crosshead end of the connecting rod. The problem is that the entire lubrication system is a single system. One lubrication pump pressurizes a manifold to which all lubrication circuits are attached.

During operation components wear and clearances between the components increase. This increase in the clearances reduces the amount of resistance to lubricant flow resulting in higher lubricant flow in that area. While higher lubricant flow results in reduced wear in that circuit, the other circuits will experience reduced flow and higher wear. The reduced lubricant flow will accelerate the wear in another area increasing clearances until it receives enough lubricant to stop eroding. This alternating wear and lubrication cycle repeats causing uneven and accelerated wear in the components of the power end reducing maintenance intervals.

In order to reduce, mitigate, or eliminate the failures listed above, the inventors propose a novel power end assembly with modular construction, as described below. Such modular construction also reduces the physical dimensions and weight Continuing with FIG. 3, the fluid end 46 comprises a single housing 48 having a flange 50 machined therein. The flange 50 provides a connection point for the plurality of stay rods 42. The stay rods 42 rigidly interconnect the power end 34 and the fluid end 46. When connected, the fluid end 46 is suspended in offset relationship to the power end 34.

A plurality of plungers 52 are disposed within the fluid end 46 and project from openings formed in the flange 50. The plungers 52 and pony rods 44 are arranged in a one-to-one relationship, with each plunger 52 aligned with and connected to a corresponding one of the pony rods 44. Reciprocation of each pony rod 44 causes its connected plunger 52 to reciprocate within the fluid end 46. In operation, reciprocation of the plungers 52 pressurizes fluid within the fluid end 46. The reciprocation cycle of each plunger 52 is differently phased from that of each adjacent plunger 52.

With reference to FIG. 5, the interior of the fluid end 46 includes a plurality of longitudinally spaced bore pairs. Each bore pair includes a vertical bore 56 and an intersecting horizontal bore 58. The zone of intersection between the paired bores defines an internal chamber 60. Each plunger 52 extends through a horizontal bore 58 and into its associated internal chamber 60. The plungers 52 and horizontal bores 58 are arranged in a one-to-one relationship.

Each horizontal bore 58 is sized to receive a plurality of packing seals 64. The seals 64 are configured to surround the installed plunger 52 and prevent high-pressure fluid from passing around the plunger 52 during operation. The packing seals 64 are maintained within the bore 58 by a retainer 65. The retainer 65 has external threads 63 that mate with internal threads 67 formed in the walls surrounding the bore 58. In some traditional fluid ends, the packing seals 64 are installed within a removable stuffing box sleeve that is installed within the horizontal bore.

Each vertical bore 56 interconnects opposing top and bottom surfaces 66 and 68 of the fluid end 46. Each horizontal bore 58 interconnects opposing front and rear surfaces 70 and 72 of the fluid end 46. A discharge plug 74 seals each opening of each vertical bore 56 on the top surface 66 of the fluid end 46. Likewise, a suction plug 76 seals each opening of each horizontal bore 58 on the front surface 70 of the fluid end 46.

Each of the plugs 74 and 76 features a generally cylindrical body. An annular seal 77 is installed within a recess formed in an outer surface of that body, and blocks passage of high pressure fluid. The discharge and suction plugs 74 and 76 are retained within their corresponding bores 56 and 58 by a retainer 78, shown in FIGS. 3, 5, and 6. The retainer 78 has a cylindrical body having external threads 79 formed in its outer surface. The external threads 79 mate with internal threads 81 formed in the walls surrounding the bore 56 or 58 between the installed plug 74 or 76 and the surface 66 or 70 of the fluid end 46.

As shown in FIG. 3, a single manifold 80 is attached to the fluid end 46. The manifold 80 is also connected to an intake piping system, of the type shown in FIG. 2. Fluid to be pressurized is drawn from the intake piping system into the manifold 80, which directs the fluid into each of the vertical bores 56, by way of openings (not shown) in the bottom surface 68.

When a plunger 52 is retracted, fluid is drawn into each internal chamber 60 from the manifold 80. When a plunger 52 is extended, fluid within each internal chamber 60 is pressurized and forced towards a discharge conduit 82. Pressurized fluid exits the fluid end 46 through one or more discharge openings 84, shown in FIGS. 3-5. The discharge openings 84 are in fluid communication with the discharge conduit 82. The discharge openings 84 are attached to a discharge piping system, of the type shown in FIG. 2.

A pair of valves 86 and 88 are installed within each vertical bore 56, on opposite sides of the internal chamber 60. The valve 86 prevents backflow in the direction of the manifold 80, while the valve 88 prevents backflow in the direction of the internal chamber 60. The valves 86 and 88 each comprise a valve body 87 that seals against a valve seat 89.

Traditional fluid ends are normally machined from high strength alloy steel. Such material can corrode quickly, leading to fatigue cracks. Fatigue cracks occur because corrosion of the metal decreases the metal's fatigue strength—the amount of loading cycles that can be applied to a metal before it fails. Such cracking can allow leakage that prevents a fluid end from achieving and maintaining adequate pressures. Once such leakage occurs, fluid end repair or replacement becomes necessary.

Fatigue cracks in fluid ends are commonly found in areas that experience high stress. For example, with reference to the fluid end 46 shown in FIG. 5, fatigue cracks are common at a corner 90 formed in the interior of the fluid end 46 by the intersection of the walls surrounding the horizontal bore 58 with the walls surrounding the vertical bore 56. A plurality of the corners 90 surround each internal chamber 60. Because fluid is pressurized within each internal chamber 60, the corners 90 typically experience the highest amount of stress during operation, leading to fatigue cracks. Fatigue cracks are also common at the neck that connects the flange 50 and the housing 48. Specifically, fatigue cracks tend to form at an area 92 where the neck joins the housing 48, as shown for example in FIGS. 4 and 5.

For the above reasons, there is a need in the industry for a fluid end configured to avoid or significantly delay the structures or conditions that cause wear or failures within a fluid end.

BRIEF DESCRIPTION OF THE DRAWINGS

FIG. 35 is a perspective view of a second surface of the retainer shown in

FIG. 30.

FIG. 43 is a top plan view of a packing nut shown installed within the retainer in FIG. 20.

FIG. 44 is a perspective view of a first surface of the packing nut shown in FIG. 43.

FIG. 45 is an elevational view of the first surface of the packing nut shown in FIG. 43.

FIG. 46 is a cross-sectional view of the packing nut shown in FIG. 45, taken along line M-M.

FIG. 48 is an elevational view of the first surface of the retainer shown in

FIG. 47.

FIG. 108 is the cross-sectional view of the fluid end section shown in FIG. 50, but the fluid routing plug from FIG. 101 is shown installed within the housing.

FIG. 109 is the cross-sectional view of the fluid end section shown in FIG. 51, but the fluid routing plug from FIG. 101 is shown installed within the housing.

FIG. 110 is a top plan view of another embodiment of a suction and discharge valve.

FIG. 111 is a perspective view of a second surface of the suction and discharge valve shown in FIG. 110.

FIG. 112 is an elevational view of a second surface of the suction and discharge valve shown in FIG. 110.

FIG. 113 is a perspective view of a first surface of the suction and discharge valve shown in FIG. 110.

FIG. 114 is a cross-sectional view of the suction and discharge valve shown in FIG. 112, taken along line AI-AI.

FIG. 115 is the cross-sectional view of the fluid end section shown in FIG. 65, but another embodiment of a fluid routing plug is shown installed within the housing.

FIG. 116 is an enlarged view of area AJ shown in FIG. 115.

FIG. 117 is an enlarged view of area AK shown in FIG. 115.

FIG. 118 is the cross-sectional view of the fluid end section shown in FIG. 65, but another embodiment of a fluid routing plug is shown installed within the housing.

FIG. 119 is an enlarged view of area AL shown in FIG. 118.

FIG. 120 is an enlarged view of area AM shown in FIG. 118.

Figure 121:
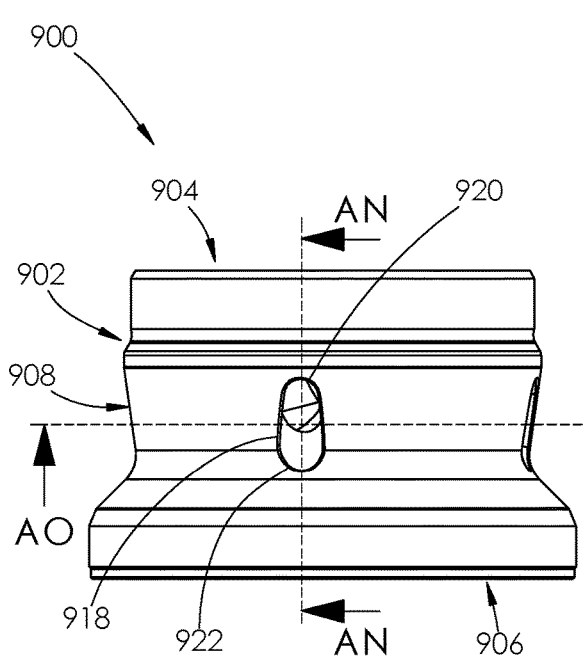

FIG. 121 is a top plan view of another embodiment of a fluid routing plug.

Figure 122:
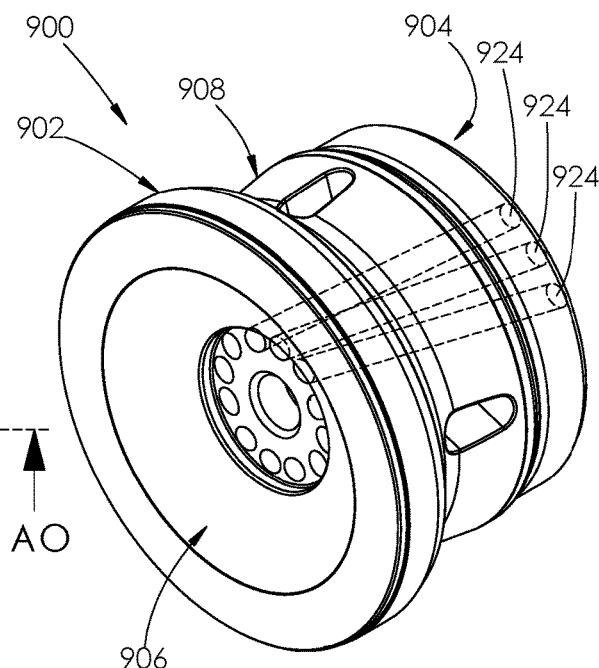

FIG. 122 is a perspective view of a second surface of the fluid routing plug shown in FIG. 121, with a plurality of second fluid passages formed within the plug shown by phantom lines.

Figure 123:
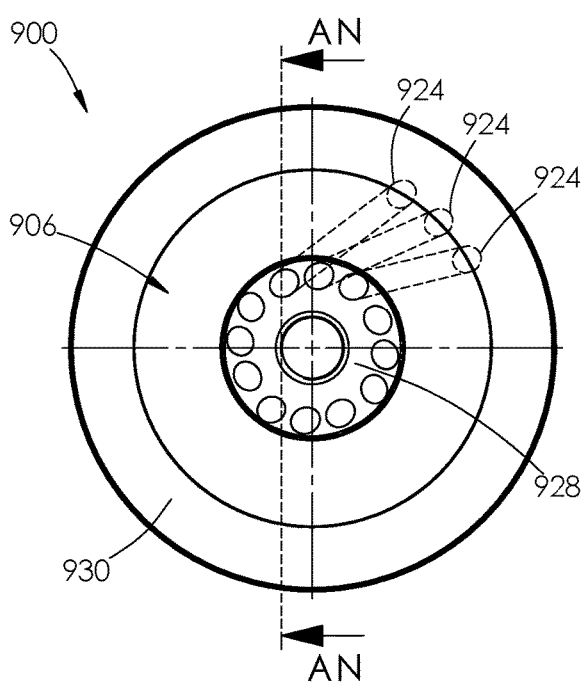

FIG. 123 is an elevational view of the second surface of the fluid routing plug shown in FIG. 121, with a plurality of second fluid passages formed within the plug shown by phantom lines.

Figure 124:
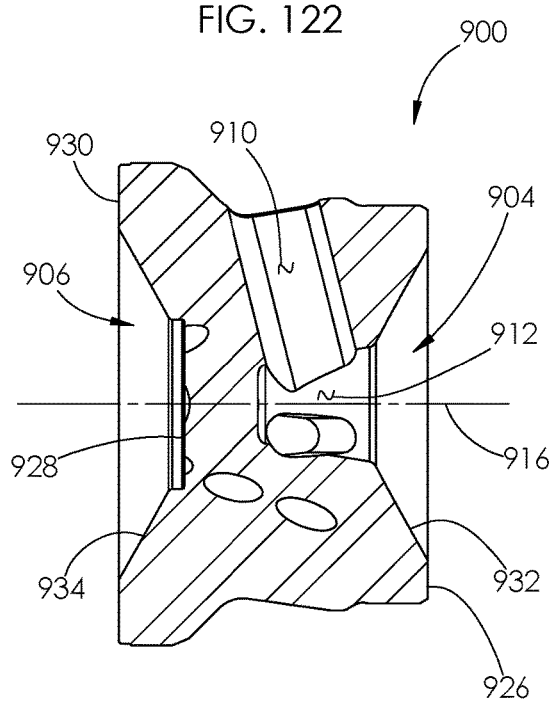

FIG. 124 is a cross-sectional view of the fluid routing plug shown in FIG. 123, taken along line AN-AN.

Figure 125:
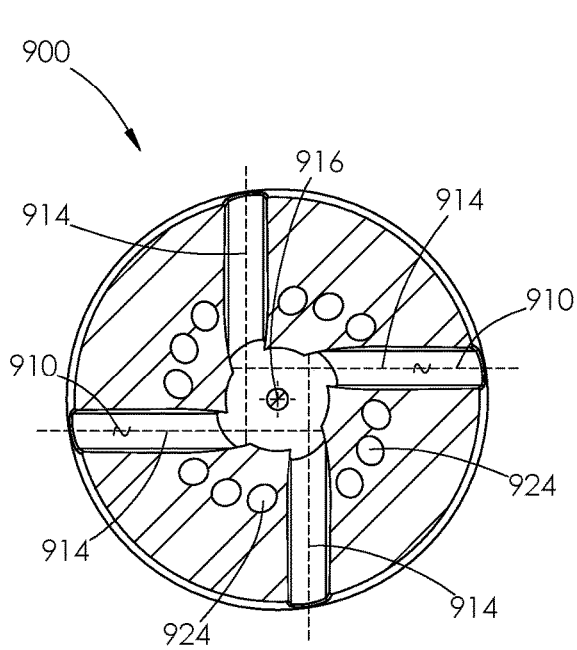

FIG. 125 is a cross-sectional view of the fluid routing plug shown in FIG. 121, taken along line AO-AO.

Figure 126:
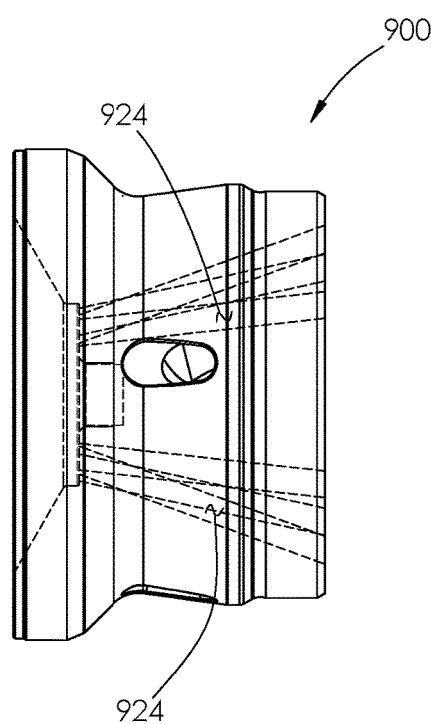

FIG. 126 is the top plan view of the fluid routing plug shown in FIG. 121, with the plurality of second fluid passages formed within the plug shown by phantom lines.

Figure 127:
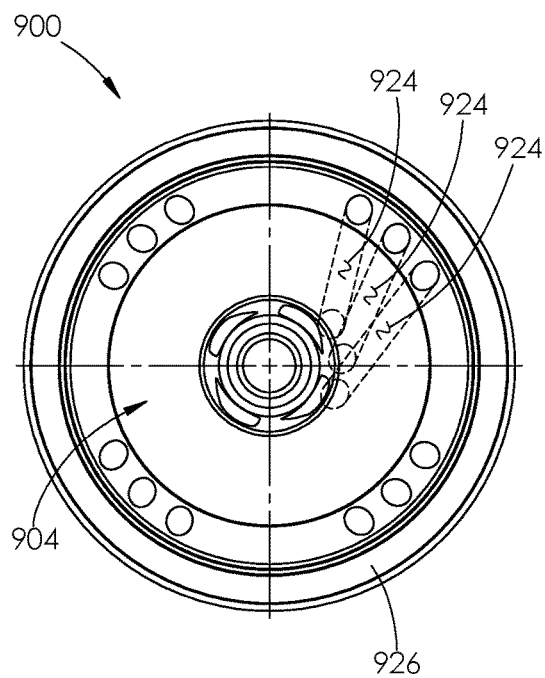

FIG. 127 is an elevational view of a first surface of the fluid routing plug shown in FIG. 121, with a plurality of second fluid passages formed within the plug shown by phantom lines.

Figure 128:
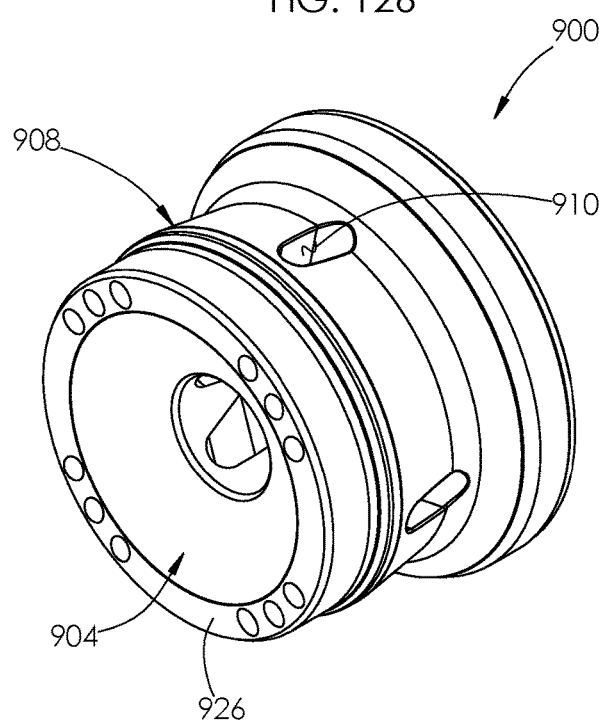

FIG. 128 is a perspective view of the first surface of the fluid routing plug shown in FIG. 121.

Figure 128A:
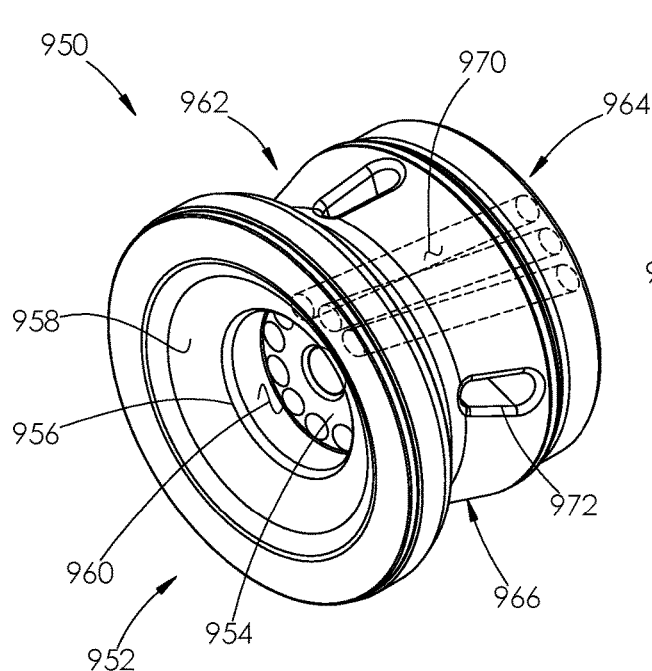

FIG. 128A is a perspective view of a second surface of another embodiment of a fluid routing plug.

Figure 128B:
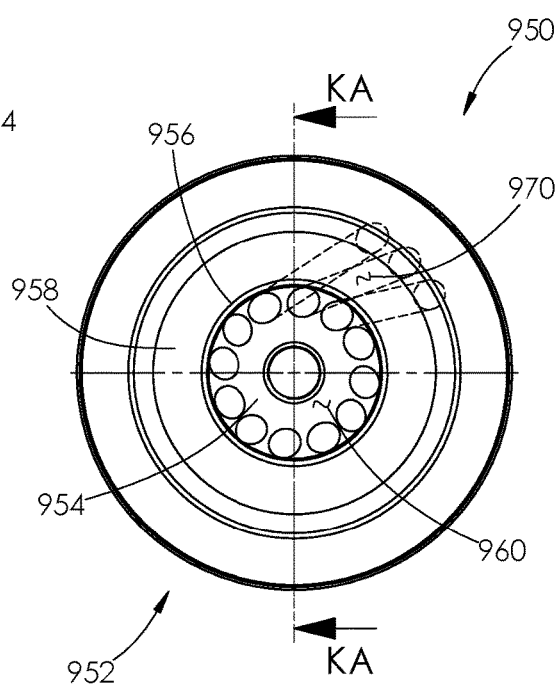

FIG. 128B is an elevational view of the second surface of the fluid routing plug shown in FIG. 128A.

Figure 128C:
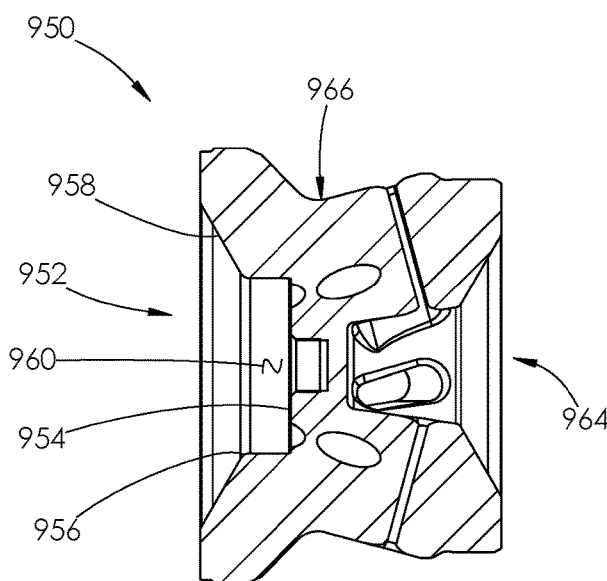

FIG. 128C is a cross-sectional view of the fluid routing plug shown in FIG. 128A, taken along line KA-KA.

Figure 128D:
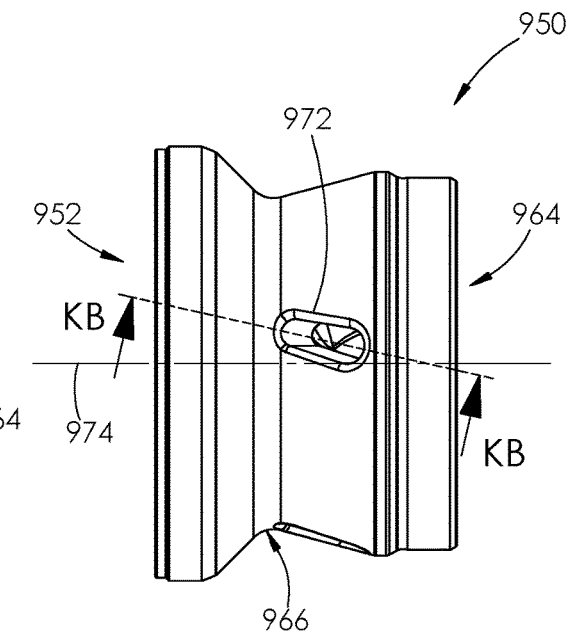

FIG. 128D is a top plan view of the fluid routing plug shown in FIG. 128A.

Figure 128E:
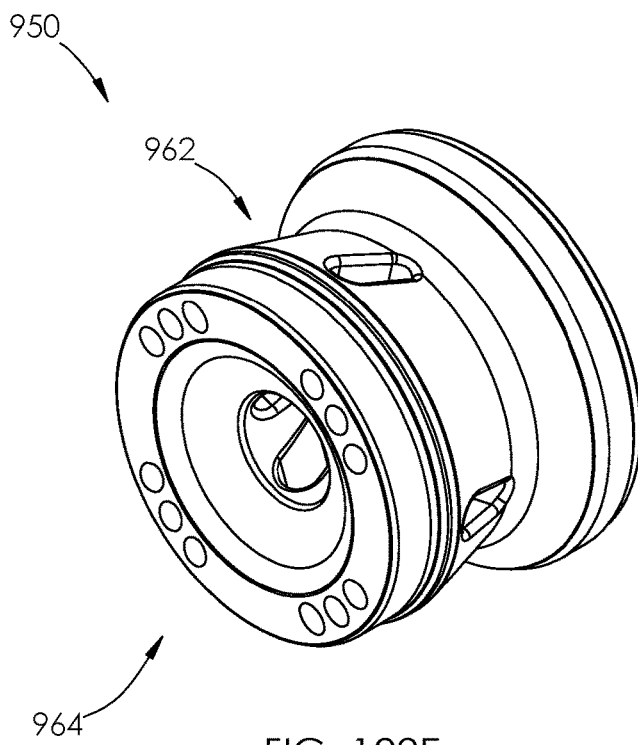

FIG. 128E is a perspective view of a first surface of the fluid routing plug shown in FIG. 128A.

Figure 128F:
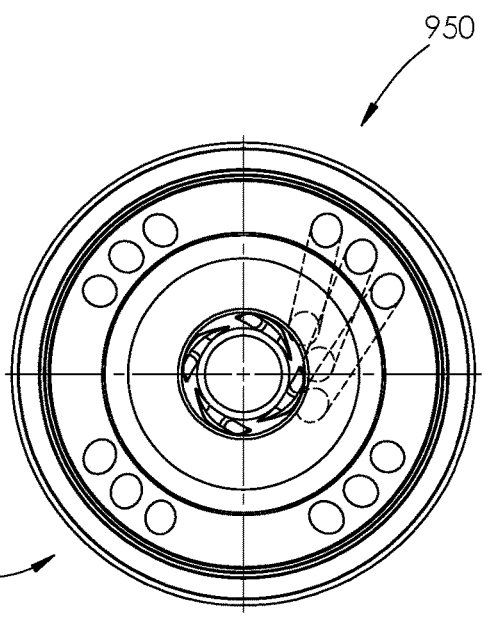

FIG. 128F is an elevational view of the first surface of the fluid routing plug shown in FIG. 128A.

Figure 128G:
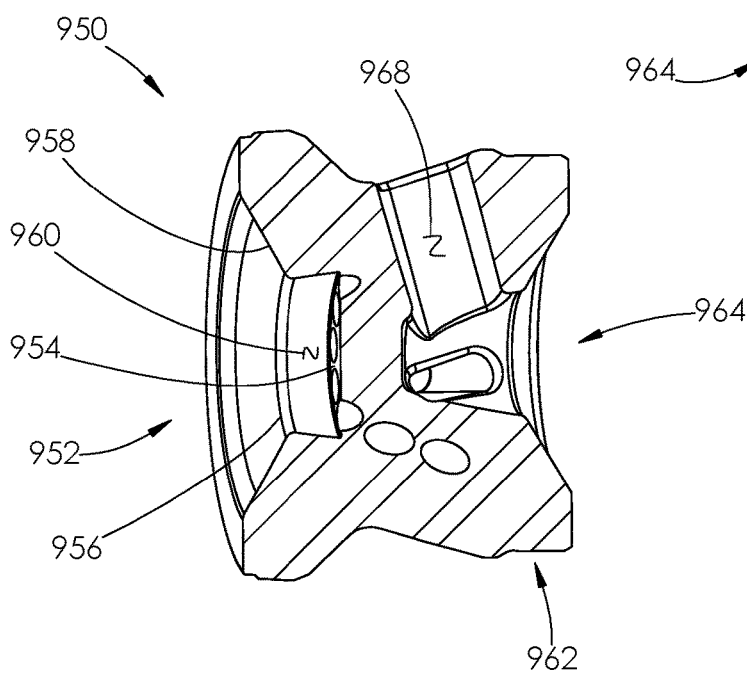

FIG. 128G is a cross-sectional view of the fluid routing plug shown in FIG. 128D, taken along line KB-KB.

Figure 129:
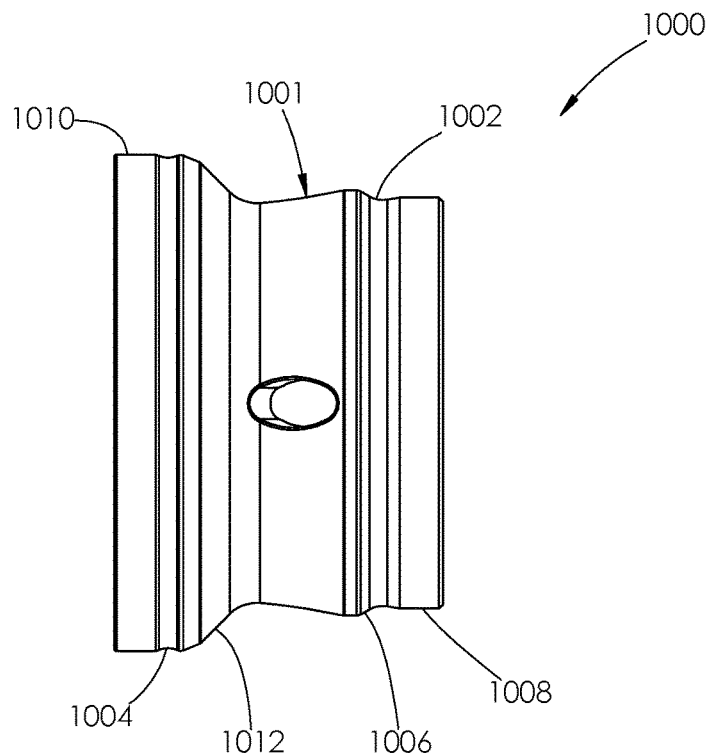

FIG. 129 is a top plan view of another embodiment of a fluid routing plug.

Figure 130:
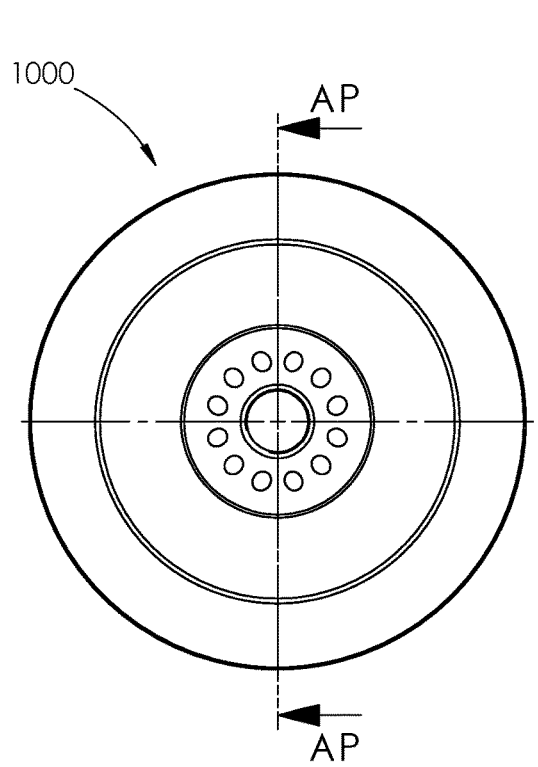

FIG. 130 is an elevational view of a second surface of the fluid routing plug shown in FIG. 129.

Figure 131:
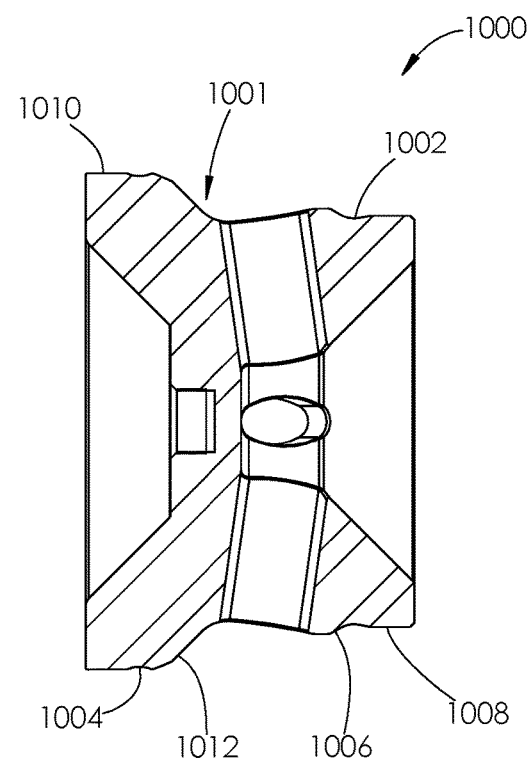

FIG. 131 is a cross-sectional view of the fluid routing plug shown in FIG. 130, taken along line AP-AP.

Figure 6:
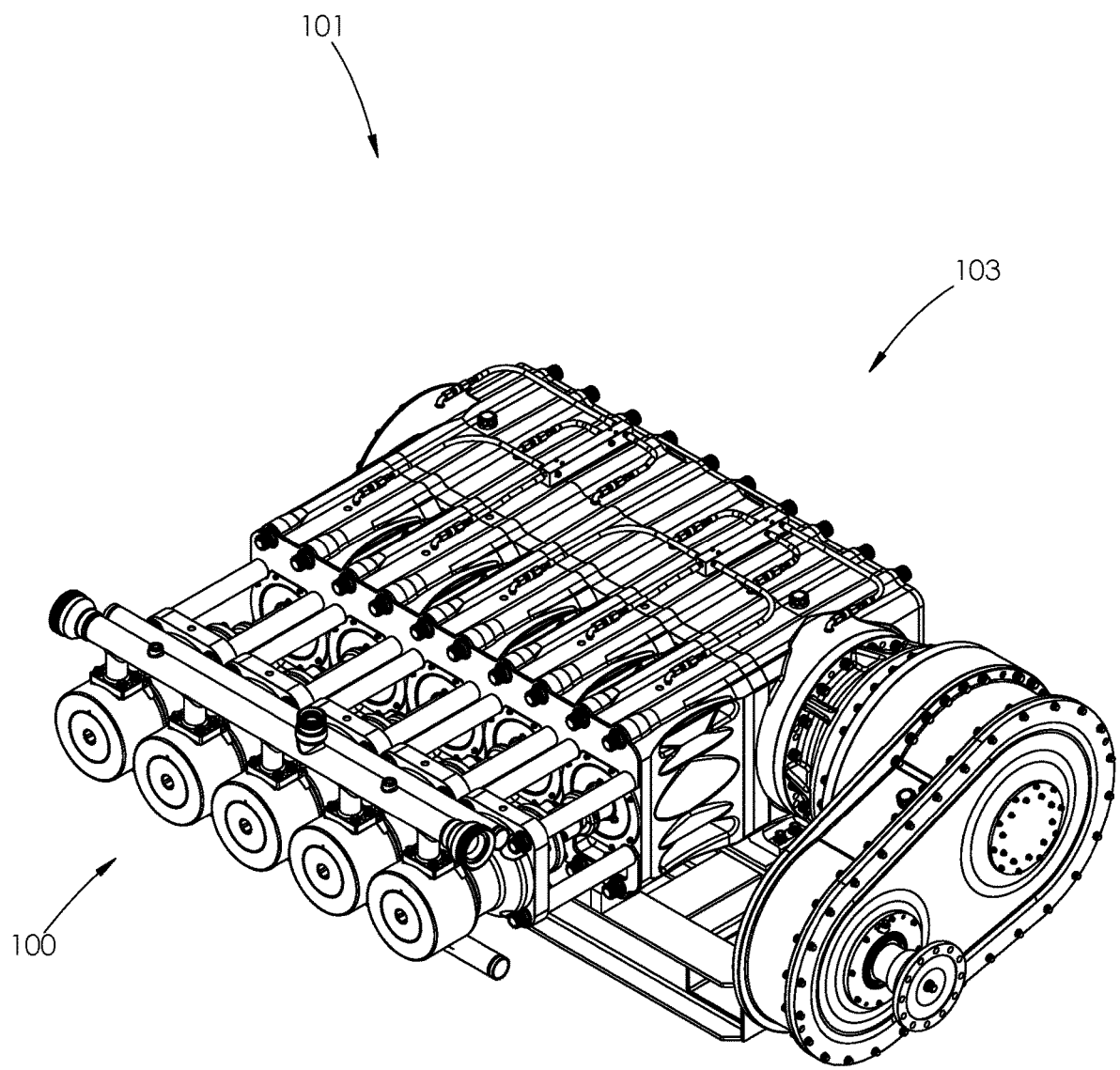
FIG. 6 is a front perspective view of one embodiment of a high pressure pump.
Figure 132:
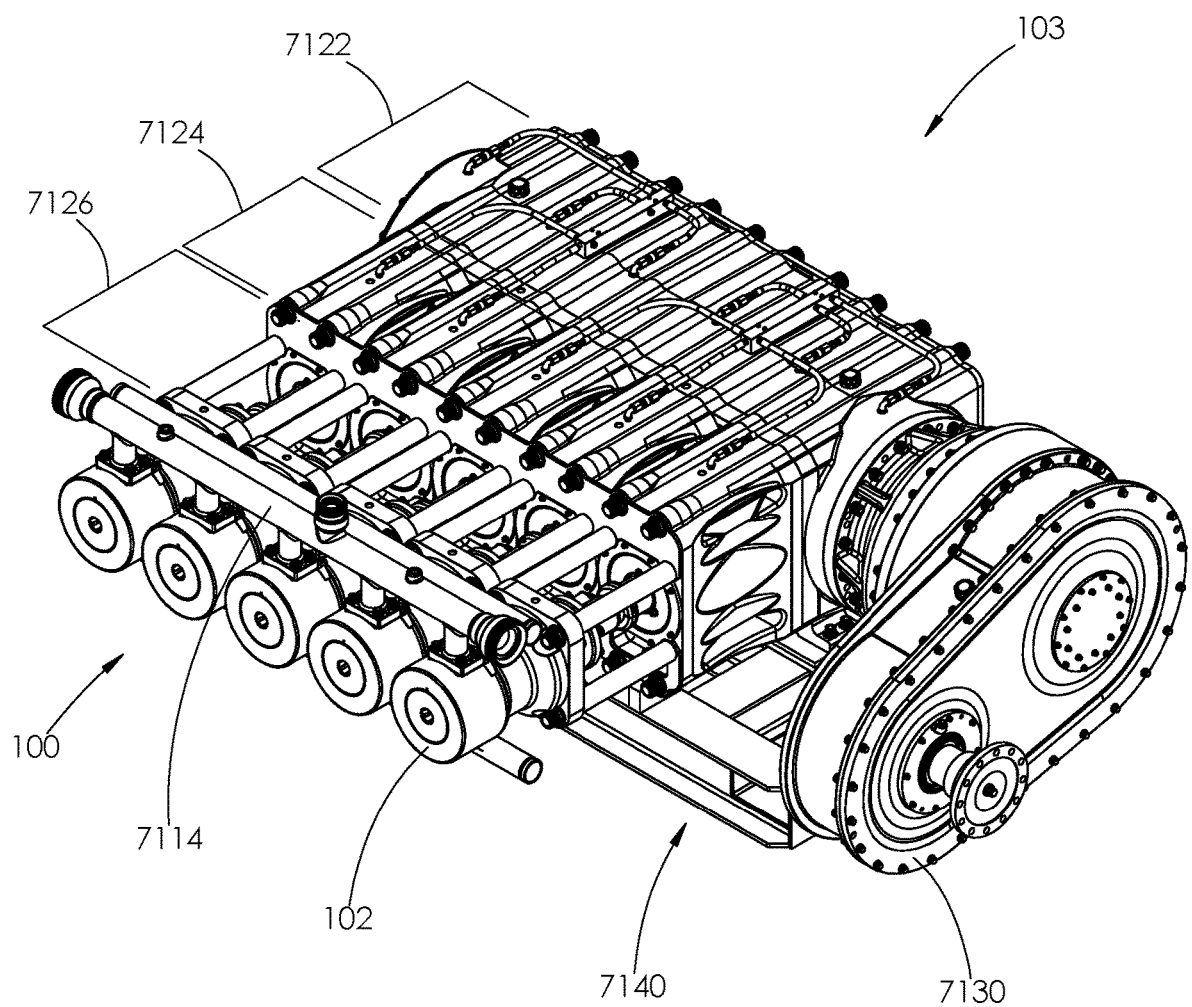

FIG. 132 is a front right-side perspective view of the high pressure pump shown in FIG. 6.

FIGS. 133-138 are views of the high pressure pump shown in FIG. 132 with the drive section and base section removed.

Figure 139:
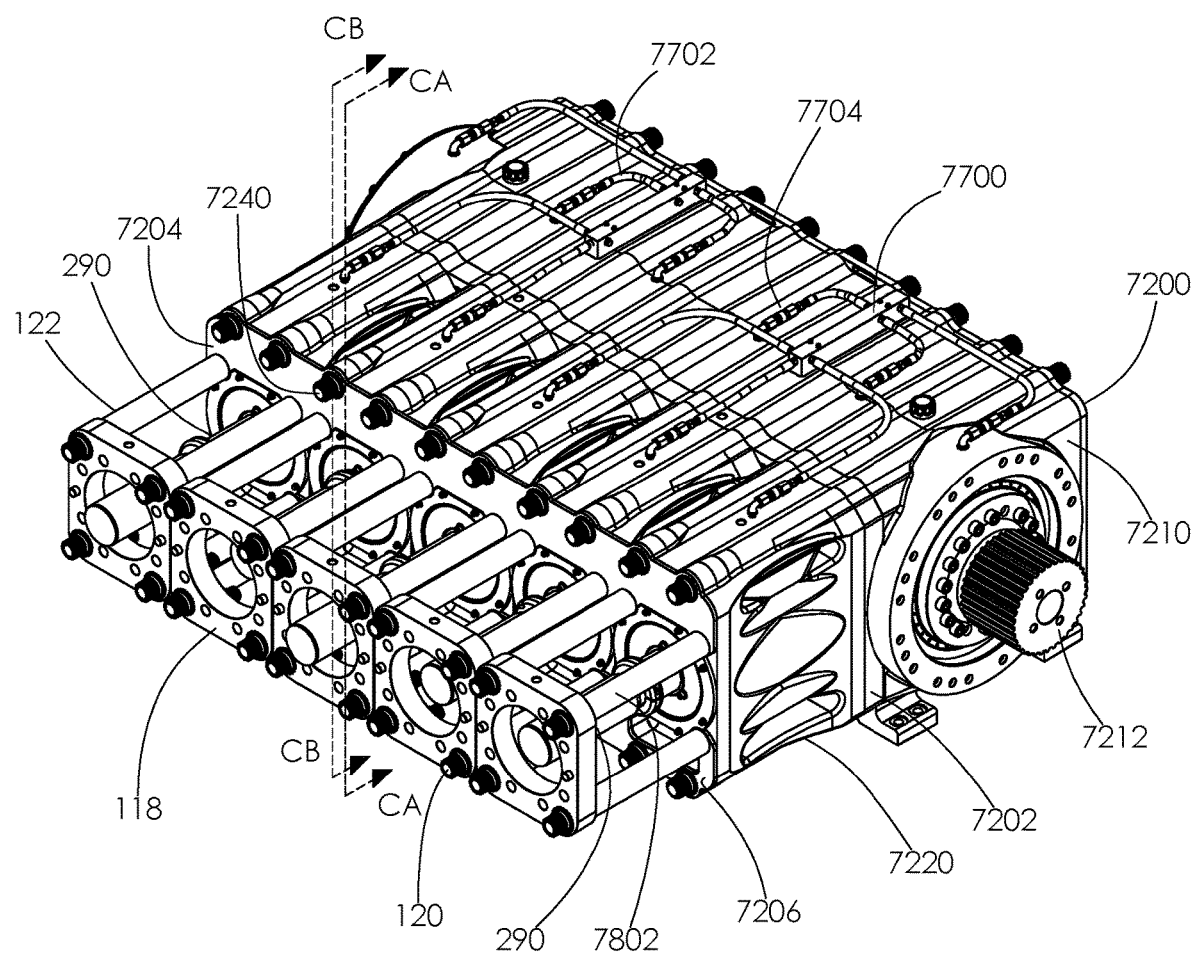

FIG. 139 is a front right-side perspective view of the power end shown in FIG. 132.

Figure 140:
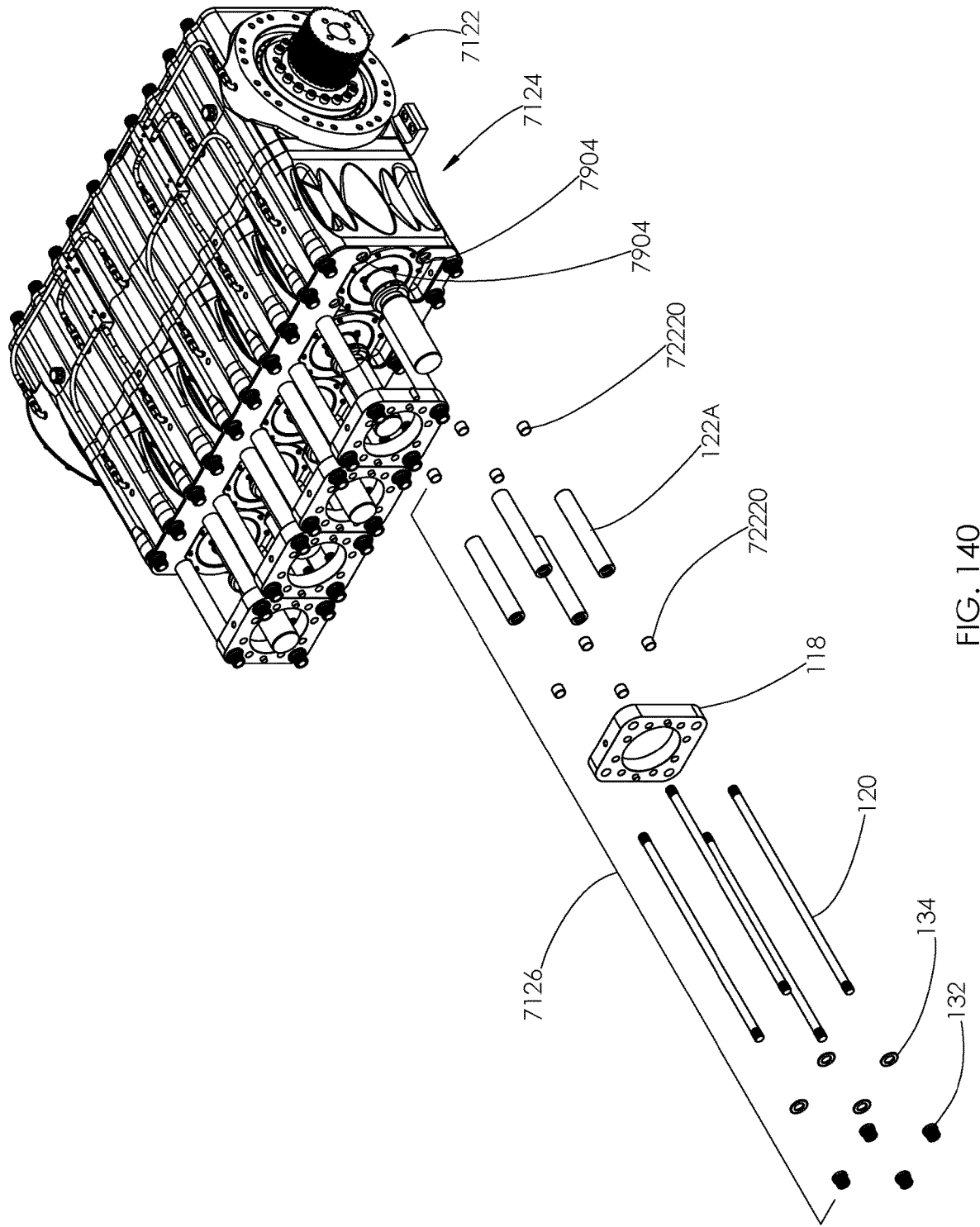

FIG. 140 is an exploded view of the power end shown in FIG. 139.

Figure 141:
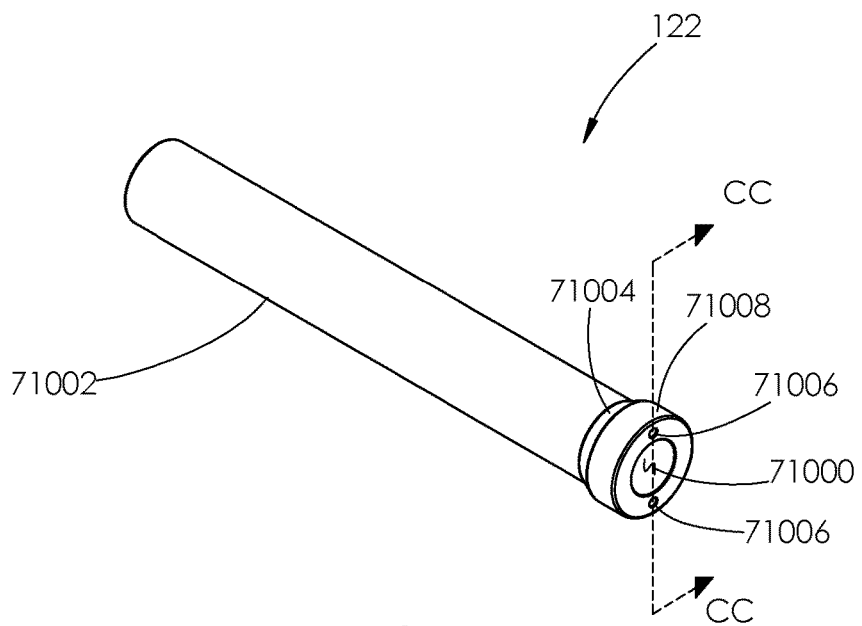
Figures 142, 143:
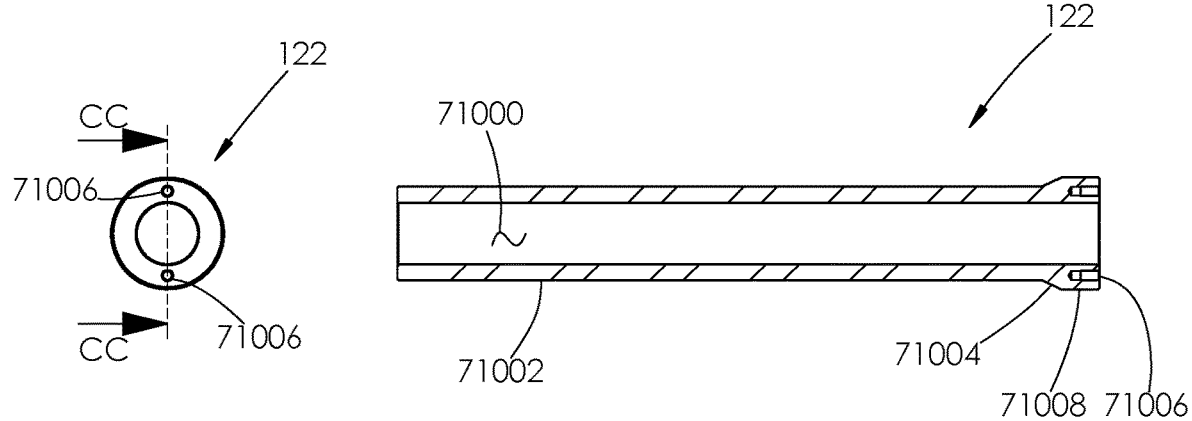

FIGS. 141-143 are views of a spacer.

FIGS. 144-149 and 149A are cutaway views of the power end shown in FIG. 139.

Figure 150:
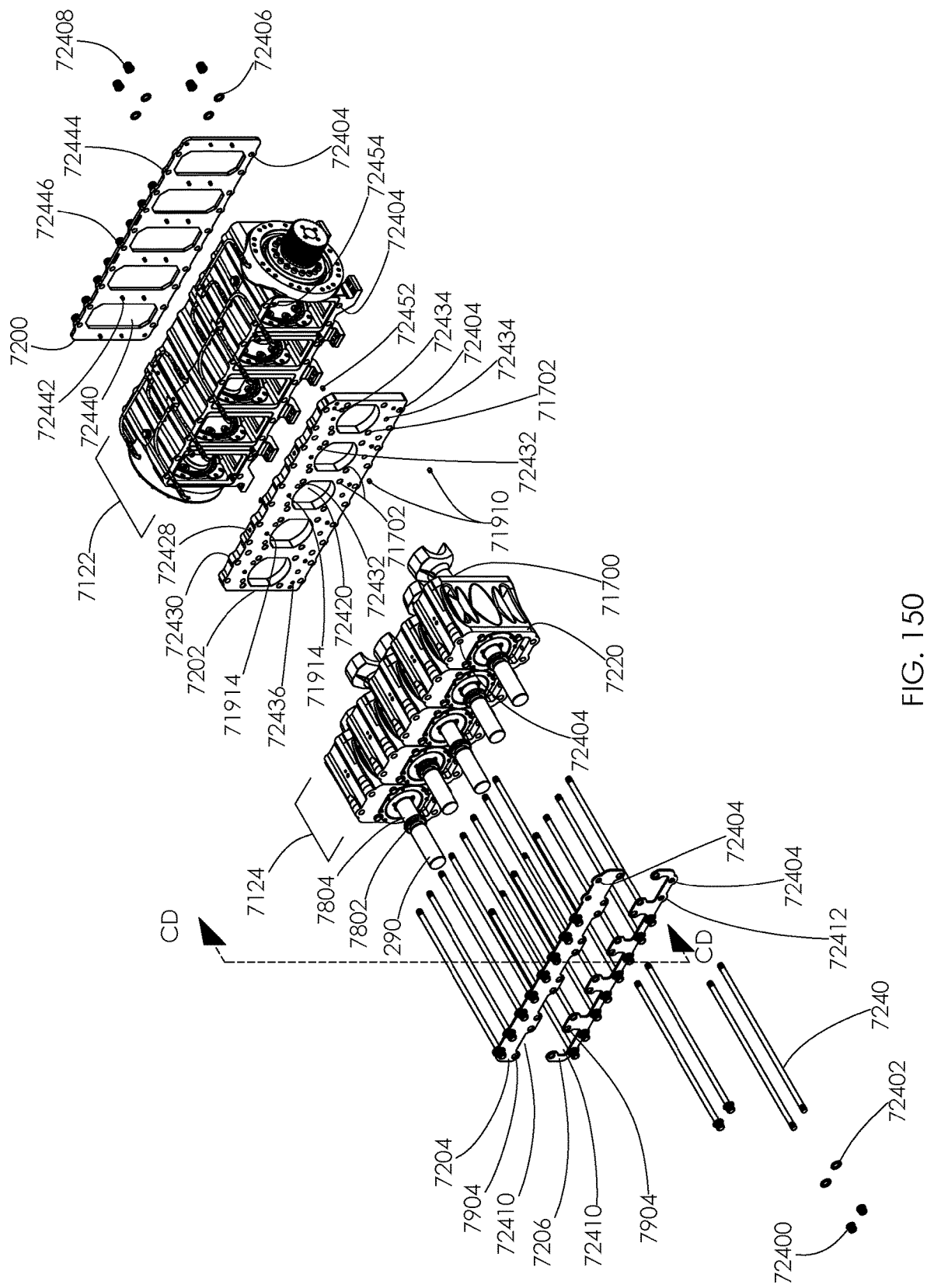

FIG. 150 is a front perspective exploded view of the power end shown in FIG. 139.

Figure 151:
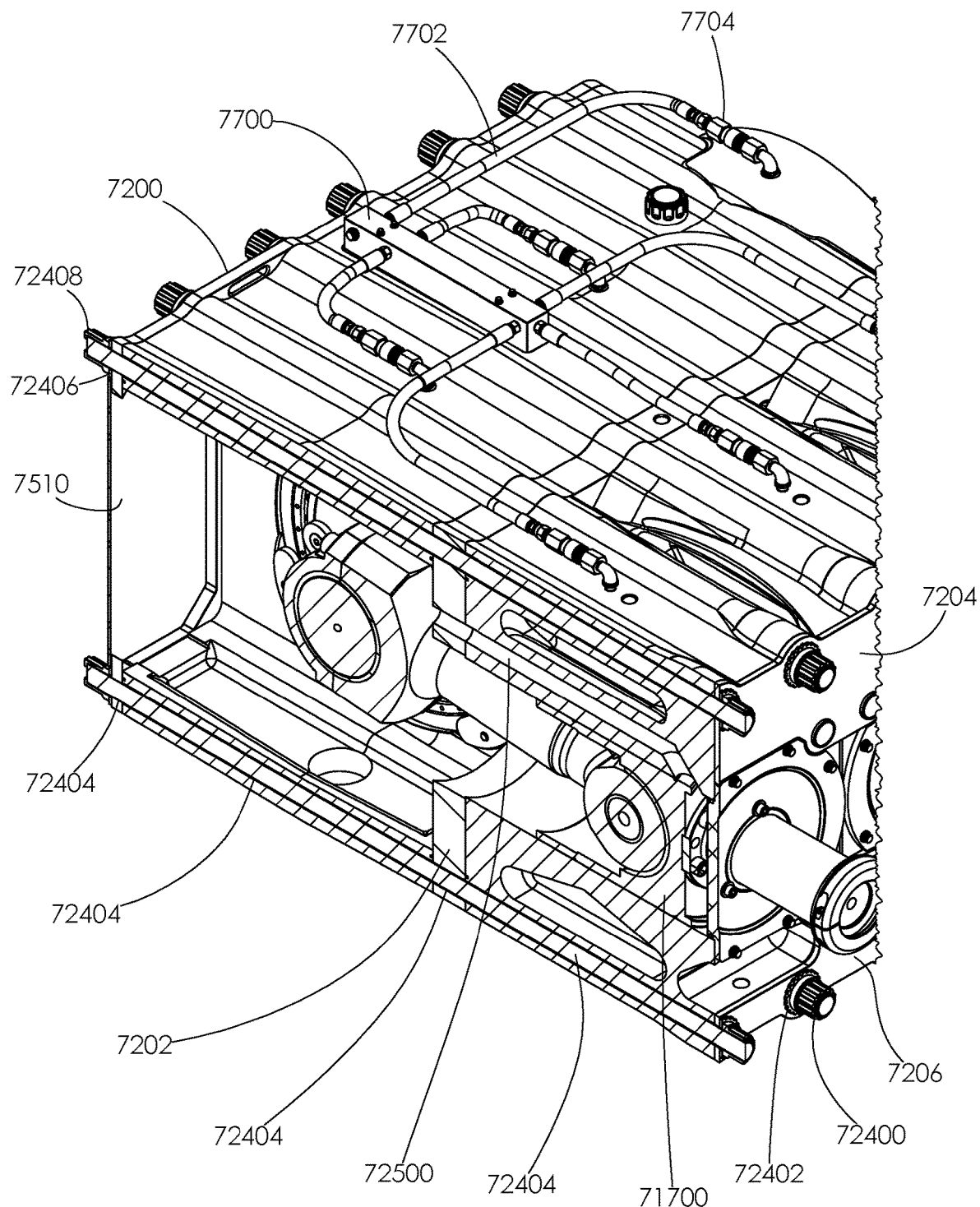
Figure 152:
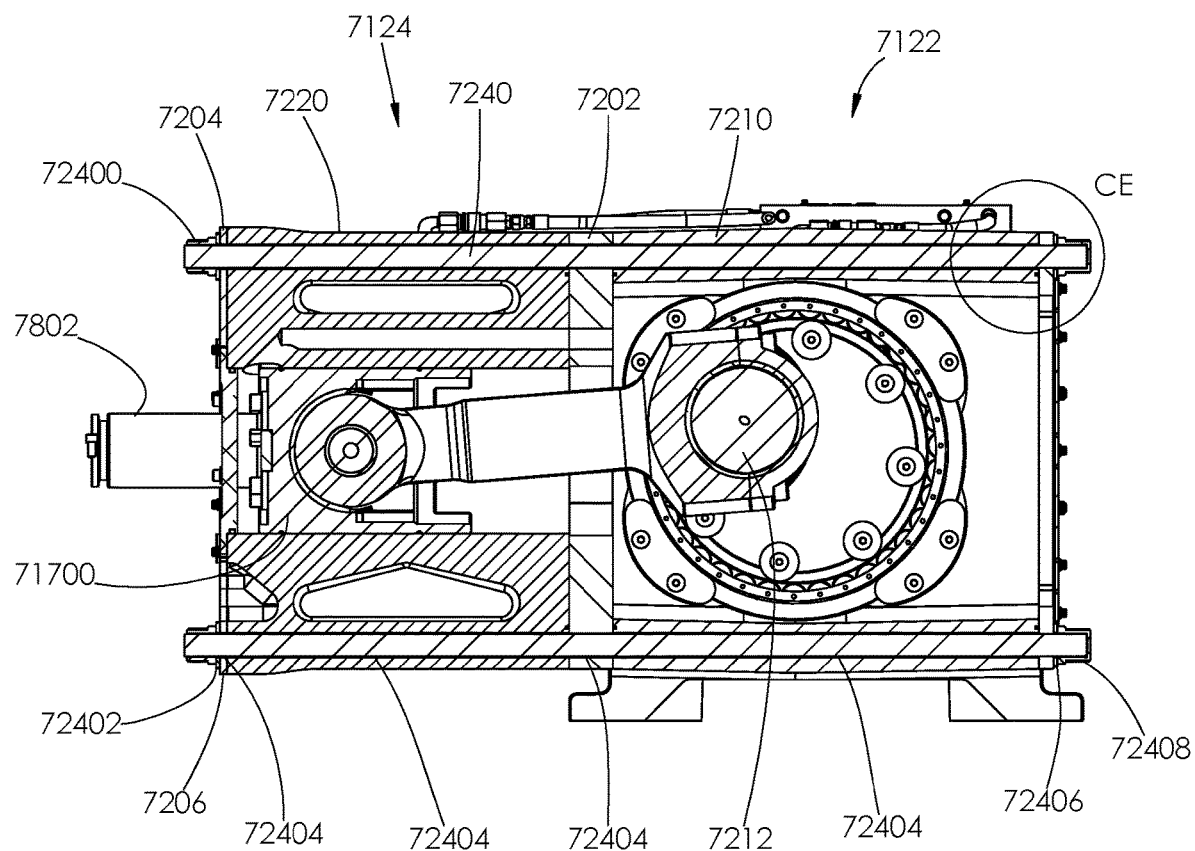
Figure 153:
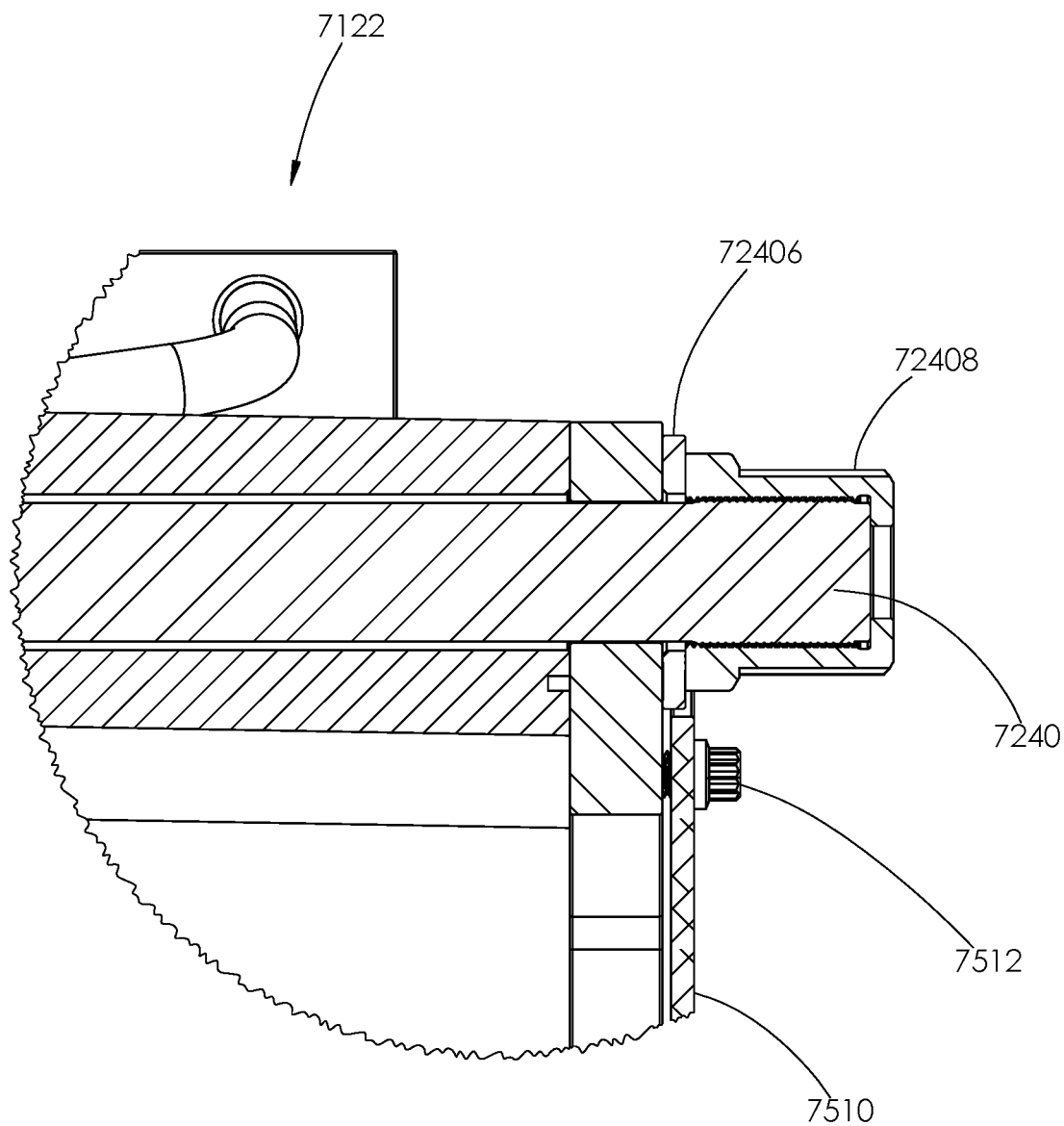

FIGS. 151-153 are cutaway views of portions of the power end shown in FIG. 139.

FIGS. 154-161 are various views of a second nut shown in FIG. 150.

Figure 162:
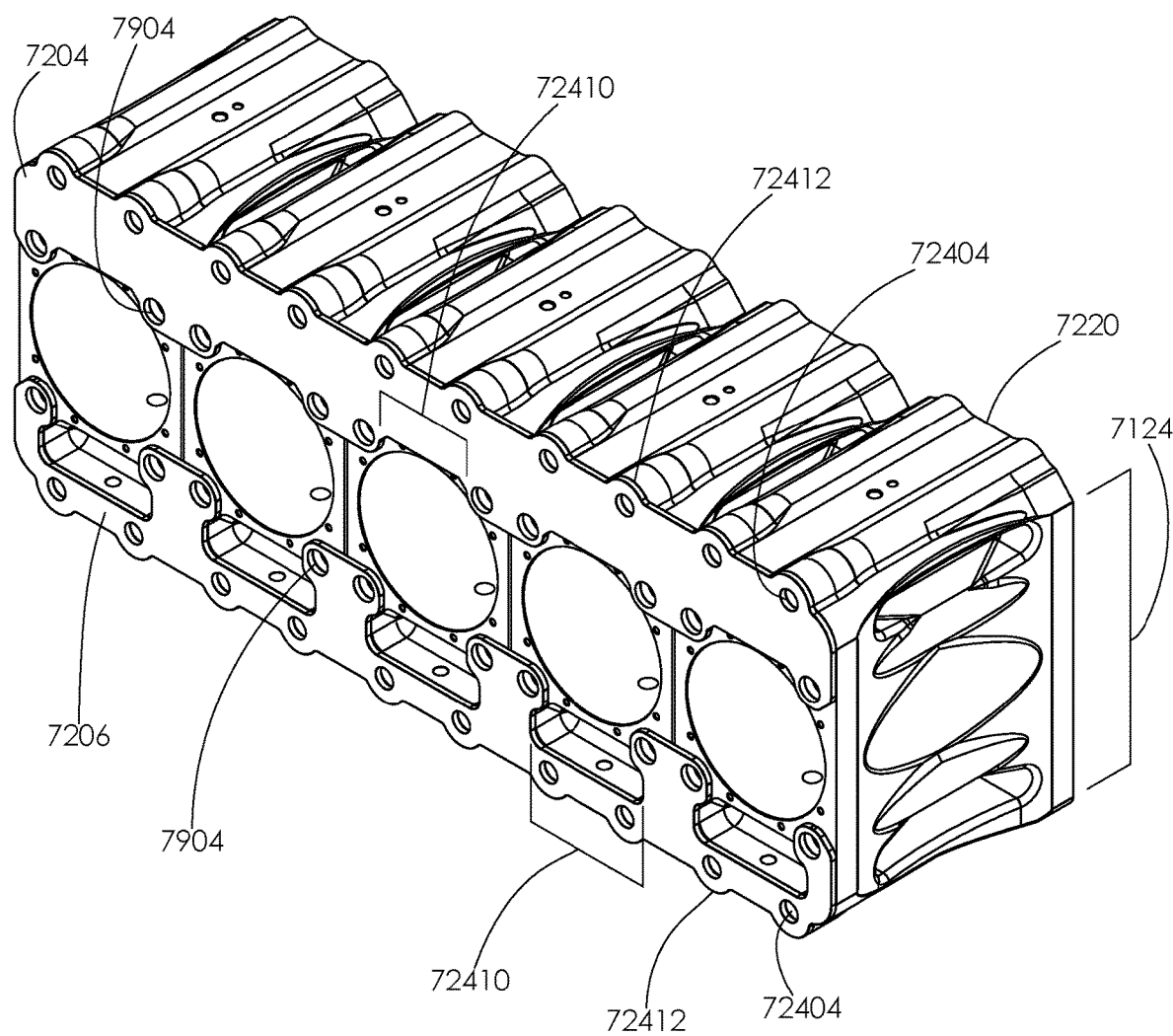

FIG. 162 is a front perspective view of the front support plates and the crosshead section shown in FIG. 139.

Figure 163:
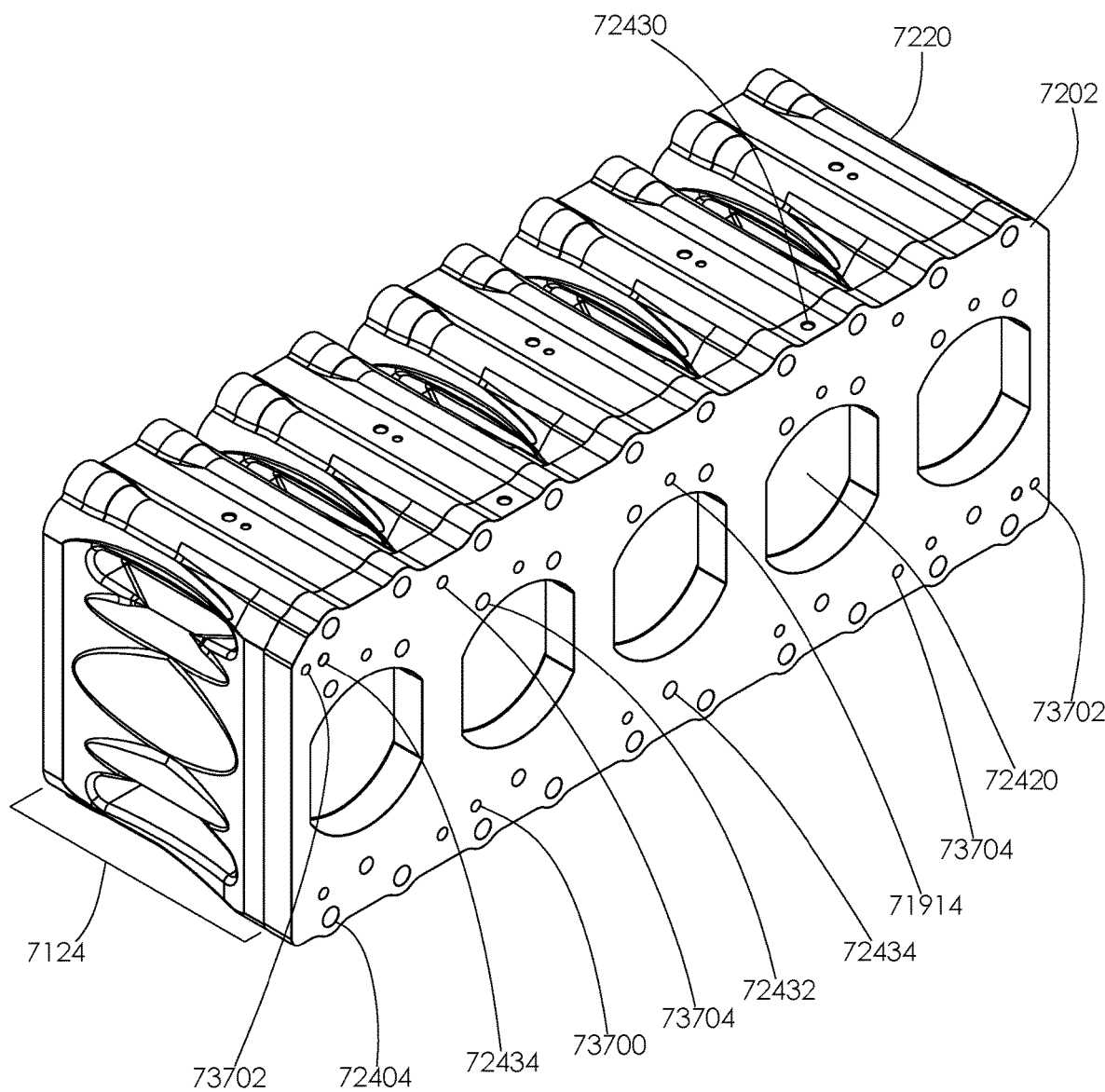

FIG. 163 is a rear perspective view of the central support plate and crosshead section shown in FIG. 139.

Figure 164:
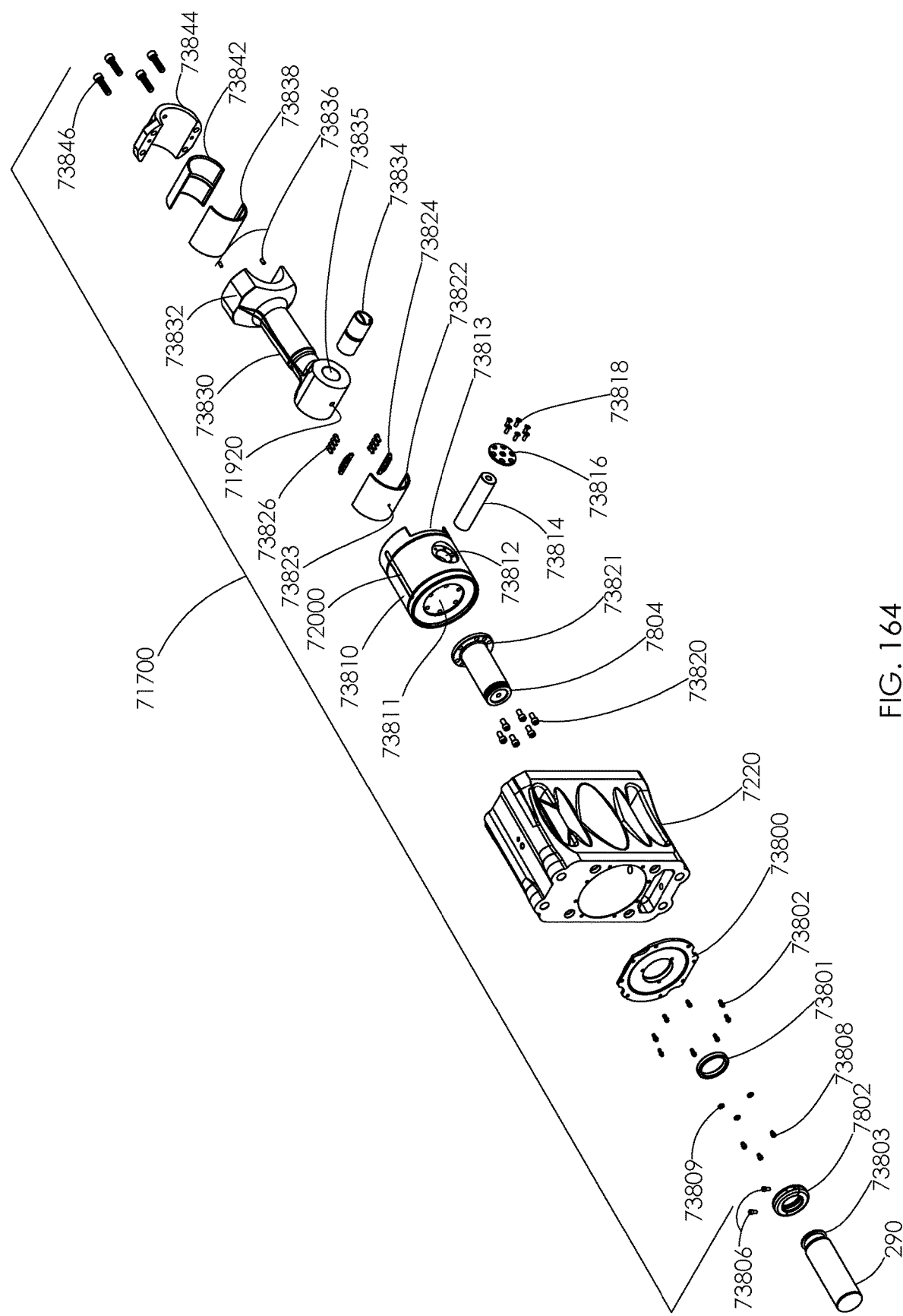

FIG. 164 is a front perspective exploded view of the crosshead frame and crosshead assembly shown in FIG. 139.

Figure 165:
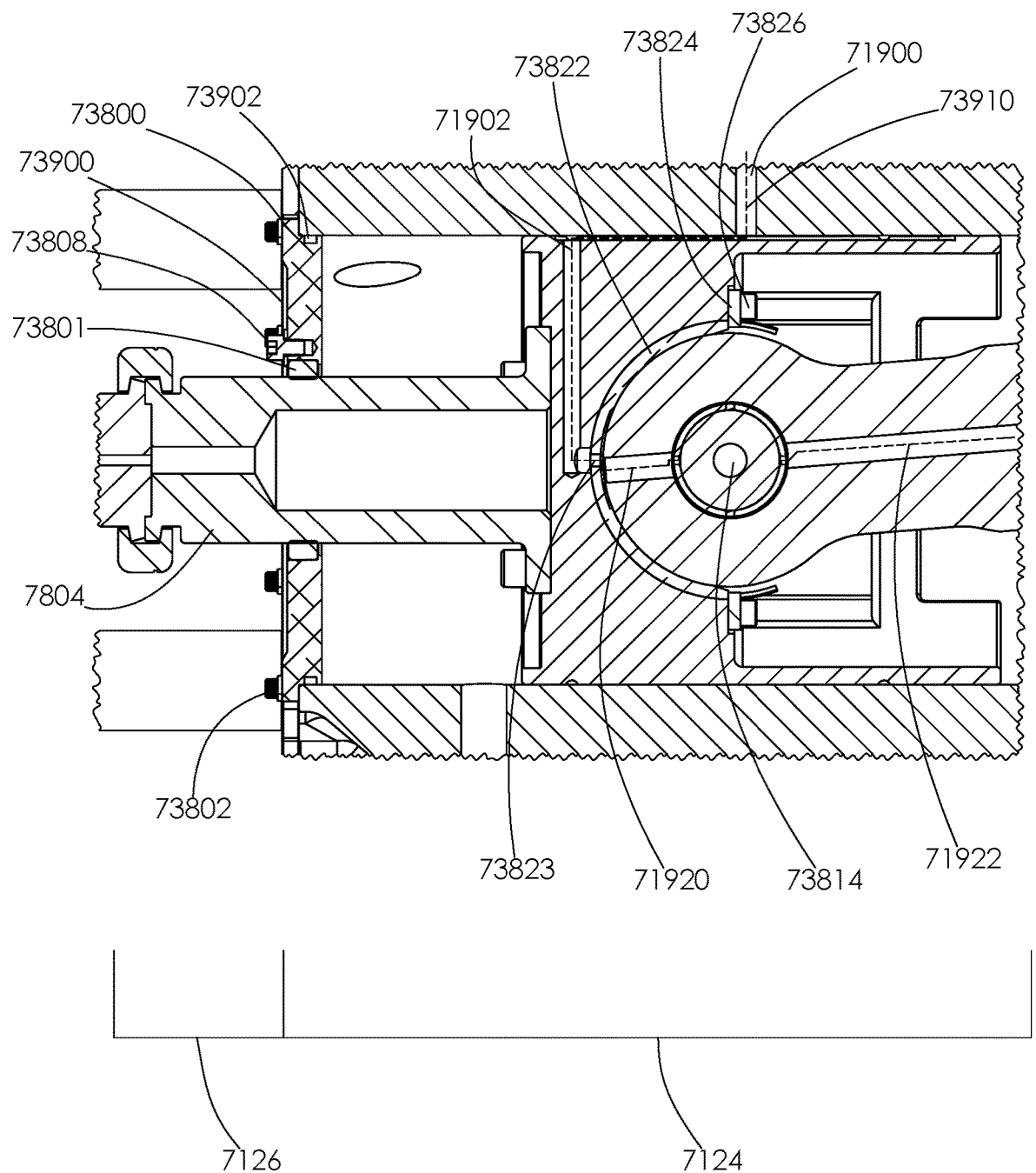

FIG. 165 is a cutaway sideview of the crosshead section shown in FIG. 139.

Figure 166:
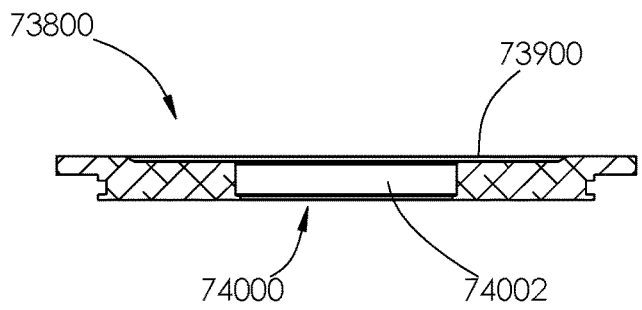
Figure 167:
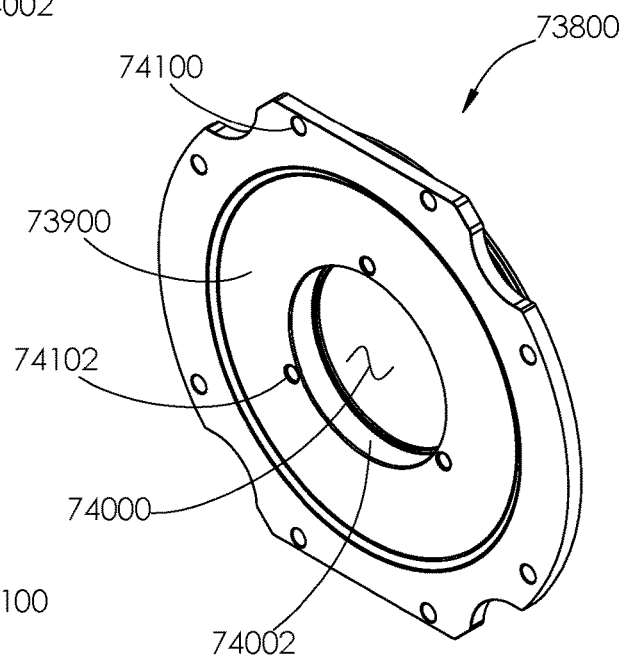
Figure 168:
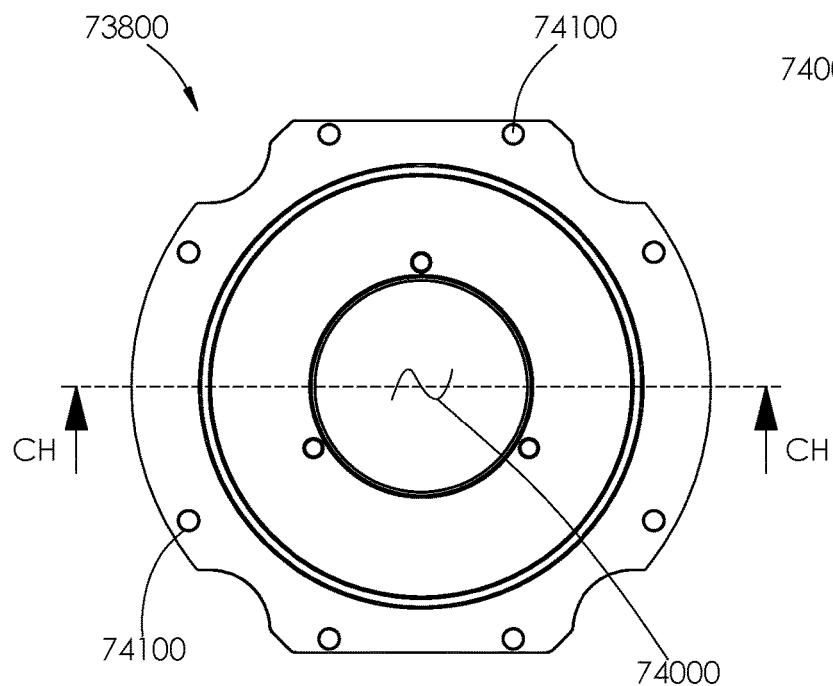

FIGS. 166-168 are various views of the pony rod seal housing shown in FIG. 164.

FIGS. 169-176 are various views of the crosshead frame shown in FIG. 164.

Figure 177:
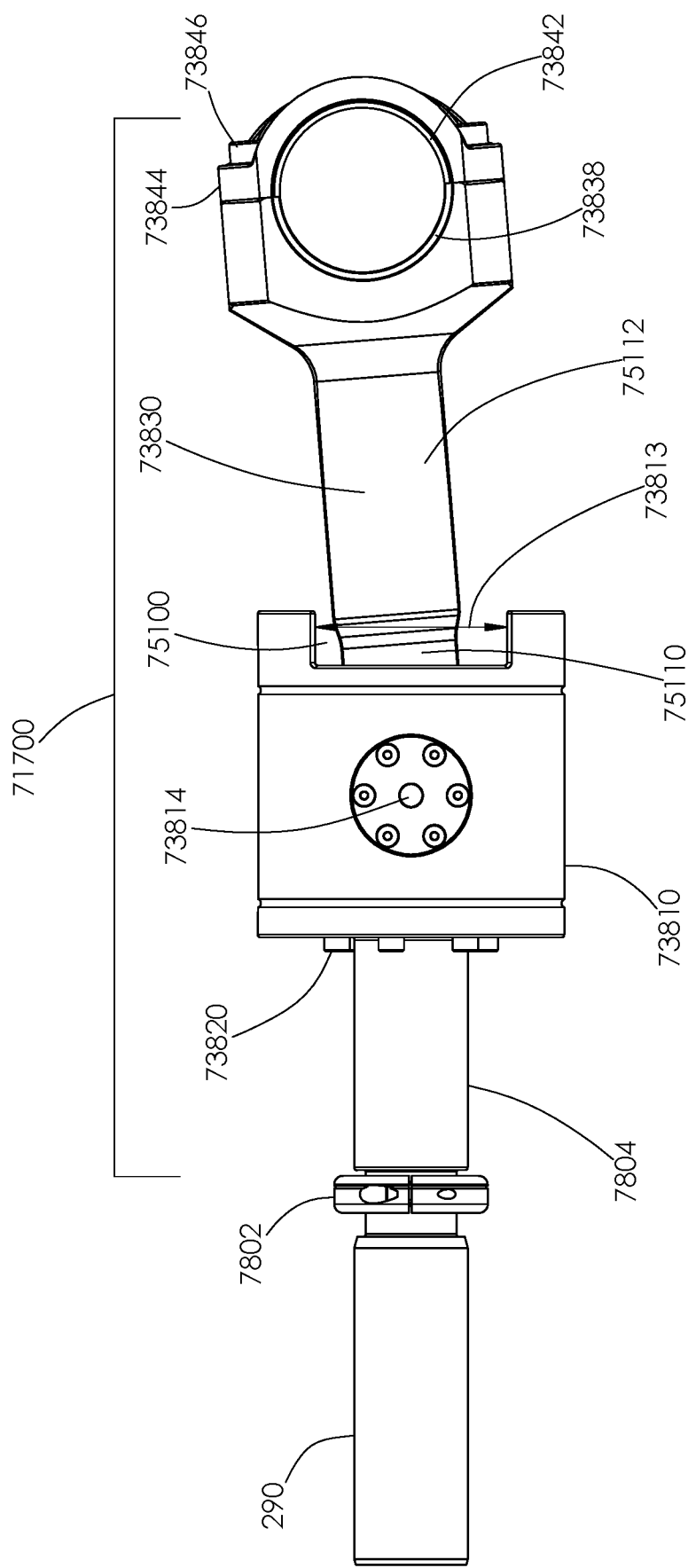
Figure 178:
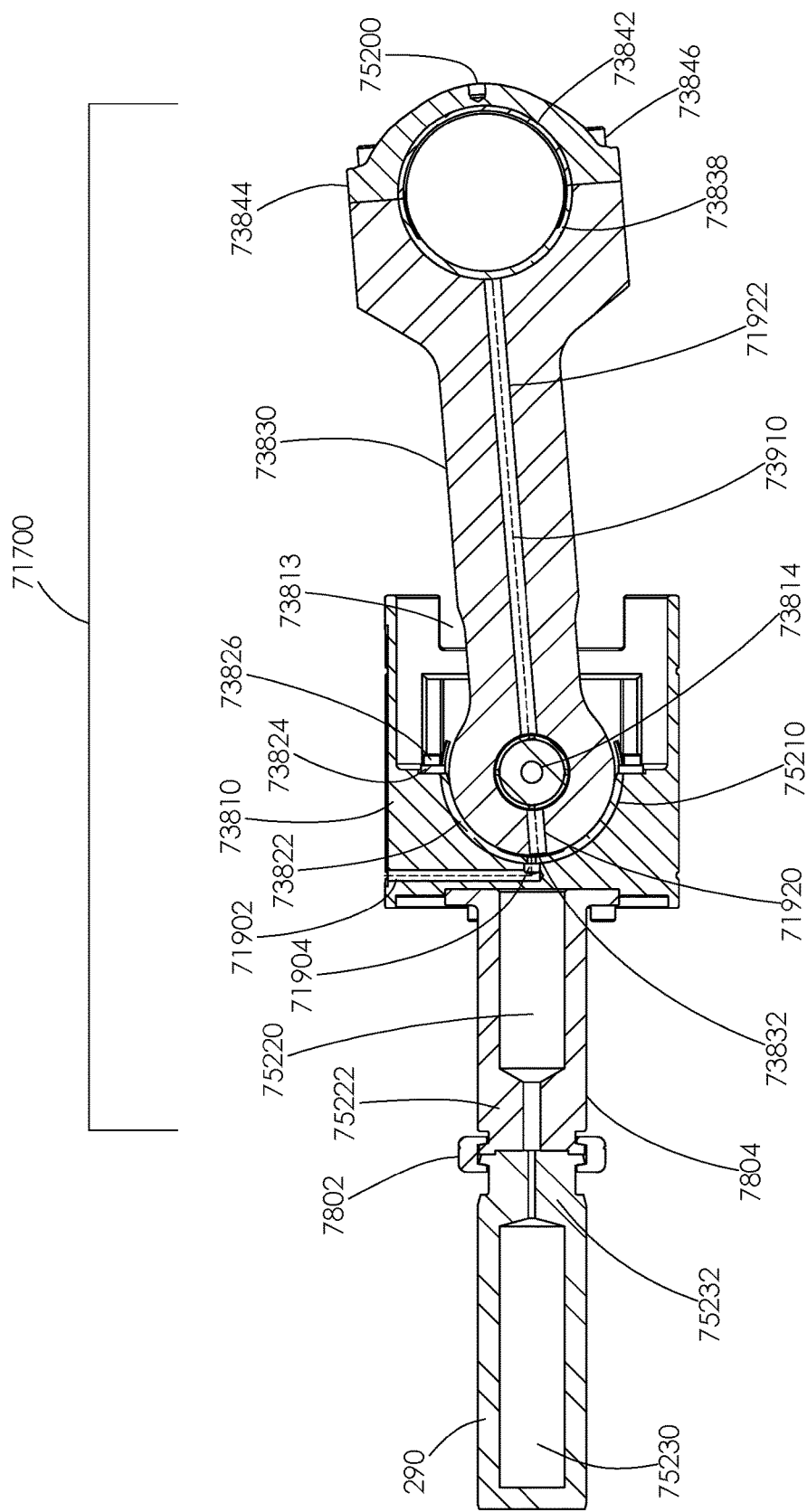

FIGS. 177 and 178 are side views of the crosshead assembly shown in FIG. 164.

Figure 179:
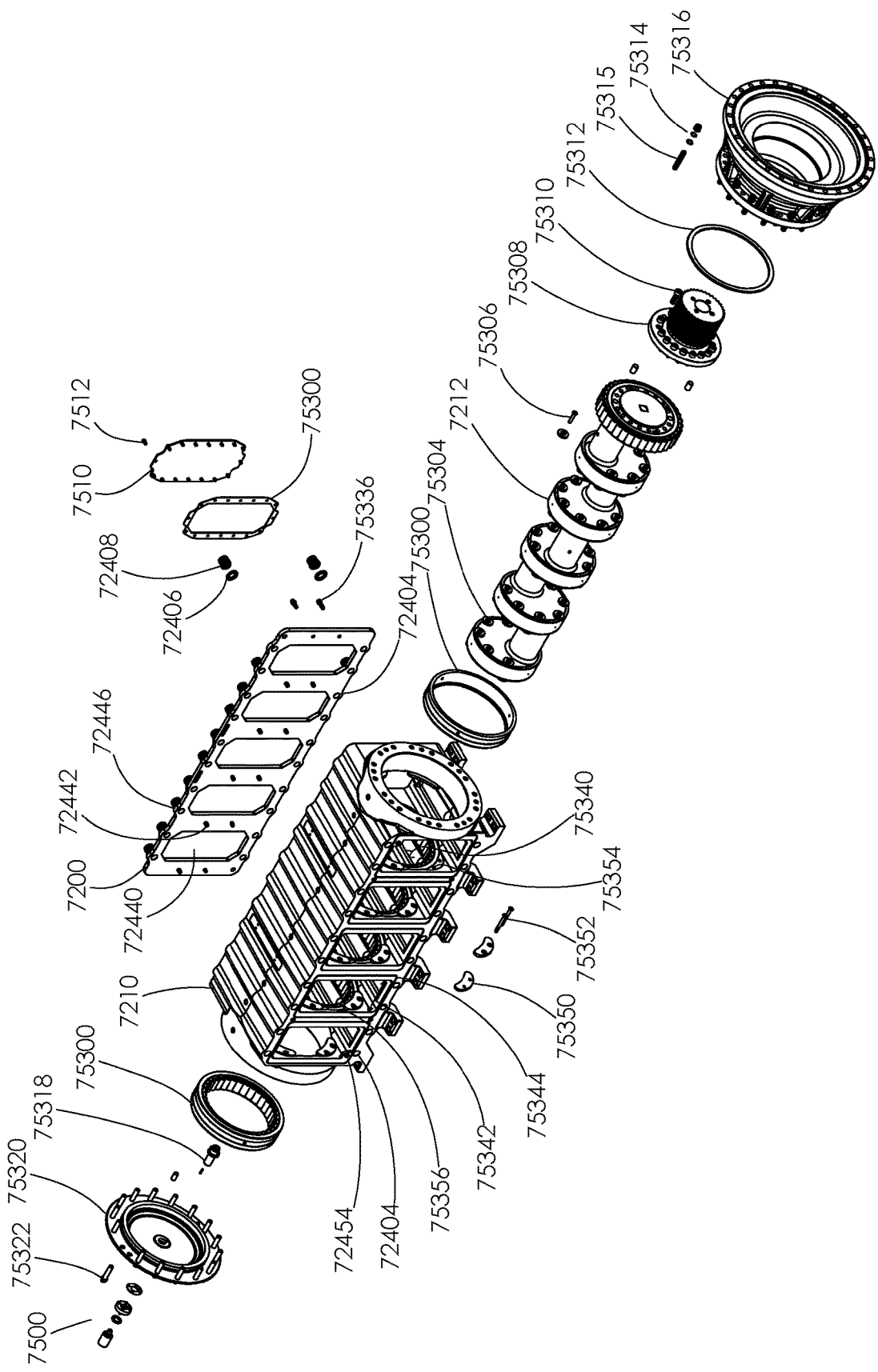

FIG. 179 is a front perspective exploded view of the crank section and the rear support plate shown in FIG. 139.

Figure 180:
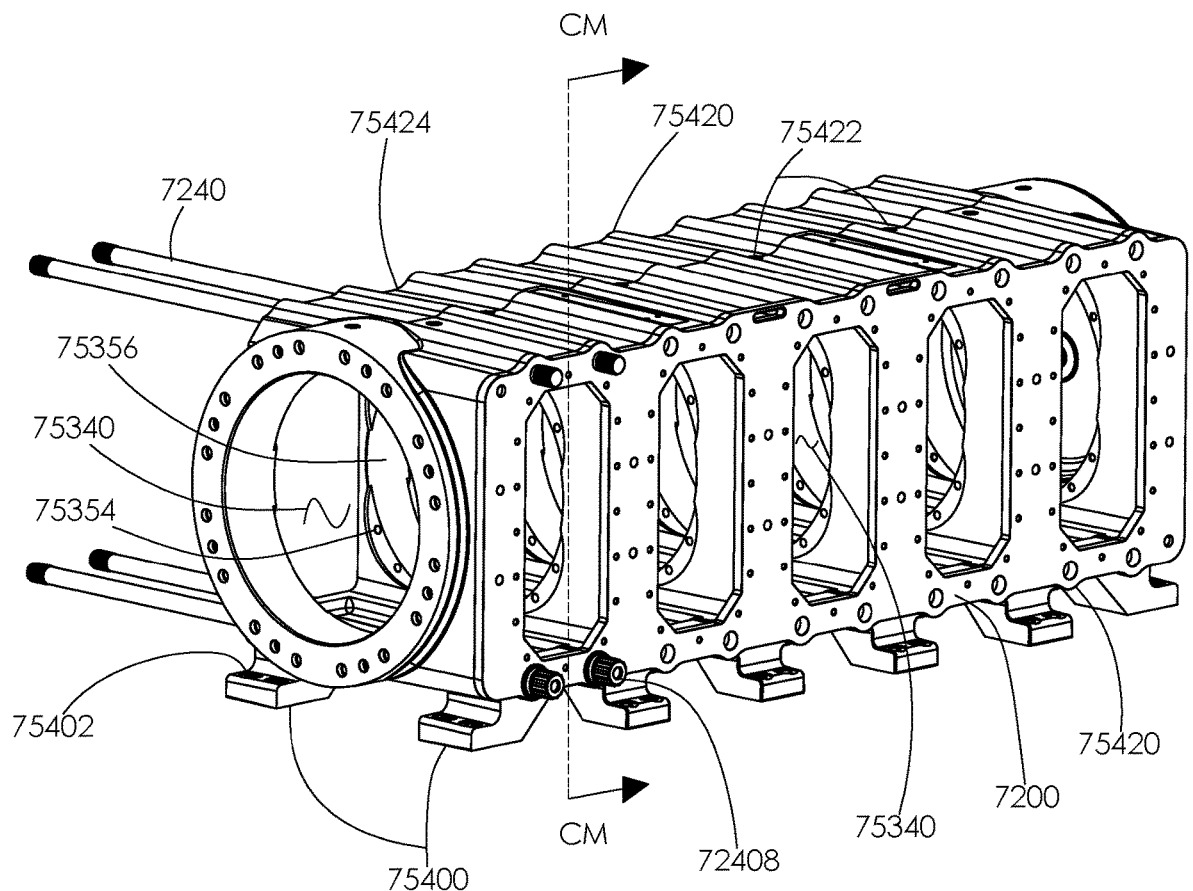

FIG. 180 is a rear perspective view of the crank section, the rear support plate, and the first set of rods shown in FIG. 139.

Figure 181:
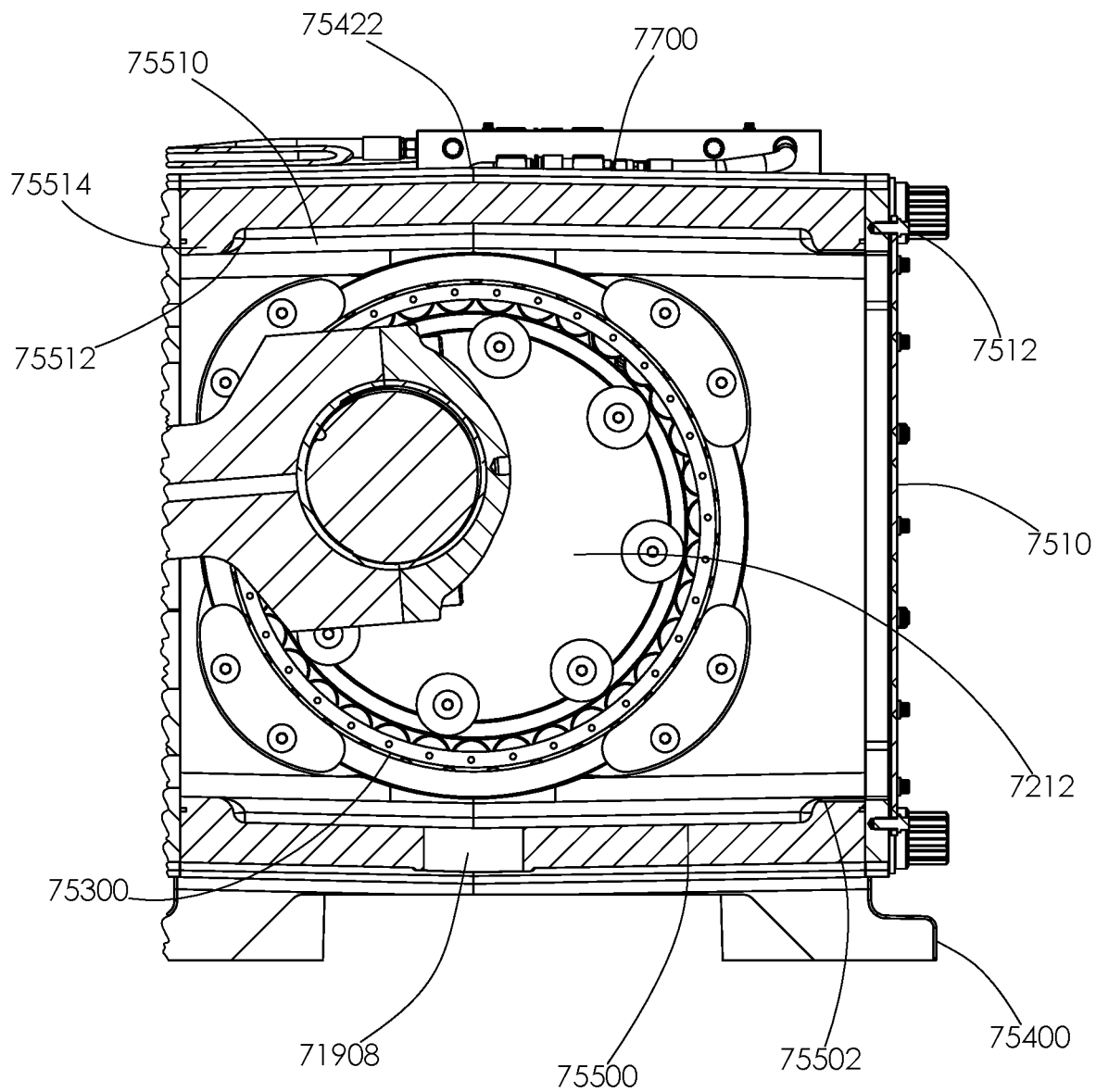

FIG. 181 is a cutaway sideview of the crank section shown in FIG. 139.

FIGS. 182-186 are various views of the crank frame shown in FIG. 179.

Figure 187:
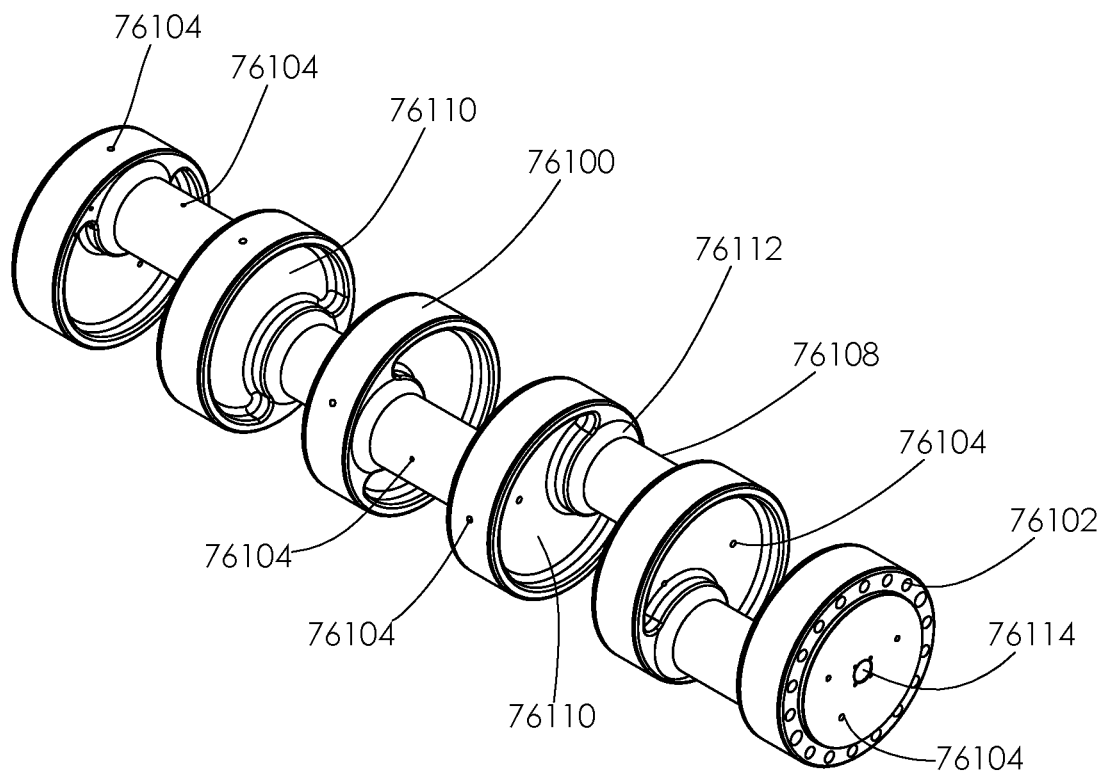

FIG. 187 is a perspective view of an embodiment of the crankshaft shown in FIG. 179.

Figure 188:
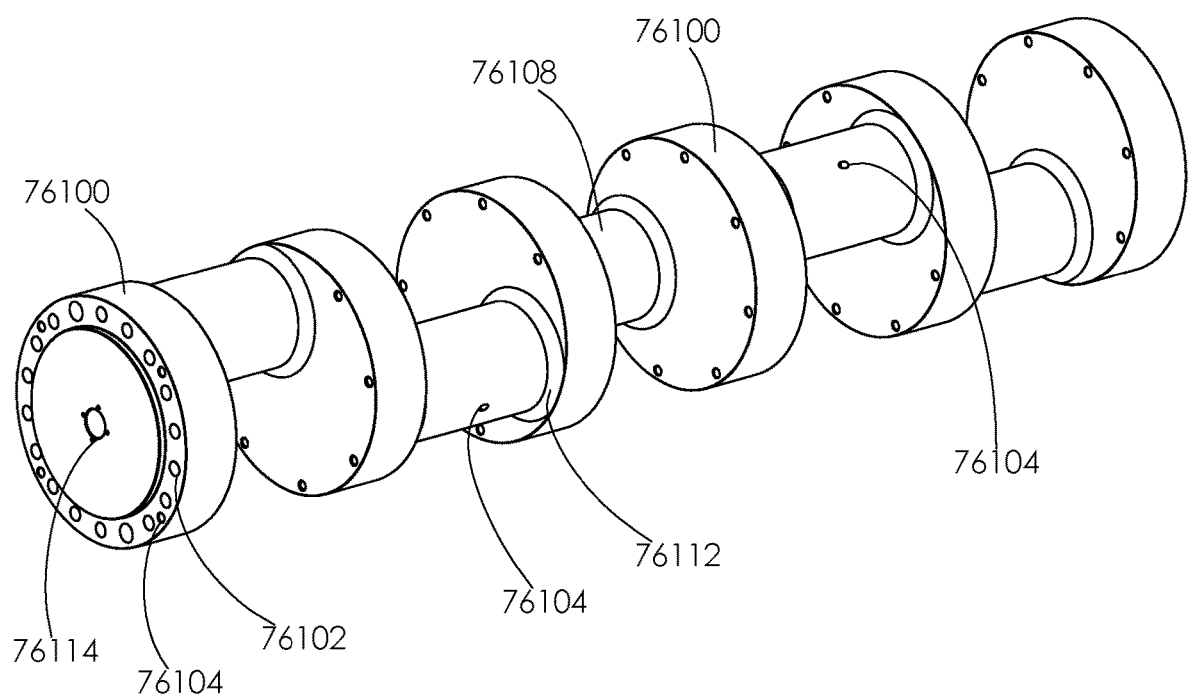

FIG. 188 is a perspective view of another embodiment of a crankshaft.

Figure 189:
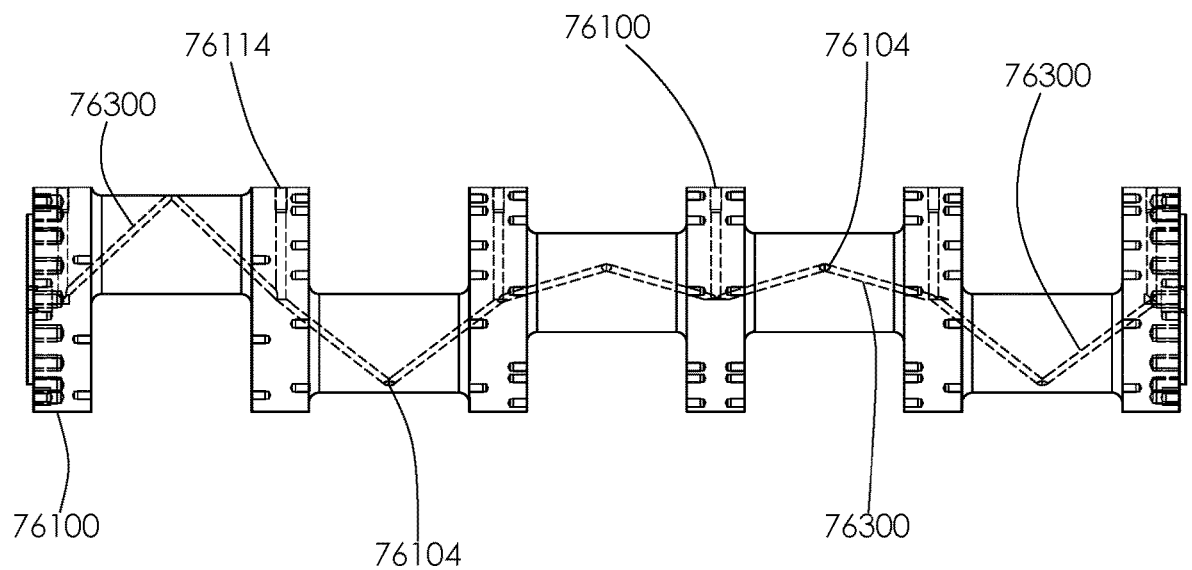

FIG. 189 is side view of the crankshaft shown in FIG. 187 with dashed lines showing various internal structures.

Figure 190:
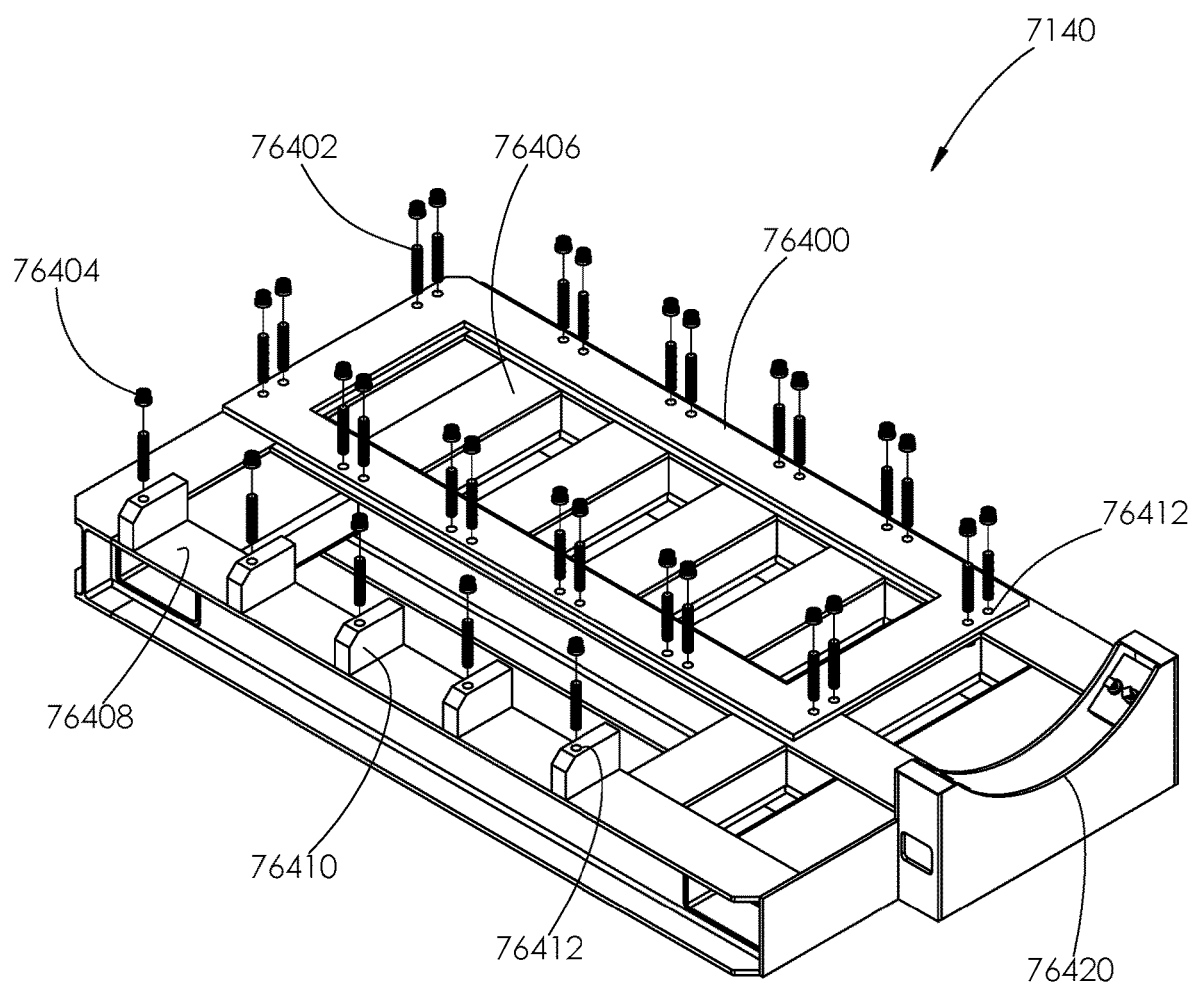

FIG. 190 is a top perspective and partially exploded view of the frame section used with the high-pressure hydraulic fracturing pump shown in FIG. 132.

DETAILED DESCRIPTION

Turning now to the non-prior art figures, FIG. 6 shows a high pressure pump 101. The high pressure pump 101 comprises a fluid end 100 attached to a power end 103. The fluid end 100 may be referred to as a fluid end assembly 100 and the power end 103 may be referred to as a power end assembly 103. In the following description, various embodiments of the fluid end 100 are described in detail with reference to FIGS. 6A-131. Various embodiments of the power end 103 are described in detail with reference to FIGS. 132-190.

Fluid End 100

Figure 6A:
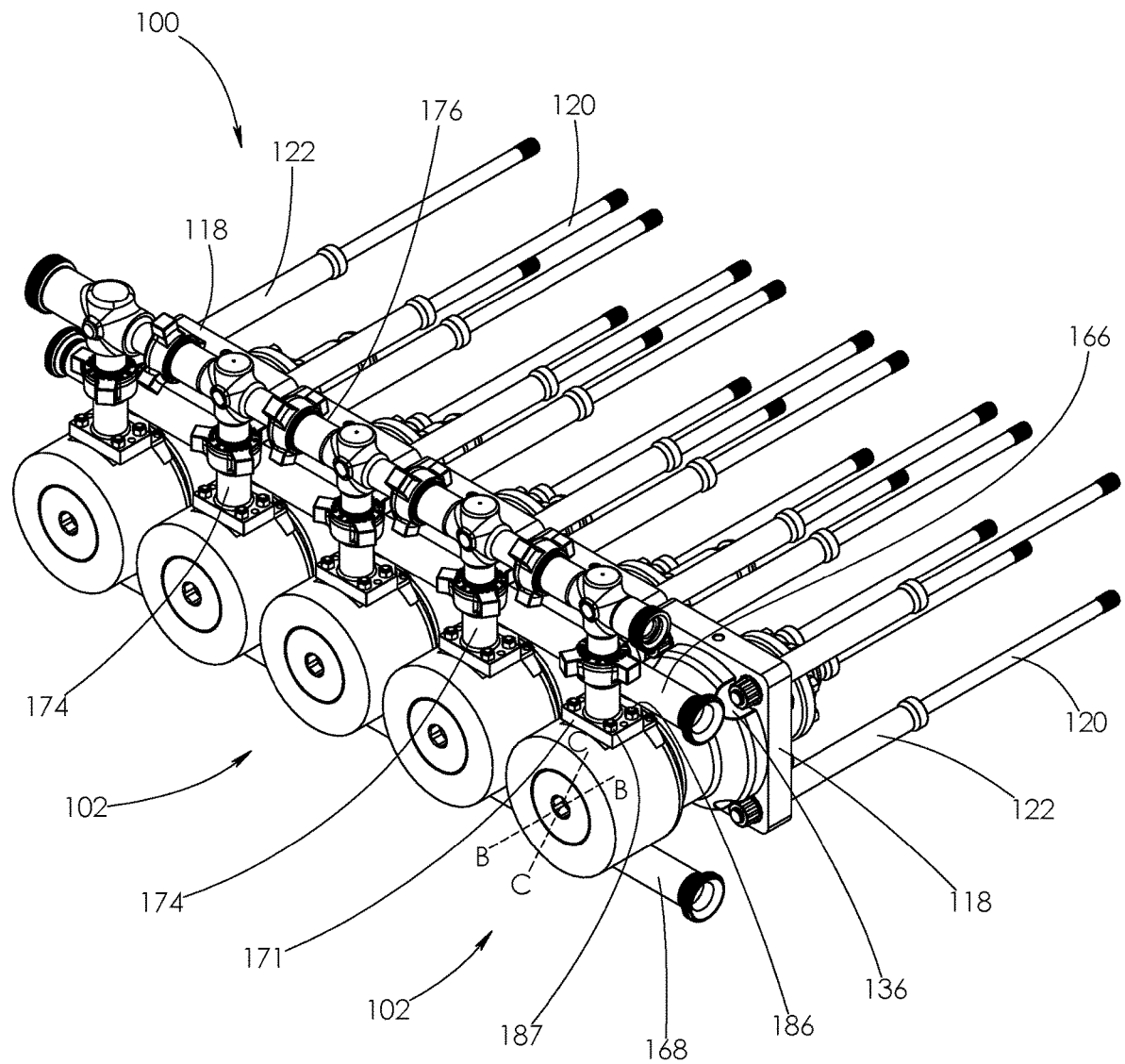
FIG. 6A is a front perspective view of a fluid end. A plurality of stay rods are attached to the fluid end.
Figure 7:
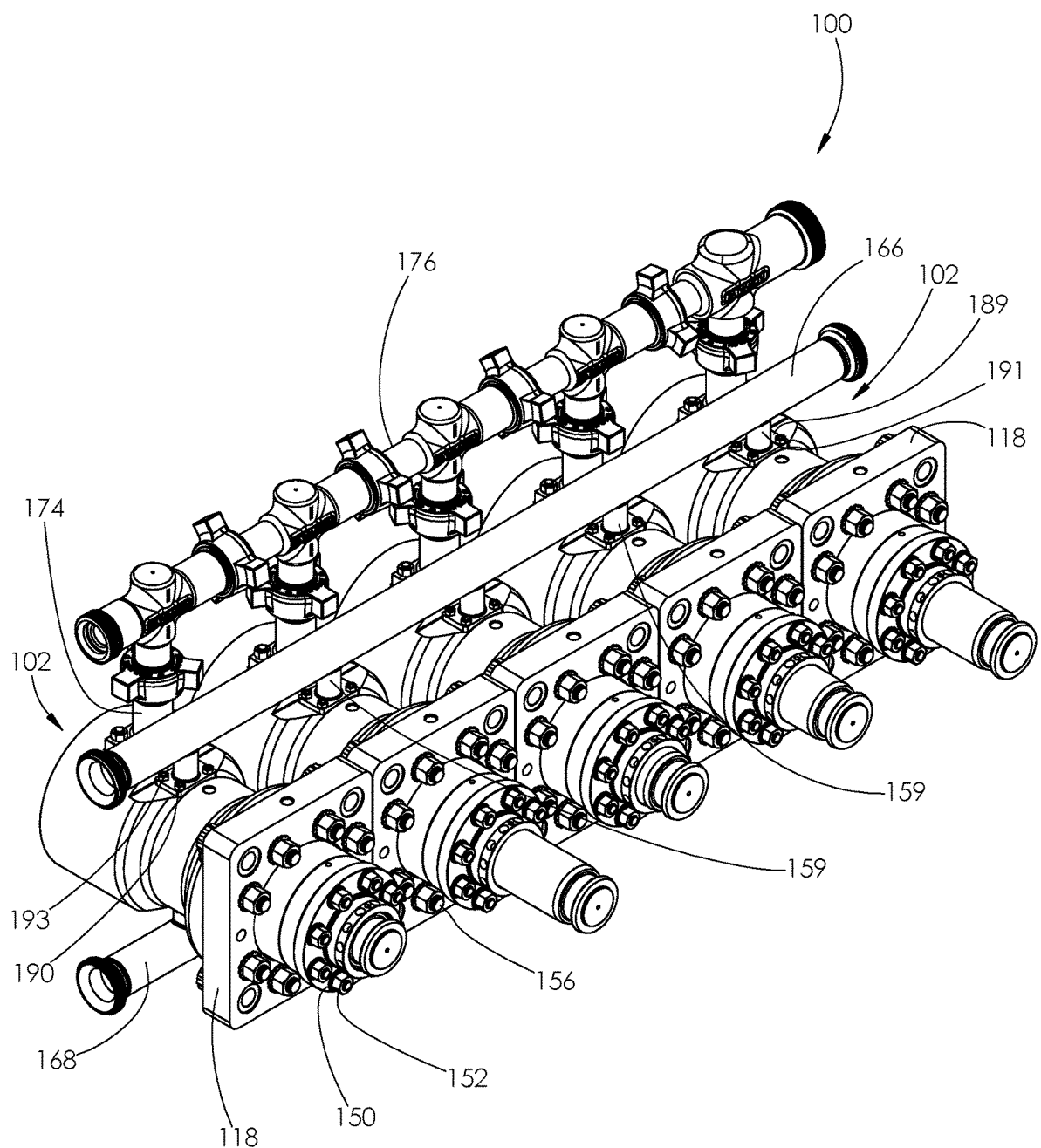
FIG. 7 is a rear perspective view of the fluid end shown in FIG. 6, but the plurality of stay rods have been removed.

FIGS. 6A and 7 show a fluid end 100. Unlike the traditional fluid end 46, shown in FIG. 3, the fluid end 100 comprises a plurality of fluid end sections 102 rather than a single housing 48. The fluid end sections 102 are positioned in a side-by-side relationship. Preferably, the fluid end 100 comprises five fluid end sections 102. However, more or less fluid end sections 102 may be used. Forming the fluid end 100 out of multiple fluid end sections 102 allows a single fluid end section 102 to be replaced, if needed. In contrast, the entire housing 48 in traditional fluid ends 46 may need to be replaced if only a portion of the housing 48 fails.

Figure 5:
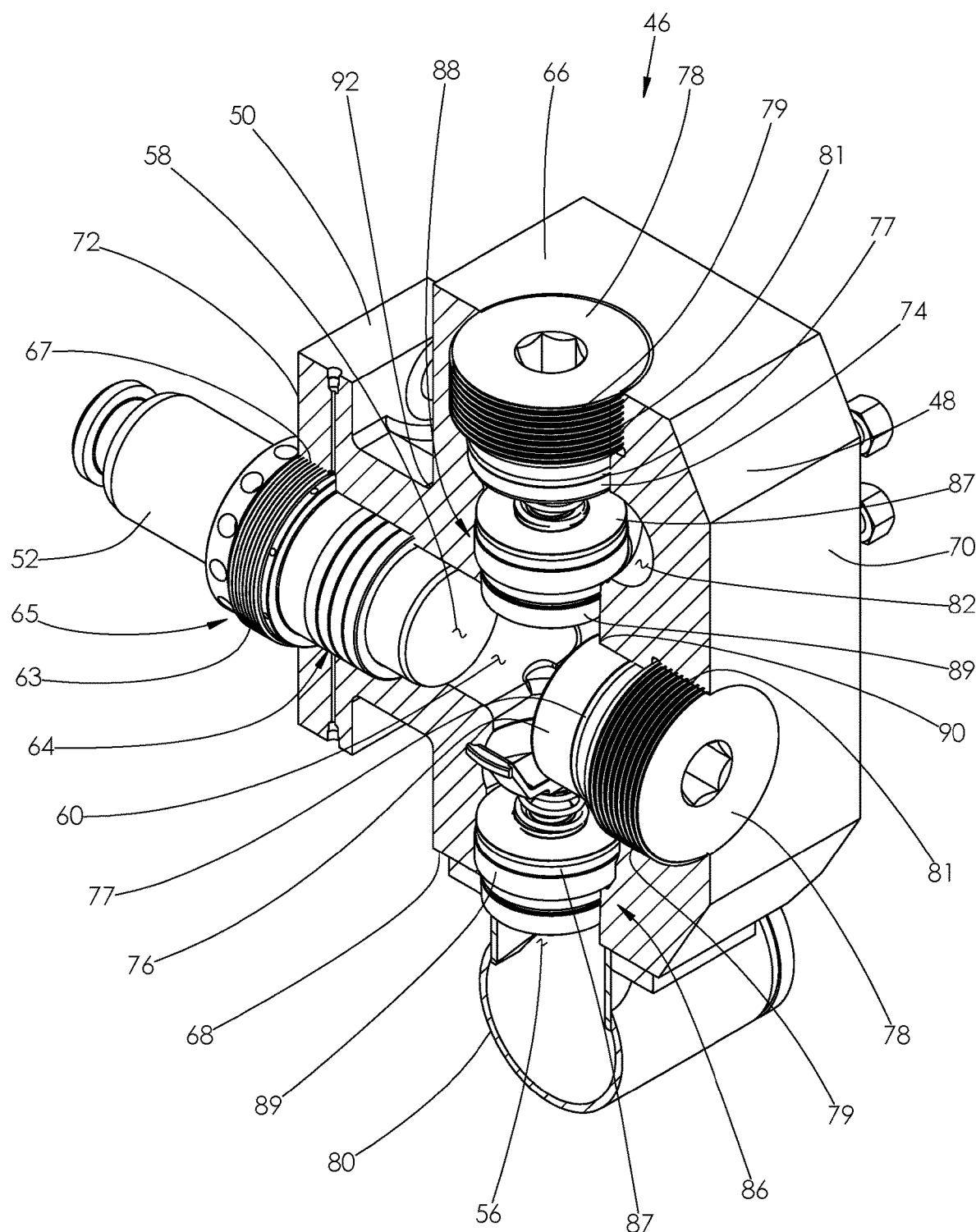
FIG. 5 is a sectional view of the fluid end shown in FIG. 4, taken along line A-A.
Figure 8:
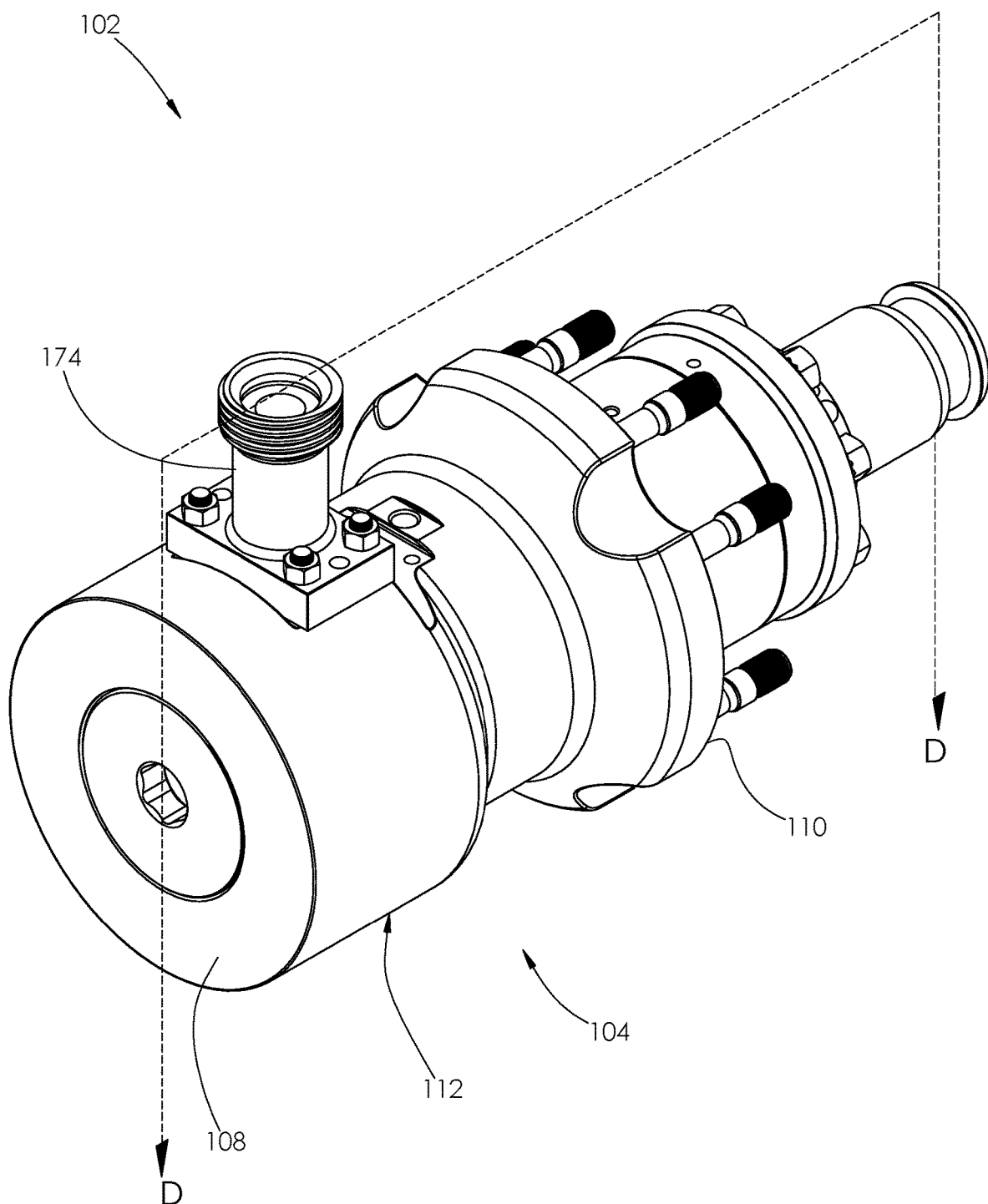
FIG. 8 is a front perspective view of one of the fluid end sections making up the fluid end shown in FIG. 6.
Figure 9:
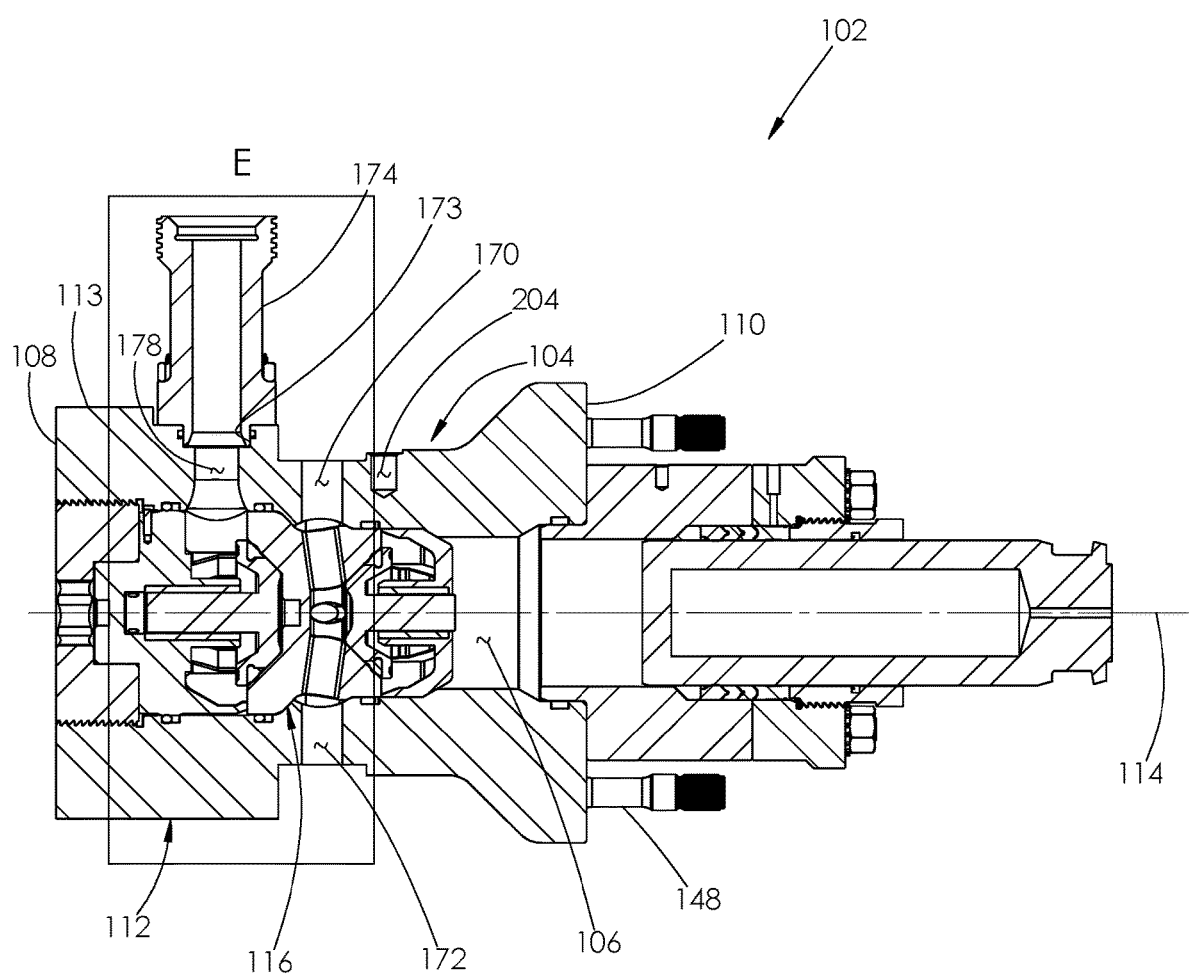
FIG. 9 is a cross-sectional view of the fluid end section shown in FIG. 8, taken along line D-D.

Turning to FIGS. 8 and 9, each fluid end section 102 comprises a horizontally positioned housing 104 having a generally cylindrical cross-sectional shape, as shown in FIG. 8. In alternative embodiments, each fluid end section may have a generally rectangular cross-sectional shape. Unlike the traditional fluid end 46 shown in FIGS. 3 and 5, each housing 104 does not include a vertical bore intersecting a horizontal bore to form an internal chamber. Rather, each housing 104 only has a single horizontally positioned bore 106, as shown in FIG. 9. Removing the internal chamber found in traditional fluid ends from the housing 104 removes common stress points from the housing 104.

Eliminating the intersecting bore also reduces the cost of manufacturing the fluid end 100 as compared to traditional fluid ends. The time required to manufacture the fluid end 100 is greatly reduced without the need for machining an intersecting bore, and the fluid end 100 may be manufactured on a lathe instead of a machining center. The fluid end 100 may also be manufactured out of lower strength and less costly materials since it does not include the high stress areas found in traditional fluid ends. Each housing 104 may be manufactured out of high strength alloy steel, such as carbon steel. In alternative embodiments, each housing 104 may be manufactured out of stainless steel.

Continuing with FIGS. 8 and 9, each housing 104 comprises a first outer surface 108 joined to an opposed second outer surface 110 by an intermediate outer surface 112. The horizontal bore 106 extends through the housing 104 along a central longitudinal axis 114 and interconnects the opposed first and second outer surfaces 108 and 110, as shown in FIG. 9. Each housing 104 is of single piece construction.

Since each housing 104 only has a single horizontal bore 106, fluid must be routed throughout the housing 104 differently from how fluid is routed throughout a traditional fluid end housing 48. As will be described in more detail herein, a fluid routing plug 116, shown in FIGS. 52-64, is installed within each housing 104 and is configured to route fluid throughout the housing 104.

With reference to FIGS. 6A, 7, and 10-16, each housing 104 is supported on a single connect plate 118 in a one-to-one relationship. A plurality of sets of stay rods 120, shown in FIG. 6A, are used to attach each connect plate 118 to the power end 103. A spacer 122 is installed on each stay rod 120 and is configured to engage with a front surface of the power end 103, as described later herein.

The connect plates 118 may each be attached to the corresponding stay rods 120 prior to attaching a housing 104 to a corresponding connect plate 118. Because the housings 104 are each attached to a connect plate 118, the fluid end 100 does not include a flange like the flange 50 formed in the fluid end 46 shown in FIG. 3. In an alternative embodiment, multiple housings may be attached to a single, larger connect plate. In such embodiment, the stay rods are likewise attached to the single, larger connect plate.

With reference to FIGS. 10-13, each connect plate 118 has a generally rectangular shape and has opposed first and second surfaces 124 and 126. A plurality of first passages 128 are formed around the outer periphery of each connect plate 118. Each first passage 128 interconnects the first and second surfaces 124 and 126 of the connect plate 118 and is configured for receiving a stay rod 120. Each stay rod 120 extends through a corresponding passage 128 in a one-to-one relationship.

The connect plate 118 shown in FIGS. 10-13 has four first passages 128. Likewise, four stay rods 120 are shown attached to each connect plate 118 in FIG. 6A. In alternative embodiments, the connect plate may have more than four or less than four first passages, as long as the amount of first passages corresponds with the number of stay rods being used with each connect plate.

Figure 16:
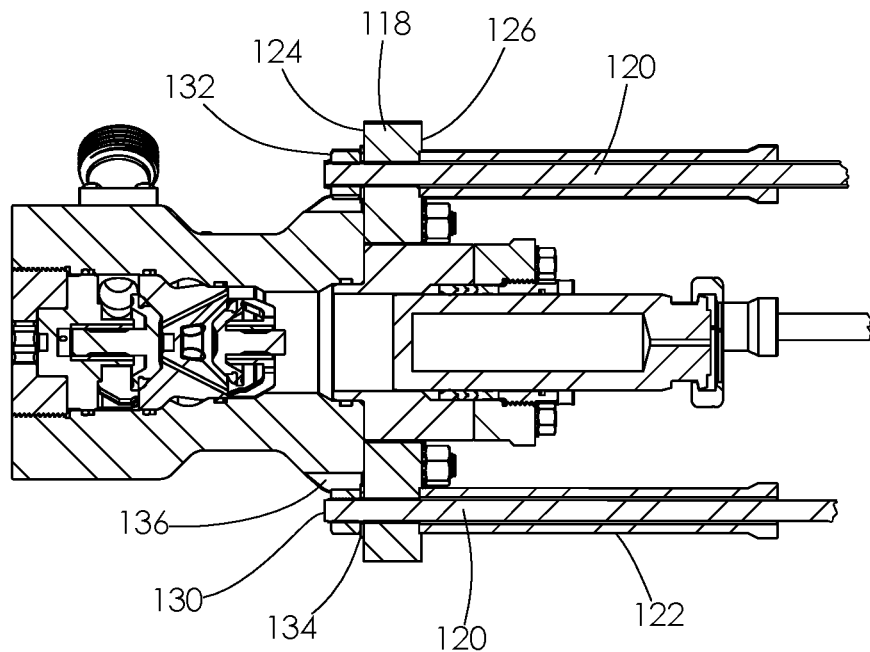
FIG. 16 is a cross-sectional view of the fluid end and stay rods shown in FIG. 6, taken along a plane that includes the line B-B.

Once each stay rod 120 is installed in a connect plate 118, a first end 130 of each stay rod 120 projects from the first surface 124 of the connect plate 118, as shown in FIG. 16. A nut 132 and a washer 134 are installed on the projecting first end 130 of each stay rod 120 in a one-to-one relationship. The nut 132 is turned until it tightly engages a corresponding washer 134 and the first surface 124 of the connect plate 118, thereby securing the connect plate 118 to the stay rods 120.

Figure 14:
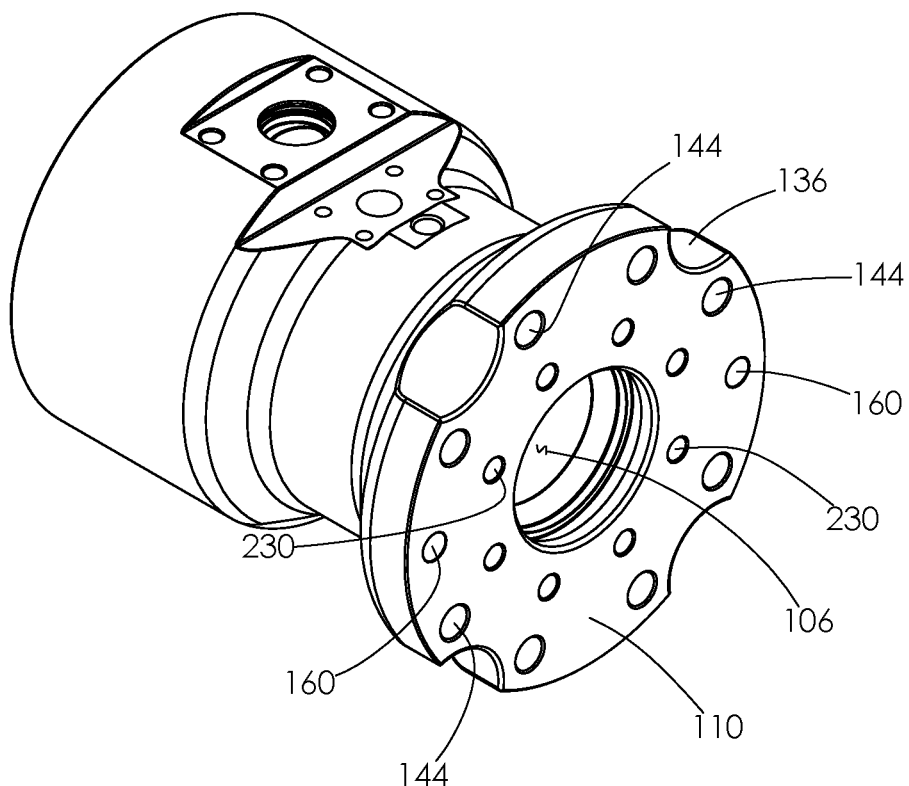
FIG. 14 is a perspective view of a second surface of a housing making up the fluid end section shown in FIG. 8.
Figure 15:
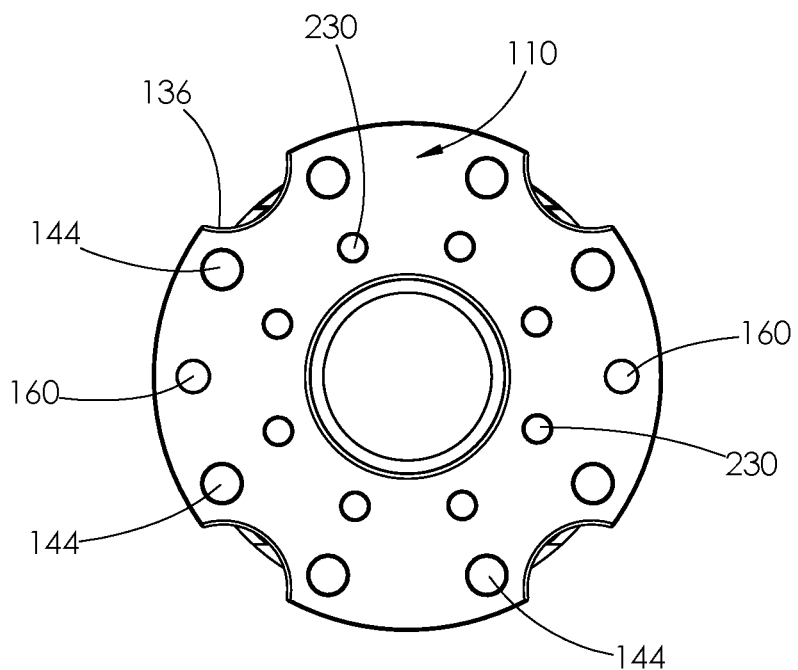
FIG. 15 is an elevational view of the second surface of the housing shown in FIG. 14.

With reference to FIGS. 6, and 14-16, a plurality of notches 136 are formed around the periphery of the housing 104 at its second surface 110, as shown in FIGS. 14 and 15. When the housing 104 is attached to the connect plate 118, each notch 136 partially surrounds one of the first passages 128 in a one-to-one relationship. The notches 136 provide space to access the washer 134 and nut 132 during operation.

Continuing with FIGS. 10-13, a central bore 138 is formed in each connect plate 118 and interconnects the first and second surfaces 124 and 126. The central bore 138 is configured for receiving a stuffing box 140, as described in more detail later herein. A plurality of second passages 142 are formed in the connect plate 118 and surround the central bore 138. Each second passage 142 interconnects the first and second surfaces 124 and 126 of the connect plate 118. The second passages 142 are configured to align in a one-to-one relationship with a plurality of first threaded openings 144 formed in the second surface 110 of each housing 104, as shown in FIGS. 14 and 15.

Figure 17:
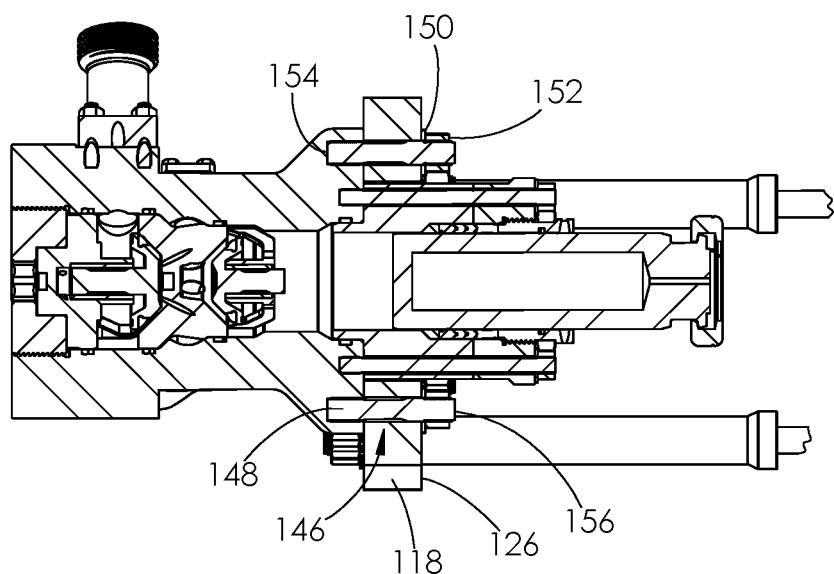
FIG. 17 is a cross-sectional view of the fluid end and stay rods shown in FIG. 6, taken along a plane that includes the line C-C.

Each housing 104 is attached to the first surface 124 of a corresponding connect plate 118 using a fastening system 146. The fastening system 146 comprises a plurality of studs 148, a plurality of washers 150, and a plurality of nuts 152, as shown in FIGS. 7 and 17. A first end 154 of each stud 148 is configured to mate with a corresponding one of the first openings 144 formed in the housing 104. The second passages 142 formed in the connect plate 118 subsequently receive the plural studs 148 projecting from the housing 104.

When the housing 104 and the connect plate 118 are brought together, a second end 156 of each stud 148 projects from the second surface 126 of the connect plate 118. A washer 150 and a nut 152 are subsequently installed on the second end 156 of each stud 148, in a one-to-one relationship. The nut 152 is turned until it tightly engages the washer 150 and the second surface 126 of the connect plate 118, thereby securing the housing 104 and the connect plate 118 together.

In FIGS. 10-15, the housing 104 and connect plate 118 each have eight corresponding first openings 144 and second passages 142. In alternative embodiments, more than eight or less than eight corresponding openings and second passages may be formed in the housing and connect plate. In such embodiments, the fastening system may comprise the same number of studs, washers, and nuts as there are openings and passages. In further alternative embodiments, the fastening system may comprise different types of fasteners, such as socket-headed screws.

Figure 10:
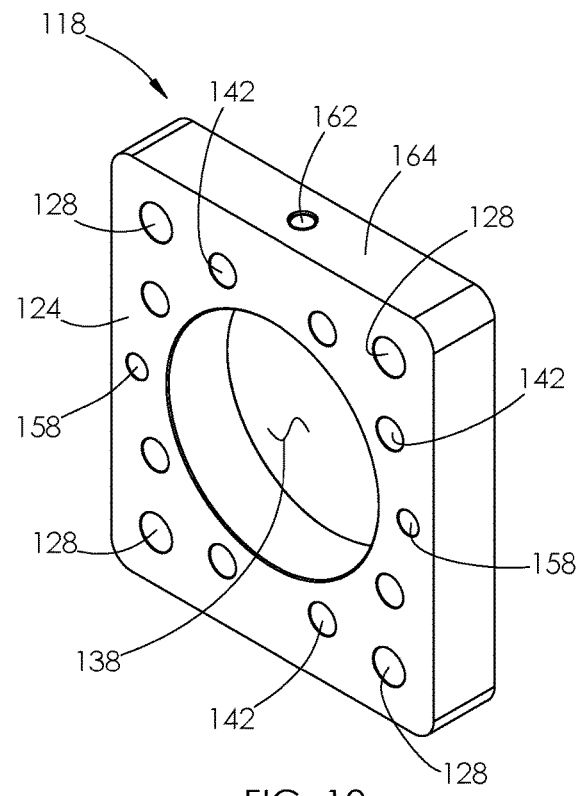
FIG. 10 is a perspective view of a first surface of a connect plate used with the fluid end shown in FIG. 6.
Figure 11:
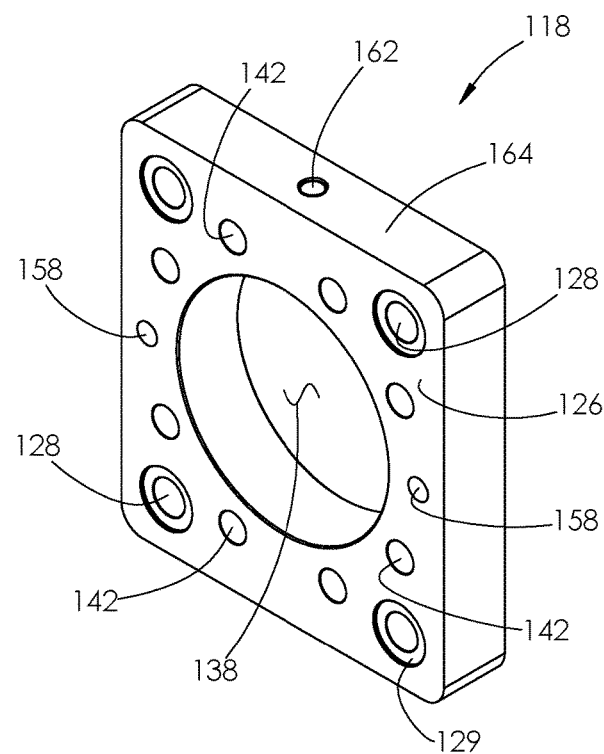
FIG. 11 is a perspective view of a second surface of the connect plate shown in FIG. 10.
Figure 12:
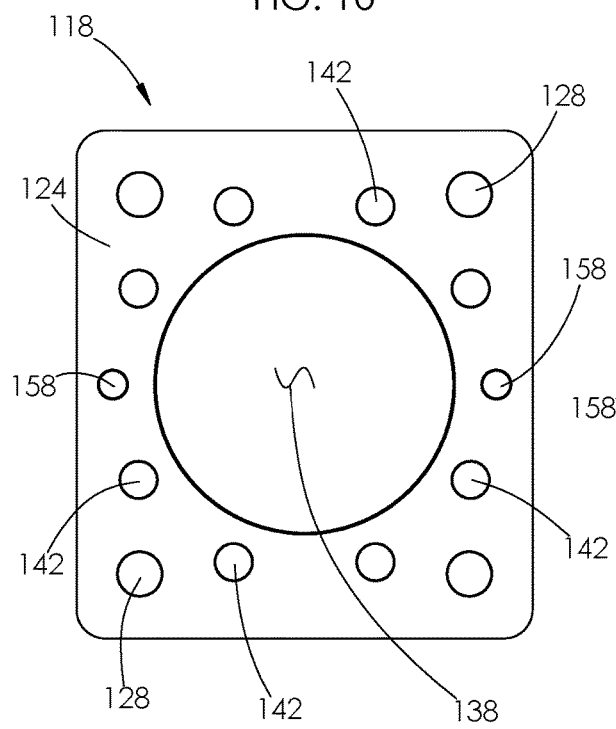
FIG. 12 is an elevational view of the first surface of the connect plate shown in FIG. 10.
Figure 13:
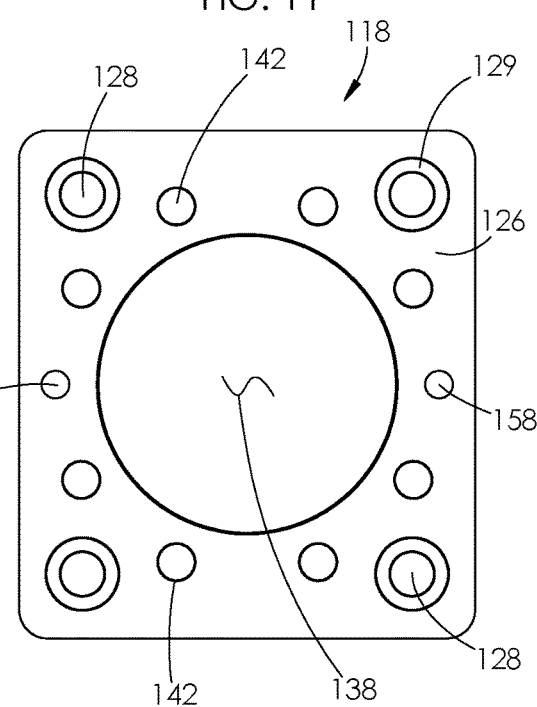
FIG. 13 is an elevational view of the second surface of the connect plate shown in FIG. 10.

Continuing with FIGS. 10-15, a pair of third passages 158 are formed in the connect plate 118 on opposite sides of the central bore 138. The third passages 158 are alignable with a pair of pin holes 160 formed in the second surface 110 of the housing 104. Each third passage 158 and each corresponding pin hole 160 is configured to receive a dowel pin in a one-to-one relationship. The dowel pins are used to help align the housing 104 on the connect plate 118 during assembly. A threaded hole 162 may also be formed in a top surface 164 of each connect plate 118, as shown in FIGS. 10 and 11. The threaded hole 162 is configured for receiving a lifting eye (now shown) used to lift and support the connect plate 118 during assembly.

In alternative embodiments, the connect plate may have various shapes and sizes other than those shown in FIGS. 10-13. For example, the connect plate may be shaped like the various embodiments disclosed in U.S. Provisional Patent Ser. No. 63/053,797, authored by Thomas et al. and filed on Jul. 20, 2020.

Figure 3:
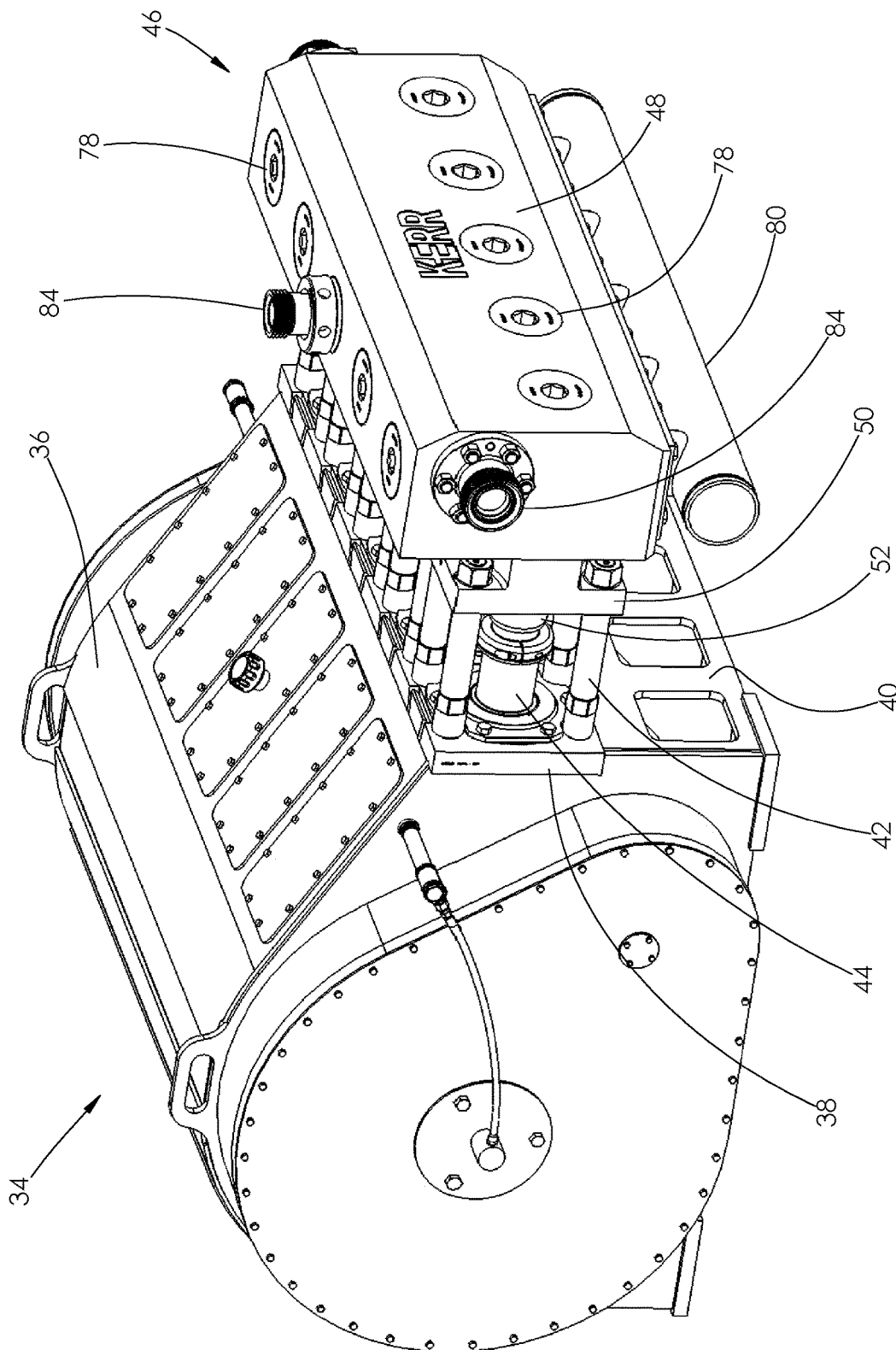
FIG. 3 is a left side perspective view of a traditional fluid end attached to a traditional power end.
Figure 4:
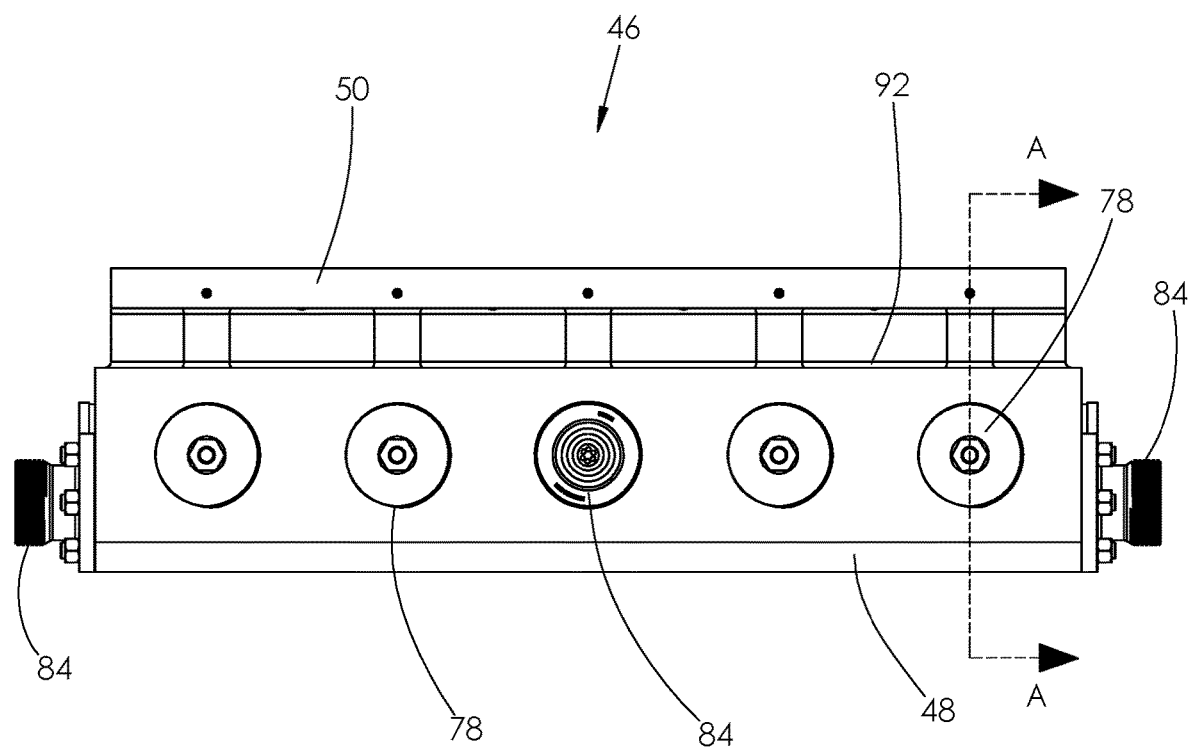
FIG. 4 is a top plan view of the fluid end shown in FIG. 3.

Turning back to FIGS. 6A and 7, in contrast to the traditional fluid end 46, shown in FIG. 3, the fluid end 100 is configured to receive fluid from two manifolds, rather than just one. The fluid end 100 comprises an upper intake manifold 166 and a lower intake manifold 168. Each manifold 166 and 168 is in fluid communication with each fluid end section 102. Using two different manifolds 166 and 168 allows different types of fluid to be delivered to each fluid end section 102. For example, fluid having a higher level of proppant may be delivered via the upper intake manifold 166, while fluid having a zero to minimal level of proppant may be delivered via the lower intake manifold 168.

Continuing with FIGS. 6A and 7, the upper and lower intake manifolds 166 and 168 are joined to the fluid end sections 102 via a plurality of conduits 159. Each conduit 159 is positioned directly below the corresponding manifold 166 and 168 and extends along a straight line between the fluid end section 102 and the corresponding manifold 166 and 168. Thus, each conduit 159 and corresponding manifold 166 and 168 have a "T" shape.

Figure 7A:
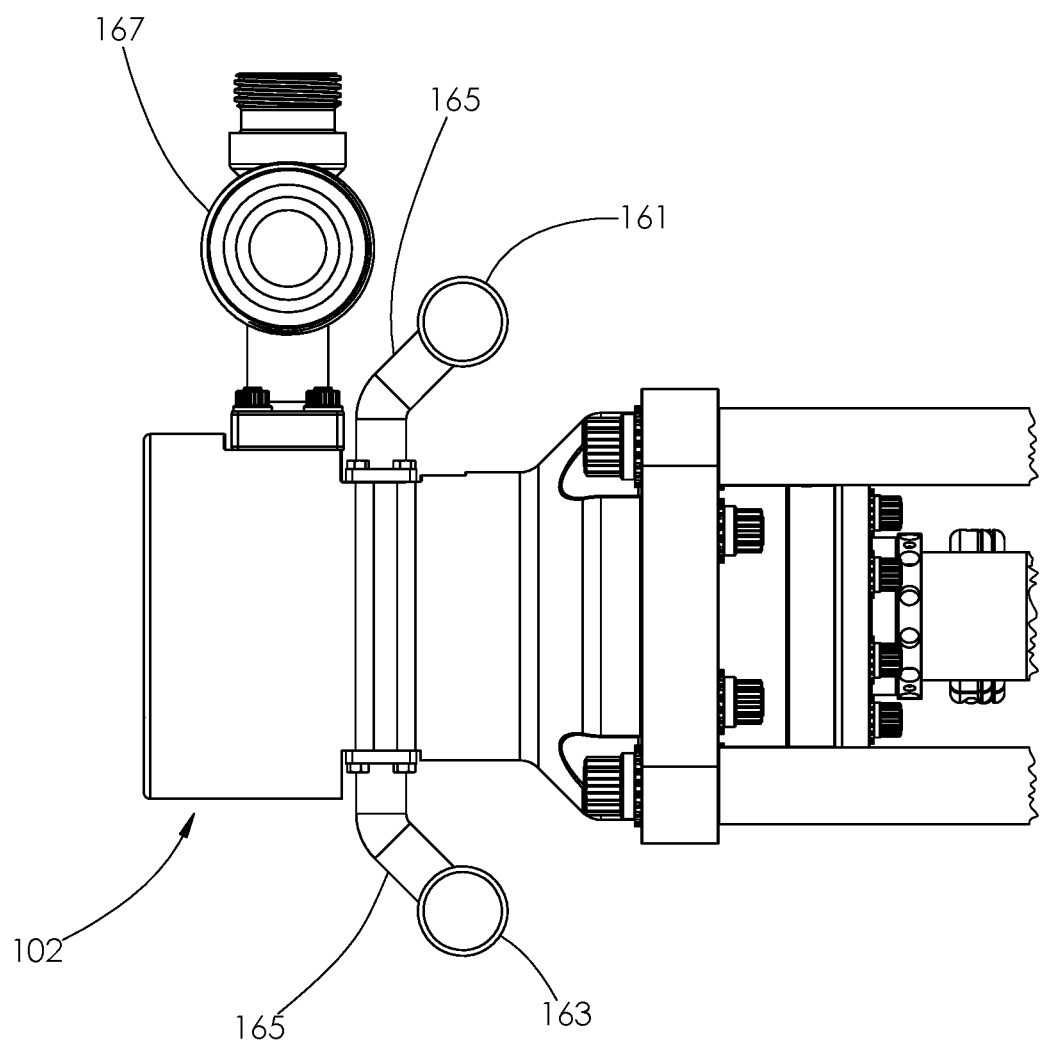
FIG. 7A is a side elevational view of the fluid end shown in FIG. 6, but with another embodiment of intake and discharge manifolds.
Figure 7B:
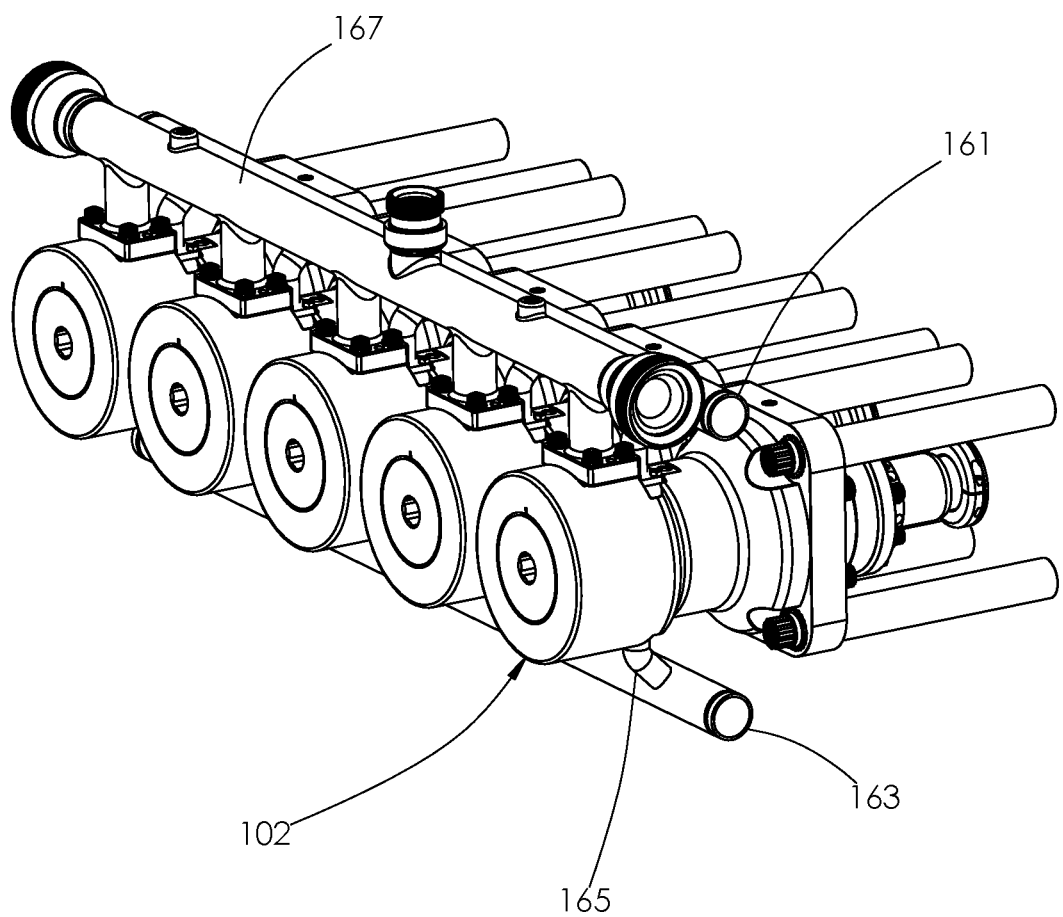
FIG. 7B is a front perspective view of the fluid end shown in FIG. 7A.

Turning to FIGS. 7A and 7B, an alternative embodiment of an upper and lower intake manifold 161 and 163 is shown. The upper and lower intake manifolds 161 and 163 are joined to the fluid end sections 102 via a plurality of conduits 165. The conduits 165 have an elbow shape. The elbow shape of the conduits 165 causes the corresponding manifolds 161 and 163 to be spaced farther away from a discharge manifold 167, than the manifolds 166 and 168. Providing more space between the intake manifolds 161 and 163 and the discharge manifold 167 provides more space for maintenance to different areas of the fluid end 100, when needed.

Turning back to FIG. 9, an upper and lower intake bore 170 and 172 are formed within the housing 104. Each bore 170 and 172 interconnects the intermediate outer surface 112 and the horizontal bore 106. The upper and lower intake bores 170 and 172 shown in FIG. 9 are collinear. In alternative embodiments, the upper and lower intake bores may not be collinear.

With reference to FIGS. 6A-9, the upper intake bore 170 is in fluid communication with the upper intake manifold 166, and the lower intake bore 172 is in fluid communication with the lower intake manifold 168. In operation, fluid may be delivered into the housing 104 through both the upper and lower intake bores 170 and 172. In alternative embodiments, only one intake bore may be formed in the housing and only one intake manifold may be attached to the housing.

Continuing with FIGS. 6A-9, the fluid end 100 further comprises a plurality of discharge conduits 174. Each discharge conduit 174 is attached to one of the fluid end sections 102 in a one-to-one relationship. A discharge manifold 176 interconnects each of the discharge conduits 174, as shown in FIGS. 6 and 7. In alternative embodiments, the discharge conduits and discharge manifold may be formed as a single unit, like the discharge manifold 167, shown in FIGS. 6, 7A and 7B.

Continuing with FIG. 9, a discharge bore 178 is formed in the housing 104 and interconnects the intermediate surface 112 and the horizontal bore 106. The discharge bore 178 is positioned between the first surface 108 of the housing 104 and the intake bores 170 and 172. The discharge bore 178 is in fluid communication with the discharge conduit 174. In operation, fluid to be pressurized enters the housing 104 through the upper and lower intake bores 170 and 172. Pressurized fluid exits the housing 104 through the discharge bore 178.

Figure 18:
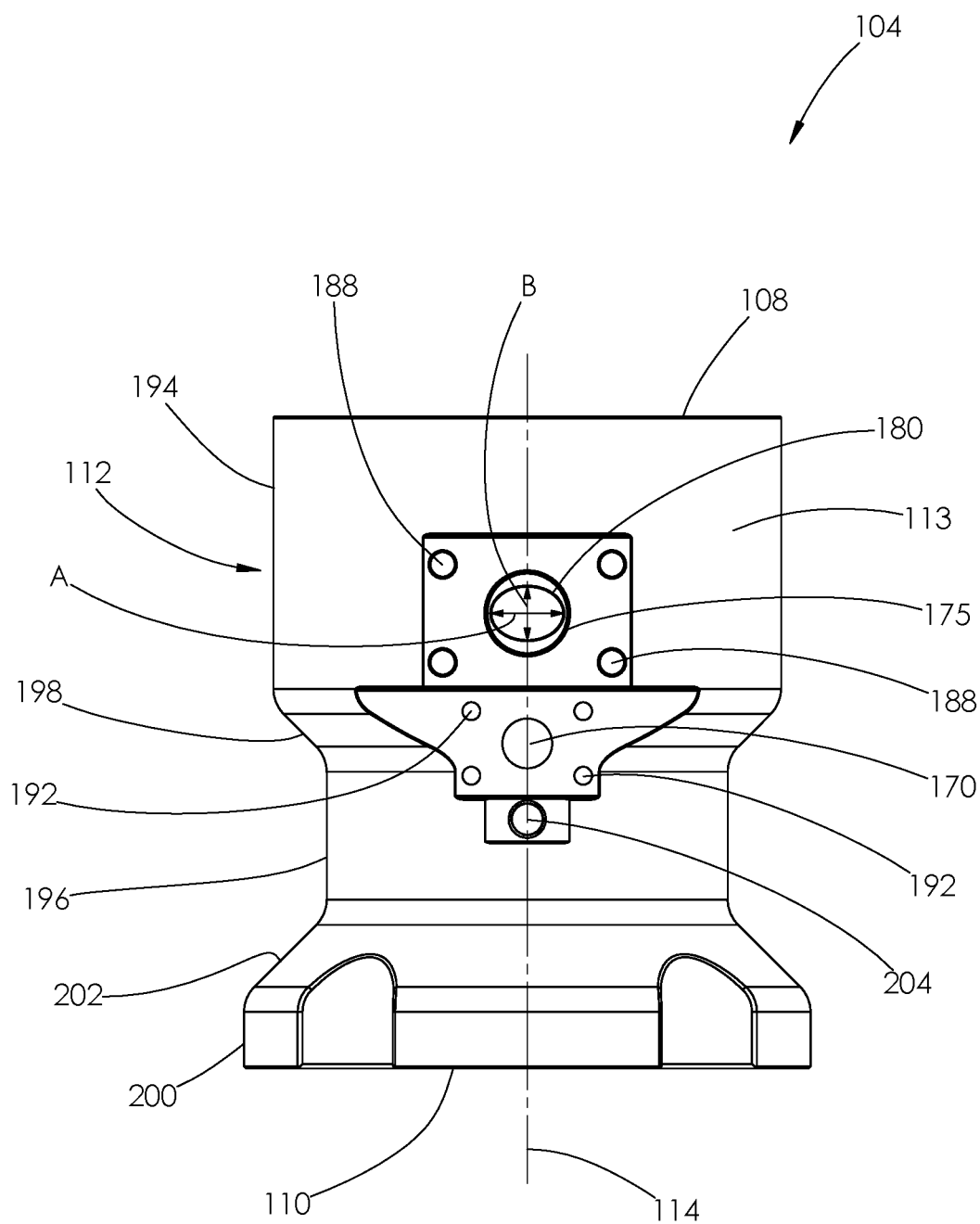
FIG. 18 is a top plan view of the housing shown in FIG. 14.

With reference to FIG. 18, the discharge bore 178 has an oval cross-sectional shape, as shown by a discharge bore opening 180. The opening 180 has a length A and a width B. The discharge bore 178 is formed within the housing 104 such that the width B extends along an axis that is parallel to the longitudinal axis 114 of the housing 104. During operation, high fluid pressure within the discharge bore 178 may cause the walls along the length A to compress, causing the discharge bore 178 to have a more circular cross-sectional shape. Providing room for the walls surrounding the discharge bore 178 to compress, helps reduce stress in the housing 104 and increase fluid flow. In alternative embodiments, the discharge bore may have a circular cross-sectional shape.

Figure 19:
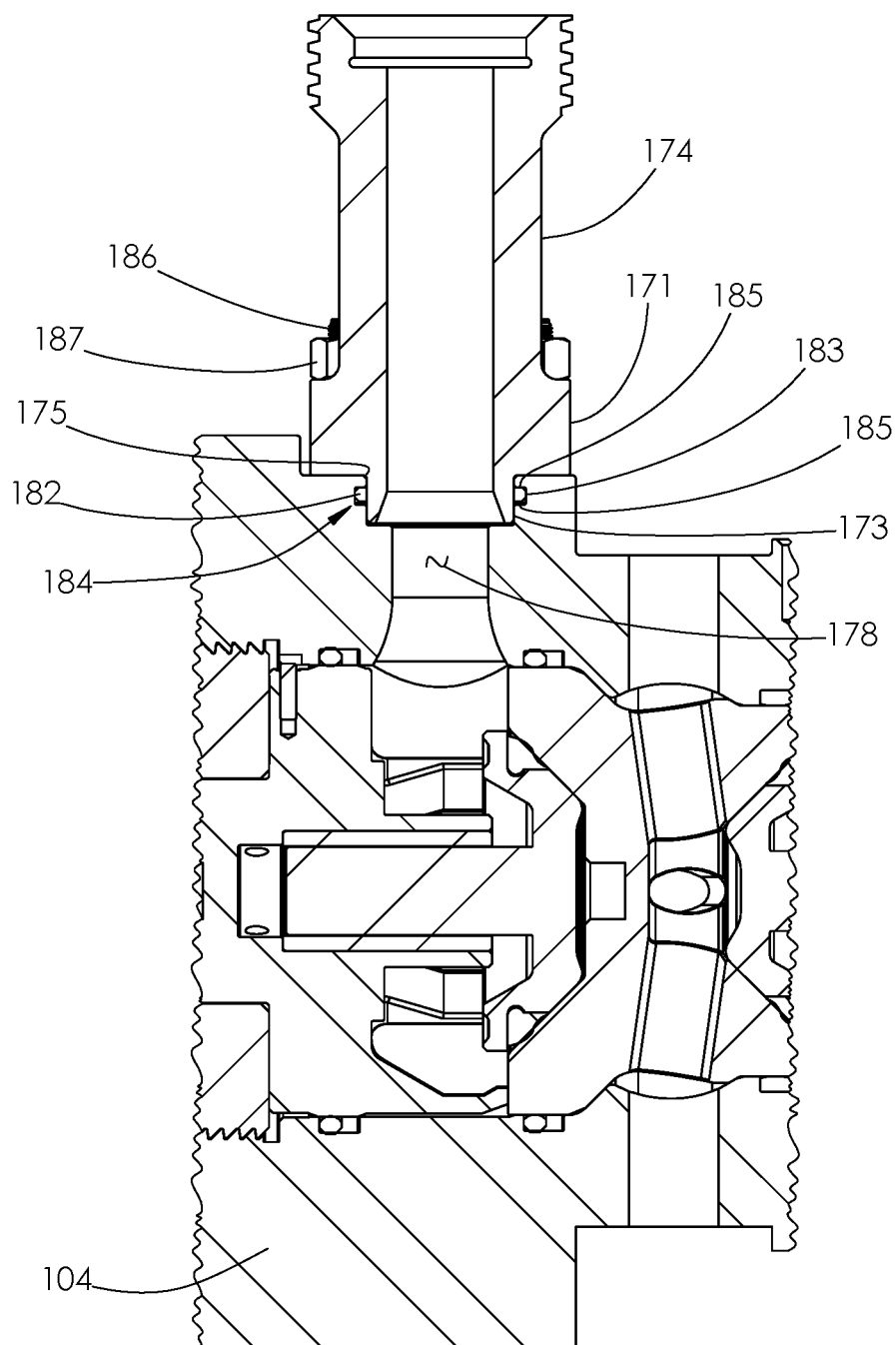
FIG. 19 is an enlarged view of area E shown in FIG. 9.

Continuing with FIG. 19, a counterbore 173 is formed within the housing 104 immediately above the opening 180 of the discharge bore 178. The discharge bore 178 opens into the counterbore 173. The counterbore 173 has a circular cross-sectional shape, as shown by the opening 175 in FIG. 18. A portion of the discharge conduit 174 is installed within the counterbore 173 through its opening 175. A seal 182 is interposed between the walls of the housing 104 surrounding the discharge bore 178 and an outer surface of the discharge conduit 174. The seal 182 is installed within a groove 184 formed in the walls of the housing 104. The seal 182 may be identical to the second seal 376, described with reference to FIGS. 65 and 70. In alternative embodiments, the seal may be identical to the first seal 374, described with reference to FIGS. 65 and 71.

The groove 184 is characterized by two sidewalls 185 joined to a base 183. The sidewalls 185 may join the base 183 via radius corners or at a 90 degree angle. No grooves are formed in the outer surface of the discharge conduit 174 for housing a seal. In operation, the seal 182 wears against the outer surface of the discharge conduit 174. If the outer surface of the discharge conduit 174 begins to erode, allowing fluid to leak around the seal 182, the discharge conduit 174 may be replaced with a new discharge conduit 174.

The discharge bore 178 shown in FIG. 9 interconnects a top surface 113 of the intermediate surface 112 of the housing 104 and the horizontal bore 106. Likewise, the discharge conduits 174 shown in FIGS. 6, 7, and 9 are attached to the top surface 113 of the intermediate surface 112 of each housing 104. In operation, any gas trapped within the housing 104 rises towards the top of the housing 104. Placing the discharge bore 178 and conduit 174 at the top of the housing 104 allows the gases to naturally escape. Additionally, any wear caused to the components by the rising gas will primarily be imposed on the discharge conduit 174, rather than the housing 104. The discharge conduit 174 and corresponding discharge piping 176 are easily replaced, if needed.

In alternative embodiments, the discharge bore may interconnect a bottom or side surface of the intermediate surface and the horizontal bore, and the discharge conduit may be attached to the corresponding surface of the housing. In further alternative embodiments, the discharge bore may interconnect the first outer surface of the housing and the horizontal bore, and the discharge conduit may be attached to the first outer surface of the housing.

With reference to FIGS. 6, 18 and 19, a rectangular flange 171 is formed around each discharge conduit 174. Each rectangular flange 171 is attached to the housing 104 using a plurality of threaded studs 186 and nuts 187, as shown in FIGS. 6 and 19. A plurality of threaded openings 188 are formed in the housing 104 for receiving the studs 186, as shown in FIG. 18. The openings 188 are positioned in a rectangular pattern around the discharge bore opening 180. Such pattern helps maximize the surface area of the intermediate surface 112 of the housing 104, helping to reduce the size and weight of the housing 104.

With reference to FIGS. 7 and 18, the intake manifolds 166 and 168 each comprise a plurality of rectangular flanges 189 joined to a plurality of conduits 191 in a one-to-one relationship, as shown in FIG. 7. Each rectangular flange 189 is attached to the housing 104 using a plurality of threaded studs 190 and nuts 193, as shown in FIG. 7. A plurality of threaded openings 192 are formed in the housing 104 for receiving the studs 190, as shown in FIG. 18. The openings 192 are positioned in a rectangular pattern around the intake bores 170 and 172 to maximize surface area of the housing 104. In alternative embodiments, the discharge conduits and intake manifolds may be attached to the housing using different types of fasteners, such as socket-headed screws.

Continuing with FIG. 18, the intermediate surface 112 of the housing 104 includes a first portion 194 joined to a second portion 196 by a first tapered portion 198. The second portion 196 is joined to a third portion 200 by a second tapered portion 202. The first portion 194 is joined to the first surface 108 and the third portion 200 is joined to the second surface 110.

The second portion 196 has a smaller diameter than both the first and third portions 194 and 200. Providing the second portion 196 with a smaller diameter helps remove unnecessary weight from the housing 104. The third portion 200 may have a slightly larger diameter than the first portion 194. The first, second, and third portions 194, 196, and 200 are generally cylindrical. Thus, the housing 104 may be characterized as being primarily cylindrical. In alternative embodiments, the housing may be uniform in diameter throughout its intermediate surface. In further alternative embodiments, the housing may have various diameters throughout its intermediate surface other than those shown in FIG. 18.

Continuing with FIG. 18, a threaded hole 204 is formed in the top surface 113 of the intermediate surface 112. The threaded hole 204 is positioned at the center of gravity of the housing 104 when the housing 104 is fully loaded with the components described herein. The threaded hole 204 is configured to receive a lifting eye (not shown) used to lift and support the housing 104 during assembly and maintenance, as shown in FIG. 9.

With reference to FIGS. 20-29, each fluid end section 102 further comprises a stuffing box 140 attached to the second outer surface 110 of the housing 104. The stuffing box 140 has a generally cylindrical shape and comprises a first outer surface 206 joined to an opposed second outer surface 208 by an intermediate outer surface 210. The intermediate surface 210 includes a cylindrical first portion 212 joined directly to a cylindrical second portion 214. The first portion 212 is positioned adjacent the first surface 206 and has a reduced diameter from that of the second portion 214. A threaded hole 215 is formed in a top surface of the second portion 214. The threaded hole 215 is configured to receive a lifting eye (not shown) used to lift and support the stuffing box 140 during assembly and maintenance.

Figure 25:
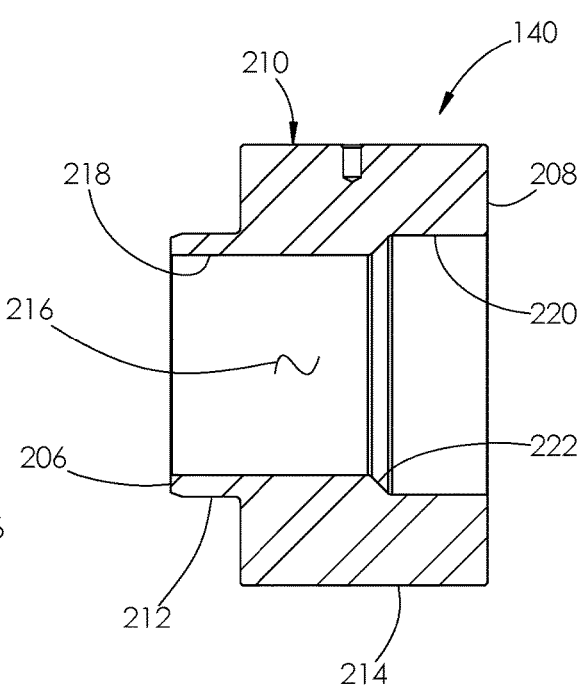
FIG. 25 is a cross-sectional view of the stuffing box shown in FIG. 24, taken along line F-F.
Figure 26:
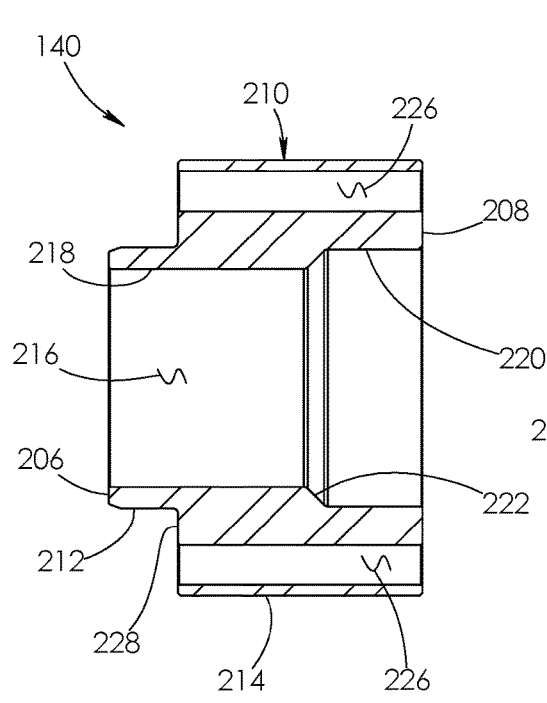
FIG. 26 is a cross-sectional view of the stuffing box shown in FIG. 24, taken along line G-G.
Figure 29:
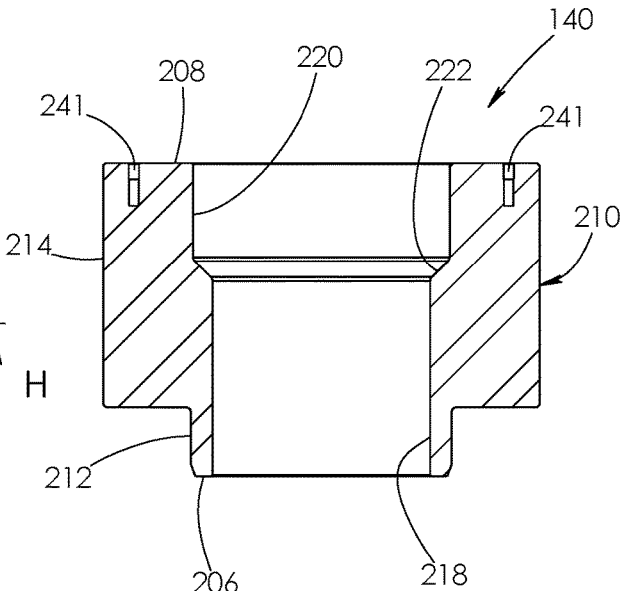
FIG. 29 is a cross-sectional view of the stuffing box shown in FIG. 28, taken along line H-H.
Figure 30:
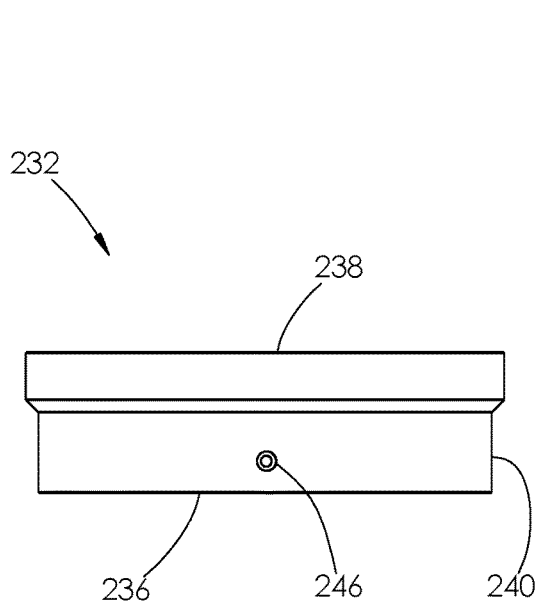
FIG. 30 is a top plan view of a retainer shown attached to the stuffing box in FIG. 20.

A central passage 216 interconnects the stuffing box's first and second outer surfaces 206 and 208. The walls surrounding the central passage 216 include a first section 218 joined to a second section 220 by a tapered shoulder 222, as shown in FIGS. 25, 26, and 29. The second section 220 has a larger diameter than that of the first section 218. As described in more detail herein, the second section 220 and the tapered shoulder 222 are configured for receiving a plunger packing 224, as shown in FIGS. 20 and 21.

Continuing with FIGS. 23-29, a plurality of passages 226 are formed around the periphery of the second portion 214 of the stuffing box 140. Each passage 226 interconnects the second surface 208 of the stuffing box 140 and a base 228 of the second portion 214. The passages 226 are formed parallel to the central passage 216.

Turning back to FIGS. 14 and 15, a plurality of second threaded openings 230 are formed in the second surface 110 of the housing 104. The openings 230 surround the opening of the horizontal bore 106. The second openings 230 are surrounded by the first openings 144 used with the connect plate 118.

Figure 20:
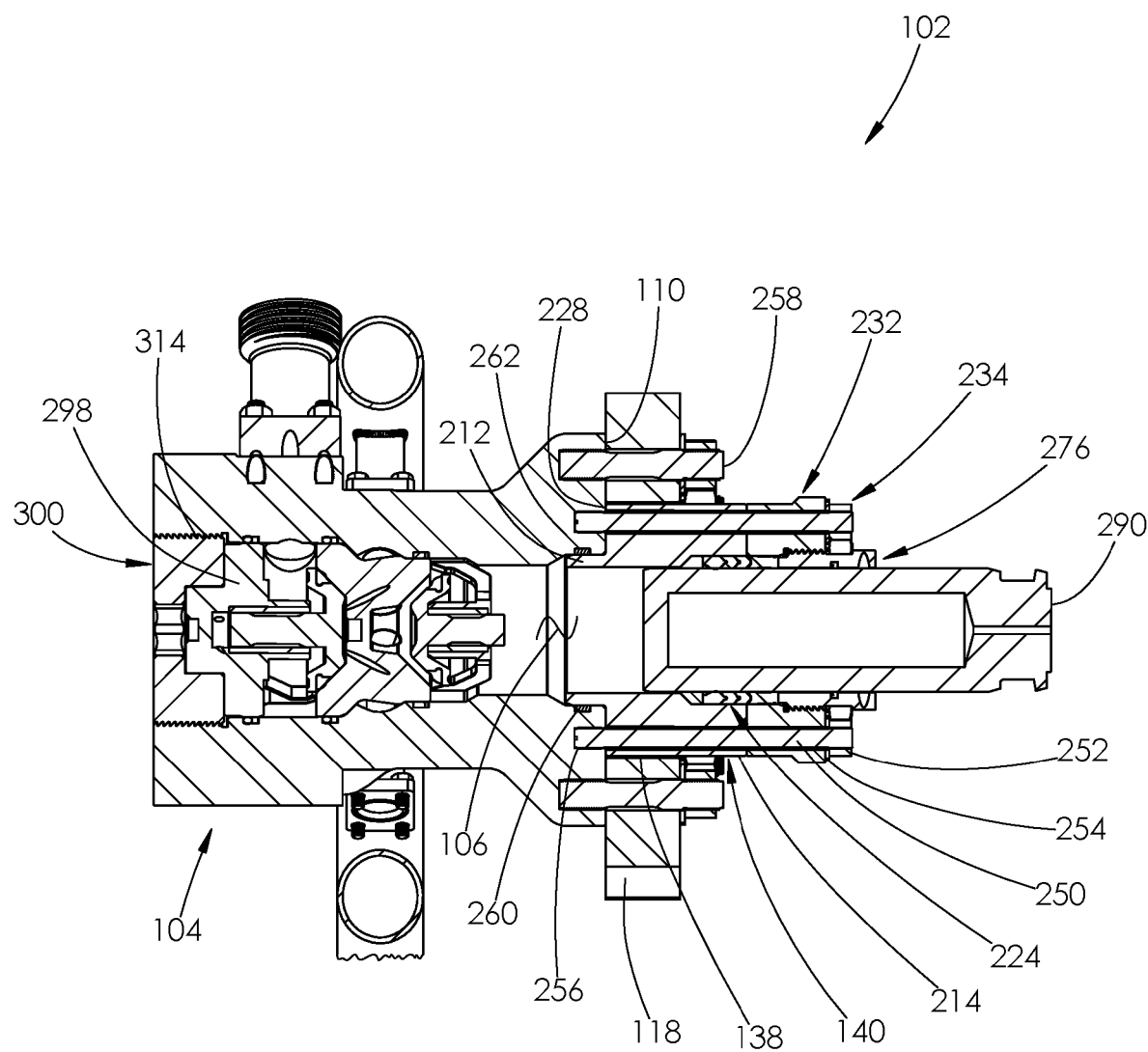
FIG. 20 is the cross-sectional view of the fluid end section shown in FIG. 17 with the upper and lower intake manifolds shown attached to the housing.
Figure 21:
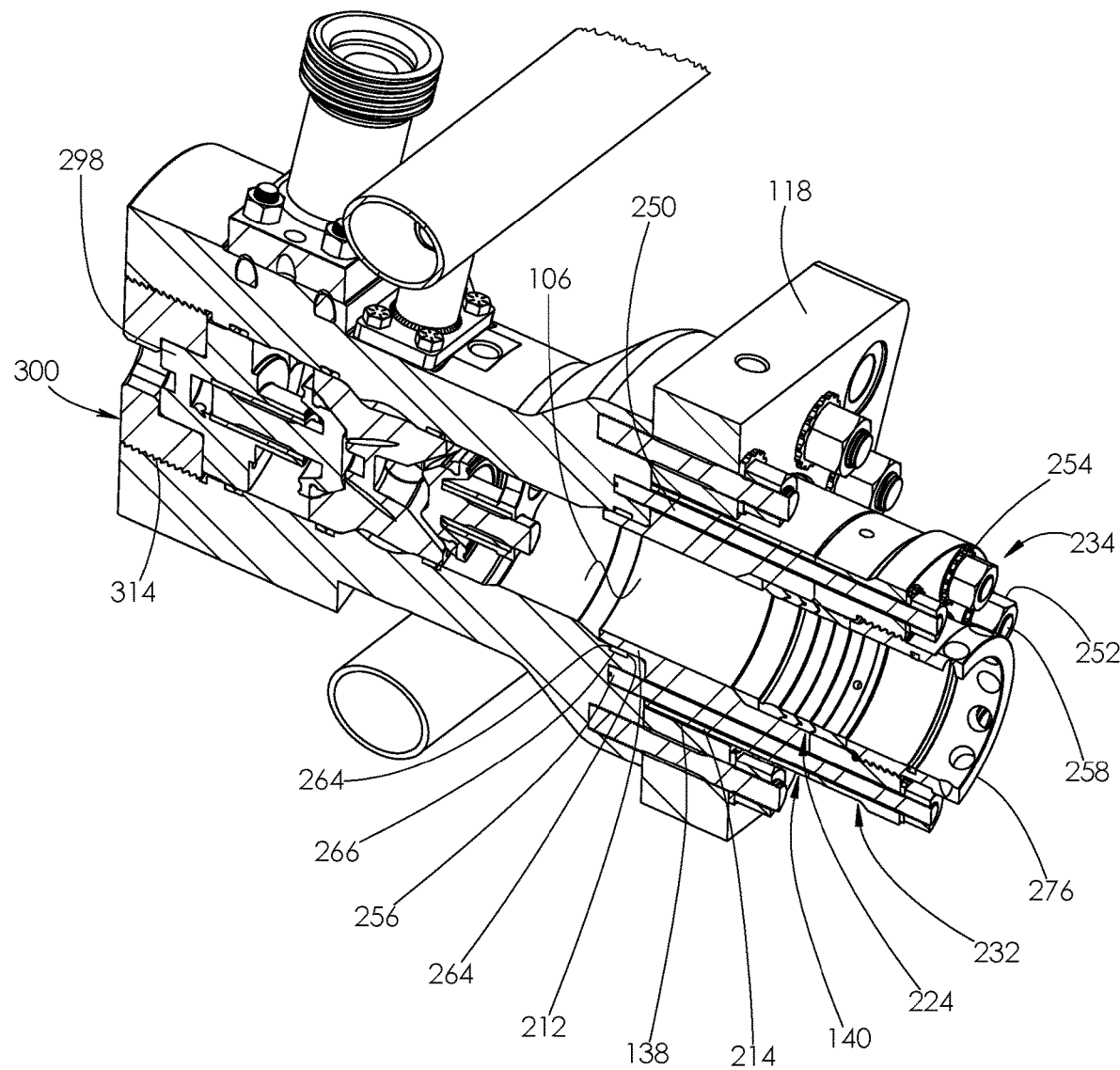
FIG. 21 is a rear perspective view of the fluid end section shown in FIG. 20, but the plunger has been removed.
Figure 22:
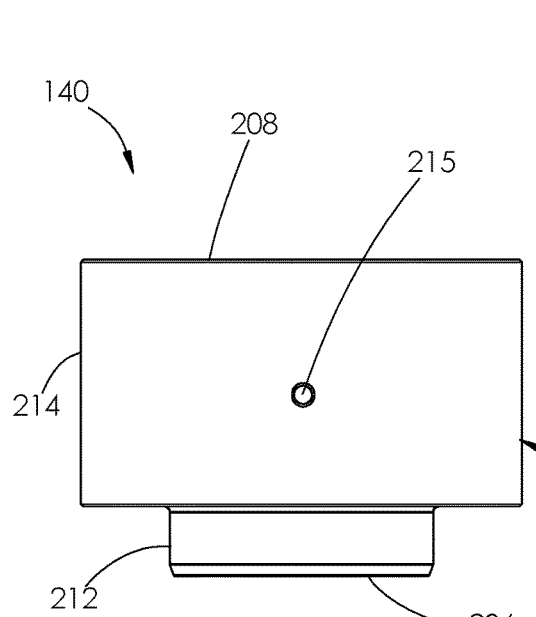
FIG. 22 is a top plan view of a stuffing box shown attached to the housing in FIG. 20.
Figure 23:
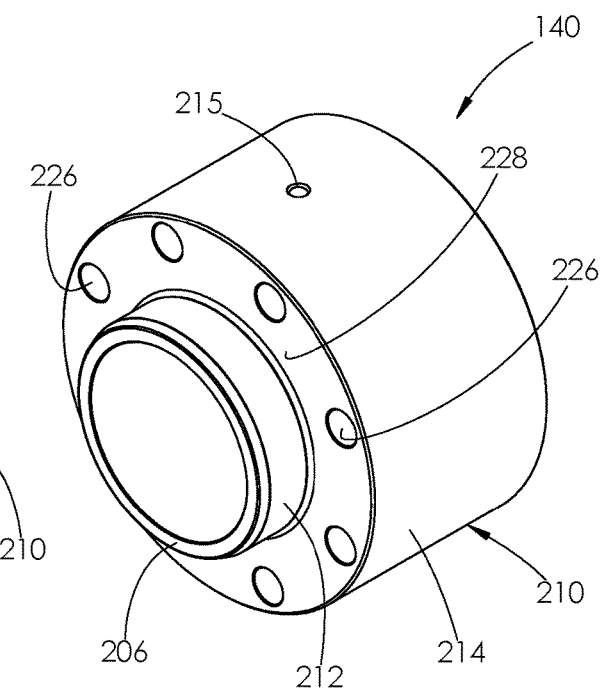
FIG. 23 is a perspective view of a first surface of the stuffing box shown in FIG. 22.
Figure 24:
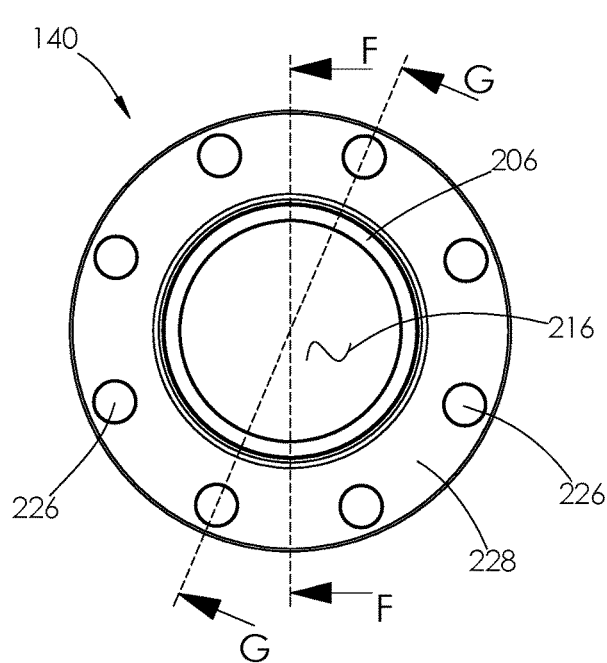
FIG. 24 is an elevational view of the first surface of the stuffing box shown in FIG. 22.

Continuing with FIGS. 20 and 21, the walls surrounding the horizontal bore 106 adjacent the second surface 110 of the housing 104 are sized to receive the first portion 212 of the stuffing box 140. The first portion 212 is installed within the horizontal bore 106 such that the base 228 of the second portion 214 abuts the second surface 110 of the housing 104. A portion of the second portion 214 is disposed within the central bore 138 formed in the connect plate 118. The stuffing box 140 is aligned on the housing 104 such that the passages 226 align with the second openings 230 in a one-to-one relationship.

With reference to FIGS. 20, 21, and 30-37, the stuffing box 140 is attached to the housing 104 using a retainer 232 and a fastening system 234. The retainer 232 has a generally cylindrical shape and comprises opposed first and second outer surfaces 236 and 238 joined by an intermediate surface 240. A central passage 242 interconnects the first and second outer surfaces 236 and 238. At least a portion of the central passage 242 has internal threads 244. A plurality of side passages 246 are formed in the retainer 232. Each passage 246 interconnects the central passage 242 and the intermediate surface 240. The passages 246 provide a pathway for lubricating oil to be introduced to the horizontal bore 106 during operation. The oil lubricates the moving parts within the housing 104 during operation.

Continuing with FIGS. 30-37, a plurality of passages 248 are formed in the retainer 232 and surround the central passage 242. Each passage 248 interconnects the first and second outer surfaces 236 and 238. The first surface 236 of the retainer 232 is positioned on the second surface 208 of the stuffing box 140 such that the passages 248 align with the passages 226 formed in the stuffing box 140, in a one-to-one relationship.

Figure 27:
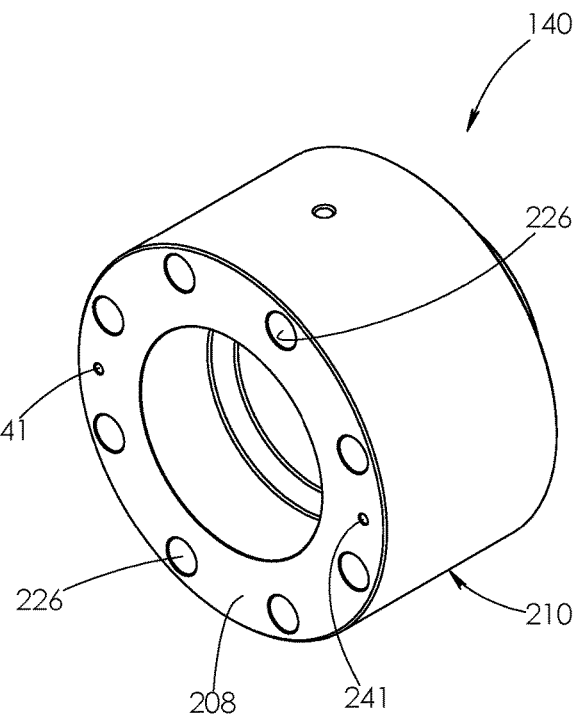
FIG. 27 is a perspective view of a second surface of the stuffing box shown in FIG. 22.
Figure 28:
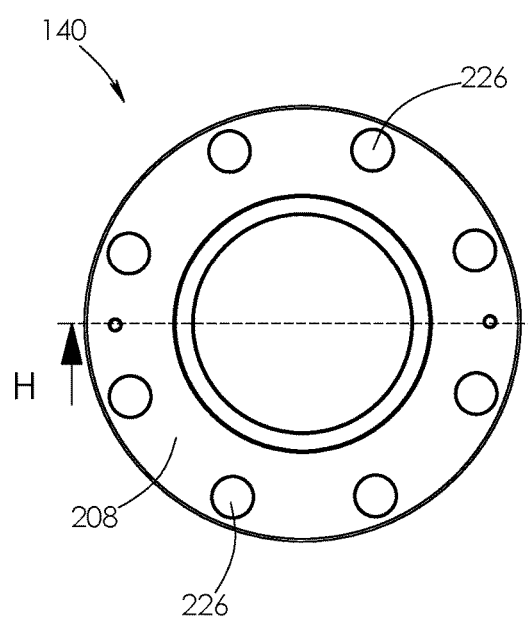
FIG. 28 is an elevational view of the second surface of the stuffing box shown in FIG. 22.
Figure 31:
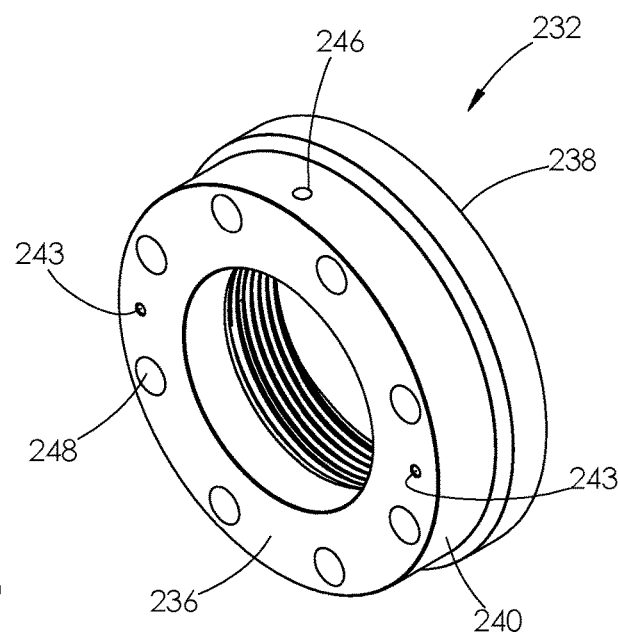
FIG. 31 is a perspective view of a first surface of the retainer shown in FIG. 30.
Figure 32:
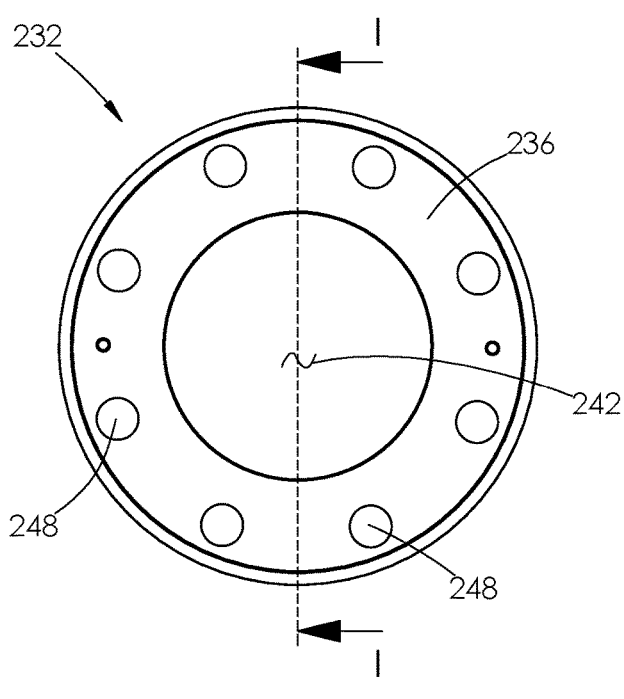
FIG. 32 is an elevational view of the first surface of the retainer shown in FIG. 30.
Figure 33:
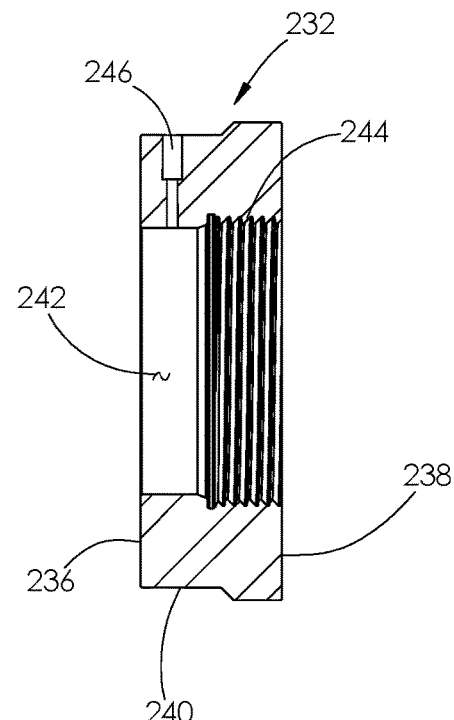
FIG. 33 is a cross-sectional view of the retainer shown in FIG. 32, taken along line I-I.
Figure 34:
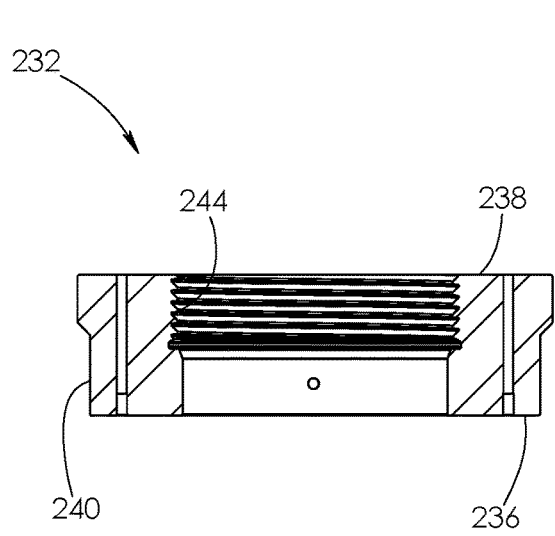
FIG. 34 is a cross-sectional view of the retainer shown in FIG. 36, taken along line J-J.
Figure 35:
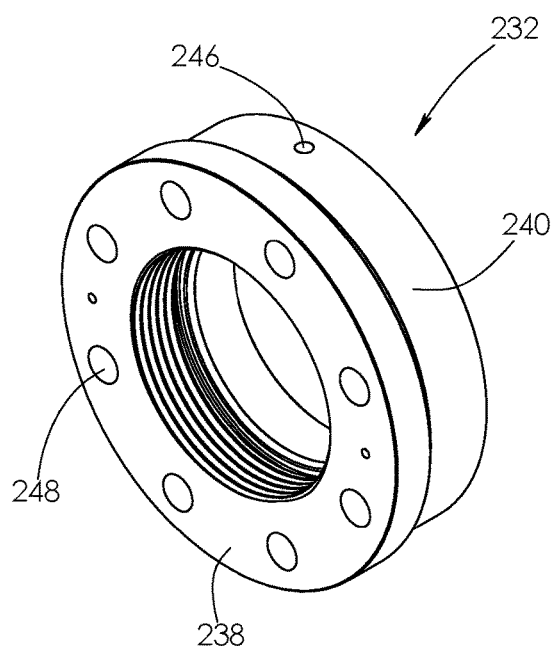
Figure 36:
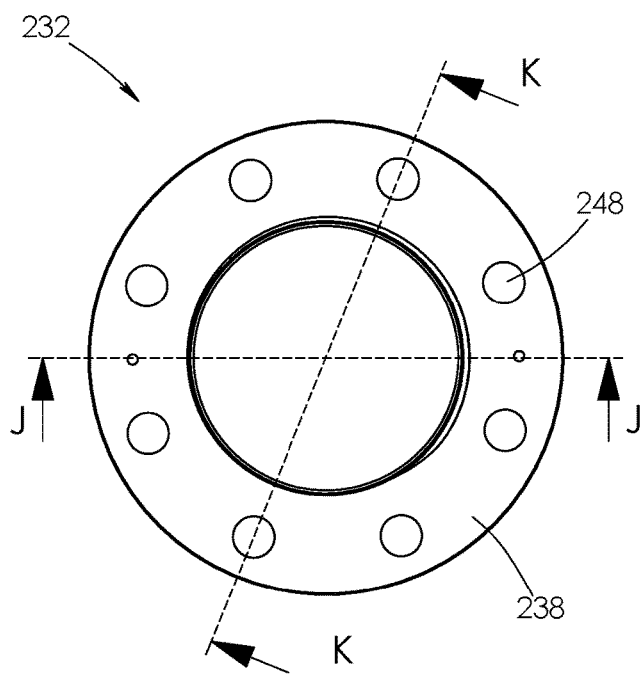
FIG. 36 is an elevational view of the second surface of the retainer shown in FIG. 30.
Figure 37:
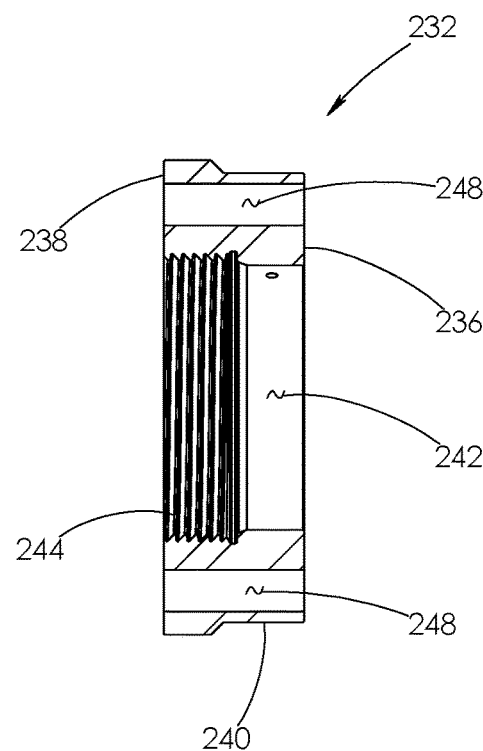
FIG. 37 is a cross-sectional view of the retainer shown in FIG. 36, taken along line K-K.
Figure 38:
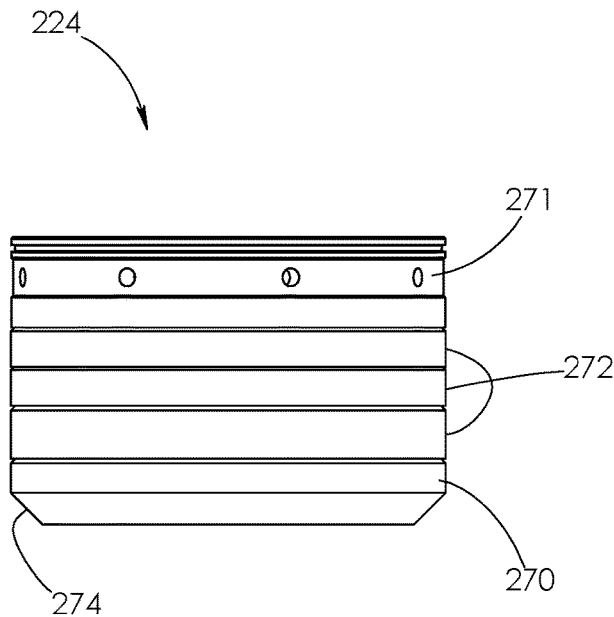
FIG. 38 is a top plan view of a plunger packing shown installed within the stuffing box and retainer in FIG. 20.
Figure 39:
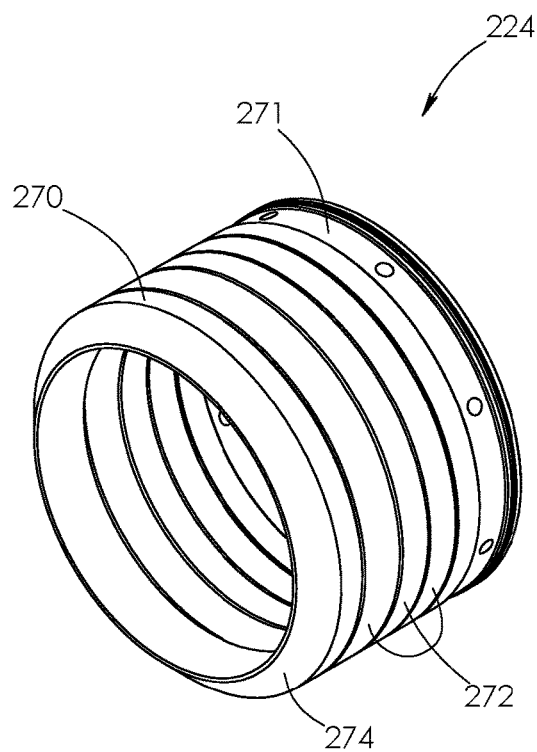
FIG. 39 is a perspective view of a first surface of the plunger packing shown in FIG. 38.
Figure 40:
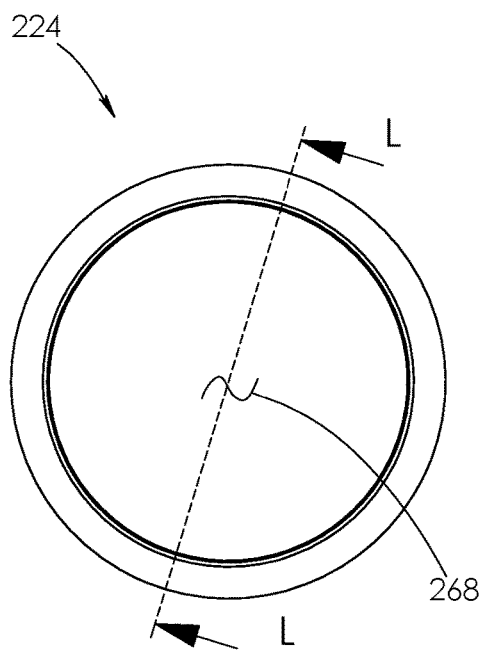
FIG. 40 is an elevational view of the first surface of the plunger packing shown in FIG. 38.
Figure 41:
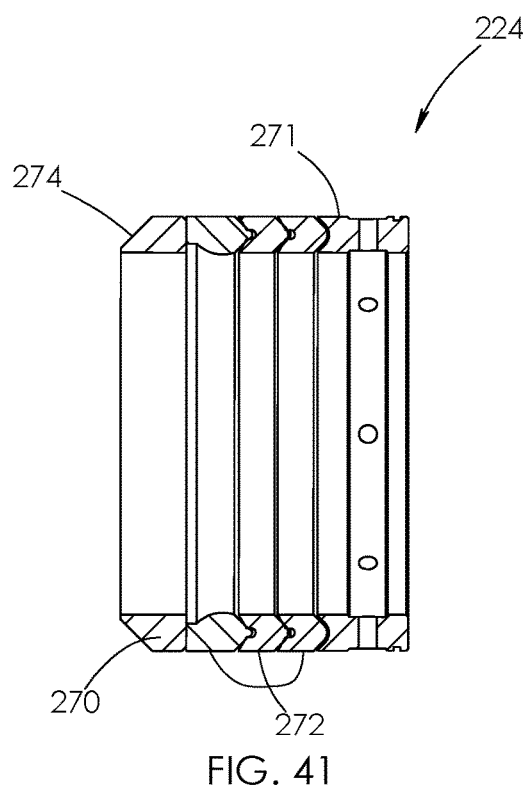
FIG. 41 is a cross-sectional view of the plunger packing shown in FIG. 40, taken along line L-L.
Figure 42:
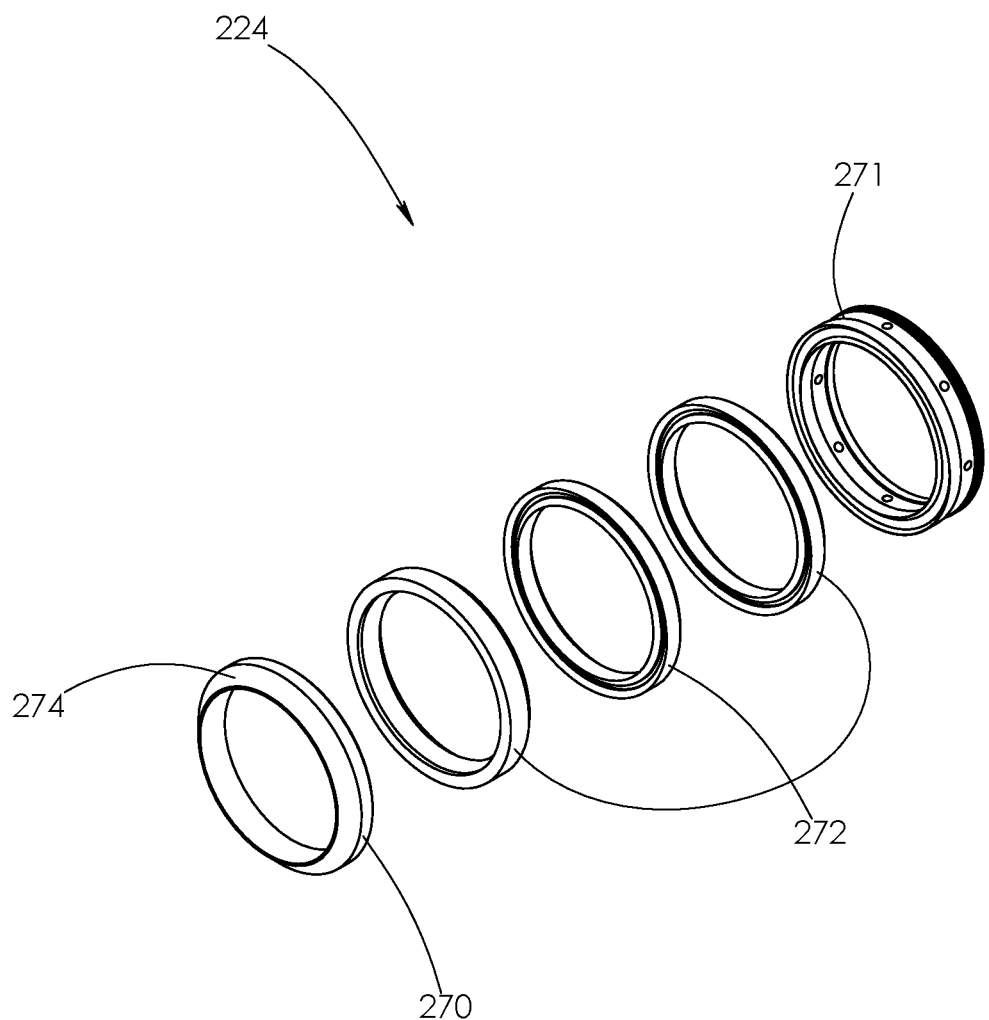
FIG. 42 is a perspective exploded view of the plunger packing shown in FIG. 38.
Figure 47:
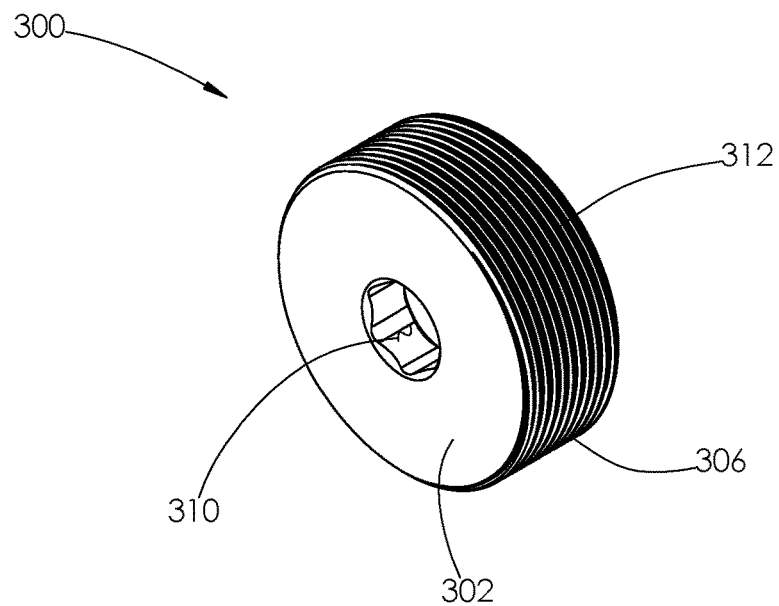
FIG. 47 is a perspective view of a first surface of a retainer shown installed within the housing in FIG. 20.
Figure 48:
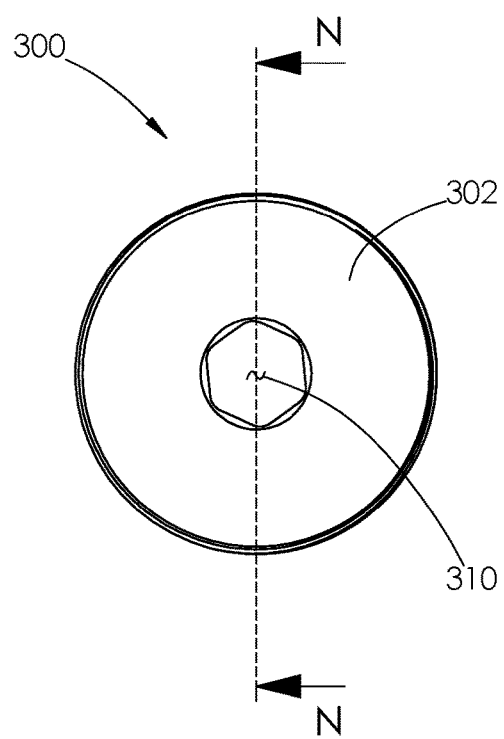
Figure 49:
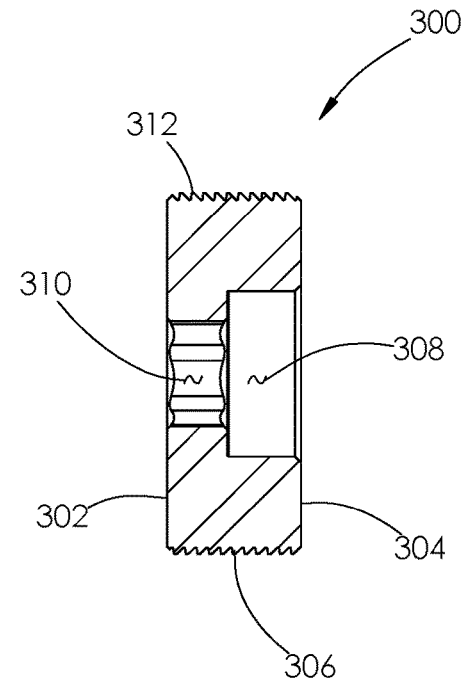
FIG. 49 is a cross-sectional view of the retainer shown in FIG. 48, taken along line N-N.

A pair of dowel pin holes 241 are formed in the second surface 208 of the stuffing box 140, as shown in FIGS. 27 and 28. A corresponding pair of dowel pin holes 243 are formed in the first surface 236 of the retainer 232, as shown in FIGS. 31 and 32. The holes 241 and 243 are configured for receiving a dowel pin. The dowel pin aligns the retainer 232 on the stuffing box 140 during assembly.

Turning back to FIGS. 20 and 21, the fastening system 234 secures both the retainer 232 and the stuffing box 140 to the housing 104. The fastening system 234 comprises a plurality of studs 250, nuts 252, and washers 254. A first end 256 of each stud 250 mates with one of the second openings 230 in the housing 104 in a one-to-one relationship. The passages 226 in the stuffing box 140 and the passages 248 in the retainer 232 subsequently receive the plural studs 250 projecting from the housing 104.

A second end 258 of each stud 250 projects from the second surface 238 of the retainer 232. The projecting second end 258 of each stud 250 receives a washer 254 and a nut 252. The nut 252 is turned until it tightly engages the washer 254 and the second surface 238 of the retainer 232, thereby securing the retainer 232 and the stuffing box 140 together. The retainer 232, in turn, holds the stuffing box 140 against the housing 104. The stuffing box 140 and the retainer 232 may be attached to and removed from the housing 104 without removing the connect plate 118.

When the first portion 212 of the stuffing box 140 is installed within the housing 104, a seal 260 is interposed between the walls of the housing 104 and outer surface of the first portion 212. The seal 260 is installed within a groove 262 formed in the walls of the housing 104. The seal 260 may be identical to the first seal 374, described with reference to FIGS. 65 and 71. In alternative embodiments, the seal may be identical to the second seal 376, described with reference to FIGS. 65 and 70.

The groove 262 is characterized by two sidewalls 264 joined by a base 266, as shown in FIG. 21. The sidewalls 264 may join the base 266 via radius corners or at a 90 degree angle. No grooves are formed in the first portion 212 of the stuffing box 140 for housing a seal. The seal 260 wears against the outer surface of the first portion 212 during operation. If the outer surface of the first portion 212 begins to erode, allowing fluid to leak around the seal 260, the stuffing box 140 may be replaced with a new stuffing box 140.

When the stuffing box 140 is attached to the housing 104 using the fastening system 234, a first end 256 of the studs 250 may be installed within the housing 104 such that they extend past the seal 260, as shown in FIG. 20. An edge of the studs 250 may not be purposely aligned with an edge of the seal 260 in order to prevent areas of high stress from being aligned with one another in the housing 104, potentially causing a stress riser.

Continuing with FIGS. 20, 21, and 38-42, a plunger packing 224 is installed within the central passage 216 of the stuffing box 140. The plunger packing 224 engages the tapered shoulder 222 and is positioned within the second section 220 of the central passage 216, as shown in FIGS. 20 and 21. A portion of the plunger packing 224 may extend into the central passage 242 of the retainer 232. The plunger packing 224 has a central passage 268 that aligns with the central passages 216 and 242 when the plunger packing 224 is installed within the stuffing box 140 and the retainer 232. In alternative embodiments, the plunger packing may be sized to not extend into the retainer.

The plunger packing 224 comprises a pair of outer ring seals 270 and 271 and at least one inner ring seal 272. The outer ring seals 270 and 271 may be made of metal while the inner ring seals 272 may be made of an elastomer material. The outer ring 270 has a tapered outer surface 274 that is sized to engage the tapered shoulder 222 formed in the central passage 216. The tapered engagement helps reduce stress in the stuffing box 140 during operation. In alternative embodiments, the walls surrounding the central passage of the stuffing box may include an annular shoulder rather than a tapered shoulder. In such embodiment, the plunger packing may have a flat outer ring configured to mate with the annular shoulder. A plurality of holes 275 are formed in the outer ring 271. The holes 275 are in fluid communication with the side passages 246 formed in the retainer 232 in order to deliver lubricating oil to the housing 104.

With reference to FIGS. 20, 21, and 43-46, a packing nut 276 is installed within the retainer 232 and engages the plunger packing 224. The packing nut 276 comprises a first surface 278 joined to an opposed second surface 280 by an intermediate surface 282. A central passage 284 extends through the packing nut 276 and interconnects the opposed first and second surfaces 278 and 280. A plurality of side holes 286 are formed in the packing nut 276 and interconnect the central passage 284 and the intermediate surface 282. The holes 286 are configured for engaging a tool used to grip the packing nut 276.

Continuing with FIGS. 43-46, external threads 288 are formed in a portion of the intermediate surface 282 of the packing nut 276. The external threads 288 are configured to mate with the internal threads 244 formed within the retainer 232, as shown in FIGS. 20 and 21. The mating threads 288 and 244 are buttress threads. The buttress threads are configured to handle a large amount of load using a low amount of threads. Using a low amount of threads allows the packing nut 276 to be quickly removed or installed within the retainer 232. In alternative embodiments, the packing nut and retainer may mate using traditional threads.

When the packing nut 276 is installed within the retainers 232, the first surface 278 of the packing nut 276 engages an outer ring seal 270 of the plunger packing 224. Such engagement compresses the plunger packing 224, creating a tight seal. After the packing nut 276 has been installed within a retainer 232, the central passage 284 within the packing nut 276 is aligned with the central passage 268 in the plunger packing 224.

Continuing with FIGS. 20 and 21, when the stuffing box 140 and the retainer 232 are attached to the housing 104, the central passages 216 and 242 align with the horizontal bore 106. Likewise, the central passages 268 and 284 in the installed plunger packing 224 and packing nut 276 align with the horizontal bore 106. Thus, the central passages 216, 242, 268, and 284 may be considered an extension of the horizontal bore 106. A plunger 290 is disposed with the installed plunger packing 224 and the packing nut 276, as shown in FIG. 20. In operation, the plunger 290 reciprocates within the horizontal bore 106 in order to pressurize fluid contained with the housing 104.

With reference to FIGS. 20, 21, and 47-49, the horizontal bore 106 is sealed at the first surface 108 of the housing 104 by a retainer 300. The retainer 300 has a first surface 302 joined to an opposed second surface 304 by an outer intermediate surface 306. A cutout 308 is formed in the second surface 304 for receiving a portion of a discharge valve guide 298. A central passage 310 is formed in the retainer 300 and interconnects the first surface 302 and the cutout 308. The walls surrounding the central passage 310 have a polygonal shape. The polygonal shape is configured to mate with a tool used to grip the retainer 300.

The intermediate surface 306 of the retainer 300 has external threads 312 that mate within internal threads 314 formed in the walls surrounding the horizontal bore 106 adjacent the first surface 108 of the housing 104, as shown in FIGS. 20 and 21. The mating threads 312 and 314 are buttress threads. The buttress threads are configured to handle a large amount of load using a low amount of threads. Using a low amount of threads allows the retainer 300 to be quickly removed from or installed within the housing 104. In alternative embodiments, the retainer may mate with the housing using traditional threads. In further alternative embodiments, the retainer may be secured to the housing using a fastening system, like the fastening system 234.

Figure 50:
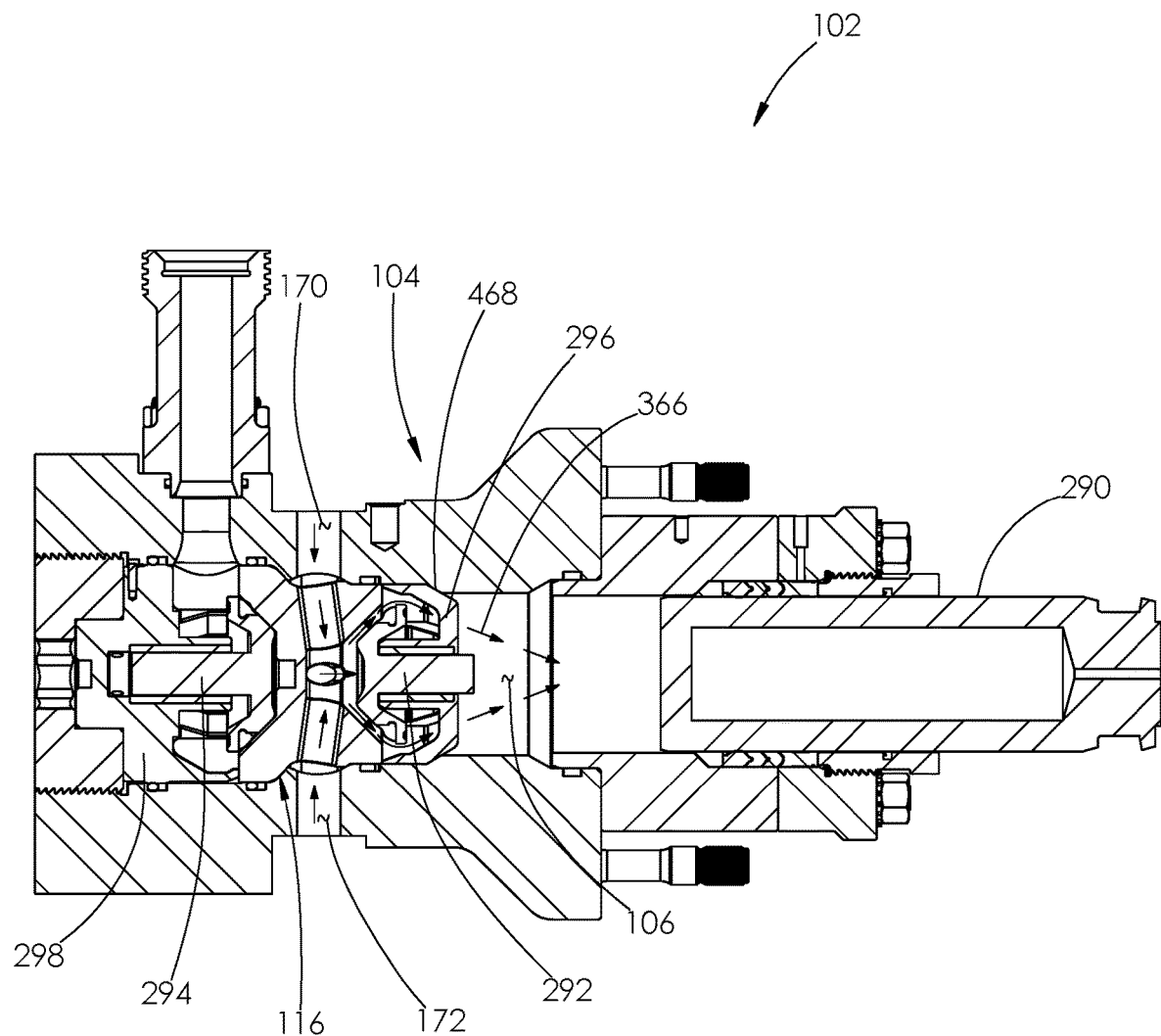
FIG. 50 is the cross-sectional view shown in FIG. 9, but the suction valve is spaced from the fluid routing plug.
Figure 51:
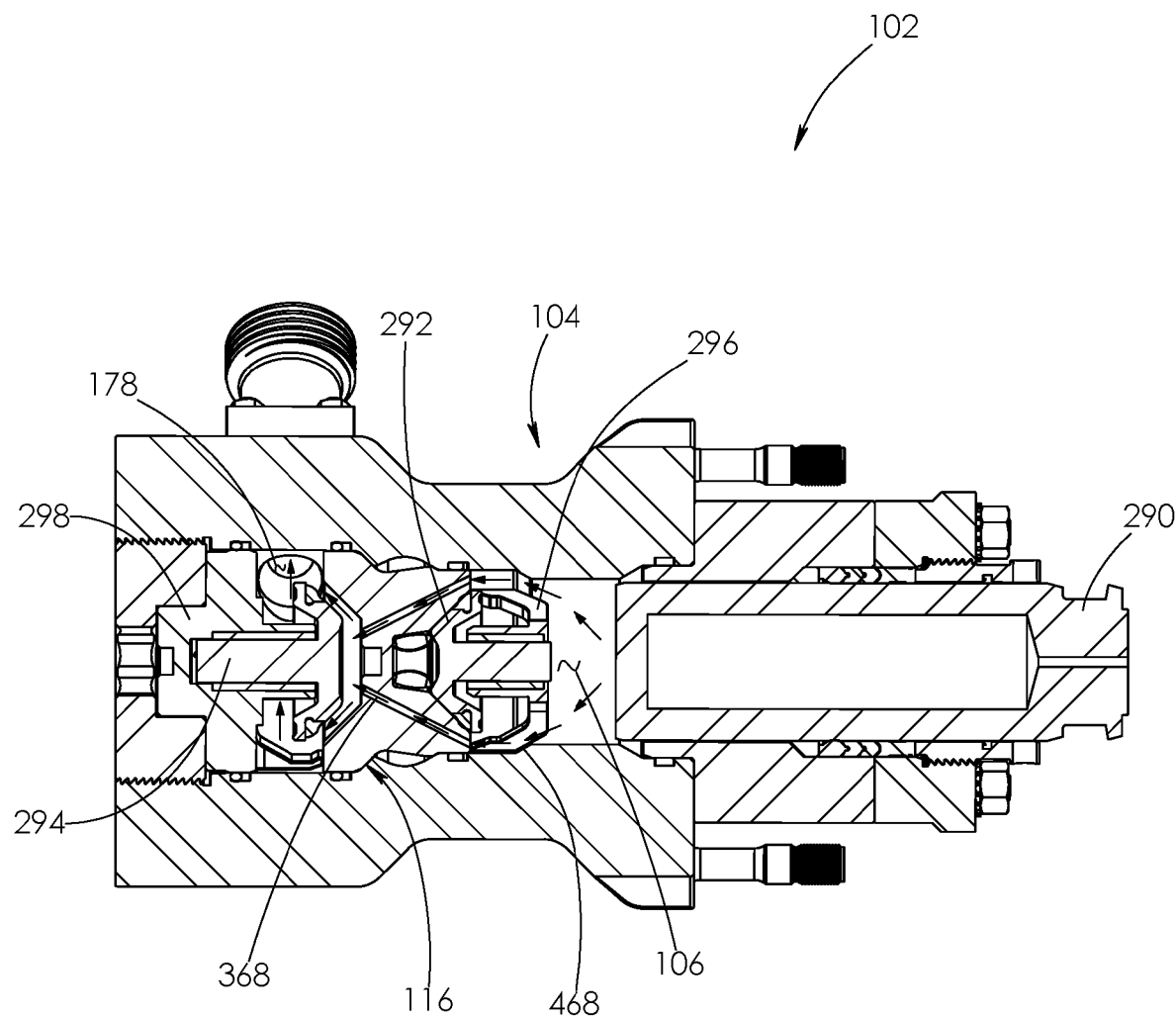
FIG. 51 is the cross-sectional view shown in FIG. 50, but the plunger has extended into the housing, the suction valve is sealed against the fluid routing plug, and the discharge valve is spaced from the fluid routing plug.

Turning now to FIGS. 50 and 51, the fluid routing plug 116 is installed within a medial section of the horizontal bore 106. The fluid routing plug 116 is configured to engage with a suction valve 292 on one side and a discharge valve 294 on the opposite side. In operation, the suction and discharge valves 292 and 294 move axially along an axis that is parallel to or aligned within the central longitudinal axis 114 of the housing 104, shown in FIG. 9, as the valves 292 and 294 move at alternating times between an open and closed position. In the closed position, the valves 292 and 294 are pressed against the fluid routing plug 116, preventing fluid from exiting the plug 116. In the open position, the valves 292 and 294 are spaced from the fluid routing plug 116, allowing fluid to flow from the plug 116.

As will be described in more detail herein, axial movement of the suction valve 292 is limited by a suction valve guide 296 installed within the housing 104. Likewise, axial movement of the discharge valve 294 is limited by the discharge valve guide 298 installed within the housing 104.

Turning now to FIGS. 52-64, the fluid routing plug 116 comprises a body 316 having opposed first and second outer surfaces 318 and 320 joined by an intermediate outer surface 322. The first outer surface 318 may also be referred to as the suction side of the fluid routing plug 116. The second outer surface 320 may also be referred to as the discharge side of the fluid routing plug 116. A central longitudinal axis 324 extends through the body 316 and both surfaces 318 and 320, as shown in FIG. 55.

Figure 58:
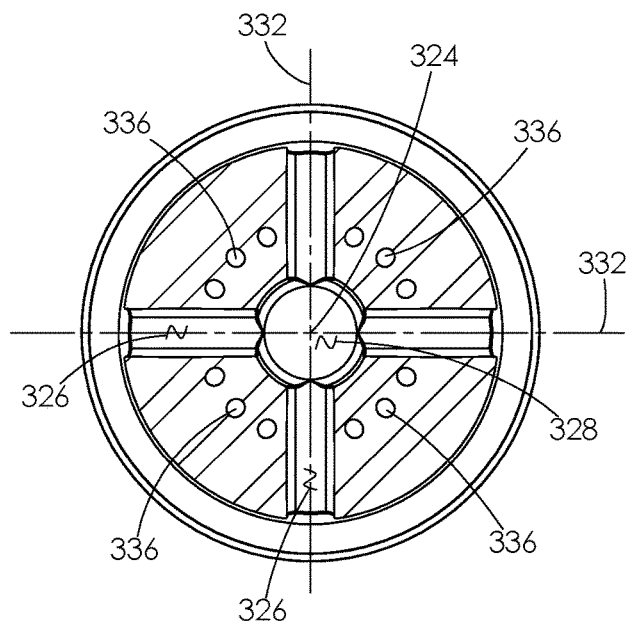
FIG. 58 is a cross-sectional view of the fluid routing plug shown in FIG. 57, taken along line P-P.

A plurality of first fluid passages 326 are formed within the body 316 and interconnect the intermediate surface 322 and the first surface 318. The first fluid passages 326 interconnect the intermediate surface 322 and the first surface 318 by way of an axial-blind bore 328, as shown in FIG. 55. The blind bore 328 extends along the central longitudinal axis 324 of the body 316. The first fluid passages 326 each open into the blind bore 328 via a plurality of openings 330. A longitudinal axis 332 of each first fluid passage 326 intersects the central longitudinal axis 324 of the body 316, as shown in FIG. 58.

The fluid routing plug 116 shown in FIGS. 52-64 has four first fluid passages 326 formed in its body 316. The first fluid passages 326 are equally spaced around the body 316. In alternative embodiments, more than four or less than four first fluid passages may be formed in the body and may be equally or unequally spaced apart from one another.

Figure 55:
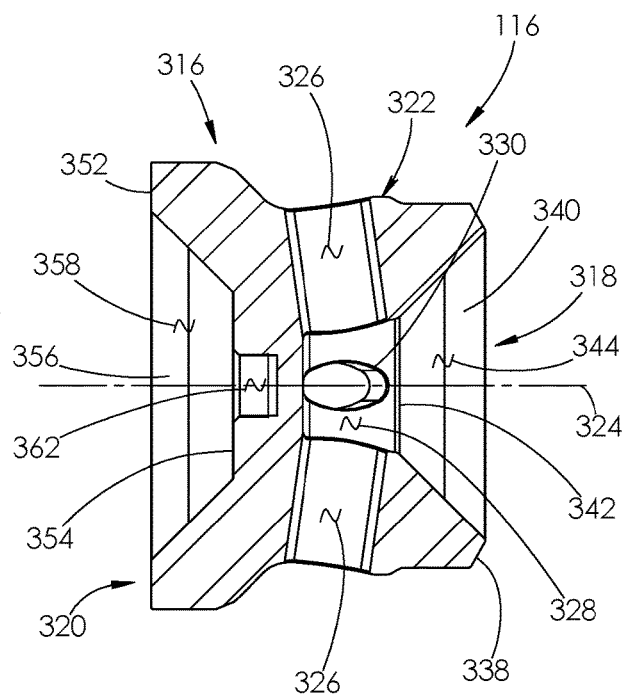
FIG. 55 is a cross-sectional view of the fluid routing plug shown in FIG. 54, taken along line O-O.

Continuing with FIG. 55, the first fluid passages 326 extend between the intermediate surface 322 and the blind bore 328 at a non-right angle relative to the central longitudinal axis 324—the acute angle facing the second surface 320 of the body 316. Forming the first fluid passages 326 at such an angle reduces the amount of stress in the fluid routing plug 116 as fluid flows through the first fluid passages 326. Forming the first fluid passages 326 at such angle also helps direct fluid flow towards the blind bore 328 and the first surface 318.

Figure 57:
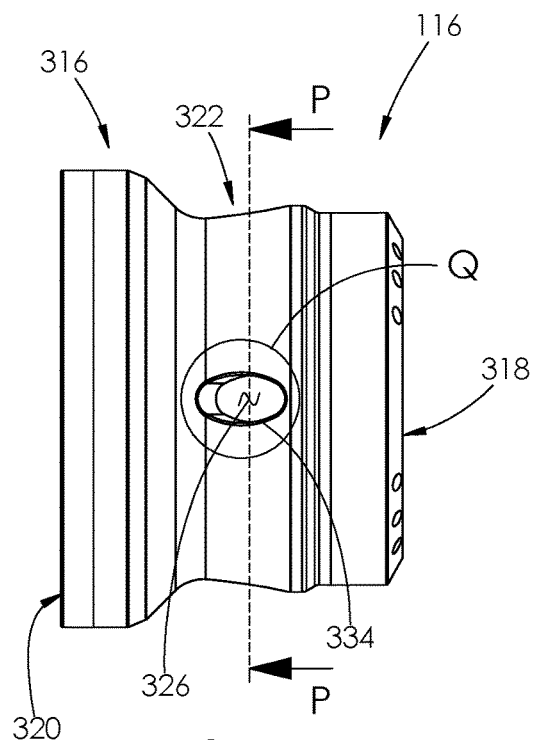
FIG. 57 is a top plan view of the fluid routing plug shown in FIG. 52.
Figure 59:
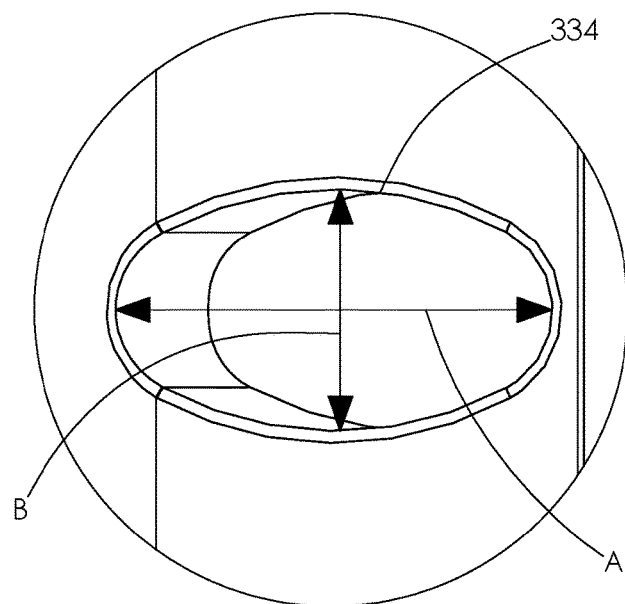
FIG. 59 is an enlarged view of area Q shown in FIG. 57.
Figures 60, 61:
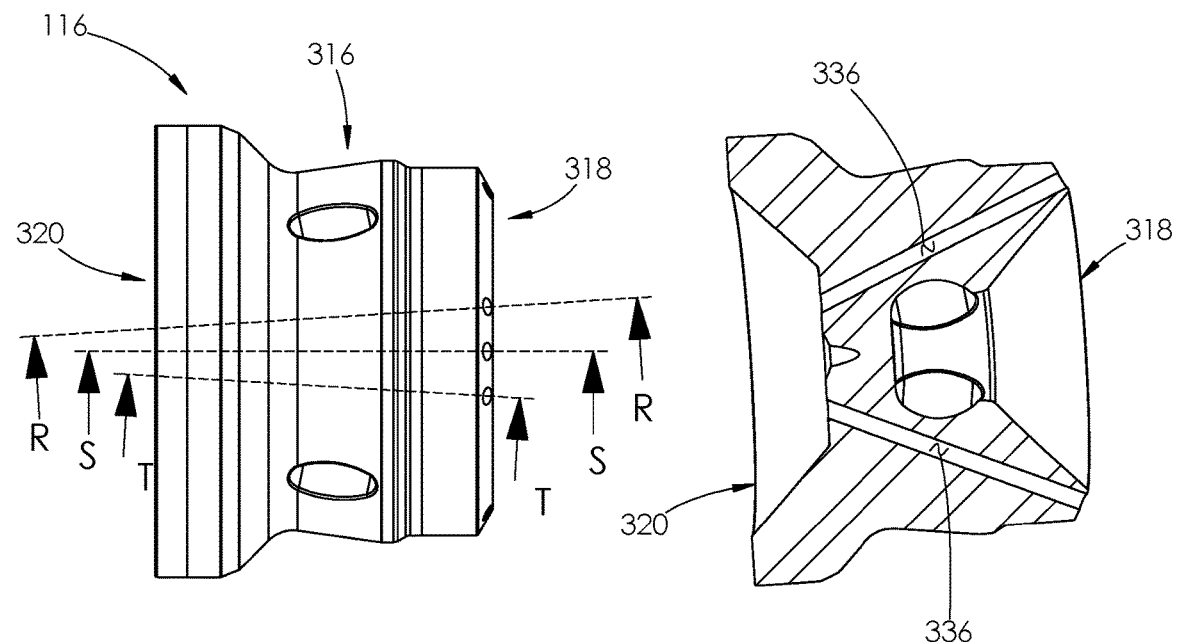
FIG. 60 is the top plan view of the fluid routing plug shown in FIG. 57, but the plug has been slightly rotated.
FIG. 61 is a cross-sectional view of the fluid routing plug shown in FIG. 60, taken along line R-R.
Figures 62, 63:
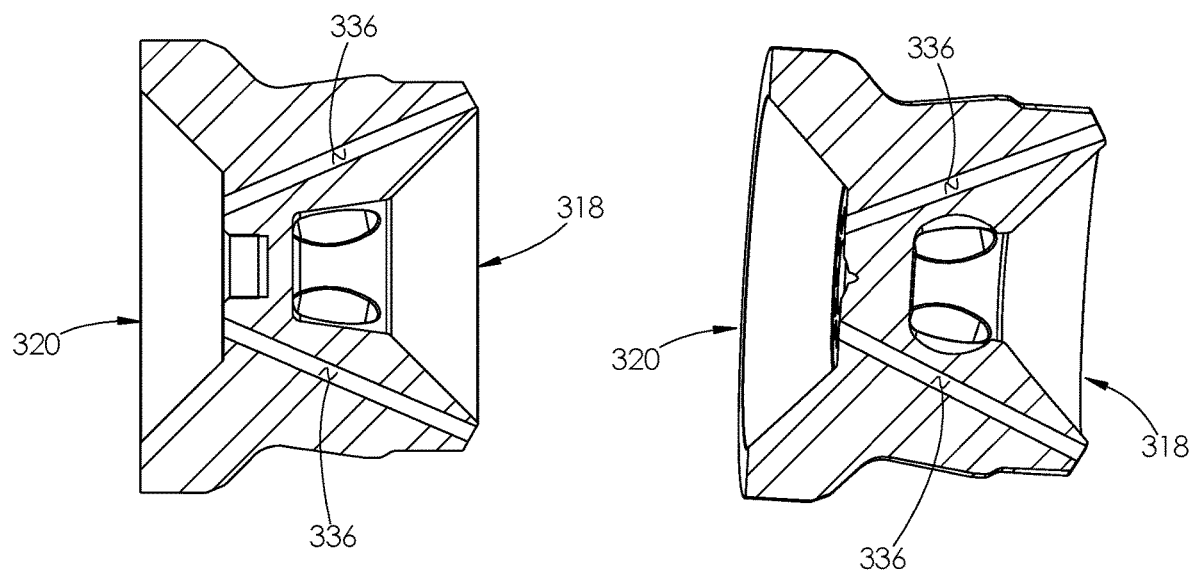
FIG. 62 is a cross-sectional view of the fluid routing plug shown in FIG. 60, taken along line S-S.
FIG. 63 is a cross-sectional view of the fluid routing plug shown in FIG. 60, taken along line T-T.

With reference to FIGS. 57 and 59, the first fluid passages 326 have an oval cross-sectional shape, as shown by an opening 334 of each first fluid passage 326 on the intermediate surface 322. Each opening 334 has a length A and a width B, as shown in FIG. 59. The first fluid passages 326 are formed in the body 316 such that the length A extends along an axis that is parallel to the central longitudinal axis 324 of the body 316. Orienting the first fluid passages 326 as such helps reduce the amount of stress in the body 316 as fluid flows through the first fluid passages 326 and helps maximize the rate of fluid flow through the passages 326. In alternative embodiments, the first fluid passages may have a different cross-sectional shape, such as a circular or oblong shape. In further alternative embodiments, the first fluid passages may be shaped like the first fluid passages 910, shown in FIGS. 121 and 124.

With reference to FIGS. 60-63, the fluid routing plug 116 further comprises a plurality of second fluid passages 336 formed in the body 316. The second fluid passages 336 each have a circular cross-sectional shape and interconnect the first and second surfaces 318 and 320 of the body 316. In alternative embodiments, the second fluid passages may have a different cross-sectional shape, such as an oval or oblong shape.

Unlike the first fluid passages 326, the second fluid passages 336 do not intersect an axially blind bore. Rather, each second fluid passage 336 extends between the first and second surface 318 and 320 along a straight-line path. The second fluid passages 336 and the first fluid passages 326 do not intersect and are positioned offset from one another, as shown in FIG. 58. Positioning the first and second passages 326 and 336 offset from one another helps minimize the stress in the fluid routing plug 116 during operation. The fluid routing plug 116 shown in FIGS. 52-64 has twelve second fluid passages 336 formed in its body 316. In alternative embodiments, more or less than twelve second fluid passages may be formed in the body.

Each second fluid passage 336 extends between the first and second surfaces 318 and 320 along a different axis, as shown in FIGS. 60-63. Each axis is positioned at a non-zero angle relative to the central longitudinal axis 324 of the body 316. Forming each second passage 336 along a different axis helps alleviate stress in the fluid routing plug 116 during operation and helps maximize the rate of fluid flow through the second passages 336.

Turning back to FIGS. 53, 55, and 56, the first surface 318 of the body 316 includes an outer rim 338 joined to a tapered wall 340. The outer rim 338 may taper slightly between the intermediate surface 322 and the tapered wall 340, as shown in FIG. 55. Such taper provides more surface area for the tapered wall 340 without increasing the length of the intermediate surface 322. The tapered wall 340 extends between an entrance 342 of the blind bore 328 and the outer rim 338 at an angle of at least 30 degrees relative to the central longitudinal axis 324 of the body 316. Preferably, the tapered wall 340 is formed at an angle of 45 degrees relative to the central longitudinal axis 324 of the body 316, as is shown in FIG. 55. As will be described in more detail later herein, the tapered wall 340 forms a cavity 344 within the first surface 318 of the body 316 that is sized to receive a sealing element 346 of the suction valve 292, as shown in FIGS. 72-76.

Figure 53:
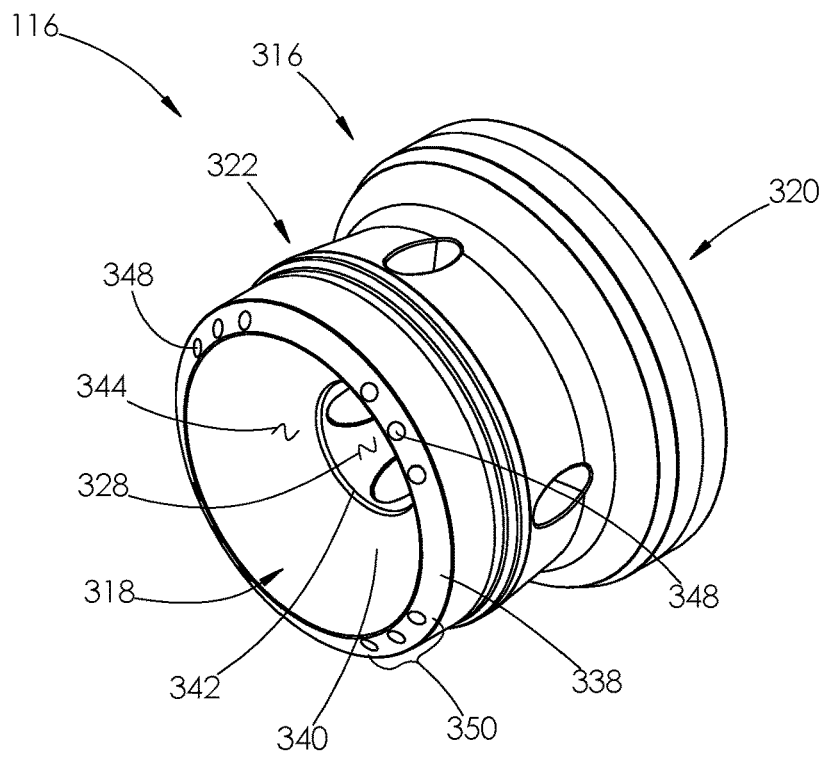
FIG. 53 is a perspective view of a first surface of the fluid routing plug shown in FIG. 52.
Figure 56:
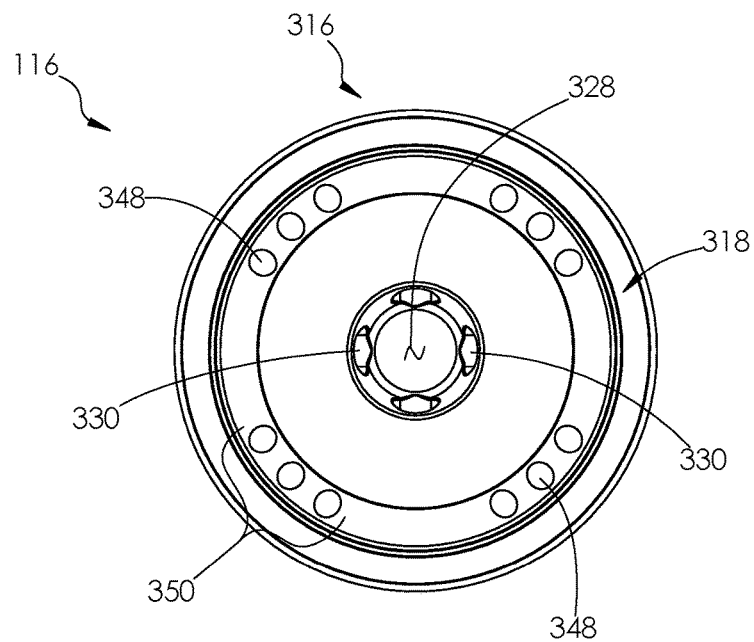
FIG. 56 is an elevational view of the first surface of the fluid routing plug shown in FIG. 52.

Continuing with FIGS. 53 and 56, the second fluid passages 336 open on the outer rim 338 of the first surface 318, as shown by the openings 348. The second fluid passages 336 are formed within the body 316 such that the openings 348 are positioned in groups 350 around the outer rim 338. The first surface 318 shown in FIG. 59 comprises four groups 350 of openings 348, each group 350 comprising three openings 348. Adjacent openings 348 within each group 350 are equally spaced. The spacing between the nearest openings 348 of adjacent groups 350 exceeds the spacing between adjacent openings 348 within a single group 350. Spacing the openings 348 in groups 350 helps achieve the ideal velocity of fluid flow through the fluid routing plug 116 and allows the second fluid passages 336 to be offset from the first fluid passages 326, as shown in FIG. 58. In alternative embodiments, the openings may be spaced in differently sized groups or different patterns than that shown in FIG. 56.

Figure 52:
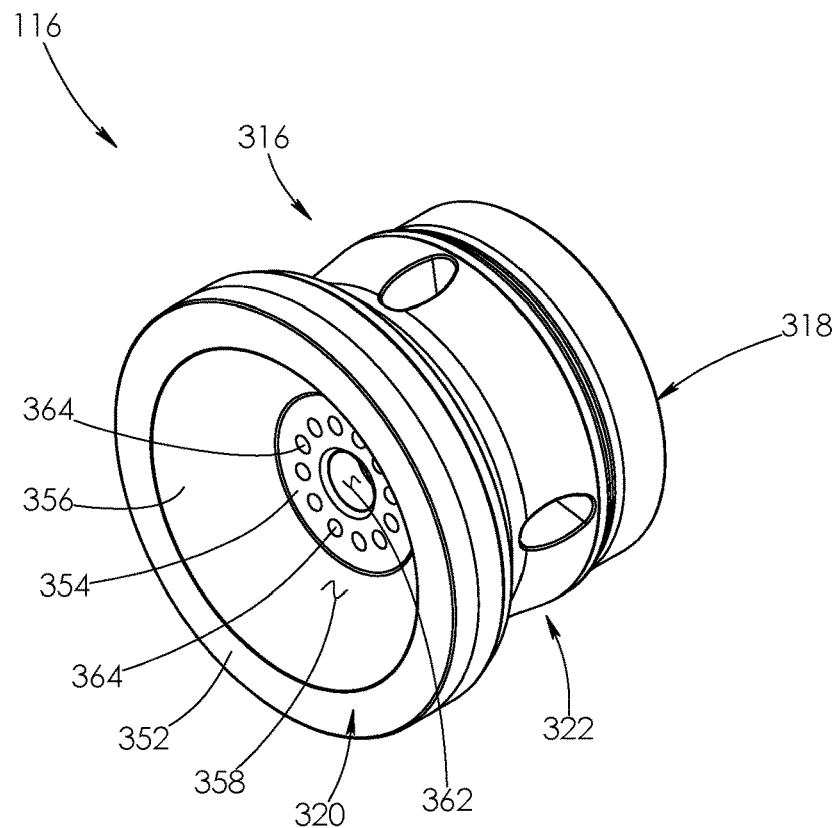
FIG. 52 is a perspective view of a second surface of a fluid routing plug shown installed within the fluid end section in FIG. 50.
Figure 54:
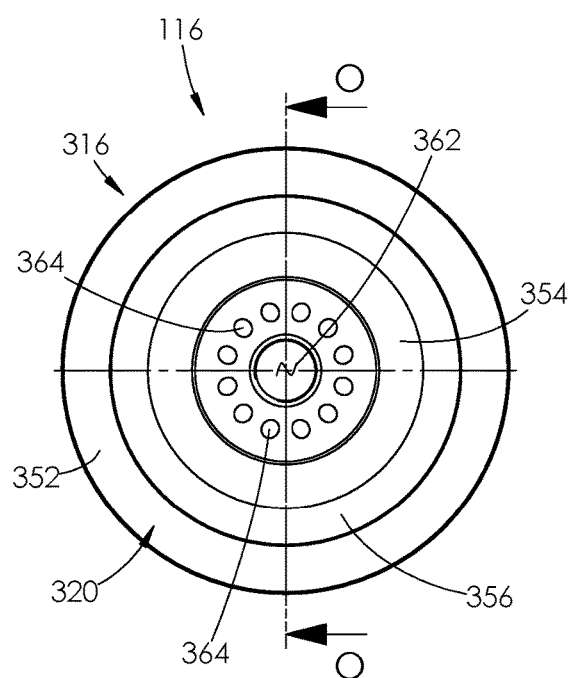
FIG. 54 is an elevational view of the second surface of the fluid routing plug shown in FIG. 52.

With reference to FIGS. 52, 54, and 55, the second surface 320 of the body 316 comprises an outer rim 352 joined to a central base 354 by a tapered wall 356. The tapered wall 356 extends between the central base 354 and the outer rim 352 at an angle of at least 30 degrees relative to the central longitudinal axis 324 of the body 316. Preferably, the tapered wall 356 is formed at an angle of 45 degrees relative to the central longitudinal axis 324 of the body 316, as is shown in FIG. 55. As will be described in more detail later herein, the tapered wall 356 forms a cavity 358 within the second surface 320 of the body 316 that is sized to receive a sealing element 360 of the discharge valve 294, as shown in FIGS. 85-89.

Continuing with FIGS. 52, 54, and 55, a blind bore 362 is formed in the center of the central base 354. The walls surrounding the blind bore 362 may be configured to mate with a tool used to grip the fluid routing plug 116. For example, the walls surrounding the blind bore 362 may be threaded. The second fluid passages 336 open on the central base 354 of the second surface 320, as shown by the openings 364 in FIGS. 52 and 54. The second fluid passages 336 are formed within the body 316 such that the openings 364 surround the opening of the blind bore 362. The openings 364 shown in FIG. 54 are all equally spaced from one another around the opening of the blind bore 362. In alternative embodiments, the openings of the second fluid passages on the central base may not all be equally spaced apart from one another.

Continuing with FIG. 55, in order to provide space for the openings 364 on the second surface 320, the tapered wall 356 has a greater diameter than the tapered wall 340 formed in the first surface 318. Thus, as will be described in more detail herein, the sealing element 360 of the discharge valve 294 is larger in size than the sealing element 346 of the suction valve 292, as shown in FIGS. 72-76 and 85-89.

Turning back to FIGS. 50 and 51, the fluid routing plug 116 is installed within the horizontal bore 106 such that the first fluid passages 326 are in fluid communication with the upper and lower intake bores 170 and 172. The upper and lower intake bores 170 and 172 direct fluid into the first fluid passages 326 of the fluid routing plug 116. The first fluid passages 326 direct the fluid into the blind bore 328 and towards the first surface 318 of the fluid routing plug 116.

When the plunger 290 is retracted from the housing 104, the fluid flowing through the first fluid passages 326 forces the suction valve 292 to move axially away from the first surface 318. Such position is considered an open position of the suction valve 292. When the suction valve 292 is spaced from the first surface 318, fluid flows out of the blind bore 328, through the gap between the first surface 318 and the suction valve 292. From there, the fluid flows around the suction valve 292 and the suction valve guide 296 and into the horizontal bore 106. A first fluid flow path for the fluid to be pressurized is shown by the arrows 366 in FIG. 50.

With reference to FIG. 51, as the plunger 290 extends into the horizontal bore 106, the plunger 290 forces fluid in the horizontal bore 106 back towards the fluid routing plug 116. Pressurized fluid forced back towards the fluid routing plug 116 by the plunger 290 forces the suction valve 292 to seal against the first surface 318, sealing the entrance 342 of the blind bore 328. Such position is considered a closed position of the suction valve 292. Once the entrance 342 of the blind bore 328 is sealed, the only place for fluid to flow is through the openings 348 of the second fluid passages 336 on the outer rim 338 of the first surface 318.

Fluid flows into the openings 348 on the first surface 318 and through the second passages 336 towards the second surface 320 of the fluid routing plug 116. The pressurized fluid at the second surface 320 forces the discharge valve 294 to move axially away from the second surface 320, unsealing the openings 364 of the second fluid passages 336. Such position is considered an open position of the discharge valve 294. Pressurized fluid is then allowed to flow around the discharge valve 294 and into the discharge bore 178. A second fluid flow path for the pressurized fluid is shown by the arrows 368 in FIG. 51.

When the plunger 290 retracts from the housing 104, the fluid pressure on the back side of the discharge valve 294 is greater than the fluid pressure within the fluid routing plug 116. Such pressure differential causes the discharge valve 294 to seal against the second surface 320, sealing the openings 364 of the second fluid passages 336. Such position is considered the closed position of the discharge valve 294.

Figure 64:
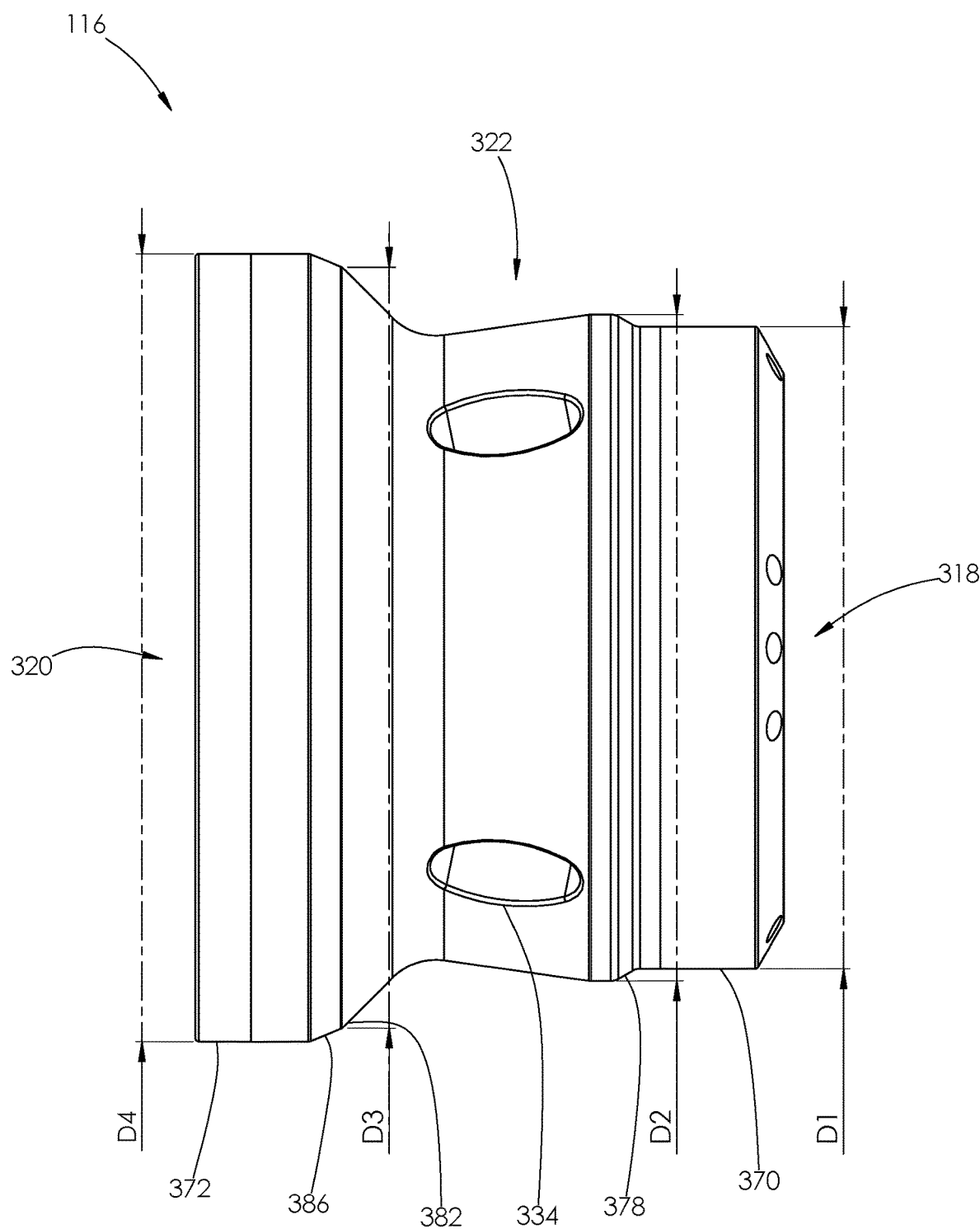
FIG. 64 is an enlarged view of the fluid routing plug shown in FIG. 60.

Turning to FIG. 64, the intermediate surface 322 of the fluid routing plug 116 varies in diameter throughout its length and generally decreases in size from its second surface 320 to its first surface 318. The intermediate surface 322 comprises a first sealing surface 370 positioned adjacent the first surface 318 and a second sealing surface 372 positioned adjacent the second surface 320. The first and second sealing surfaces 370 and 372 each extend around the entire intermediate surface 322 in an endless manner and surround the longitudinal axis 324 of the body 316. The first and second sealing surfaces 370 and 372 shown in FIG. 64 are annular. In alternative embodiments, the first and second sealing surfaces may have non-annular shape, such as an oval shape.

Figure 70:
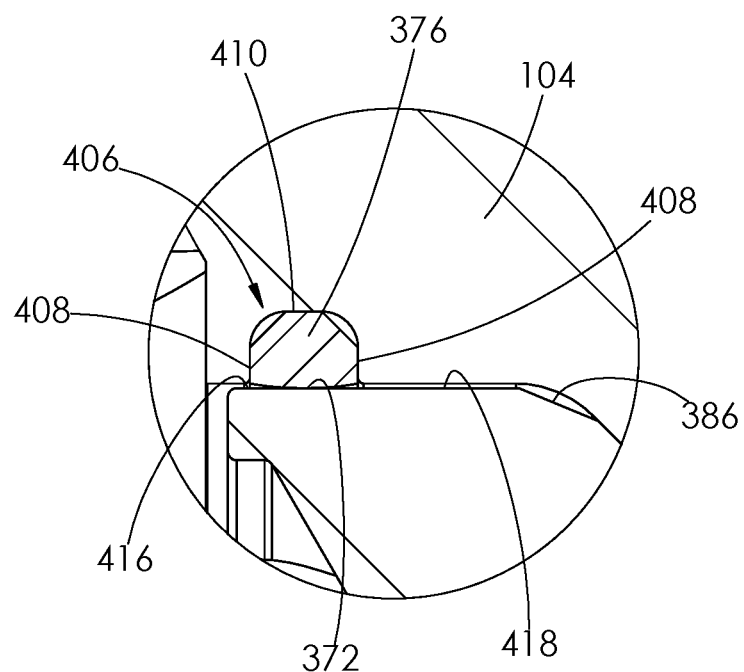
FIG. 70 is an enlarged view of area Y shown in FIG. 65.
Figure 71:
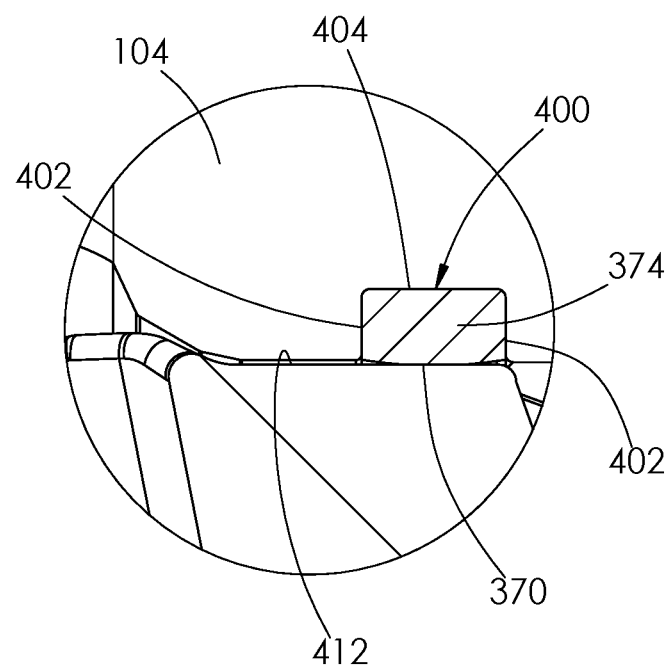
FIG. 71 is an enlarged view of area Z shown in FIG. 65.

The first sealing surface 370 has a smaller diameter than the second sealing surface 372. As will be described in more detail herein, the first and second sealing surfaces 370 and 372 are configured to engage a first and second seal 374 and 376 installed within the housing 104, as shown in FIGS. 70 and 71.

Continuing with FIG. 64, the intermediate surface 322 of the fluid routing plug 116 further comprises a first bevel 378 positioned between the opening 334 of the first fluid passages 326 and the first sealing surface 370. The first bevel 378 extends around the entire intermediate surface 322 in an endless manner and surrounds the longitudinal axis 324 of the body 316. The first bevel 378 shown in FIG. 64 is annular. In alternative embodiments, the first bevel may have non-annular shape, such as an oval shape.

Figure 69:
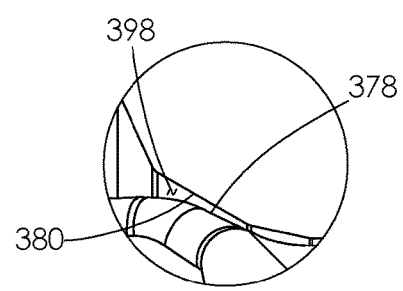
FIG. 69 is an enlarged view of area X shown in FIG. 65.

A maximum diameter of the first bevel 378 is greater than the diameter of the first sealing surface 370. The maximum diameter of the first bevel 378 is positioned adjacent the openings 334 of the first fluid passages 326 and a minimum diameter of the first bevel 378 is positioned adjacent the first sealing surface 370. As will be described in more detail later herein, the first bevel 378 corresponds with a first beveled surface 380 formed in the housing 104, as shown in FIGS. 65 and 69.

The intermediate surface 322 also comprises a second bevel 382 positioned between the second sealing surface 372 and the openings 334 of the first fluid passages 326. The second bevel 382 extends around the entire intermediate surface 322 in an endless manner and surrounds the longitudinal axis 324 of the body 316. The second bevel 382 shown in FIG. 64 is annular. In alternative embodiments, the first bevel may have a non-annular shape, such as an oval shape.

A maximum diameter of the second bevel 382 is positioned adjacent the second sealing surface 372 and a minimum diameter of the second bevel 382 is positioned adjacent the openings 334 of the first fluid passages 326. The second sealing surface 372 and the maximum diameter of the second bevel 382 both have a greater diameter than the maximum diameter of the first bevel 378 and the diameter of the first sealing surface 370.

Figure 65:
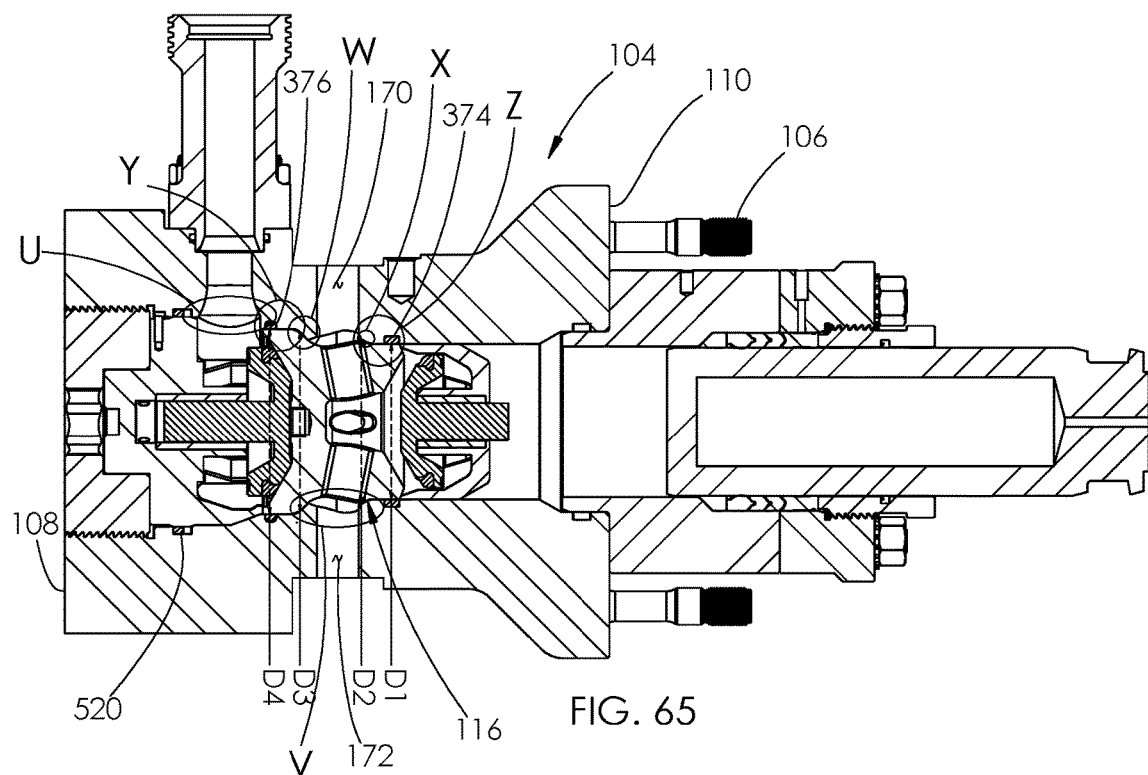
FIG. 65 is the cross-sectional view shown in FIG. 50.
Figure 68:
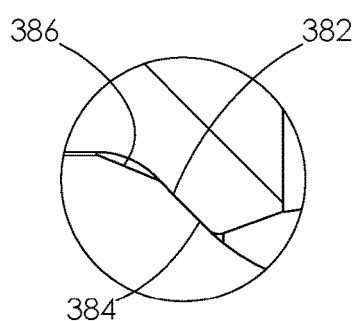
FIG. 68 is an enlarged view of area W shown in FIG. 65.

As will be described in more detail later herein, the second bevel 382 corresponds with a second beveled surface 384 formed in the housing 104, as shown in FIGS. 65 and 68. A small transition bevel 386 may extend between the second sealing surface 372 and the second bevel 382. However, the transition bevel 386 does not engage the second beveled surface 384, as shown in FIG. 68. The transition bevel 386 helps reduce friction between the fluid routing plug 116 and the housing 104 during installation.

As described above, the first and second bevels 378 and 382 are positioned between the first and second sealing surfaces 370 and 372. The first and second bevels 378 and 382 help alleviate stress in the fluid routing plug 116 during operation. In alternative embodiments, the intermediate surface may only include a single bevel positioned between the first and second sealing surfaces.

Continuing with FIG. 64, the various diameters of the intermediate surface 322 are shown in more detail. The first sealing surface 370 has a diameter D1. The maximum diameter of the first bevel 378 has a diameter D2. The maximum diameter of the second bevel 382 has a diameter D3, and the second sealing surface 372 has a diameter D4. As described above in detail, D4 is greater than D3, D3 is greater than D2, and D2 is greater than D1.

With reference to FIG. 65, in addition to being shaped to alleviate stress, the intermediate surface 322 is shaped to allow for easy installation of the fluid routing plug 116 within the horizontal bore 106. The fluid routing plug 116 is installed into the horizontal bore 106 at the first outer surface 108 of the housing 104. The fluid routing plug 116 is installed with the first surface 318 entering the horizontal bore 106 before the second surface 320. The fluid routing plug 116 is pushed into the horizontal bore 106 until the first sealing surface 370 engages the first seal 374 and the second sealing surface 372 engages the second seal 376.

The first sealing surface 370 and first bevel 378 have smaller diameters than the second seal 376 and the second beveled surface 384. Thus, clearance exists between these features as the fluid routing plug 116 is installed into the horizontal bore 106. Providing such clearance during installation avoids unnecessary wear to both the housing 104 and fluid routing plug 116 during installation.

Figure 67:
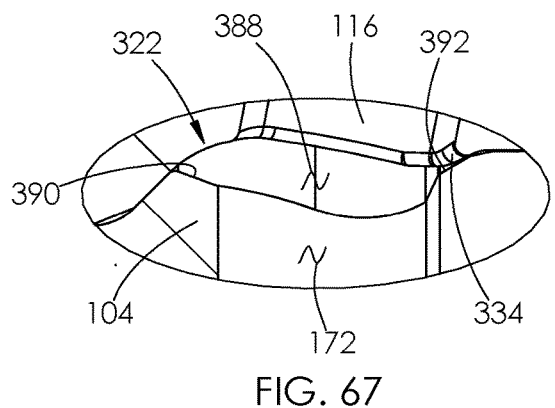
FIG. 67 is an enlarged view of area V shown in FIG. 65.

With reference to FIGS. 65 and 67, once the fluid routing plug 116 is installed within the housing 104, an annular chamber 388 is formed between the walls of the housing 104 and the intermediate surface 322. The intake bores 170 and 172 open into the chamber 388. Only a couple of the openings 334 of the first fluid passages 326 may align with the intake bores 170 and 172. Alternatively, the fluid routing plug 116 may be installed within the housing 104 such that none of the openings 334 directly align with the intake bores 170 and 172. The chamber 388 provides a pathway for fluid from the intake bores 170 and 172 to flow around the fluid routing plug 116 and into the openings 334 of the first fluid passages 326. The chamber 388 also provides space for proppant or other debris to collect during operation.

Figure 66:
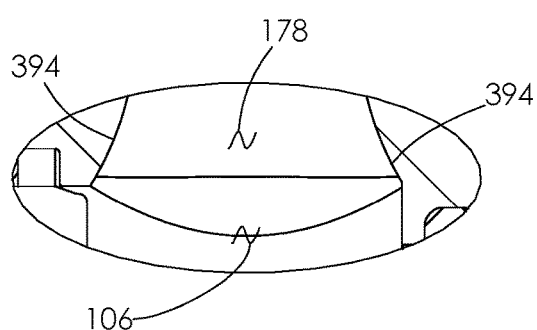
FIG. 66 is an enlarged view of area U shown in FIG. 65.

Continuing with FIG. 67, the walls of the housing 104 surrounding the horizontal bore 106 immediately adjacent the intake bores 170 and 172 are beveled, as shown by bevels 390 and 392. The bevels 390 and 392 help reduce stress in the housing 104 during operation and increase the size of the annular chamber 388. In alternative embodiments, the bevels 390 and 392 may be larger than those shown in FIG. 67 in order to increase the size of the chamber 388, as shown for example in FIG. 100F. Similarly, the walls of the housing 104 surrounding the horizontal bore 106 immediately adjacent the discharge bore 178 are also beveled, as shown by the bevel 394 in FIG. 66. The bevel 394 reduces stress in the housing 104 during operation and helps direct fluid into the discharge bore 178.

Continuing with FIGS. 65 and 68, the second bevel 382 and the second beveled surface 384 are shown in more detail. The second beveled surface 382 is positioned between the second seal 376 and the intake bores 170 and 172. The second beveled surface 384 has an annular shape and surrounds the horizontal bore 106 in an endless manner. In alternative embodiments, the second beveled surface may have a shape that conforms to the shape of the second bevel formed in the fluid routing plug.

When the fluid routing plug 116 is installed within the horizontal bore 106, the second bevel 382 seats against the second beveled surface 384, as shown in FIG. 68. The bevels 382 and 384 meet at a non-right angle. Such angle reduces stress in the fluid routing plug 116 and the housing 104 during operation. The bevels 382 and 384 remain engaged during the forward and backwards stroke of the plunger 290.

Turning to FIGS. 65 and 69, the first bevel 378 and the first beveled surface 380 are shown in more detail. The first beveled surface 380 is positioned between the intake bores 170 and 172 and the first seal 374. The first beveled surface 380 has an annular shape and surrounds the horizontal bore 106 in an endless manner. In alternative embodiments, the first beveled surface may have a shape that conforms to the shape of the first bevel formed in the fluid routing plug.

In contrast to the second bevel 382, the first bevel 378 is sized to be spaced from the first beveled surface 380 when the fluid routing plug 116 is initially installed within the housing 104, as shown by a gap 398. The gap 398 provides space for the fluid routing plug 116 to expand during operation.

As the plunger 290 retracts backwards away from the housing 104, a significant amount of load is applied to the second bevel 382. The applied load causes the fluid routing plug 116 to slightly compress, forcing the intermediate surface 322 at the first bevel 378 to expand outwards. As the first bevel 378 expands, it eventually engages with the first beveled surface 380. Upon engaging the first beveled surface 380, the load being applied to the second bevel 382 is shared with the first bevel 378, thereby decreasing the load applied to the second bevel 382. Without the gap 398, the fluid routing plug 116 would not have room to expand, potentially causing damage to the fluid routing plug 116 and the housing 104 over time.

As the plunger 290 extends forward into the housing 104, the first bevel 378 will return to its un-expanded state, re-creating the gap 398. The gap 398 will repeatedly be created and closed during operation as the plunger 290 reciprocates. In addition to providing space for the fluid routing plug 116 to expand, the gap 398 also provides a gas and fluid relief area during the forward stroke of the plunger 290.

Continuing with FIGS. 68 and 69, because the second bevel 382 carries the majority of the load experienced by the fluid routing plug 116 during operation, the second bevel 382 is longer than the first bevel 378. In alternative embodiments, the first bevel may be longer than that shown in FIG. 69 or be equal in length to the second bevel. In such embodiments, the first beveled surface formed in the housing may correspond with the chosen size of the first bevel. In further alternative embodiments, the first bevel may be sized to mate with the first beveled surface when the fluid routing plug is first installed within the housing.

With reference to FIGS. 65, 70, and 71, in order to prevent fluid from leaking around the fluid routing plug 116 during operation, the first and second seals 374 and 376 are positioned between the sealing surfaces 370 and 372 and the walls of the housing 104 surrounding the horizontal bore 106.

The first seal 374 is positioned within a first annular groove 400 formed in housing 104 and surrounding the horizontal bore 106 in an endless manner. The first groove 400 is positioned between the intake bores 170 and 172 and the second outer surface 110 of the housing 104, as shown in FIG. 65. The first groove 400 is characterized by two sidewalls 402 joined by a base 404, as shown in FIG. 71. The sidewalls 402 may join the base 404 via radius corners or at a 90 degree angle. In alternative embodiments, the first groove may have a non-concentric shape that corresponds with the shape of the first sealing surface.

The second seal 376 is positioned within a second annular groove 406 formed in the housing 104 and surrounding the horizontal bore 106 in an endless manner. The second groove 406 is positioned between the discharge bore 178 and the intake bores 170 and 172, as shown in FIG. 65. The second groove 406 is characterized by two sidewalls 408 joined by a base 410. The sidewalls 408 may join the base 410 via radius corners or at a 90 degree angle. In alternative embodiments, the second groove may have a non-concentric shape that corresponds with the shape of the second sealing surface.

The second groove 406 has a larger diameter than that of the first groove 400 due to the diameter of the horizontal bore 106 at each groove, as shown in FIG. 65. Likewise, the second seal 376 has a larger diameter than that of the first seal 374. Because the first and second grooves 400 and 406 are formed in the housing 104, no grooves are formed in the intermediate surface 322 of the fluid routing plug 116 for receiving a seal.

When the fluid routing plug 116 is installed within the horizontal bore 106, the first and second seal 374 and 376 tightly engage the corresponding first and second sealing surfaces 370 and 372, as shown in FIGS. 70 and 71. During operation, the first and second seals 374 and 376 wear against the first and second sealing surfaces 370 and 372. If the first or second sealing surface 370 or 372 begins to erode, allowing fluid to leak around the fluid routing plug 116, the plug 116 may be removed and replaced with a new plug 116. The first or second seal 374 or 376 may also be replaced with a new seal, if needed.

The first groove 400 shown in FIG. 71 is wider than the second groove 406 shown in FIG. 70. As described below, each groove 400 and 406 is sized to correspond with the size of the seal installed within the groove. In alternative embodiments, the first and second grooves may be wider or narrower than those shown in the figures in order to accommodate the size of the seal installed within the groove.

As discussed above, the fluid routing plug 116 may repeatedly stretch and contract in response to the changing fluid pressure. For example, when the plunger 290 is retracted out of the housing 104, the fluid pressure at the first surface 318 is equal or approximately equal to the pressure of fluid delivered to the housing 104 from the intake manifolds 166 and 168. Such fluid pressure may be around 100-200 psi, for example. When the plunger 290 extends into the housing 104, the fluid at the first surface 318 may be pressurized to around 10,000 psi, for example.

The first seal 374, being positioned adjacent the first surface 318 of the fluid routing plug 116 experiences the constant change in fluid pressure. In contrast, the second seal 376, being positioned adjacent the second surface 320, experiences more static fluid pressure. The fluid pressure at the second surface 320 of the fluid routing plug 116 may remain at or close to 10,000 psi, for example.

Continuing with FIGS. 70 and 71, because the first seal 374 experiences more pressure fluctuations during operation than the second seal 376, the first seal 374 may be more robust than the second seal 376. For example, the first seal 374 is larger than the second seal 376 and has a generally square cross-sectional shape, while the second seal 376 has a circular cross-sectional shape. The first seal 374 may also have a higher durometer value than the second seal 376. As described below, both seals 374 and 376 are bi-directional seals. In alternative embodiments, the second seal may be of the same construction as the first seal.

Continuing with FIG. 71, the first seal 374 is shown engaged with both side walls 402 of the first groove 400. In operation, as the plunger 290 extends into the housing 104, pressurized fluid pushes against the right side of the first seal 374, helping to activate the first seal 374 and create a tight seal between the first seal 374 and the first sealing surface 370. As the plunger 290 retracts from the housing 104 and the fluid pressure drops, the fluid pressure is greater on the left side of the first seal 374. Thus, the fluid pressure may push against the left side of the first seal 374, helping to activate the first seal 374. Therefore, in operation, the first seal 374 may move slightly between its left and right side.

Continuing with FIG. 70, the second seal 376 is shown engaged with both side walls 408 of the second groove 406. In operation, pressurized fluid within the housing 104 helps to activate the second seal 376, thereby creating a tight seal between the second seal 376 and the second sealing surface 372. Because the second seal 376 experiences primarily static fluid pressure, the second seal 376 may not move within the second groove 406, as much as the first seal 374 moves within the first groove 400.

Continuing with FIGS. 70 and 71, the first seal 374 also takes up approximately 97% of the open volume within the first groove 400. Likewise the second seal 376 takes up almost 97% of the open volume within the second groove 406. Normally, seals are configured to take up around 70% of the open volume within the groove the seal is installed within. The remaining open volume provides space for the seal to expand and move. However, in operation, fluid and proppants can fill the open volume and wear against the groove, eventually causing the walls of the groove to erode. If the walls of the groove are damaged, the housing 104 may need to be replaced.

By sizing the grooves 400 and 406 so that the seals 374 and 376 take up almost all of the open volume within the corresponding grooves 400 and 406, there is less room for fluid or proppants to fill any open space within the grooves. Specifically, fluid and proppants are prevented from entering any open volume on the back side of the seals 374 and 376, thereby protecting the first and second grooves 400 and 406 from erosion. In alternative embodiments, the first seal may take less volume of the first groove than is shown in FIG. 70. Likewise, in alternative embodiments, the second seal may take up less volume of the second groove than is shown in FIG. 71. The other grooves formed in the housing and described herein may also be configured so that the corresponding seals take up approximately 97% of the open volume within the groove.

Continuing with FIG. 71, the first sealing surface 370 may extend up to immediately adjacent the first surface 318 of the body 316. A first portion 412 of the intermediate surface 322 between the first bevel 378 and the first sealing surface 370 faces the housing 104 walls. A very small gap exists between the first portion 412 and the housing 104. The gap may be as small as 0.001 inches in width. Such gap provides clearance to reduce friction between the fluid routing plug 116 and the housing 104 during installation and operation. Such gap also provides space for excess proppant to collect during operation.

Continuing with FIG. 70, a second portion 416 of the intermediate surface 322 between the second sealing surface 372 and the second surface 320 may face the walls of the housing 104. A third portion 418 of the intermediate surface 322 between the second sealing surface 372 and the transition bevel 386 may also face the walls of the housing 104. Like the first portion 412, a very small gap exists between the second and third portions 416 and 418 and the housing 104. The gaps may be as small as 0.001 inches in width. Such gaps provide clearance to reduce friction between the fluid routing plug 116 and the housing 104 during installation and operation. Such gaps also provide space for excess proppant to collect during operation.

Turning back to FIG. 65, as discussed above, the walls of the housing 104 surrounding the horizontal bore 106 are sized to allow for easy installation of the fluid routing plug 116. The second groove 406 has a diameter D1. A maximum diameter of the second beveled surface 384 has a diameter D2. A maximum diameter of the first beveled surface 380 has a diameter D3, and the first groove 400 has a diameter D4. The diameter D4 is greater than the diameter D3. The diameter D3 is greater than the diameter D2, and the diameter D2 is greater than the diameter D1.

With reference to FIGS. 72-76 and 85-89, the suction and discharge valves 292 and 294 are generally identical, with the exception that the discharge valve 294 may be larger in size than the suction valve 292. As discussed above, the suction and discharge valves 292 and 294 each have a sealing element 346 and 360. The sealing elements 346 and 360 each include a sealing surface 420 and 422 that tapers at an angle that matches the angle of the tapered wall 340 and 356 of the fluid routing plug 116. Thus, the sealing surfaces 420 and 422 each taper at an angle of 30 or 45 degrees. Preferably, the tapered walls 340 and 356 and the sealing surfaces 420 and 422 both taper at an angle of 45 degrees.

Forming the mating tapered walls 340 and 356 and sealing surfaces 420 and 422 at 45 degrees provides more surface area for the valves 292 and 294 to seal against the fluid routing plug 116. Providing more sealing surface area or a larger "strike face" helps distribute the forces applied to the valves 292 and 294 and the fluid routing plug 116, thereby providing more evenly distributed sealing. Providing more evenly distributed sealing prevents certain areas from wearing faster than others, helping to increase the life of the parts.

Figure 72:
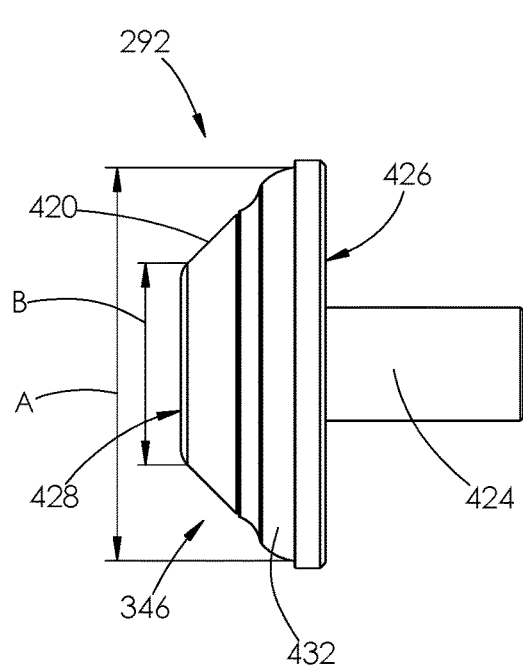
FIG. 72 is a top plan view of a suction valve shown installed within the housing in FIG. 50.
Figure 73:
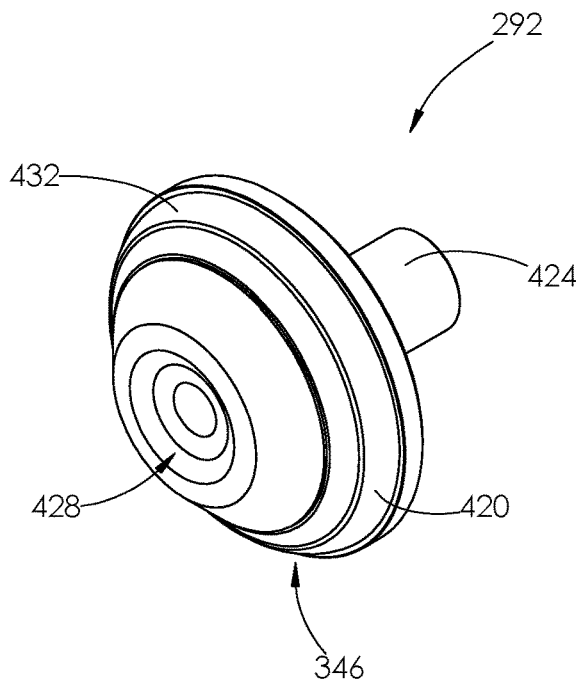
FIG. 73 is a perspective view of a second surface of the suction valve shown in FIG. 72.
Figure 74:
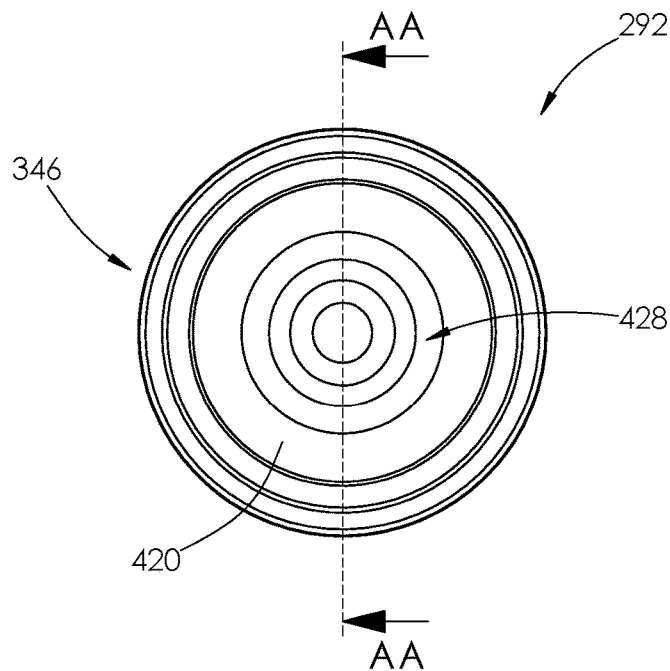
FIG. 74 is an elevational view of the second surface of the suction valve shown in FIG. 72.
Figures 85, 86:
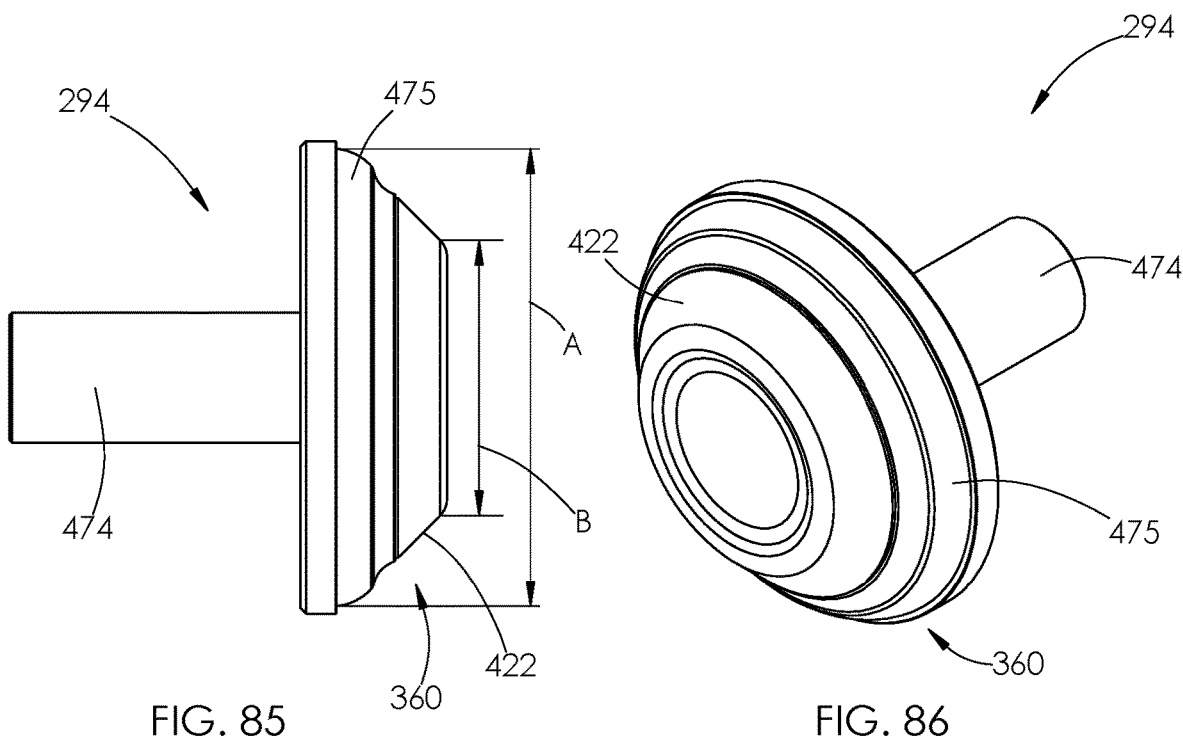
FIG. 85 is a top plan view of a discharge valve shown installed within the housing in FIG. 50.
FIG. 86 is a perspective view of a second surface of the discharge valve shown in FIG. 85.
Figure 87:
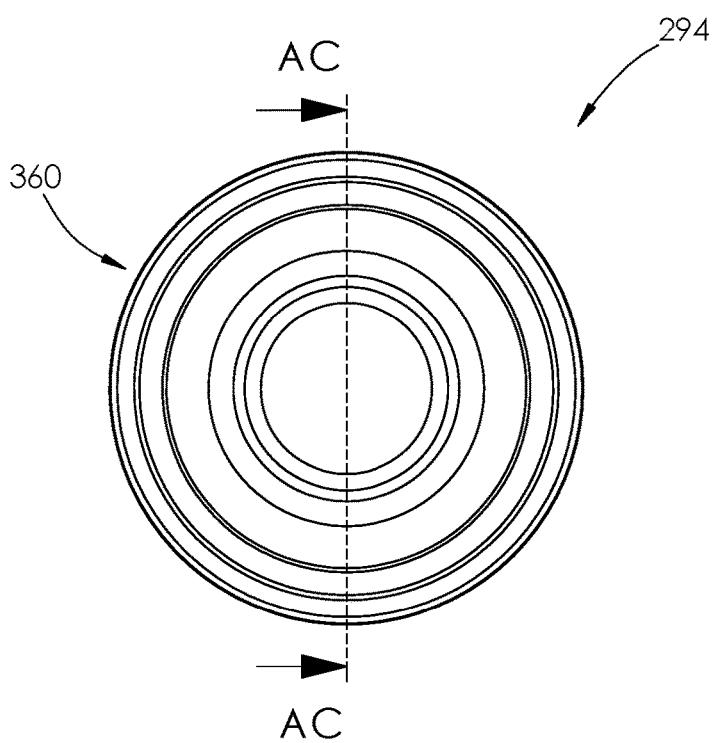
FIG. 87 is an elevational view of the second surface of the discharge valve shown in FIG. 85.
Figure 88:
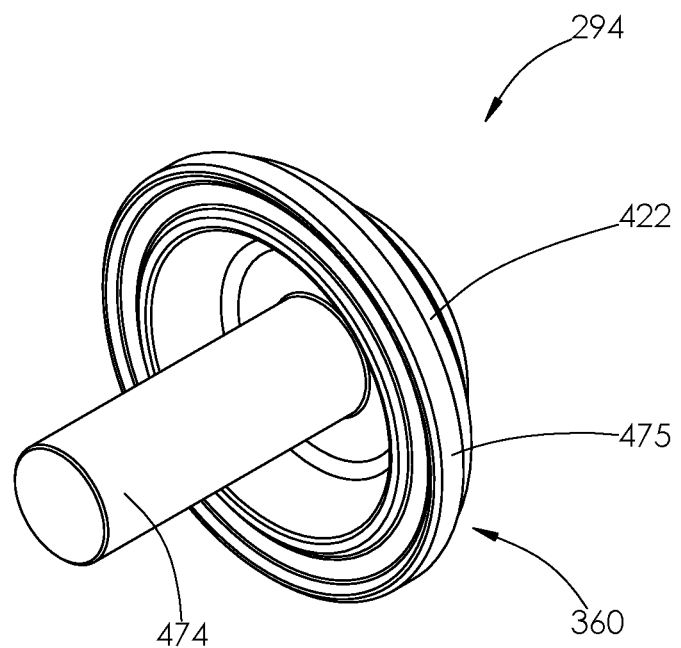
FIG. 88 is a perspective view of a first surface of the discharge valve shown in FIG. 85.
Figure 89:
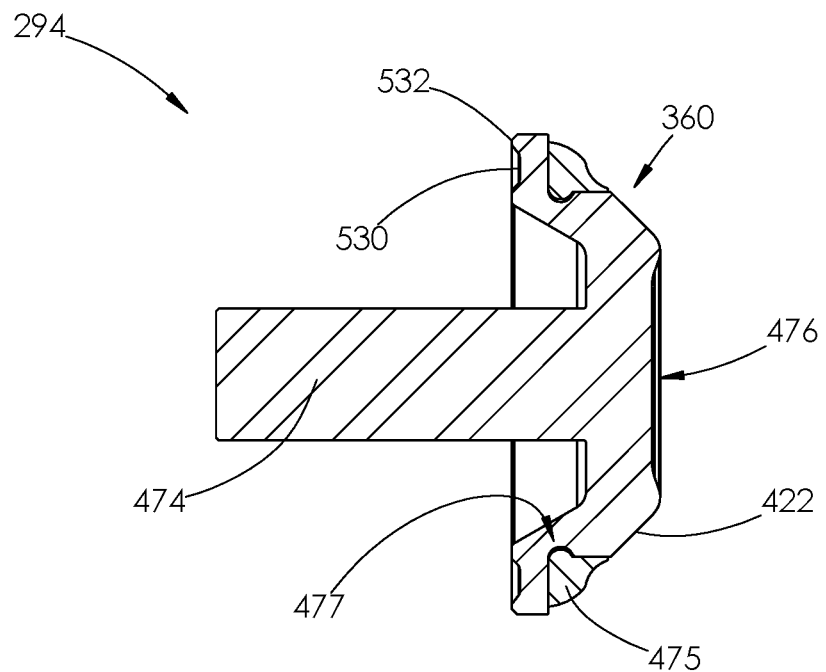
FIG. 89 is a cross-sectional view of the discharge valve shown in FIG. 87, taken along line AC-AC.

Each valve 292 and 294 also has an outer sealing diameter A and an inner sealing diameter B, as shown in FIGS. 72 and 85. The ratio of the outer sealing diameter A to the inner sealing diameter B is preferably 1.55 or greater. This ratio helps increase the life of the valves 292 and 294 and reduce any turbulent fluid flow during operation. The valves 292 and 294 and the fluid routing plug 116 are configured so that no portion of the valves 292 and 294 enters the first or second fluid passages 326 and 336 during operation. Additionally, no portion of the valve 292 enters the blind bore 328 during operation. Rather, the suction valve 292 is configured only to cover the entrance 342 of the blind bore 330 on the first surface 318, and the discharge valve 294 is configured only to cover the openings 364 of the second fluid passages 336 on the second surface 320.

Continuing with FIGS. 72-76, the suction valve 292 is shown in more detail. The suction valve 292 comprises the sealing element 346 joined to a stem 424. When the suction valve 292 is installed within the horizontal bore 106, the stem 424 extends along an axis that is parallel to or aligned with central the longitudinal axis 114 of the housing 104.

Figure 76:
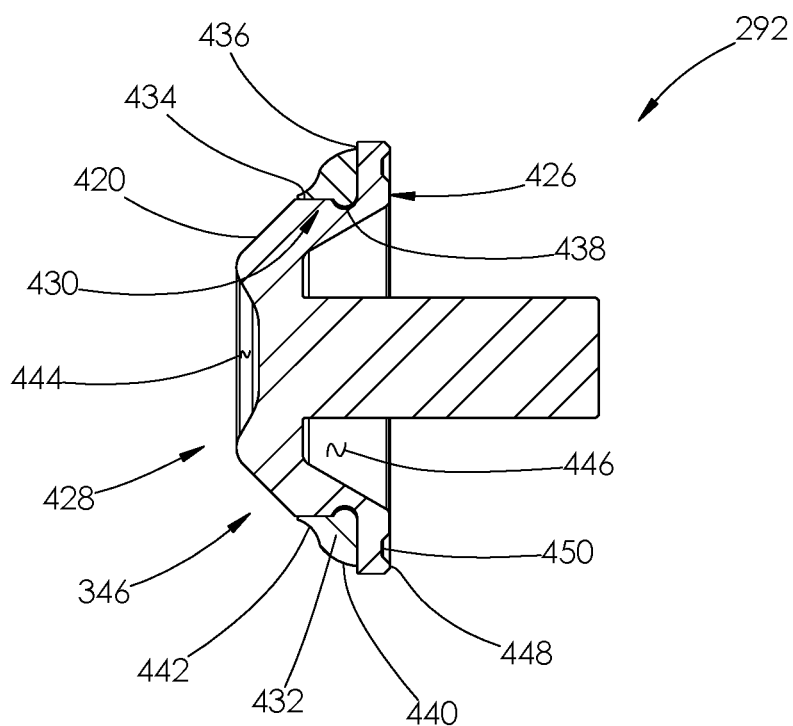
FIG. 76 is a cross-sectional view of the suction valve shown in FIG. 74, taken along line AA-AA.
Figure 77:
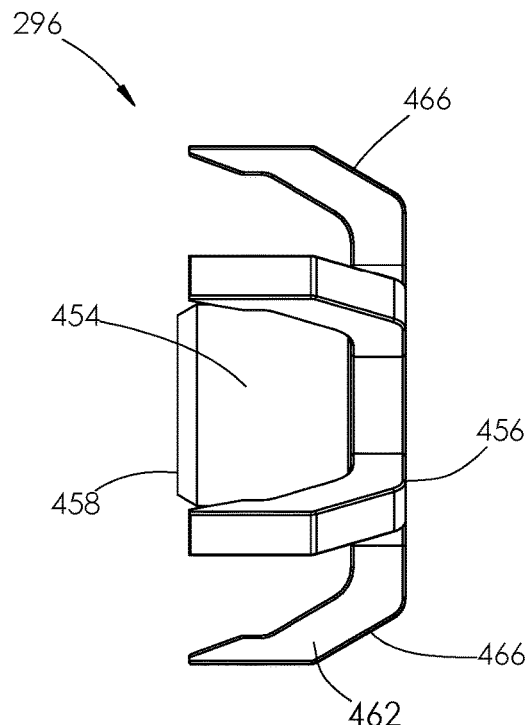
FIG. 77 is a top plan view of a suction valve guide shown installed within the housing shown in FIG. 50.
Figure 78:
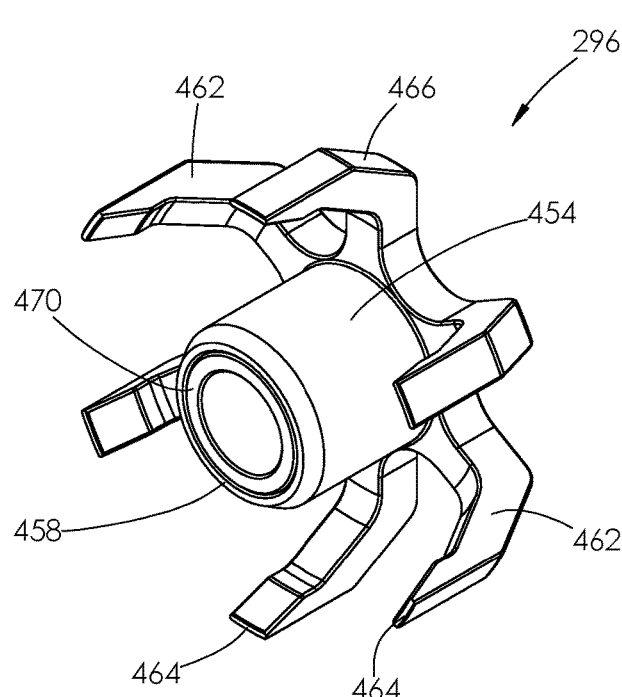
FIG. 78 is a perspective view of a first surface of the suction valve guide shown in FIG. 77.
Figure 79:
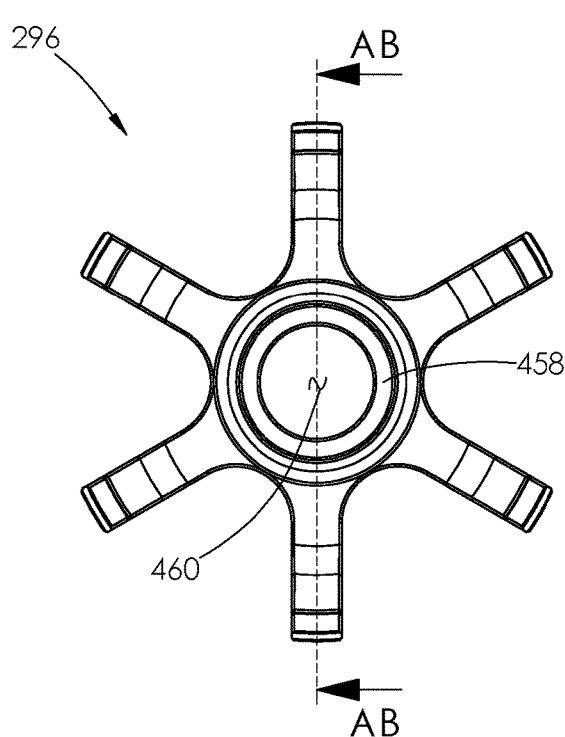
FIG. 79 is an elevation view of the first surface of the suction valve guide shown in FIG. 77.

The sealing element 346 comprises opposed first and second surfaces 426 and 428 joined by the sealing surface 420. A groove 430 is formed in the sealing surface 420 adjacent the first surface 426, as shown in FIG. 76. A seal 432 is installed within the groove 430. The groove 430 is characterized by a first sidewall 434 joined to a second sidewall 436. The sidewalls 434 and 436 may be joined by an inner groove 438. The groove 430 is sized to correspond with the inward facing surface of the seal 432. An outward facing surface of the seal 432 comprises a convex surface 440 joined to a concave surface 442. The seal 432 is preferably made of a polyurethane compound. In alternative embodiments, the seal may be made of a different elastomer material.

When the suction valve 296 seals against the first surface 318 of the fluid routing plug 116, the seal 432 and a portion of the sealing surface 420 mate with the tapered wall 340, as shown in FIG. 51. The seal 432 is shaped so that the convex surface 440 displaces into, or toward, the concave surface 442 as the seal 432 engages the tapered wall 340. This relative movement allows the shear forces to be dissipated, increasing the life of the seal 432 and the suction valve 292. If the seal 432 becomes worn and no longer seals properly, the seal 342 may be removed and replaced with a new seal 432. In alternative embodiments, the seal and groove may have various shapes and sizes, as desired. In further alternative embodiments, the sealing surface may not include a groove and corresponding seal.

Continuing with FIG. 76, the second surface 428 of the sealing element 346 is sized to cover the entrance 342 of the blind bore 328, as shown in FIG. 51. A cutout 444 is formed within the second surface 428. The cutout 444 creates a small cavity within the second surface 428. The cavity provides space for fluid to collect and apply pressure to the suction valve 292. Such pressure helps force the suction valve 292 to move axially to an open position.

Figure 75:
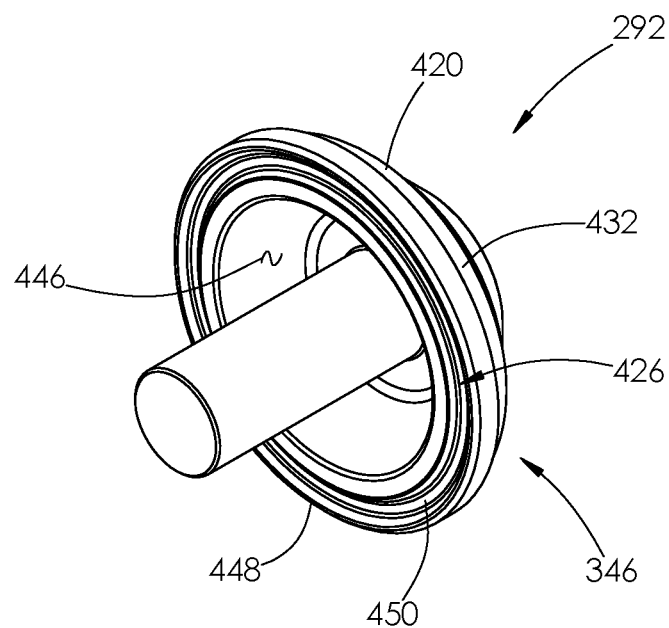
FIG. 75 is a perspective view of a first surface of the suction valve shown in FIG. 72.

Continuing with FIGS. 75 and 76, the stem 424 projects from the first surface 426 of the sealing element 346. An annular void 446 is formed in the first surface 426 and surrounds the stem 424. The first surface 426 further includes a ring-shaped outer rim 448 that surrounds the annular void 446 and the stem 424. The outer rim 448 joins the sealing surface 420. The annular void 446 reduces weight within the suction valve 292 and helps orient the valve's center of gravity during operation.

Figure 83:
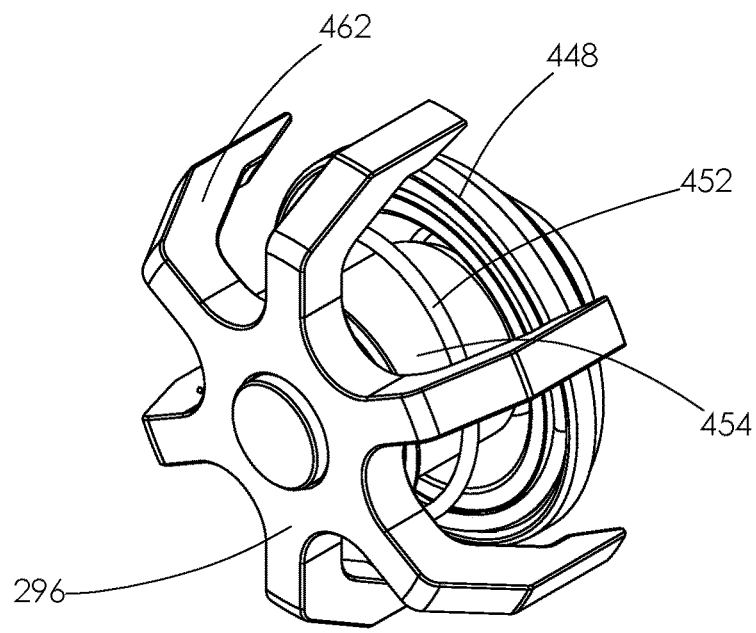
FIG. 83 is a perspective view of the suction valve guide shown in FIG. 77 engaged with the suction valve shown in FIG. 72. A spring is shown positioned between the suction valve guide and the suction valve.
Figure 84:
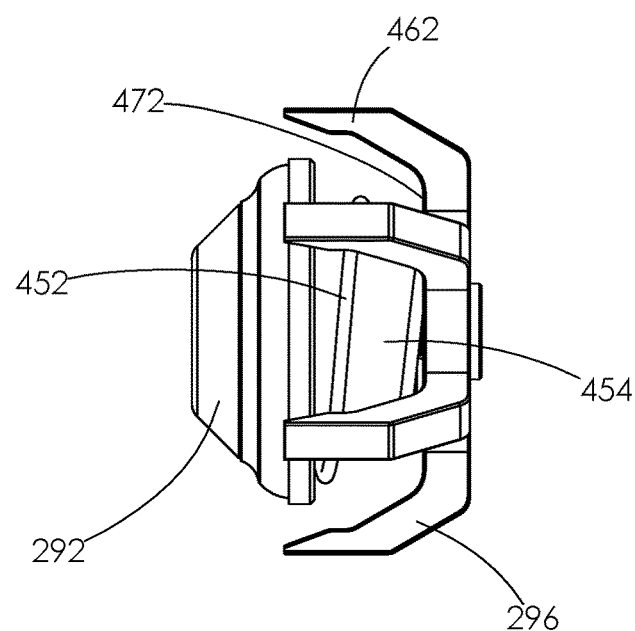
FIG. 84 is a top plan view of the suction valve guide, suction valve, and spring shown in FIG. 83.

An annular groove 450 is formed in the outer rim 448. The groove 450 is configured for receiving a bottom portion of a spring 452, as shown in FIG. 83. As described below, a top portion of the spring 452 engages with the suction valve guide 296, as shown in FIGS. 83 and 84. The spring 452 biases the suction valve 292 in the closed position. Positioning the spring 452 on the outer rim 448 helps to stabilize the suction valve 292 during operation.

With reference to FIGS. 77-82, the stem 424 is configured to move axially within the suction valve guide 296. The suction valve guide 296 may also be referred to as a cage for the suction valve 292. The suction valve guide 296 comprises a body 454 having opposed first and second surfaces 456 and 458. A central passage 460 is formed within the body 454 and interconnects the first and second surfaces 456 and 458. A plurality of legs 462 extend out from the body 454 adjacent its first surface 456 and project downward towards its second surface 458. The suction valve guide 296 shown in FIGS. 77-82 has six evenly spaced legs 462 formed around its body 454. In alternative embodiments, more or less than six legs may be formed on the body and may be non-uniformly spaced.

The legs 462 gradually decrease in thickness from the body 454 to a bottom surface 464 of each leg 462. The bottom surface 464 of each leg 462 is extremely thin so that the legs 462 do not block or interfere with the openings 348 of the second fluid passages 336 on the first surface 318, as shown in FIG. 50.

Continuing with FIGS. 77-82, an outer surface of each leg 462 includes a bevel 466. The bevels 466 are configured to engage a corresponding bevel 468 formed in the walls of the housing 104, as shown in FIGS. 50 and 51. The suction valve guide 296 is inserted into the horizontal bore 106 until the bevels 466 and 468 engage, allowing the guide 296 to bottom out on the walls of the housing 104. Once the bevels 466 and 468 are engaged, the suction valve guide 296 is held against the walls of the housing 104 by the spring 452 and fluid pressure.

When the suction valve guide 296 is in its installed position, the bottom surface 464 of each of the legs 462 hovers just above the first surface 318 of the fluid routing plug 116, leaving a gap between the legs 462 and the plug 116. The bottom surfaces 464 do not directly contact the fluid routing plug 116 in order to prevent the suction valve guide 296 from applying load to the plug 116 during operation.

Figure 80:
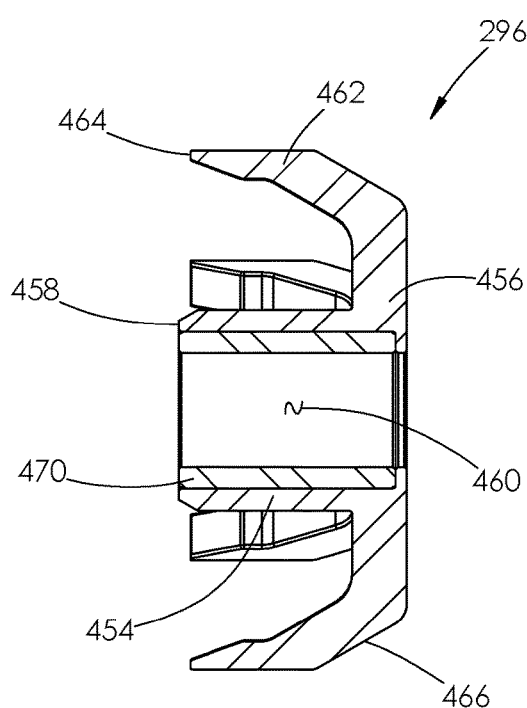
FIG. 80 is a cross-sectional view of the suction valve guide shown in FIG. 79, taken along line AB-AB.
Figure 81:
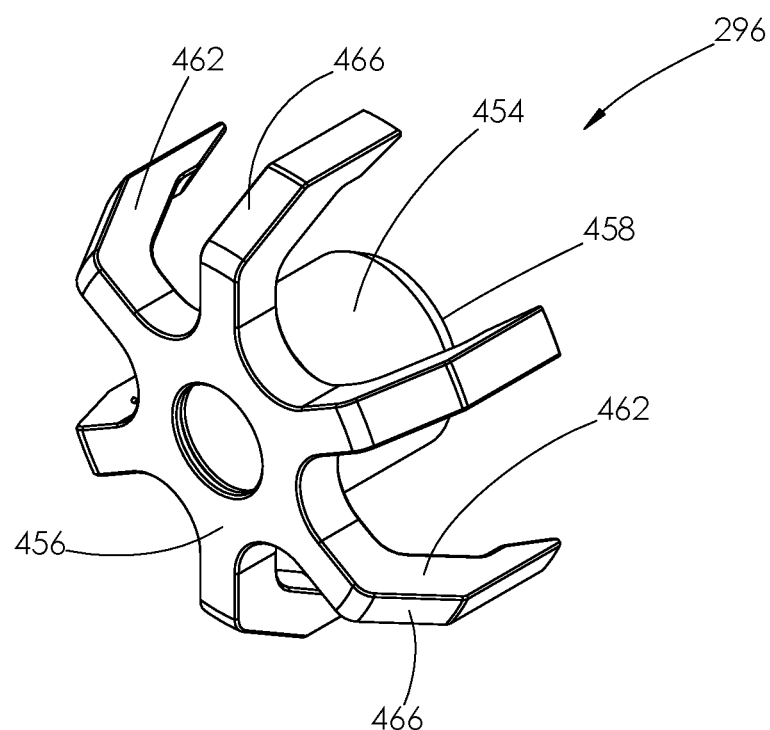
FIG. 81 is a perspective view of a second surface of the suction valve guide shown in FIG. 77.
Figure 82:
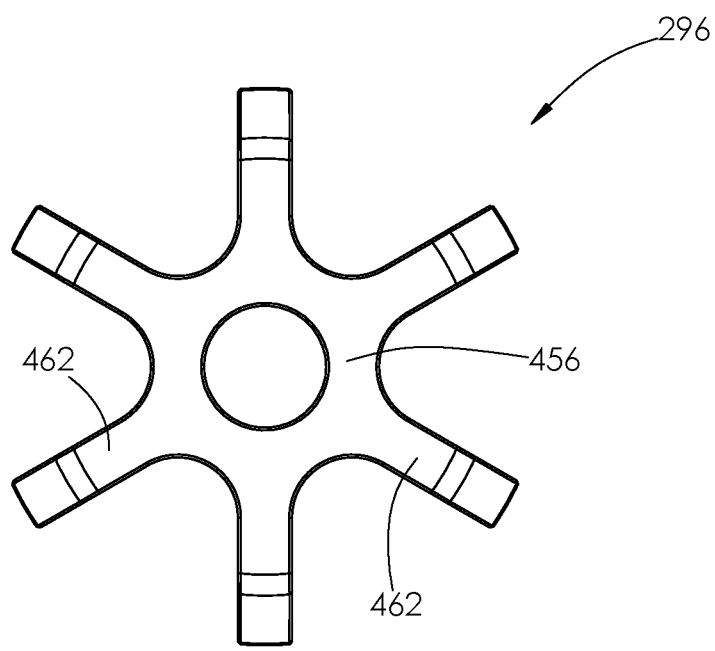
FIG. 82 is an elevational view of the second surface of the suction valve guide shown in FIG. 77.

Continuing with FIG. 80, a tubular insert 470 is installed within the central passage 460 of the body 454. The insert 470 may be press-fit within the passage 460. The insert 470 extends the length of the central passage 460 and is formed from a more wear resistant material than the suction valve guide 296. For example, the insert 470 may be made of tungsten carbide, while the suction valve guide 296 may be made of high strength alloy steel. The stem 424 is installed within the insert 470 and reciprocates within the insert 470 during operation, as shown in FIGS. 50 and 51. Any fluid contained within the insert 470 drains from the opening of the central passage 460 on the first surface 456 of the body 454.

During operation, the stem 424 may wear against the insert 470 as it reciprocates. The insert 470 helps decrease the rate of wear and helps the stem to wear evenly against the insert. Forming only the insert 470 out of a wear resistant material helps reduce the cost of the other parts, that do not experience as much wear during operation.

Turning to FIGS. 83 and 84, the spring 452 is interposed between the suction valve 292 and the suction valve guide 296. The spring 452 is held between the outer rim 448 of the suction valve 292 and an inner surface 472 of the legs 462. At least a portion of the spring 452 surrounds the body 454 of the suction valve guide 296. As the suction valve 292 moves to an open position, the spring 452 compresses between the suction valve 292 and the suction valve guide 296.

With reference to FIGS. 85-89, the discharge valve 294 is shown in more detail. As discussed above, the discharge valve 294 is constructed identically to the suction valve 292, with the exception that the discharge valve 294 may be larger in size. The discharge valve 294 shown in FIGS. 85-89, for example, has a larger sealing surface 422 and a longer stem 474 than the suction valve 292. When the discharge valve 294 is installed within the horizontal bore 106, the stem 424 extends along an axis that is parallel to or aligned with the central longitudinal axis 114 of the housing 104. A seal 475 is installed within a groove 477 formed in the sealing surface 422 and is configured to engage with the tapered wall 356 formed in the second surface 320 of the fluid routing plug 116. A bottom surface 476 of the discharge valve 294 is sized to cover the central base 354, as shown in FIG. 50.

With reference to FIGS. 90-95, the stem 474 formed on the discharge valve 294 is configured to move axially within the discharge valve guide 298. The discharge valve guide 298 may also be referred to as a cage for the discharge valve 294. The discharge valve guide 298 comprises a body 478 having opposed first and second surfaces 480 and 482 joined by an intermediate surface 484. The intermediate surface 484 includes a front portion 486, a medial portion 488, and a rear portion 490. The medial portion 488 has a larger diameter than both the front and rear portions 486 and 490. The front portion 486 has a slightly larger diameter than the rear portion 490.

Continuing with FIGS. 90-95, a blind bore 492 is formed in the first surface 480 and extends into the front portion 486 of the body 478. The blind bore 492 is configured to receive a tool used to grip the discharge valve guide 298. The front portion 486 is sized to be received within the cutout 308 formed in the retainer 300, as shown in FIGS. 50 and 51. When the discharge valve guide 298 and the retainer 300 are engaged, the blind bore 492 opens into the central passage 310 formed in the retainer 300.

Figure 93:
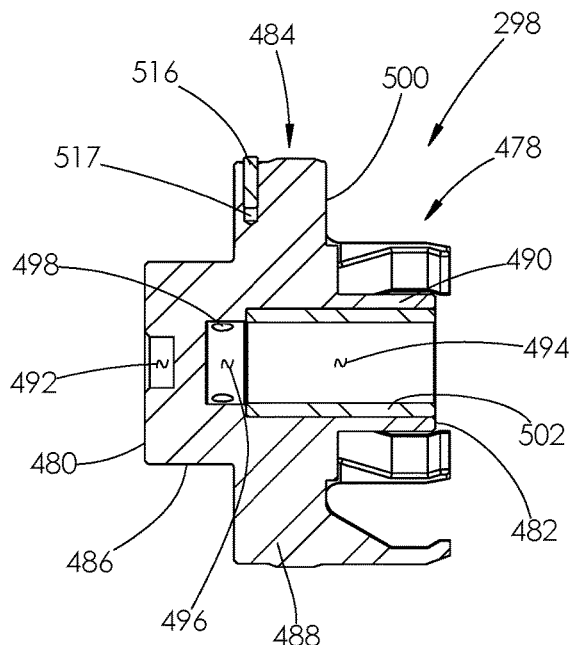
FIG. 93 is a cross-sectional view of the discharge valve guide shown in FIG. 92, taken along line AD-AD.
Figure 94:
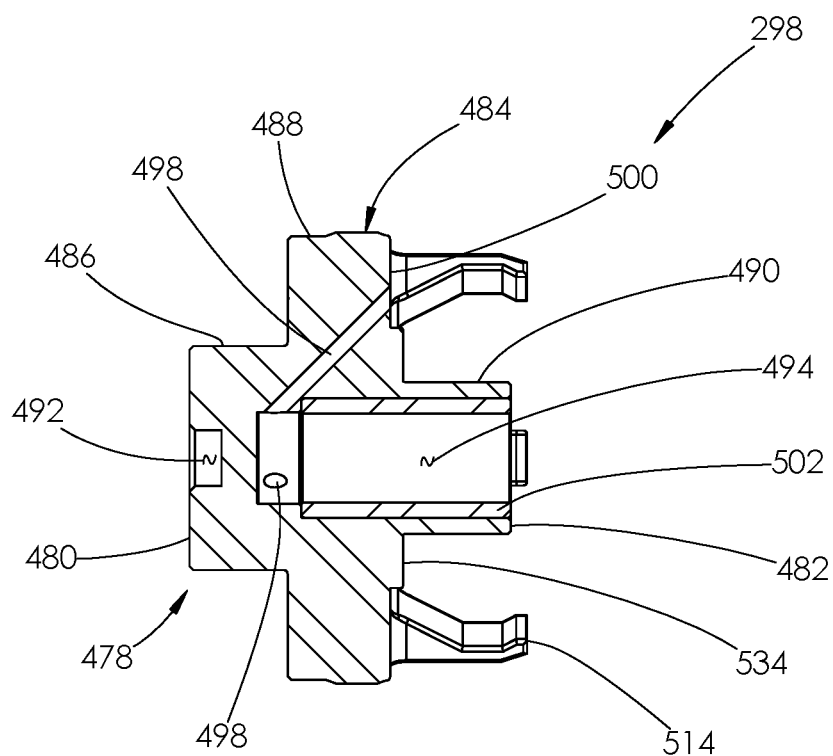
FIG. 94 is a cross-sectional view of the discharge valve guide shown in FIG. 92, taken along line AE-AE.

A central passage 494 is formed in the body 478 and opens on the second surface 482, as shown in FIGS. 93 and 94. The central passage 494 opens in the body 478 into an axially blind counterbore 496. A plurality of relief ports 498 are formed in the body 478. Each relief port 498 interconnects the counterbore 496 and a base 500 of the medial portion 488, as shown in FIG. 94.

Continuing with FIGS. 93 and 94, a tubular insert 502 is installed within the central passage 494. The insert 502 is identical to the insert 470, with the exception that the insert 502 may be larger than the insert 470. During operation, the stem 474 moves axially within the insert 502 installed within the central passage 494. Any fluid within the insert 502 drains from the body 478 through the counterbore 496 and the relief ports 498.

Figure 90:
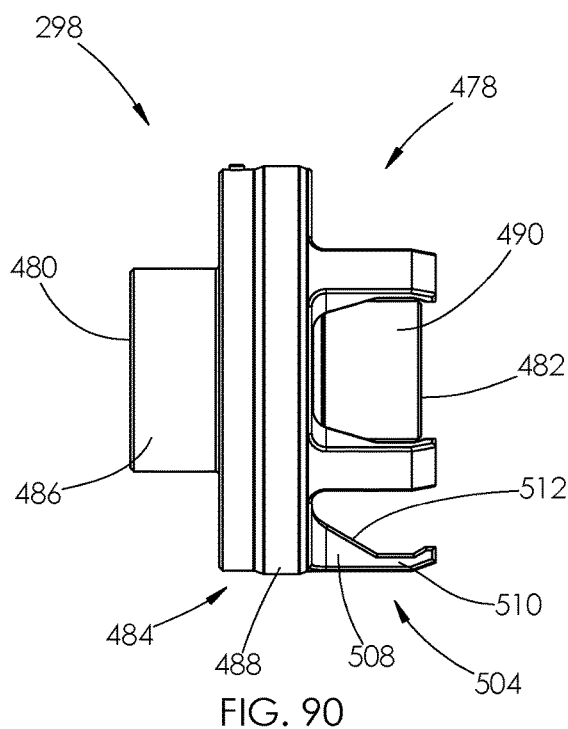
FIG. 90 is a top plan view of a discharge valve guide shown installed within the housing in FIG. 50.
Figure 91:
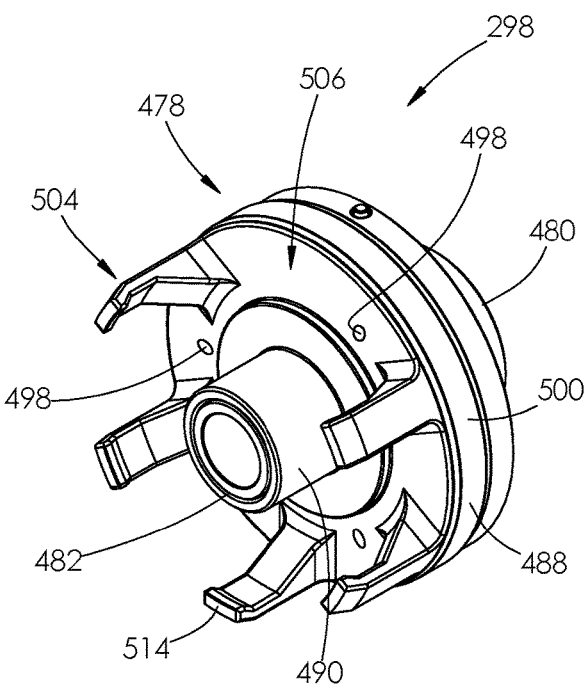
FIG. 91 is a perspective view of a first surface of the discharge valve guide shown in FIG. 90.
Figure 92:
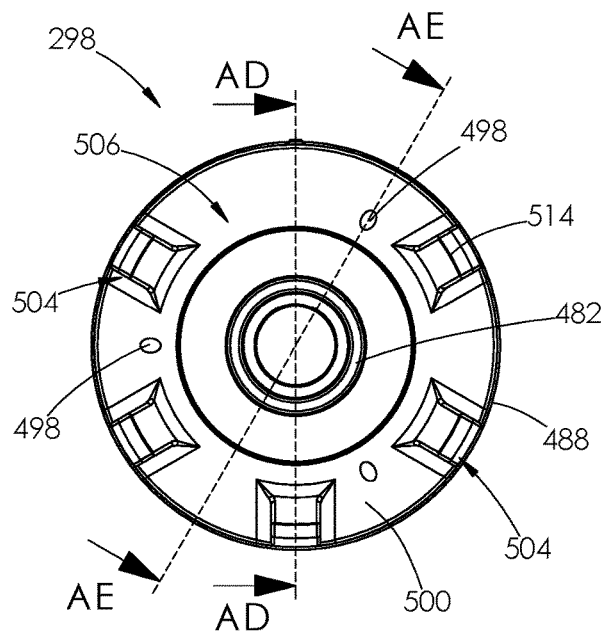
FIG. 92 is an elevation view of the first surface of the discharge valve guide shown in FIG. 90.

Continuing with FIGS. 90-92, a plurality of legs 504 project from the medial portion 488 and extend towards the second surface 482 of the body 478. The discharge valve guide 298 shown in FIGS. 90-95 comprises five legs 504. The legs 504 are positioned on the body 478 so as to leave a large space 506 between at least two adjacent legs 504. Other than the space 506, the legs 504 are equally spaced from one another. The space 506 is intended to align with the discharge bore 178, thereby preventing any legs 504 from blocking the discharge bore 178 during operation. Providing the space 506 therefore allows fluid to flow freely between the discharge valve 294 and the discharge bore 178 without significant obstructions. The space 506 also helps minimize wear applied to the legs 504 by the flowing fluid over time. In alternative embodiments, the body may have more or less than five legs as be spaced, as desired, as long as the legs are positioned on the body so as to leave a large space between at least two of the legs.

With reference to FIG. 90, each of the legs 504 has a thicker upper portion 508 and thinner lower portion 510. The thicker upper portion 508 provides strength to the legs 504 while the lower portion 510 is thinned in order to provide more room for fluid flow around the legs 504. The upper portion 508 also includes a tapered inner surface 512. Tapering the inner surface 512 of the legs 504 provides strength and alleviates stress in the legs 504 during operation.

Continuing with FIGS. 90-95, when the discharge valve guide 298 is installed within the horizontal bore 106, a bottom surface 514 of each leg 504 engages the outer rim 352 of the second surface 320 of the fluid routing plug 116, as shown in FIGS. 50 and 51. The discharge valve guide 298 is held against the fluid routing plug 116 by the retainer 300. Such engagement helps keep the second bevel 382 of the fluid routing plug 116 seated against the second beveled surface 384, as shown in FIGS. 65 and 68.

Figure 95:
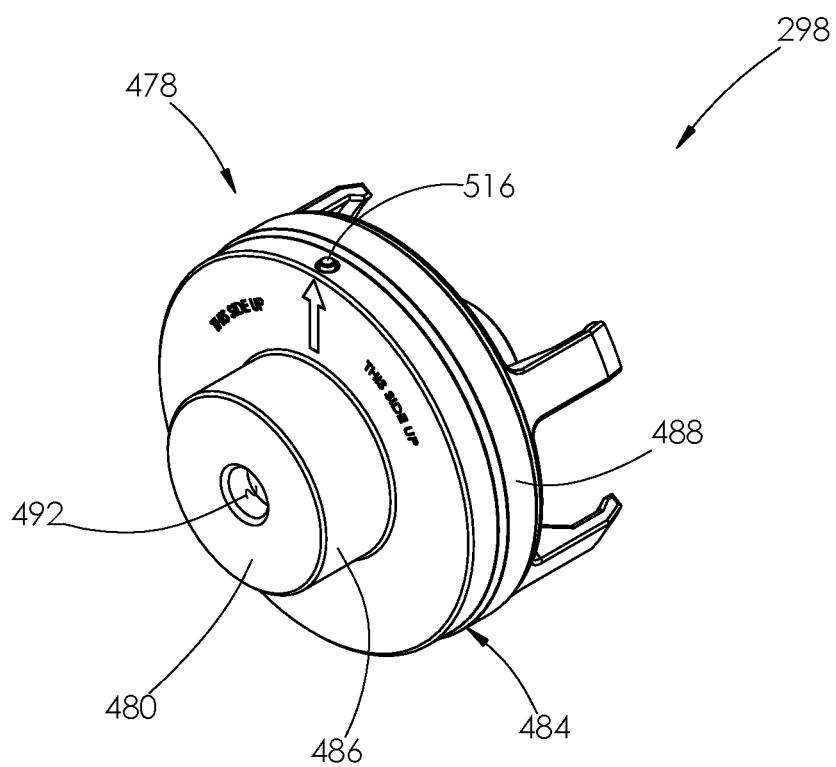
FIG. 95 is a perspective view of a second surface of the discharge valve guide shown in FIG. 90.
Figure 96:
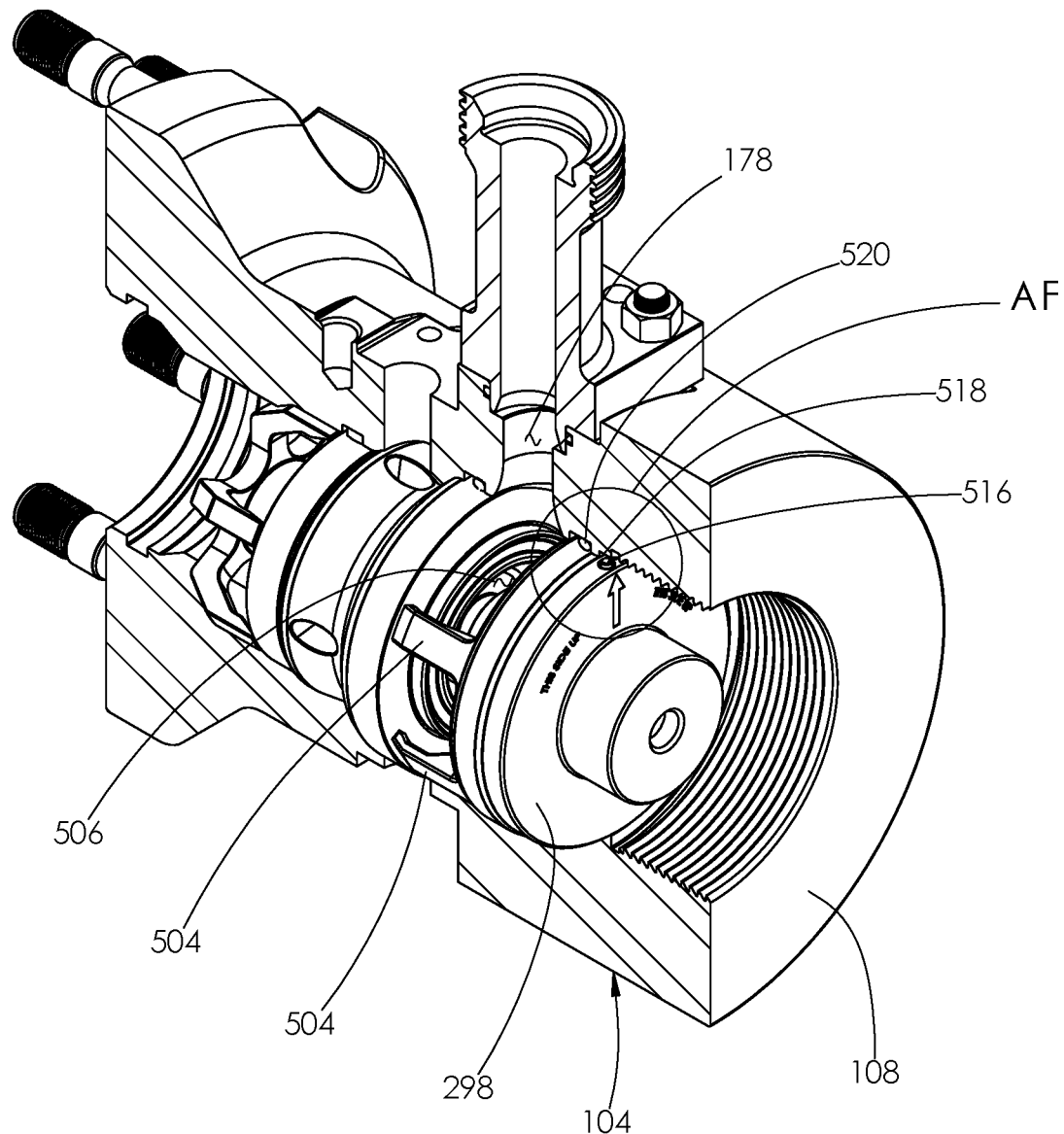
FIG. 96 is a perspective cut-away view of a first surface of the fluid end section shown in FIG. 8.
Figure 97:
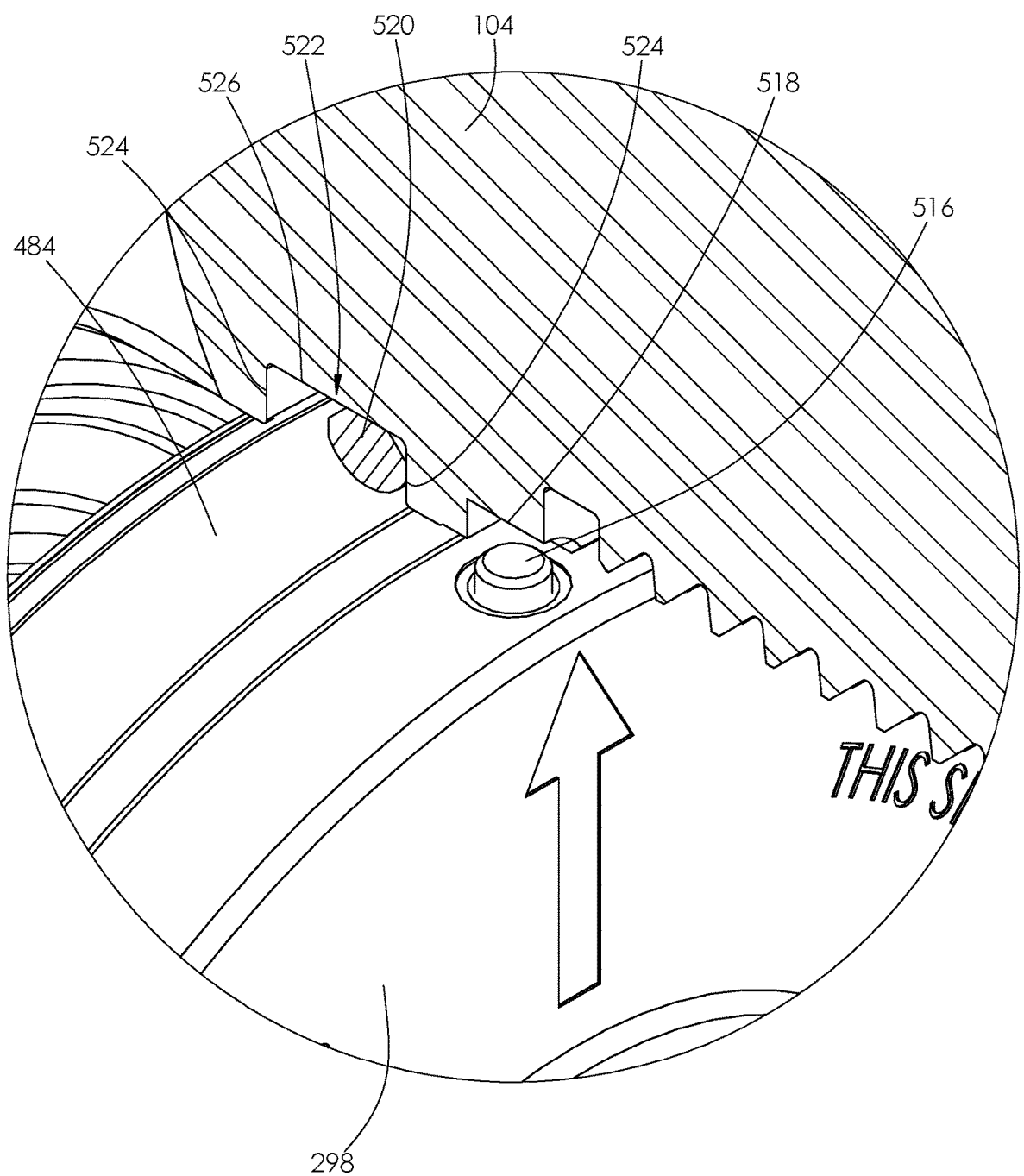
FIG. 97 is an enlarged view of area AF shown in FIG. 96.

Continuing with FIGS. 93 and 95, a dowel pin 516 is installed within a blind bore 517 formed in the medial portion 488 of the body 478. The dowel pin 516 is configured to be received within a dowel pin hole or groove 518 formed in the walls of the housing 104 surrounding the horizontal bore 106, as shown in FIGS. 96 and 97. The discharge valve guide 298 is installed within the horizontal bore 106 such that the dowel pin 516 is positioned within the dowel pin hole 518. Such positioning ensures that the space 506 between the pair of legs 504 aligns with the discharge bore 178, thus preventing any legs 504 from blocking the discharge bore 178 during operation.

Continuing with FIGS. 96 and 97, a seal 520 is interposed between the intermediate surface 484 of the body 478 and the walls of the housing 104. The seal 520 may be identical to the second seal 376 shown in FIGS. 65 and 70. In alternative embodiments, the seal may be identical to the first seal 374 shown in FIGS. 65 and 71. The seal 520 is installed within a groove 522 formed in the housing 104. The groove 522 is characterized by two sidewalls 524 joined to a base 526. The sidewalls 524 may join the base 526 via radius corner or at a 90 degree angle. During operation, the seal 520 wears against the outer intermediate surface 484 of the discharge valve guide 298. If the intermediate surface 484 begins to erode, allowing fluid to leak around the seal 520, the discharge valve guide 298 may be removed and replaced with a new discharge valve guide 298.

Figure 98:
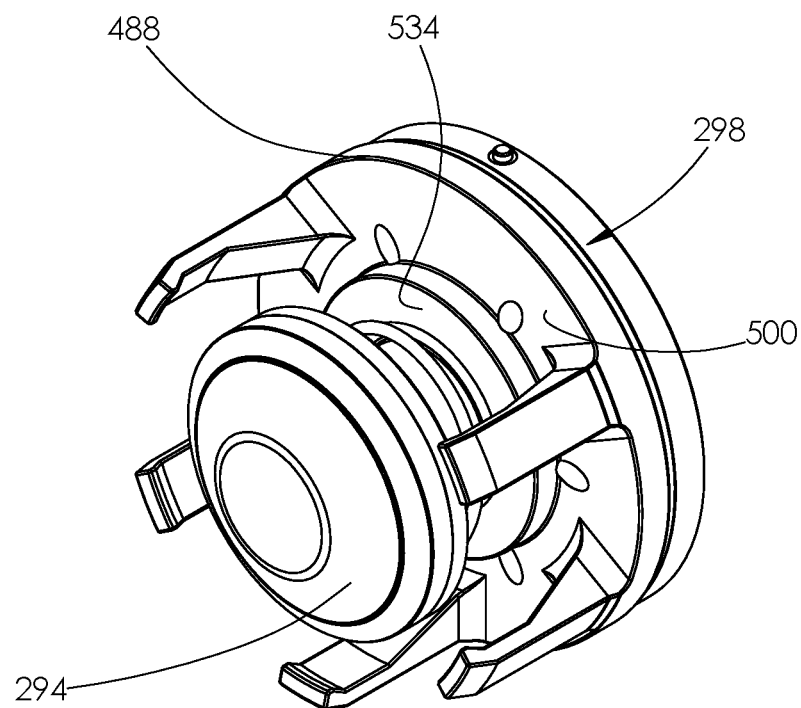
FIG. 98 is a perspective view of the discharge valve guide shown in FIG. 90 engaged with the discharge valve shown in FIG. 85. A spring is shown positioned between the discharge valve guide and the discharge valve.
Figure 99:
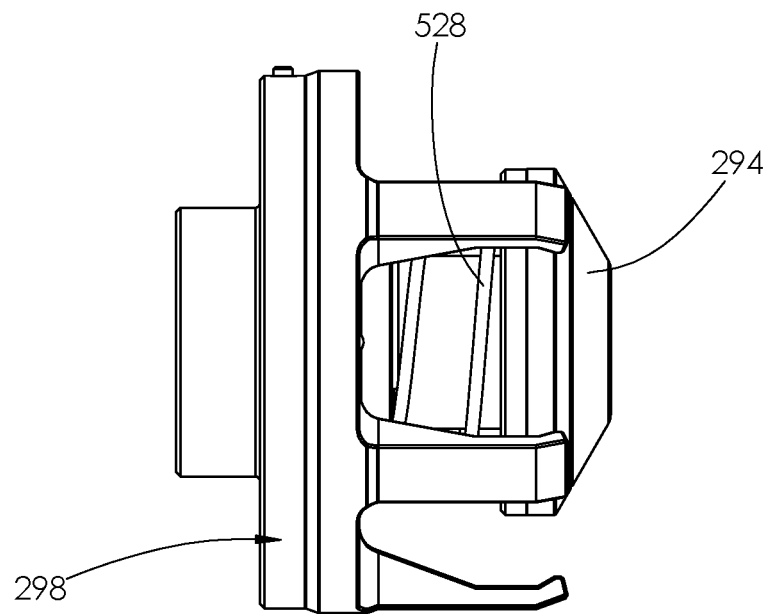
FIG. 99 is a top plan view of the discharge valve guide, discharge valve, and spring shown in FIG. 98.

With reference to FIGS. 98 and 99, a spring 528 is installed between the discharge valve 294 and the discharge valve guide 298. A bottom portion of the spring 528 sits in a groove 530, shown in FIG. 89, formed in an outer rim 532 of the discharge valve 294. A top portion of the spring 528 engages a ledge 534 formed in the base 500 of the medial portion 488 of the discharge valve guide 298. During operation, the spring 528 compresses against the ledge 534 of the medial portion 488.

Figure 100:
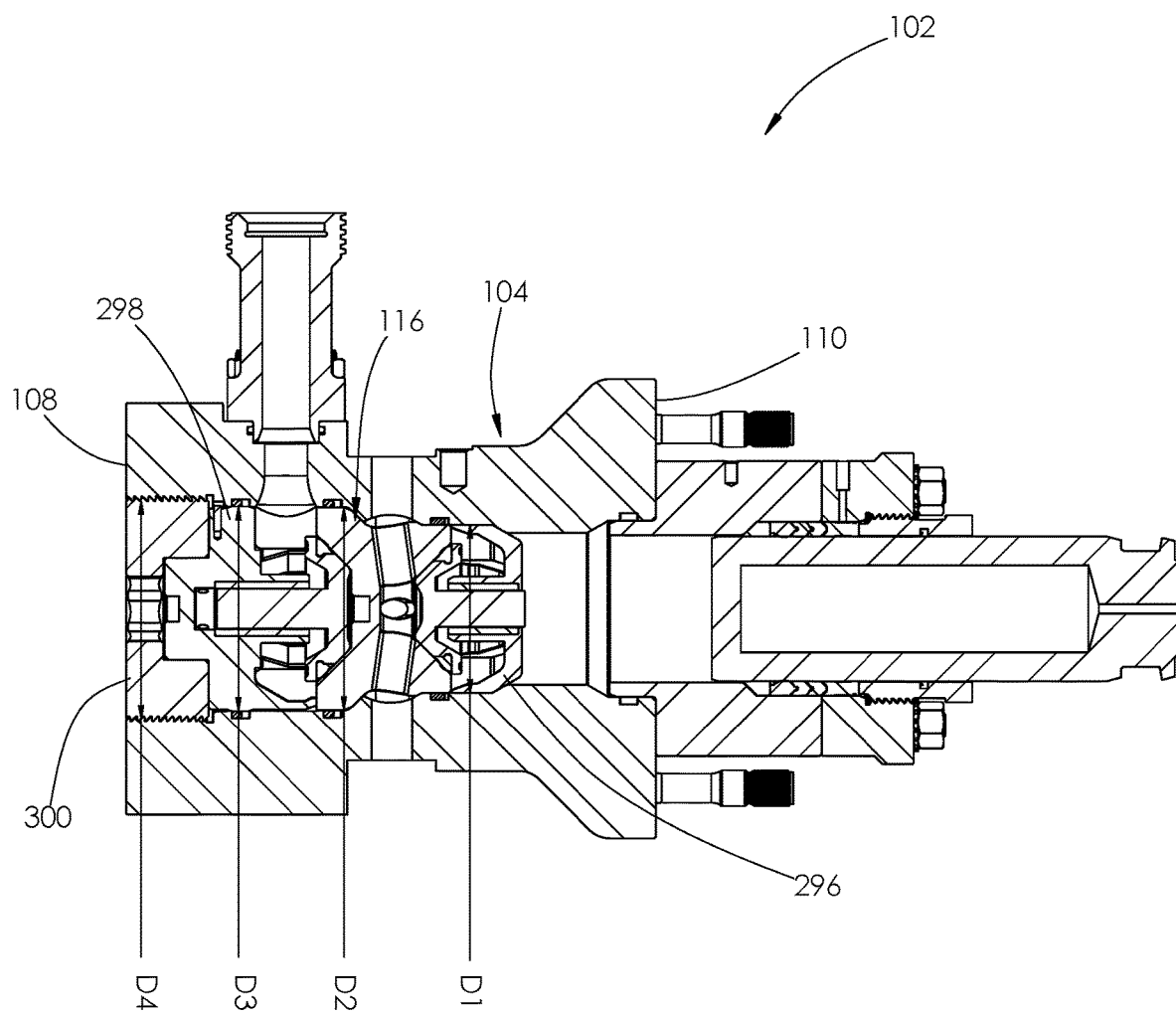
FIG. 100 is the cross-sectional view of the fluid end section shown in FIG. 9.
Figure 100A:
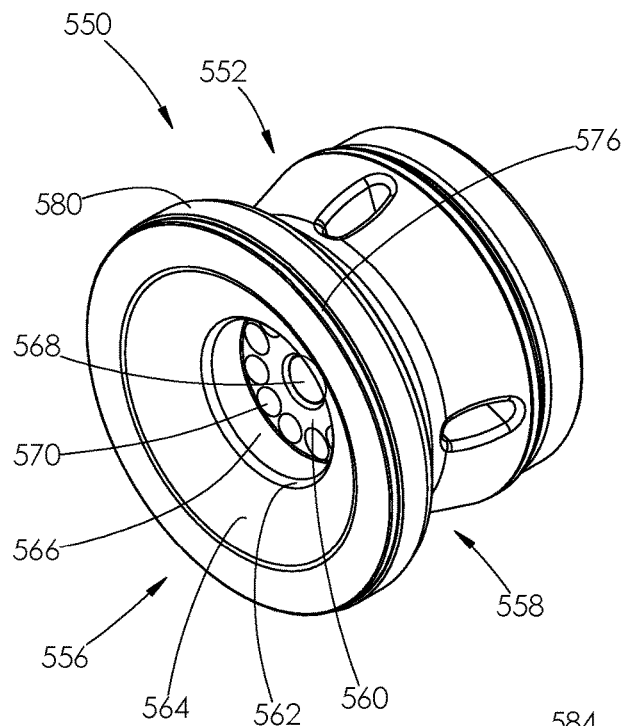
FIG. 100A is a perspective view of a second surface of another embodiment of a fluid routing plug.

Turning to FIG. 100, the components installed within the housing 104 are installed through the first surface 108, starting with the suction valve guide 296. The diameter of the installed components slightly increases from the second surface 320 to the first surface 318. For example, the suction valve guide 296 has smaller outer diameters than the fluid routing plug 116, and the fluid routing plug 116 has smaller outer diameters than the discharge valve guide 298. The discharge valve guide 298 has smaller outer diameters than the retainer 300.

Likewise, the diameters of the walls surrounding the horizontal bore 106 generally increase from the second surface 110 to the first surface 108. As shown in FIG. 100, a diameter D4 of the horizontal bore 106 is greater than a diameter D3 of the horizontal bore 106. The diameter D3 of the horizontal bore 106 is greater than a diameter D2 of the horizontal bore 106. The diameter D2 of the horizontal bore 106 is greater than a diameter D1 of the horizontal bore 106. Such construction allows the components to be installed without engaging the walls of the housing 104 until the component is at its intended installed position. The seals 374, 376, and 520 may be installed within the housing 104 prior to installing the other components described above.

Turning to FIGS. 100A-100E, another embodiment of a fluid routing plug 550 is shown. The fluid routing plug 550 may be installed within the housing 104 in place of the fluid routing plug 116. The fluid routing plug 550 is identical to the fluid routing plug 116, with a few exceptions. The fluid routing plug 550 comprises a body 552 having a first outer surface 554 joined to a second outer surface 556 by an intermediate outer surface 558. The second surface 556 of the fluid routing plug 550 is generally identical to the second surface 320 of the fluid routing plug 116, but a central base 560 formed in the second surface 556 is spaced from an edge 562 of a tapered wall 564 formed in the second surface 556. The central base 560 is spaced from the tapered wall 564 such that a throat 566 is formed between the central base 560 and the tapered wall 564.

Continuing with FIGS. 100A-100D, a blind hole 568 is formed in the central base 560 and a plurality of openings 570 corresponding to a plurality of second fluid passages 572 open on the central base 560 and surround the blind hole 568. In operation, fluid exiting the openings 570 flows into the throat 566 before pushing against the discharge valve 294 engaged with the second surface 556. Allowing fluid to gather in the throat 566 before contacting the discharge valve 294 helps the fluid to contact more surface area of the discharge valve 294, instead of having a plurality of single points of contact from each second fluid passage opening. Allowing the fluid to contact more surface area of the discharge valve 294 helps reduce wear to the valve over time.

Figure 100B:
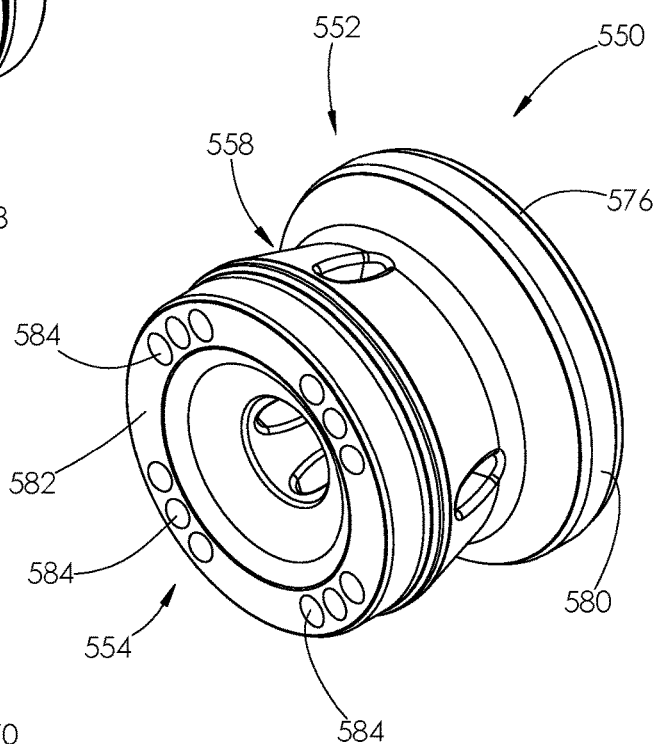
FIG. 100B is a perspective view of a first surface of the fluid routing plug shown in FIG. 100A.
Figure 100C:
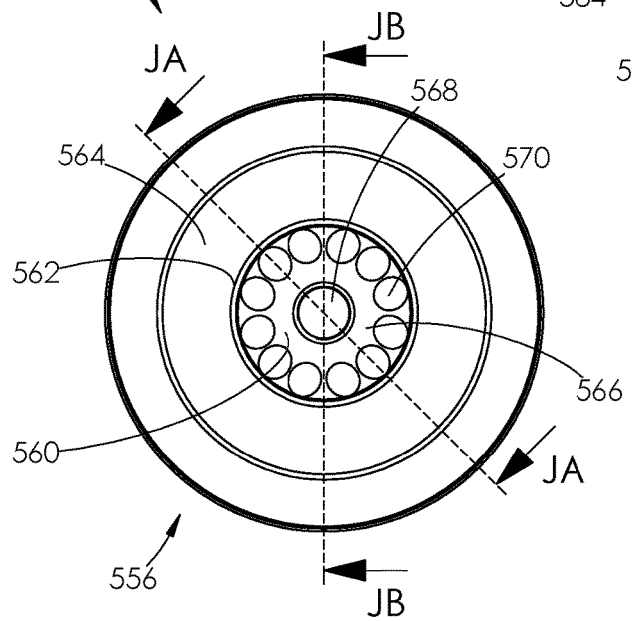
FIG. 100C is an elevational view of the second surface of the fluid routing plug shown in FIG. 100A.
Figure 100D:
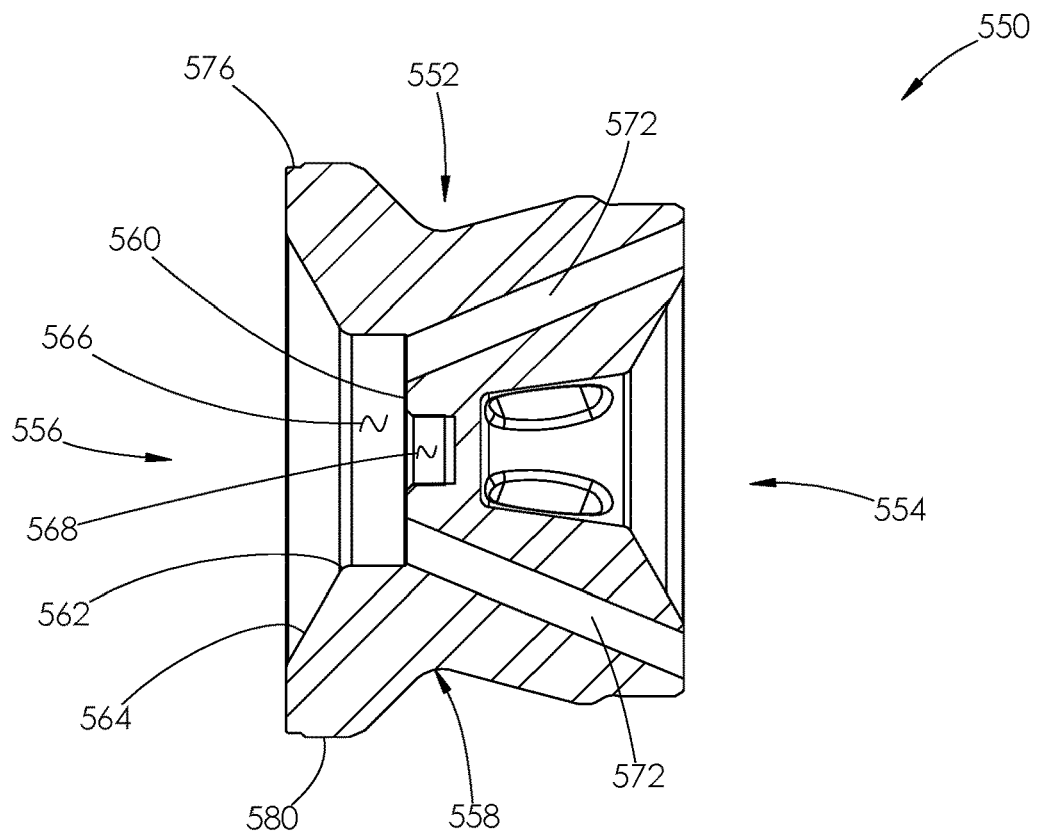
FIG. 100D is a cross-sectional view of the fluid routing plug shown in FIG. 100C, taken along line JA-JA.
Figure 100E:
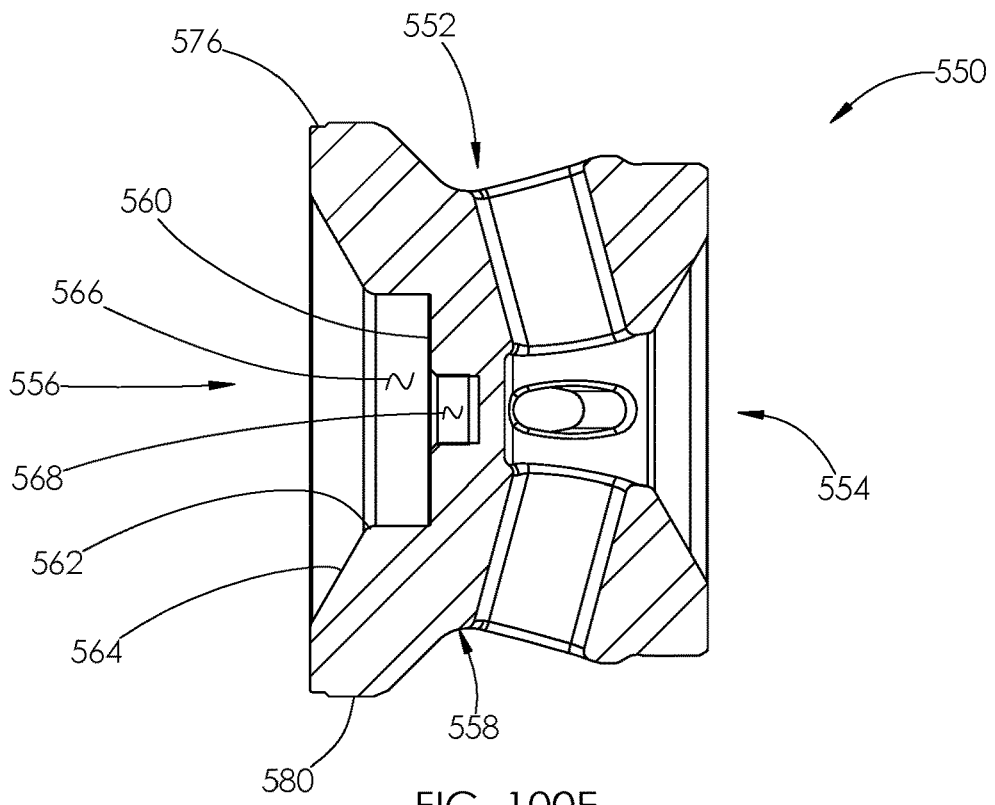
FIG. 100E is a cross-sectional view of the fluid routing plug shown in FIG. 100C, taken along line JB-JB.
Figure 100F:
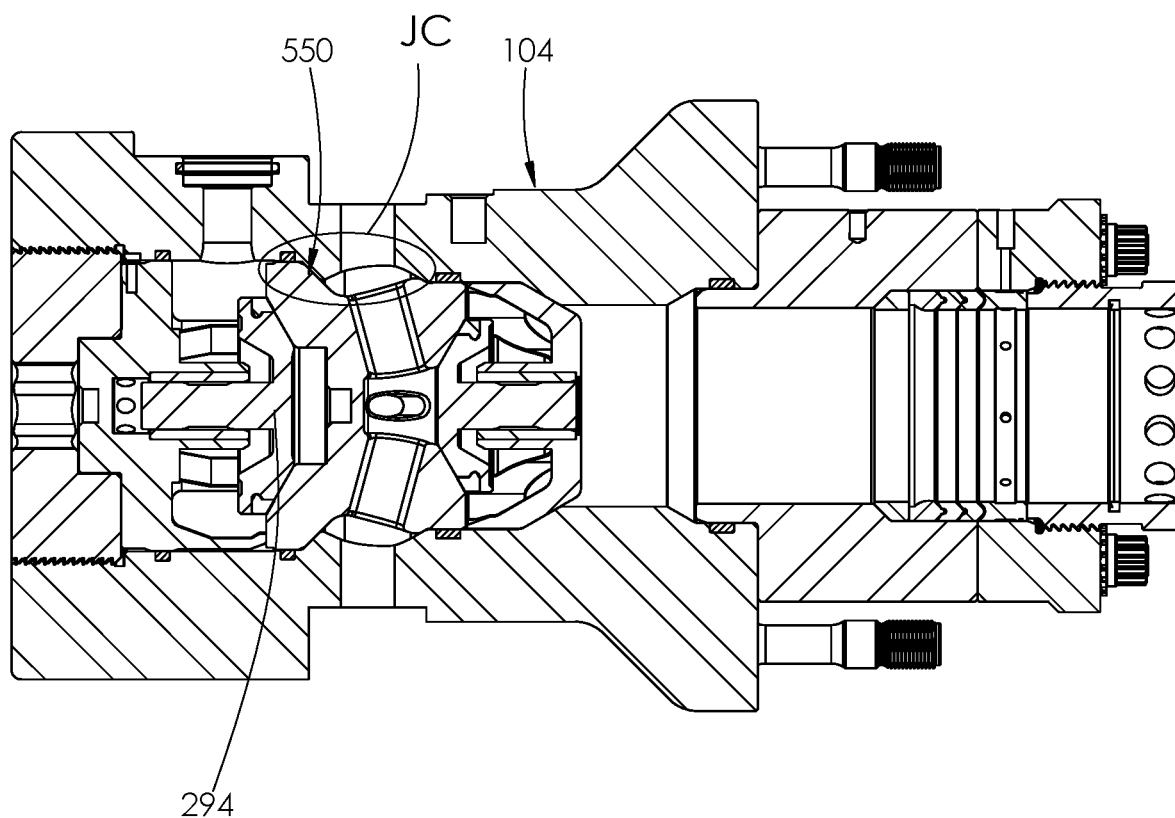
FIG. 100F is the cross-sectional view of the fluid end section shown in FIG. 9, but the fluid routing plug from FIG. 100A is shown installed within the housing.
Figure 100G:
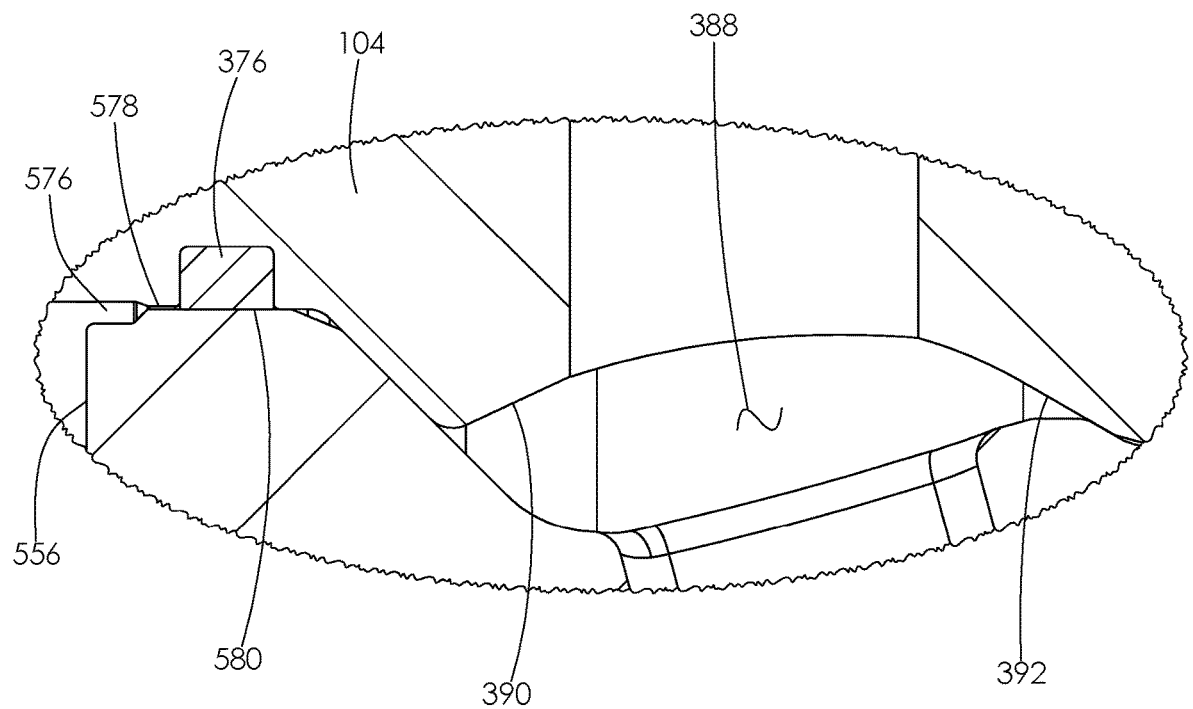
FIG. 100G is an enlarged view of area JC from FIG. 100F.
Figure 101:
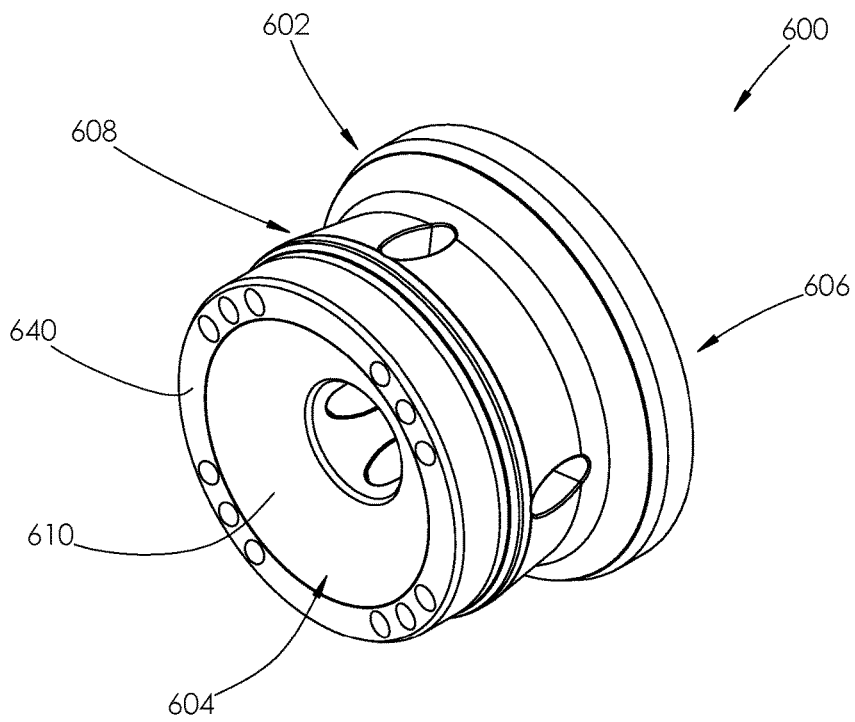
FIG. 101 is a perspective view of a first surface of another embodiment of a fluid routing plug.
Figure 102:
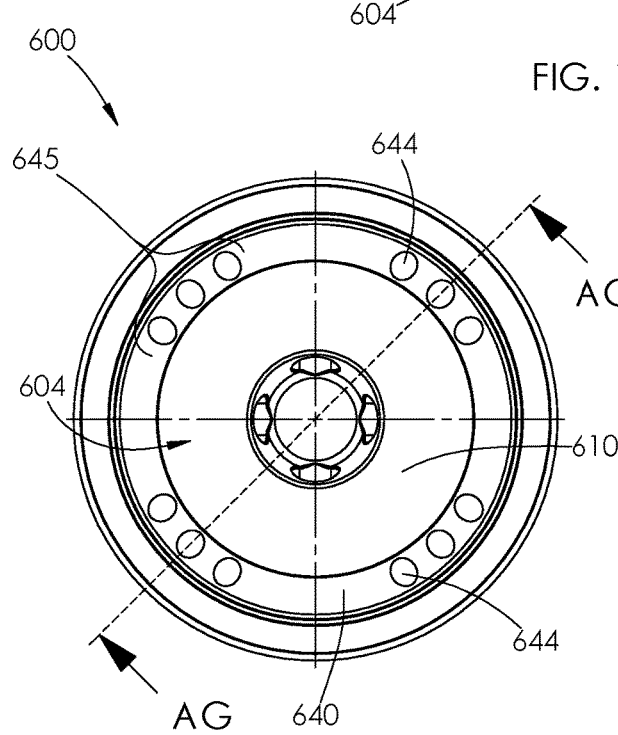
FIG. 102 is an elevational view of the first surface of the fluid routing plug shown in FIG. 101.

Continuing with FIGS. 100E and 100F, the intermediate surface 558 of the fluid routing plug 550 is identical to the intermediate surface 322 formed on the fluid routing plug 116. However, the intermediate surface 558 may include a cutout 576 adjacent the second surface 556. The cutout 576 provides space for fluid or proppant to collect during operation, as shown in FIG. 100F. The cutout 576 also helps reduce friction during installation of the fluid routing plug 550 within the housing 104. A small gap 578 may also exist between the walls of the housing 104 and the intermediate surface 558 between a second sealing surface 580 and the cutout 576, as shown in FIG. 100F. The gap 578 helps the seal 376 breath during operation.

Continuing with FIG. 100B, the first surface 554 of the fluid routing plug 550 is identical to the first surface 318 of the fluid routing plug 116, with the exception of its outer rim 582. The outer rim 582 is flat and wider than the outer rim 338, shown in FIG. 55. Because the outer rim 582 is wider, a plurality of openings 584 for the second fluid passages 572 may have a slightly larger diameter than the openings 348, shown in FIG. 56. Likewise, the openings 570 may also have a slightly larger diameter than the openings 364 shown in FIG. 54. Providing a slightly larger diameter for the second fluid passages 572 helps reduce fluid velocity through the fluid routing plug 550 during operation. Reducing fluid velocity within the fluid routing plug 550 helps reduce wear to the fluid routing plug 550 over time.

Figure 103:
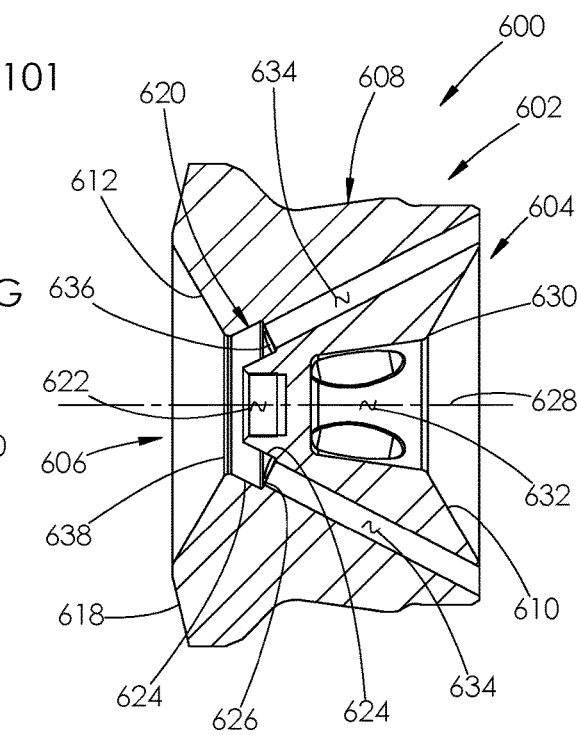
FIG. 103 is a cross-sectional view of the fluid routing plug shown in FIG. 102, taken along line AG-AG.
Figure 108:
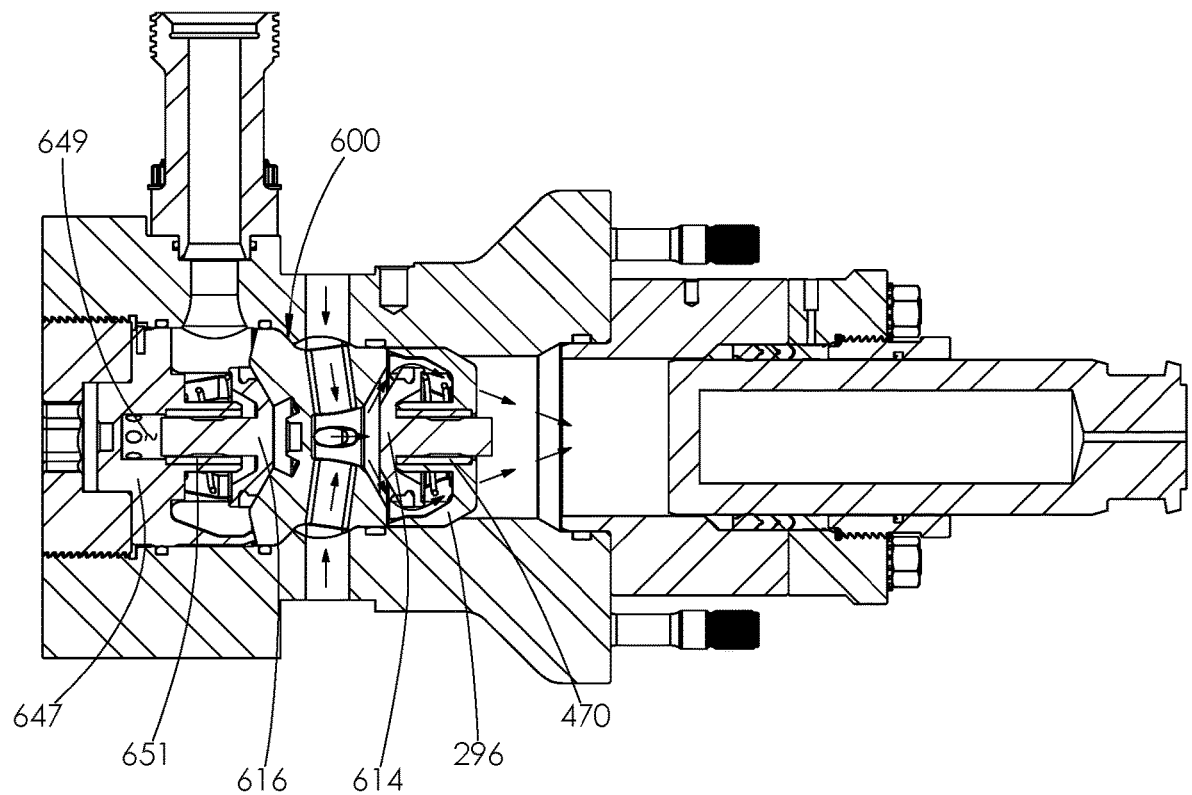
Figure 109:
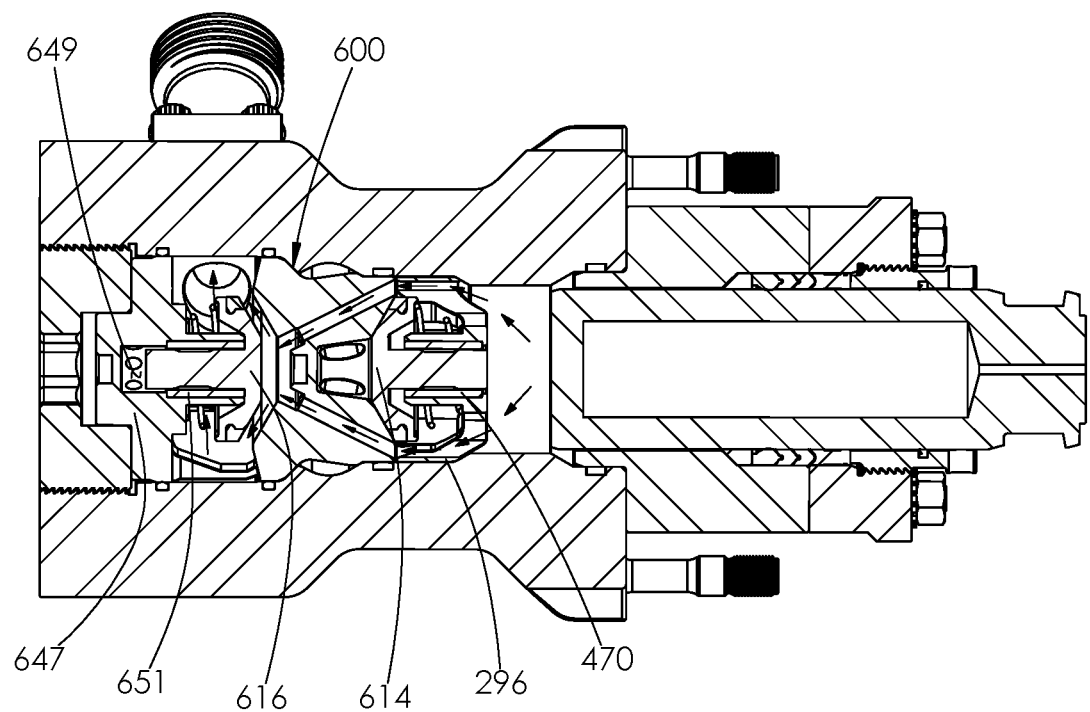
Figure 110:
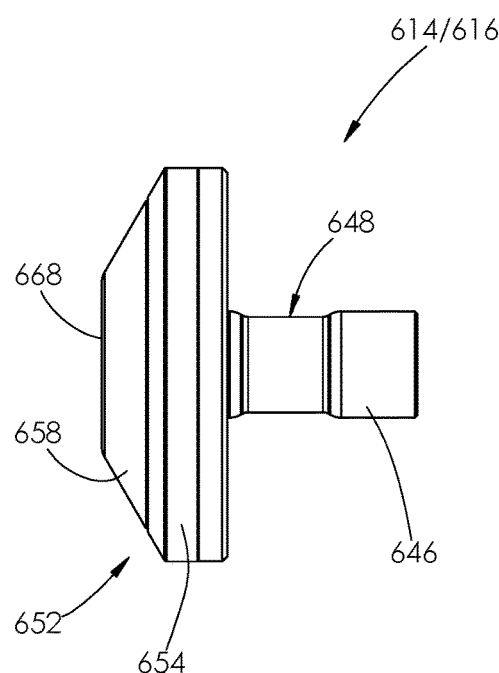
Figure 111:
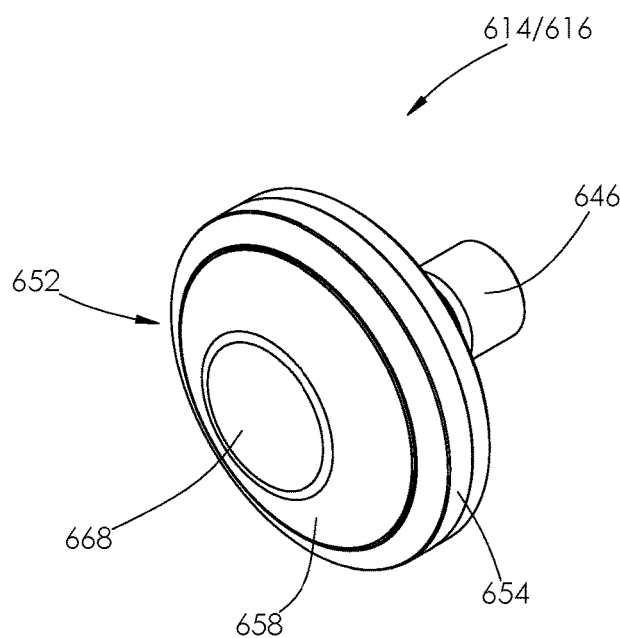
Figure 112:
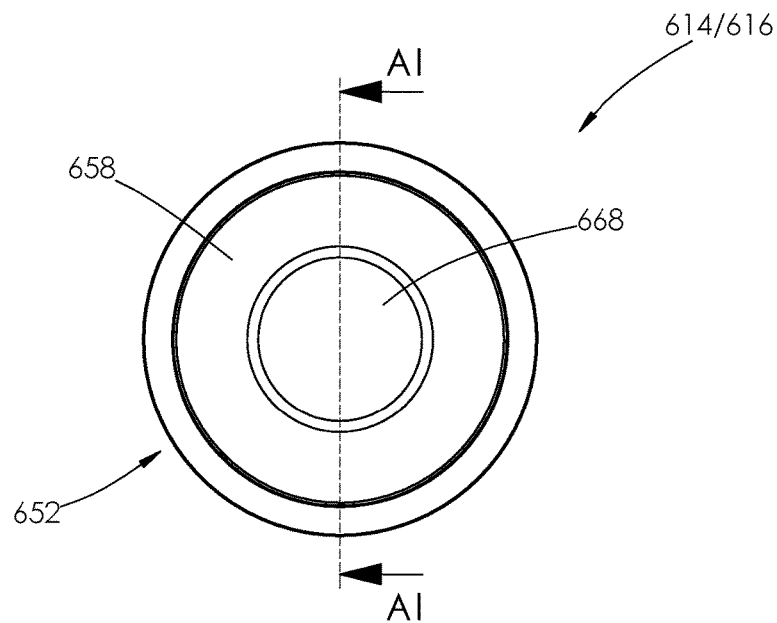
Figure 113:
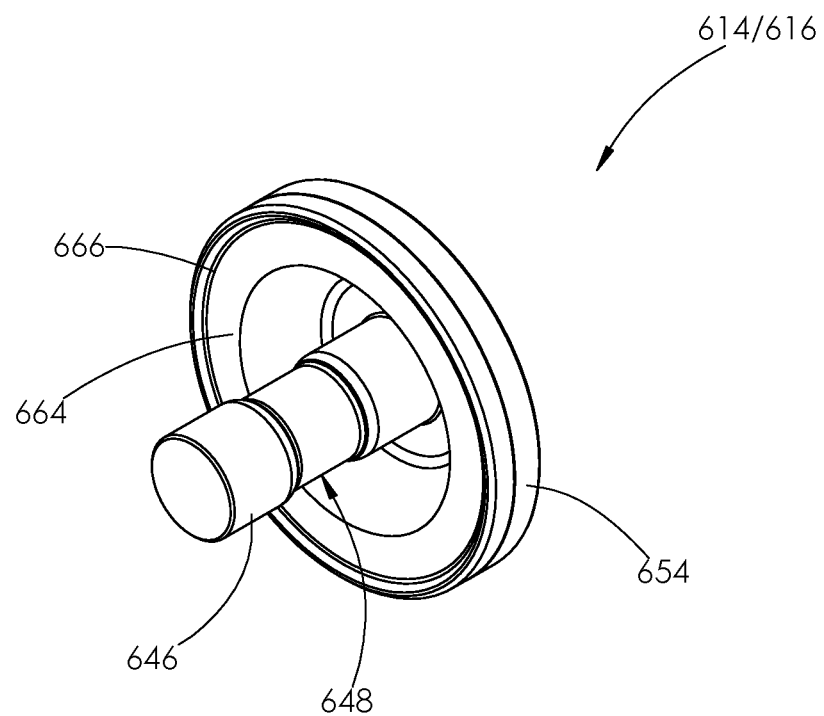
Figure 114:
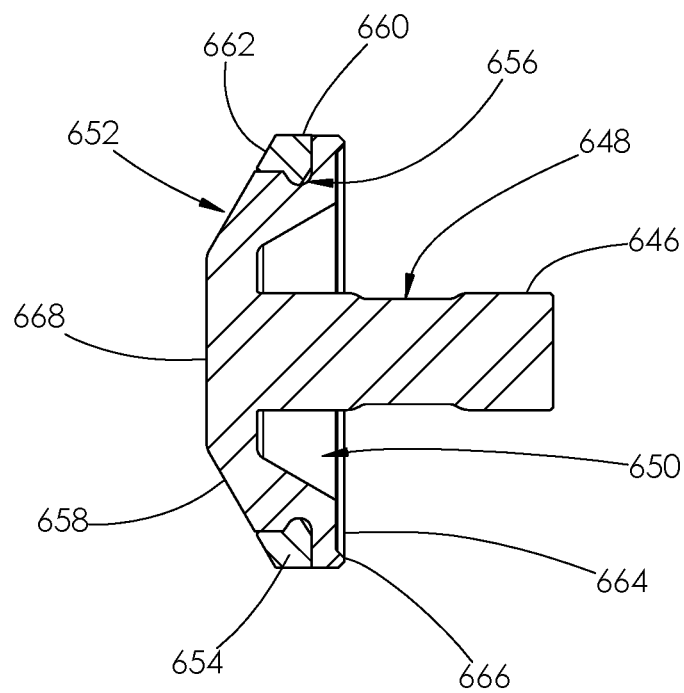

Turning to FIGS. 101-109, another embodiment of a fluid routing plug 600 is shown. The fluid routing plug 600 may be installed within the housing 104 in place of the fluid routing plug 116. The fluid routing plug 600 is identical to the fluid routing plug 116, with a few exceptions. The fluid routing plug 600 comprises a body 602 having a first outer surface 604 joined to a second outer surface 606 by an intermediate outer surface 608. In contrast to the fluid routing plug 116, the first and second surfaces 604 and 606 of the fluid routing plug 600 are configured so that each surface 604 and 606 has identically sized tapered walls 610 and 612, as shown in FIG. 103. Because the tapered walls 610 and 612 are the same size, a suction valve 614 and a discharge valve 616 used with the fluid routing plug 600 may be identical in size, as shown in FIGS. 108 and 109.

Using the same size suction and discharge valves 614 and 616 helps equalize the forces applied to the fluid routing plug 600 and the valves 614 and 616 during operation, helping to reduce any wear to the parts over time. Making the suction and discharge valves 614 and 616 identical also makes replacing the valves 614 and 616 during operation easier.

Figure 105:
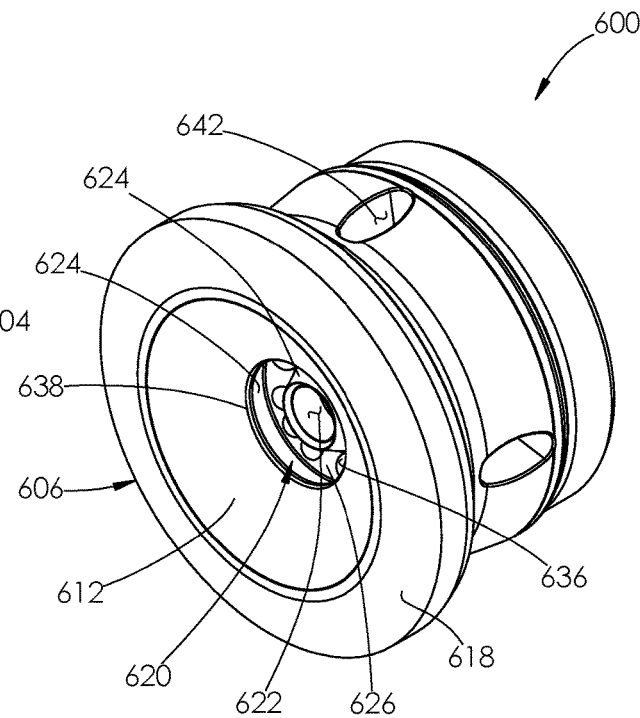
FIG. 105 is a perspective view of a second surface of the fluid routing plug shown in FIG. 101.
Figure 106:
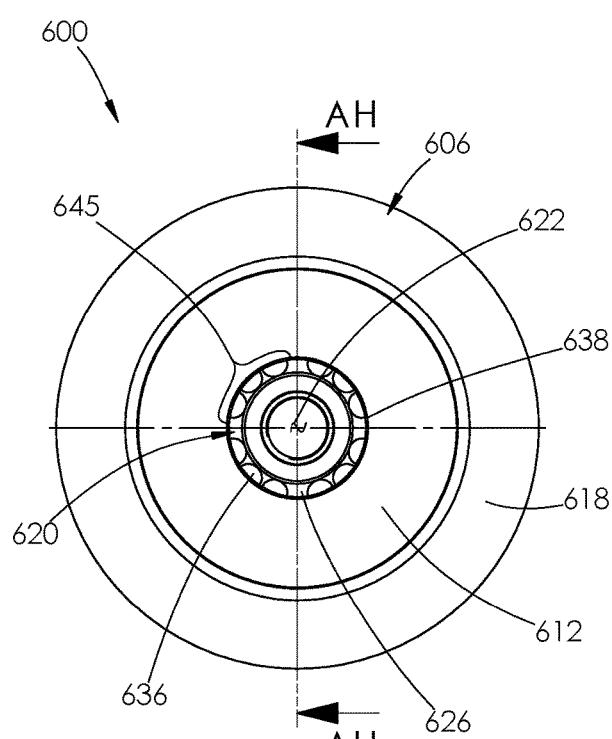
FIG. 106 is an elevational view of the second surface of the fluid routing plug shown in FIG. 101.
Figure 107:
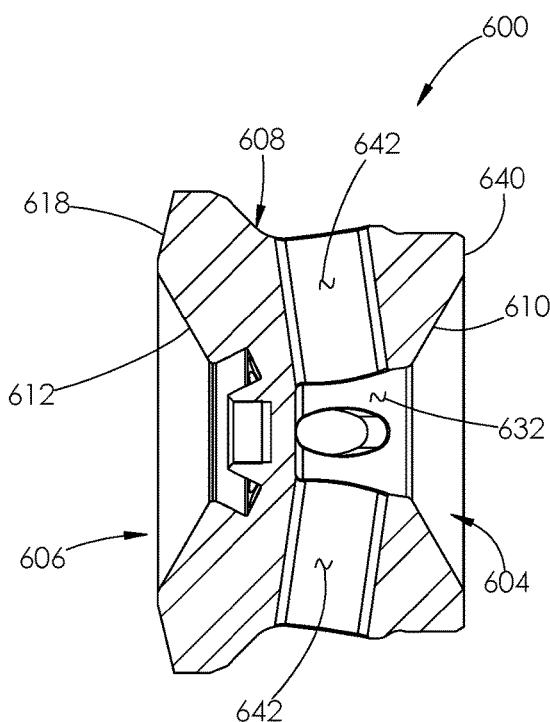
FIG. 107 is a cross-sectional view of the fluid routing plug shown in FIG. 106, taken along line AH-AH.

Continuing with FIGS. 103, 105, and 106, the tapered wall 612 formed in the second surface 606 extends between an outer rim 618 and an annular groove 620 formed in the center of the second surface 606. The annular groove 620 may be considered a central base formed in the second surface 606. The groove 620 surrounds a blind bore 622 formed in the center of the second surface 606. The blind bore 622 is identical to the blind bore 362 formed in the fluid routing plug 116, as shown in FIG. 55.

The groove 620 is characterized by two parallel sidewalls 624 joined by a base 626. The sidewalls 624 each extend at a non-zero angle relative to a central longitudinal axis 628 of the body 602. Because the sidewalls 624 of the groove 620 extend at an angle, the base 626 of the groove 620 extends at a non-zero angle relative to the central longitudinal axis 628 of the body 602. Preferably, the base 626 extends at approximately the same angle as the tapered wall 612 so that the base 626 and the tapered wall 612 are in a generally parallel relationship. The tapered wall 612 shown in FIG. 103 extends at a 45 degree angle relative to the central longitudinal axis 628.

An annular inner edge 638 of the tapered wall 612 is joined to the outer sidewall 624 of the groove 620 at a right angle. The diameter of the inner edge 638 of the tapered wall 612 is the same size as a diameter of an entrance 630 of an axially blind bore 632 formed in the first surface 604, as shown in FIG. 103. In alternative embodiments, the groove formed in the second surface and the inner edge of the tapered wall may not have an annular shape.

Continuing with FIGS. 103, 105, and 106, a plurality of second fluid passages 634 are formed in the body 602. The second fluid passages 634 are identical to the second fluid passages 336 formed in the fluid routing plug 116, shown in FIGS. 52-64, with the exception of the positioning of their openings 636 on the second surface 606. Each second fluid passage 634 opens on the base 626 of the groove 620 formed in the second surface 606. Thus, the openings 636 are axially spaced from the inner edge 638 of the tapered wall 612. Because the sidewalls 624 of the groove 620 are formed at an angle, the inner edge 638 of the tapered wall 612 slightly overlaps the openings 636, as shown in FIG. 106. By positioning the openings 636 in an axially spaced relationship with the inner edge 638 of the tapered wall 612, the size of the tapered wall 612 can be decreased without decreasing the size of the openings 636.

Figure 104:
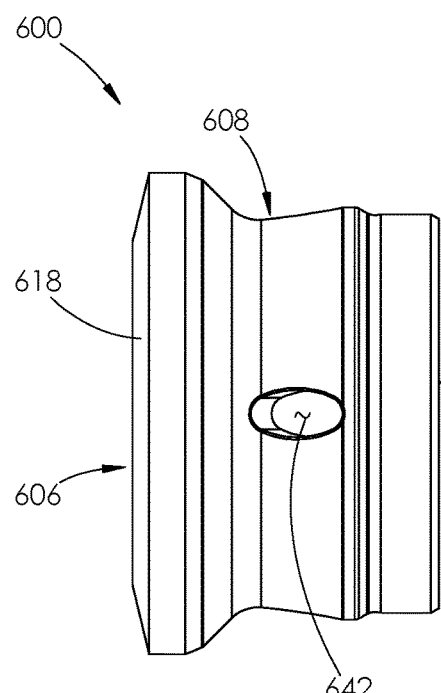
FIG. 104 is a top plan view of the fluid routing plug shown in FIG. 101.

Because the tapered wall 612 is decreased in size from the tapered wall 356 shown in FIG. 55, the outer rim 618 on the second surface 606 is wider than the outer rim 352. The outer rim 618 also tapers between the intermediate surface 608 and the tapered wall 612, as shown in FIGS. 103 and 104. Such taper increases the length of the tapered wall 612 without increasing the length of the intermediate surface 608.

Continuing with FIGS. 101-107, the first surface 604 is identical to the first surface 318 shown in FIGS. 53, 55, and 56, with the exception of its outer rim 640. Instead of tapering like the outer rim 338, shown in FIG. 55, the outer rim 640 is flat. The outer rim 640 is flat in order to slightly decrease the size of the tapered wall 610 to match the size of the tapered wall 612. The intermediate surface 608 of the fluid routing plug 600 is identical to that of the fluid routing plug 116, shown in FIG. 64. A plurality of first fluid passages 642 formed in the body 602 are identical to the first fluid passages 326, shown in FIGS. 55, 57, and 59. The second fluid passages 634 open on the outer rim 640 of the first surface 604, as shown by the openings 644. The openings 644 are positioned in groups 645, in the same manner as the second fluid passages 336 formed in the fluid routing plug 116, as shown in FIG. 56. The openings 636 on the second surface 606 may remain spaced in groups 645, as shown in FIG. 106.

With reference to FIGS. 108 and 109, the fluid routing plug 600 routes fluid throughout the housing 104 in the same manner as the fluid routing plug 116. The suction valve guide 296 is shown engaged with suction valve 614. Another embodiment of a discharge valve guide 647 is shown engaged with the discharge valve 616.

The discharge valve guide 647 is identical to the discharge valve guide 298, shown in FIGS. 90-95, with a few exceptions. A counterbore 649 formed in the guide 647 is larger than the counterbore 496. The counterbore 649 is larger in order to accommodate the shorter stem 646 of the discharge valve 616. An insert 651 installed within the discharge valve guide 647 is the same size as the insert 470 installed within the suction valve guide 296.

With reference to FIGS. 110-114, as discussed above, in contrast to the valves 292 and 294, the valves 614 and 616 are identical in size and shape. The valves 614 and 616 are generally identical to the valves 292 and 294, with a few exceptions. Each valve 614 and 616 comprises a sealing element 652 joined to a stem 646. The stem 646 projects from a first surface 650 of the sealing element 652.

An annular cutout 648 is formed within a medial portion of the stem 646. The cutout 648 provides space for fluid or proppants to collect during operation. Providing such space prevents the fluid and proppants from rubbing against the inserts 470 and 502. The suction and discharge valves 292 and 294 may be configured to include an annular cutout within their stems 424 and 474.

Continuing with FIGS. 110-114, the sealing element 652 further includes a second surface 668 joined to the first surface 650 by a sealing surface 658. A groove 656 is formed in the sealing surface 658 for housing a seal 654. The groove 656 is identical to the groove 430, shown in FIG. 76. An outward facing surface of the seal 654 comprises a sidewall 660 joined to a tapered base 662. In operation, the tapered base 662 engages the tapered walls 610 and 612 of the fluid routing plug 600. The sidewall 660 may compress creating a tight seal.

The first surface 650 of the sealing element 652 includes an outer rim 664. An outer ledge 666 surrounds the outer rim 664. A bottom portion of a spring engages the outer rim 664 and is held in place by the outer ledge 666. While not shown, a cutout may be formed in the second surface 668 of the sealing element 652, like the cutout 444, shown in FIG. 76.

Figure 115:
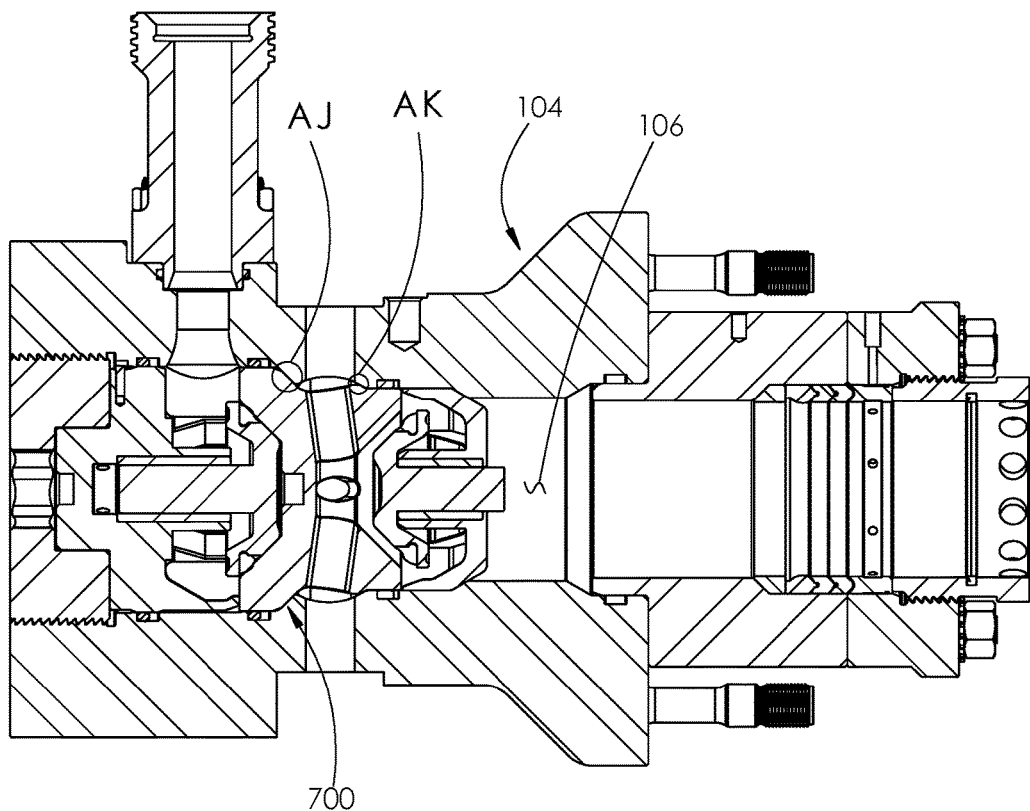
Figure 116:
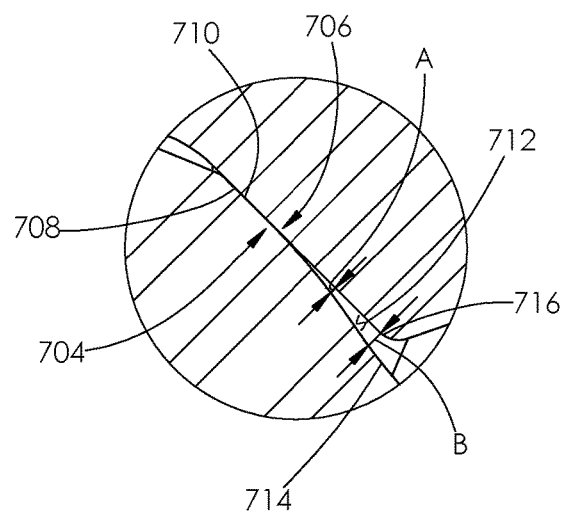
Figure 117:
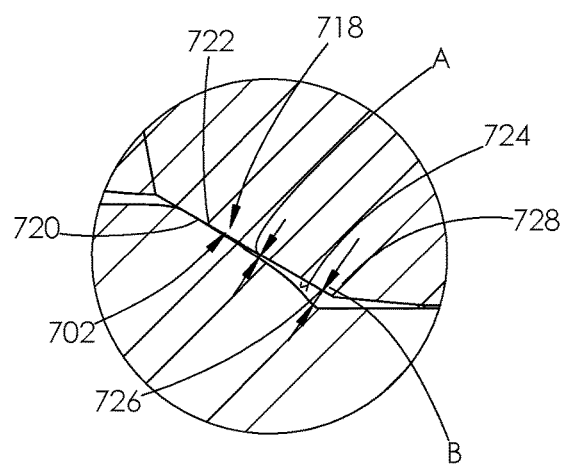

With reference to FIGS. 115-117, an alternative embodiment of a fluid routing plug 700 is shown. The fluid routing plug 700 may be installed within the housing 104 in place of the fluid routing plug 116. The fluid routing plug 700 is identical to the fluid routing plug 116, with the exception of the shape of its first and second bevels 702 and 704. When the fluid routing plug 700 is first installed within the horizontal bore 106, the second bevel 704 only partially engages a second beveled surface 706, as shown in FIG. 116. The bevels 704 and 706 mate at a second bevel mating surface 708 and a second beveled surface mating surface 710. Below the mating surfaces 708 and 710, the second bevel 704 and the second beveled surface 706 have mating angles that are not equal, causing a gap 712 to exist between the bevels 704 and 706. Specifically, the second bevel 704 may have a slightly convex shape so that portions of the second bevel 704 don't match the flat shape of the second beveled surface 706.

The width of the gap 712 gradually increases between the mating surfaces 708 and 710 and a bottom portion 714 of the second bevel 704 and a bottom portion 716 of the second beveled surface 706. Thus, the width B of the gap 712 is wider than the width A of the gap 712. Because the second bevel 704 has a slightly convex shape, the angle between the mating surfaces 708 and 710 is different from the angle between the bottom portions 714 and 716.

Turning to FIG. 117, the first bevel 702 and the first beveled surface 718 are shown in more detail. Like the second bevel 704, the first bevel 702 may only partially engage a first beveled surface 718. The bevels 702 and 718 mate at a first bevel mating surface 720 and a first beveled surface mating surface 722. Below the mating surfaces 720 and 722, the first bevel 702 and the first beveled surface 718 have mating angles that are not equal, causing a gap 724 to exist between the bevels 702 and 718. Specifically, the first bevel 702 may have a slightly convex shape so that portions of the first bevel 702 do not match the flat shape of the first beveled surface 718.

The width of the gap 724 gradually increases between the mating surfaces 720 and 722 and a bottom portion 726 of the first bevel 702 and a bottom portion 728 of the first beveled surface 718. Thus, the width B of the gap 724 is wider than the width A of the gap 724. Because the first bevel 702 has a slightly convex shape, the angle between the mating surfaces 720 and 722 is different from the angle between the bottom portions 726 and 728.

The width of the gaps 712 and 724 has been exaggerated in FIGS. 116 and 117 for illustration purposes. In reality, portions of the gaps 712 and 724 may be approximately 0.002 inches in width, for example. However, the gaps 712 and 724 may be wider or smaller depending on the materials and forces used.

As discussed above, in operation, the fluid pressure applied to the fluid routing plug 700 will cause the plug 700 to compress and expand as the plunger 290 retracts from the housing 104. As the fluid routing plug 700 starts to expand, the bottom portion 714 of the second bevel 704 will move to engage the bottom portion 714 of the second beveled surface 706, causing the bottom portions 714 and 716 to mate. Likewise, the bottom portion 726 of the first bevel 702 will move to engage the bottom portion 728 of the first beveled surface 718. Such movement of the fluid routing plug 700 distributes the load applied to the fluid routing plug 700 through the length of the first and second bevels 702 and 704.

With reference to FIGS. 118-120, an alternative embodiment of a fluid routing plug Boo is shown. The fluid routing plug Boo may be installed within the housing 104 in place of the fluid routing plug 116. The fluid routing plug Boo is identical to the fluid routing plug 700, with the exception of the shape of its first and second bevels 802 and 804. Like the fluid routing plug 700, the second bevel 804 is sized to leave a gap 806 between the second bevel 804 and a second beveled surface 808 when the fluid routing plug Boo is first installed within the housing 104. In contrast to the gap 712, an angle formed between the mating surfaces 810 and 812 and bottom portions 814 and 816 of the second bevel 804 and second beveled surface 808 remains the same. Thus, an area A of the gap 806 has the same angle as an area B of the gap 806.

Likewise, the first bevel 802 is shaped so that an angle formed between the first bevel 802 and a first beveled surface 820 stays relatively the same between mating surfaces 822 and 824 and bottom portions 826 and 828. Thus, the width A of the gap 818 has approximately the same angle as the width B of the gap 818.

The width of the gaps 806 and 818 has been exaggerated in FIGS. 119 and 120 for illustration purposes. In reality, portions of the gaps 806 and 818, for example, may be approximately 0.002 inches in width. However, the gaps 806 and 818 may be wider or smaller depending on the materials and forces used.

As discussed above, the first and second bevels 802 and 804 expand during operation. Such movement of the fluid routing plug Boo distributes the load applied to the fluid routing plug Boo through the length of the first and second bevels 802 and 804.

In alternative embodiments, the first bevel may be configured to have a gap that increases in size, as shown in FIG. 117, while the second bevel may be configured to have a gap that increases by a different amount, as shown in FIG. 119, and vice versa. In further alternative embodiments, the width of the gap may be of various shapes and sizes depending on the materials used and forces involved. In even further alternative embodiments, the intermediate surface of the fluid routing plug may include any combination of the different bevel constructions described herein.

In contrast to the first fluid passages 326, shown in FIGS. 55 and 58, a longitudinal axis 914 of each first fluid passage 910 does not intersect a central longitudinal axis 916 of the body 902, as shown in FIG. 125. Rather, the first fluid passages 910 are formed such that the longitudinal axis 914 of each passage 910 is offset from the central longitudinal axis 916 of body 902. The offset configuration of the first fluid passages 910 encourages a vortex type flow of fluid about the central longitudinal axis 916, thereby reducing fluid turbulence during operation. In alternative embodiments, the longitudinal axis 914 of each first fluid passage 910 may intersect the longitudinal axis 916 of the body 902.

A plurality of openings 918 formed on the intermediate surface 908 for the first fluid passages 910 are similar to the openings 334, shown in FIGS. 57 and 59, but have a more oblong shape, as shown in FIG. 121. The oblong shape shown in FIG. 121 has opposed first and second ends 920 and 922. The second end 922, which is closer to the second surface 906, is slightly wider than the first end 920. The unequal size of the ends 920 and 922 helps direct fluid along the offset longitudinal axis 914 of the first fluid passages 910. The unequal size of the ends 920 and 922 also helps increase the wall thickness in certain areas of the body 902 between the first fluid passages 910 and a plurality of second fluid passages 924.

In alternative embodiments, the opposed ends of the openings may be identical in size or may be shaped identical to the openings 334, shown in FIGS. 57 and 59. The opening 918 of the first fluid passage 910 shown in FIG. 121 extends along an axis that is parallel to the longitudinal axis 916 of the body 902. In alternative embodiments, the openings of the first fluid passages may extend at a non-zero angle relative to the longitudinal axis 916 of the body 902, as shown for example by the openings 972 shown in FIG. 128D. The angle at which the first fluid passages 910 are formed in the body 902 may vary, as desired, in order to increase the wall thickness within the body 902 and reduce stress in the body 902 during operation.

Continuing with FIGS. 122 and 126, each of the second fluid passages 924 formed in the body 902 interconnects the first and second surfaces 904 and 906. The second fluid passages 924 are identical to the second fluid passages 336, shown in FIGS. 60-63, but the second fluid passages 924 are slightly pivoted from the position of the second fluid passages 336. Each second fluid passage 924 is pivoted so that it has a compound angle with respect to the central longitudinal axis 916, as shown in FIGS. 122, 123 126, and 127. Meaning, each second fluid passage 924 extends such that it has two different angles relative to the central longitudinal axis 916—up-and-down, and side-to-side. Like the first fluid passages 910, forming the second fluid passages 924 at such angles encourages a vortex type flow of fluid about the central longitudinal axis 916, thereby reducing fluid turbulence during operation.

Continuing with FIGS. 124, 127, and 128, the first surface 904 of the fluid routing plug 900 may be identical to the first surface 318, shown in FIGS. 53, 55, and 56. However, an outer rim 926 of the first surface 904 may be flat rather than tapered. The second surface 906 of the fluid routing plug 900 is identical to the fluid routing plug 116, but a central base 928 formed in the second surface 906 may be slightly set back within the body 902, as compared to the central base 354, shown in FIGS. 54 and 55. An outer rim 930 on the second surface 906 may be slightly wider than the outer rim 352, shown in FIGS. 54 and 55. The intermediate surface 908 of the fluid routing plug 900 may be identical to the intermediate surface 322 of the fluid routing plug 116. Alternatively the intermediate surface may be identical to those formed on the fluid routing plug 700 or 800.

In alternative embodiments, the first and second surfaces 904 and 906 of the fluid routing plug 900 may be configured so that its tapered walls 932 and 934 are the same size, like the fluid routing plug 600. In further alternative embodiments, the first and second surfaces of the fluid routing plug 900 may be identical to the first and second surfaces of the fluid routing plug 116.

Turning to FIGS. 128A-128G, another embodiment of a fluid routing plug 950 is shown. The fluid routing plug 950 may be installed within the housing 104 in place of the fluid routing plug 116. The fluid routing plug 950 is identical to the fluid routing plug 900, with a few exceptions. The fluid routing plug 950 comprises a body 962 having a first outer surface 964 joined to a second outer surface 952 by an intermediate outer surface 966. In contrast to the fluid routing plug 900, the second surface 952 of the fluid routing plug 950 is formed identically to the second surface 856 of the fluid routing plug 850, shown in FIGS. 100A-100E. A central base 954 formed in the second surface 952 is spaced from an edge 956 of a tapered wall 958 such that a throat 960 is formed within the second surface 952. The throat 960 serves the same purpose as the throat 566 formed in the fluid routing plug 550.

Continuing with FIG. 128A-128G, a plurality of first fluid passages 968, shown in FIG. 128G, and a plurality of second fluid passages 970, shown in FIG. 128A, are formed in the body 962. The first and second fluid passages 968 and 970 are identical to the first and second passages 910 and 924 formed in the fluid routing plug 900. However, as discussed above, an opening 972 of the first fluid passages 968 may extend along a non-zero angle relative to a central longitudinal axis 974 of the body 962, as shown in FIG. 128D. In alternative embodiments, the openings 972 may be identical to the openings 918, shown in FIG. 121. Like the fluid routing plug 900, the angle at which the first fluid passages 968 are formed in the body 962 may vary, as desired, in order to increase the wall thickness within the body 962 and reduce stress in the body 962 during operation.

In alternative embodiments, the first and second surfaces 964 and 952 of the fluid routing plug 950 may be configured like the fluid routing plug 600. In further alternative embodiments, the first and second surfaces of the fluid routing plug 950 may be identical to the first and second surfaces of the fluid routing plug 116.

Turning to FIGS. 129-131, another embodiment of a fluid routing plug 1000 is shown. The fluid routing plug woo may be installed within the housing 104 in place of the fluid routing plug 116. The fluid routing plug 1000 is identical to the fluid routing plug 116, but includes a first and second annular recess 1002 and 1004 formed in its intermediate surface 1001. The first annular recess 1002 is positioned between a first bevel 1006 and a first sealing surface 1008. The second annular recess 1004 is positioned between a second sealing surface 1010 and a second bevel 1012.

When the fluid routing plug 1000 is installed within the horizontal bore 106, a small annular space exists between the wall of the housing 104 and each recess 1002 and 1004. The space provides relief areas for excess fluid or proppant to collect during operation. The first and second recesses 1002 and 1004 may also be formed in the intermediate surfaces of the fluid routing plugs 550, 600, 700, 800, 900, and 950.

In alternative embodiments, the first and second surfaces of each of the fluid routing plugs 550, 600, 700, 800, 900, and 950 may each be sized so as to engage with identically sized suction and discharge valves 292, 294, 614 or 616, as discussed with regard to fluid routing plug 600. In further alternative embodiments, the first and second surfaces of each of the fluid routing plugs 550, 600, 700, Boo, 900, and 950 may be sized so as to engage with differently sized suction and discharge valves 292, 294, 614 or 616. In such embodiment, the valves 292, 294, 614 or 616 may be sized as desired, as long as the ratio of the outer sealing diameter A to the inner sealing diameter B of each valve is preferably 1.55 or greater, as discussed with regard to FIGS. 72 and 85. The desired size of the valve may vary depending on the desired fluid velocity within the corresponding fluid routing plug.

One or more kits may be useful in assembling the fluid end section 102. A kit may comprise a plurality of housings 104 and a plurality of the corresponding fluid routing plugs 116, 550, 600, 700, 800, 900, or 950. The kit may also comprise a plurality of suction valves 292 or 614, discharge valves 294 or 616, suction valve guides 296, discharge valve guides 298 or 657, springs 452 and 528, retainer 300, stuffing box 140, retainer 232, plunger packing 224, packing nut 276, fastening system 234, discharge conduit 174, and the various seals described herein. The kit may also comprise the intake manifolds 166 and 168, pipe system 176, connect plate 118, fastening system 146 and stay rods 120. The kit may also comprise other various features described herein for use with the fluid end 100. Unless specifically described herein, the various components of the fluid end 100 may be made of high strength alloy steel, such as carbon steel or stainless steel.

The concept of a "kit" is described herein due to the fact that fluid ends are often shipped or provided unassembled by a manufacturer, with the expectation that a customer will use components of the kit to assemble a functional fluid end. Alternatively, some components are replaced during operation. Accordingly, certain embodiments within the present disclosure are described as "kits," which are unassembled collections of components. The present disclosure also describes and claims assembled apparatuses and systems by way of reference to specified kits, along with a description of how the various kit components are actually coupled to one another to form the apparatus or system.

The term "means for routing fluid" refers to the various fluid routing plugs described herein and structural equivalents thereof. The term "means for regulating fluid flow" refers to the various suction and discharge valves and suction and discharge valve guides described herein and structural equivalents thereof. A "means for pressurizing fluid" refers to the fluid end and the various embodiments of housings and components installed within or attached to the various housings described herein and structural equivalents thereof.

While not shown herein, one of skill in the art will appreciate that the fluid end 100 described herein may be formed as a single housing having a plurality of horizontal bores formed therein and positioned in a side-by-side relationship. The housing may be attached to a single, large connect plate. In further alternative embodiments, the single housing described above may be broken up into one or more sections have two or more horizontal bores formed therein. Such housings may be attached to one or more connect plates.

One of skill in the art will further appreciate that various features of the fluid routing plugs, housings, and other components described herein may be modified or changed, as desired. While not specifically shown in a figure herein, various features from one or more of the fluid routing plugs described herein may be included in another one of the plugs. Likewise, various features from one or more of the different housings described herein may be included in another one of the housings.

Power End 103

Referring now to FIGS. 132-190, the power end 103 disclosed herein includes some or all of the following features and advantages in various embodiments:

Modular construction of the power end includes individual connect plates, individual crosshead frames, and/or individual crosshead assemblies that may be individually replaced, which allows failed components to be replaced without discarding other components.

The power end assembly is held together by one or more sets of stay rods that may be disengaged and reengaged using nuts to facilitate replacement of components without cutting or welding.

Tension on the one or more sets of stay rods causes compression on the power end assembly to preload the power end assembly against working loads and/or to apply compression to components made of materials that benefit from compression.

Using a plurality of sets of stay rods enables the stay rods to be vertically offset such that deflection and stress from driving the fluid end can be reduced by moving the set of stay rods that couple the connector section to the power end assembly closer to the cylindrical axes of the plungers reciprocating in the fluid ends.

Compression from the one or more sets of stay rods is distributed throughout the power end using one or more unitary plates. The one or more unitary plates also reduce stress and displacement modular components due to static and working loads.

Different components of the power end assembly are made of different materials that are suited to different purposes. For example, components housing moving components such as the crosshead frames and crank frame may be made of ductile iron that is being compressed by plates made of high-alloy steel. Compressing the ductile iron components increases their performance (e.g., resistance to wear, working life) in various embodiments. Other components may be made of high-alloy steel for strength. The use of different materials may also reduce weight and cost of materials.

Weight is strategically reduced throughout the power end by using individual crosshead frames and through the use of weight-reducing features in the crosshead section, crank section, and various plates.

Blind nuts and/or threaded receivers in one or more of the plates allows nuts to be installed at the proper amount of torque without measuring an amount of exposed thread extending from the nuts.

Feet in the crank frame anchor the crank frame to the base section at each bearing journal and in line with bearing loads that are transferred to the feet and then to the base section.

Longer connecting arms and wider crossheads lower pressure-velocity loading of the crosshead assembly on the crosshead frames.

Using pony rod seal housings that hold the pony rod seal partially inside the crosshead frame increases the clearance around the pony rod clamp on the backstroke of the power end assembly.

Lubrication is applied at the top of the power end at both the crosshead section and the crank section, collected through a plurality of drains in the crank section, and reused in a closed lubrication system.

Spacers maintain the distance between the connect plates and the crosshead frames.

Use of seals positioned in grooves cut into components instead of gaskets avoids common problems with gaskets such as saturation and over compression.

Various bores in the crosshead frames facilitate the flow of air and lubricant from the crosshead frames to the crank section.

Various alignment dowel pins, countersunk holes, and/or sleeves facilitate alignment of components during assembly (or reassembly) of the power end assembly.

The advantages conferred by the previously described improvements are listed here for convenience. This is not an exhaustive list and it is expected that other benefits will be realized as the improvements are implemented. Omission from this list does not preclude the identification of additional benefits.

Continuing with FIGS. 132-190, the power end 103 includes a crank section 7122, a crosshead section 7124, a connector section 7126, a drive section 7130, and a base section 7140. For the sake of clarity, as used herein "front" or "front side" refers to portions of power end 103 that are proximate to fluid end 100 along a longitudinal axis and "rear" or "rear side" refers to portions of power end 103 that are distal from fluid end 100 along the longitudinal axis. Similarly, as used herein "top" or "top side" refers to portions of the power end 103 that are distal from base section 7140 along a vertical axis and "bottom" or "bottom side" refers to portions of the power end 103 that are proximate to base section 7140 along the vertical axis. Accordingly, in the embodiment shown in FIGS. 132-140, for example, connector section 7126 is in front of crosshead section 7124, which in turn is in front of crank section 7122, and fluid end 100 and power end 103 are coupled to the top of base section 7140. For consistency throughout this disclosure all references to longitudinal, transverse, vertical axes refer to the axes shown in FIG. 132. However, the axes may be defined differently, as desired.

In various embodiments, power end 103 includes crank section 7122, crosshead section 7124, and connector section 7126. Crank section 7122 is configured to receive rotational motion (e.g., from drive section 7130). As discussed herein, crank section 7122 includes a crank frame (e.g., crank frame shown in FIG. 133), a crankshaft (e.g., crankshaft 7212 shown in FIG. 133), and various components that facilitate the rotation of the crankshaft within the crank frame (e.g., the components shown in FIG. 179) and the coupling of crank section 7122 to crosshead section 7124, drive section 7130, and base section 7140. Thus, "a first means for receiving rotational motion" includes crank section 7122 and its components and the equivalents therefore. As recited herein, crank section 7122 (and its equivalents) may be referred to as "a first means for receiving rotational motion." Crank section 7122 and its various components are discussed herein in further detail in reference to FIGS. 179-189.

Figure 1:
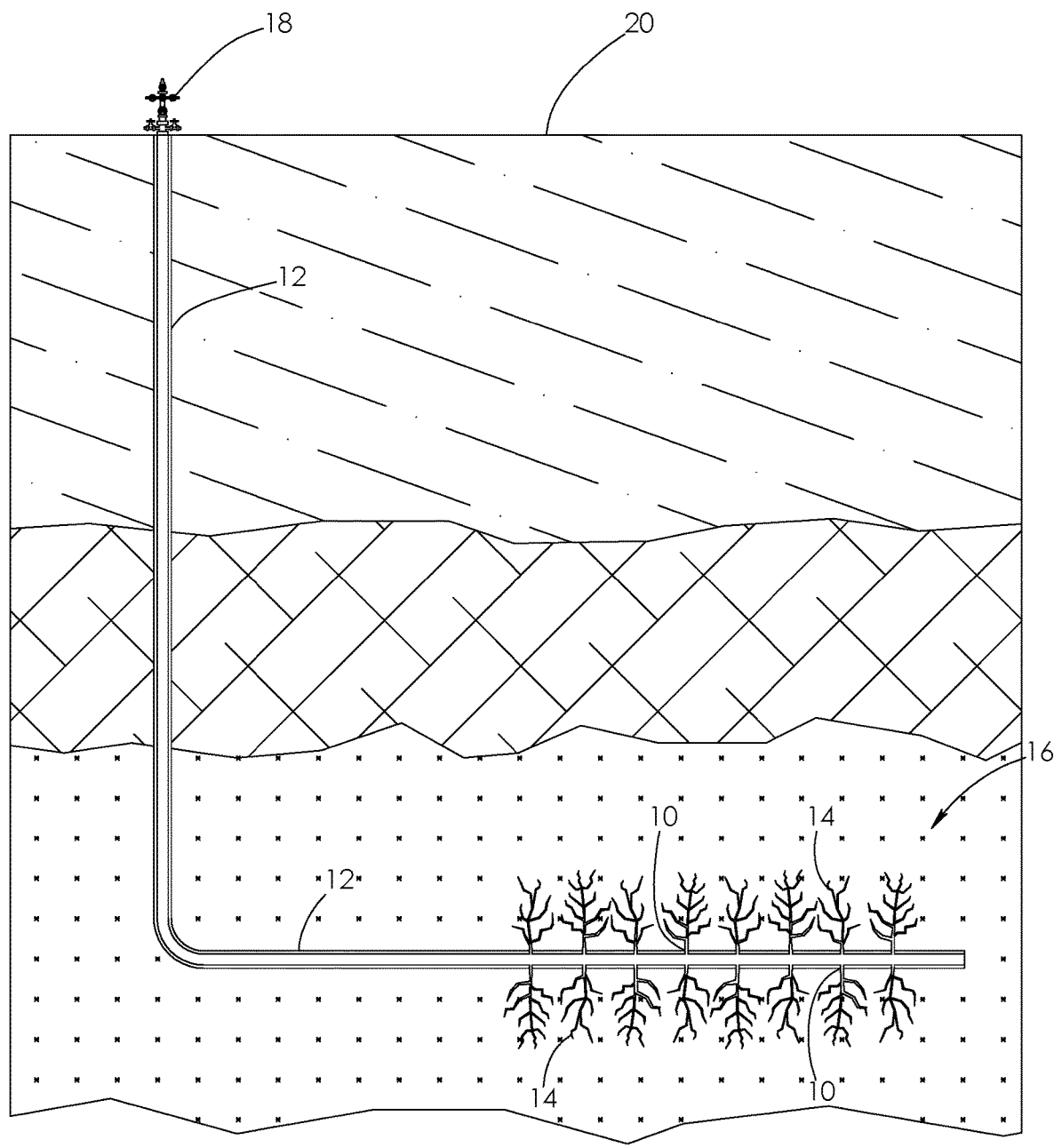
FIG. 1 is an illustration of the underground environment of a hydraulic fracturing operation.
Figure 2:
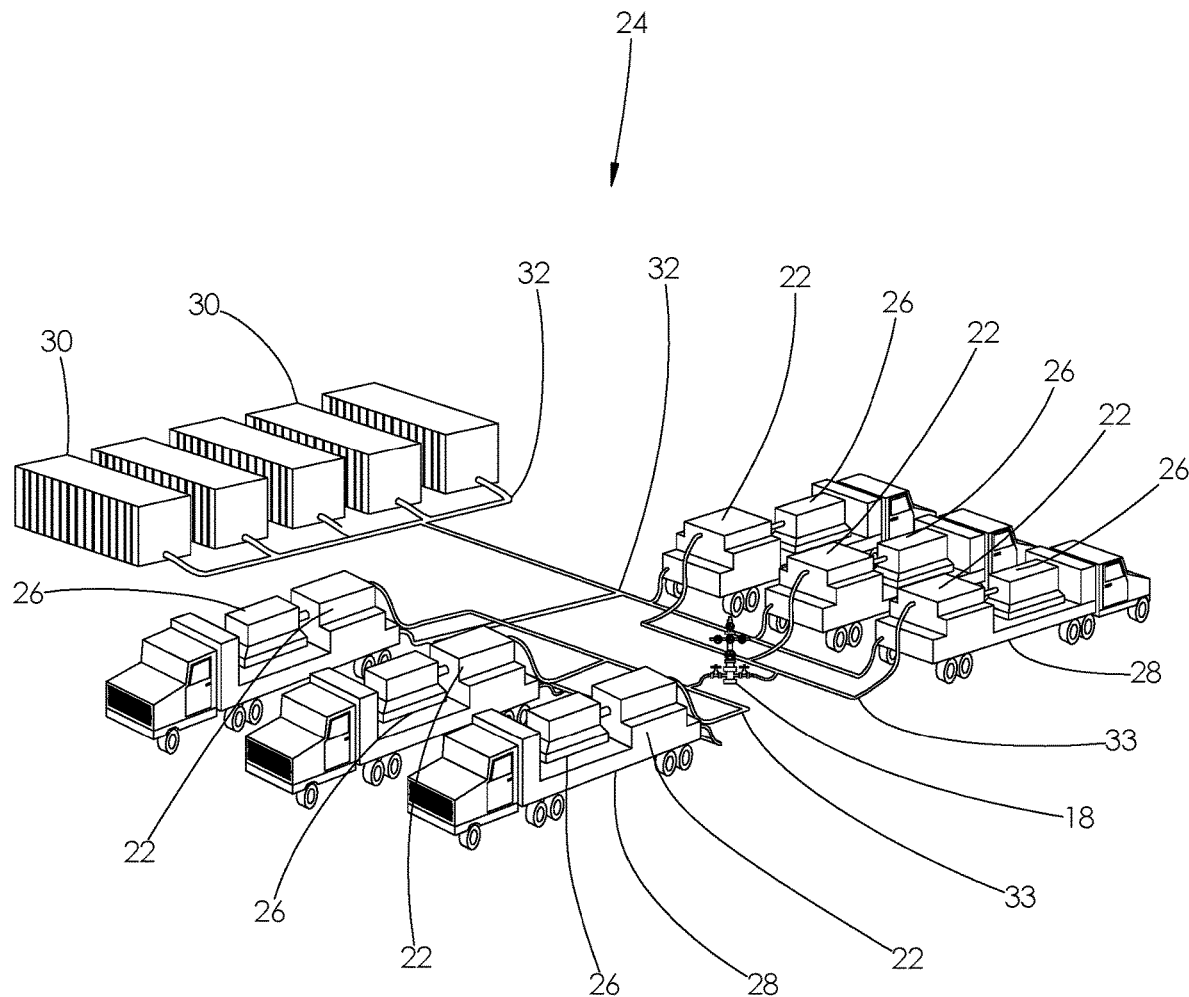
FIG. 2 illustrates above-ground equipment used in a hydraulic fracturing operation.

Crosshead section 7124 is configured to couple to crank section 7122 and to translate the rotational motion into linear motion. In various embodiments, crosshead section 7124 includes a plurality of individual crosshead frames (e.g., crosshead frames 220 shown in FIG. 2) and a plurality of crosshead assemblies (e.g., crosshead assemblies 71700 shown in FIG. 17). As recited herein, crosshead section 7124 (and its equivalents) and its components (and their equivalents). may be referred to as "a second means for translating rotational motion into linear motion." Crosshead section 7124 and its various components are discussed herein in further detail in reference to FIGS. 163-179.

Connector section 7126 is configured to couple to fluid end 100 (e.g., by coupling to individual fluid end sections 102) such that the linear motion is applied to fluid end Dm. Connector section 7126 may include one or more connect plates (e.g., individual connect plates 118 shown in FIG. 133) and one or more spacers (e.g., spacers 122 shown in FIG. 133). As recited herein, connector section 7126 (and its equivalents) and its various components (and their equivalents) may be referred to as "a third means for coupling to a fluid end 100 such that linear motion is applied to a fluid end assembly." Connector section 7126 and its various components are discussed herein in in further detail in reference to FIGS. 139-149A.

In various embodiments, the high pressure pump 101 is powered using one or more drive sections 7130. In various embodiments, drive section 7130 includes a planetary gearset, although any other suitable gear configuration could be used. In various embodiments shown in FIG. 132, drive section 7130 is powered by a diesel motor and applies rotational motion to crank section 7122 at one end. In other embodiments, drive section 7130 is powered by one or more electrical motors and applies rotational motion to crank section 7122 at one end or by a dual drive section 7130 in which rotational motion is applied at both ends of crank section 7122.

The power end 103 includes base section 7140 that is configured to couple to various components of crank section 7122 and/or crosshead section 7124. In various embodiments, by coupling crank section 7122 and crosshead section 7124 to base section 7140, the various components of crank section 7122 and crosshead section 7124 are secured to one another such that these components do not move relative to each other as the high pressure pump 101 operates. Further, base section 7140 is itself coupled to a truck or a trailer (not shown), such that the high pressure pump 101 may be moved to a drill site or around the drill site. Base section 7140 is discussed in further detail here in reference to FIG. 190.

Figure 133:
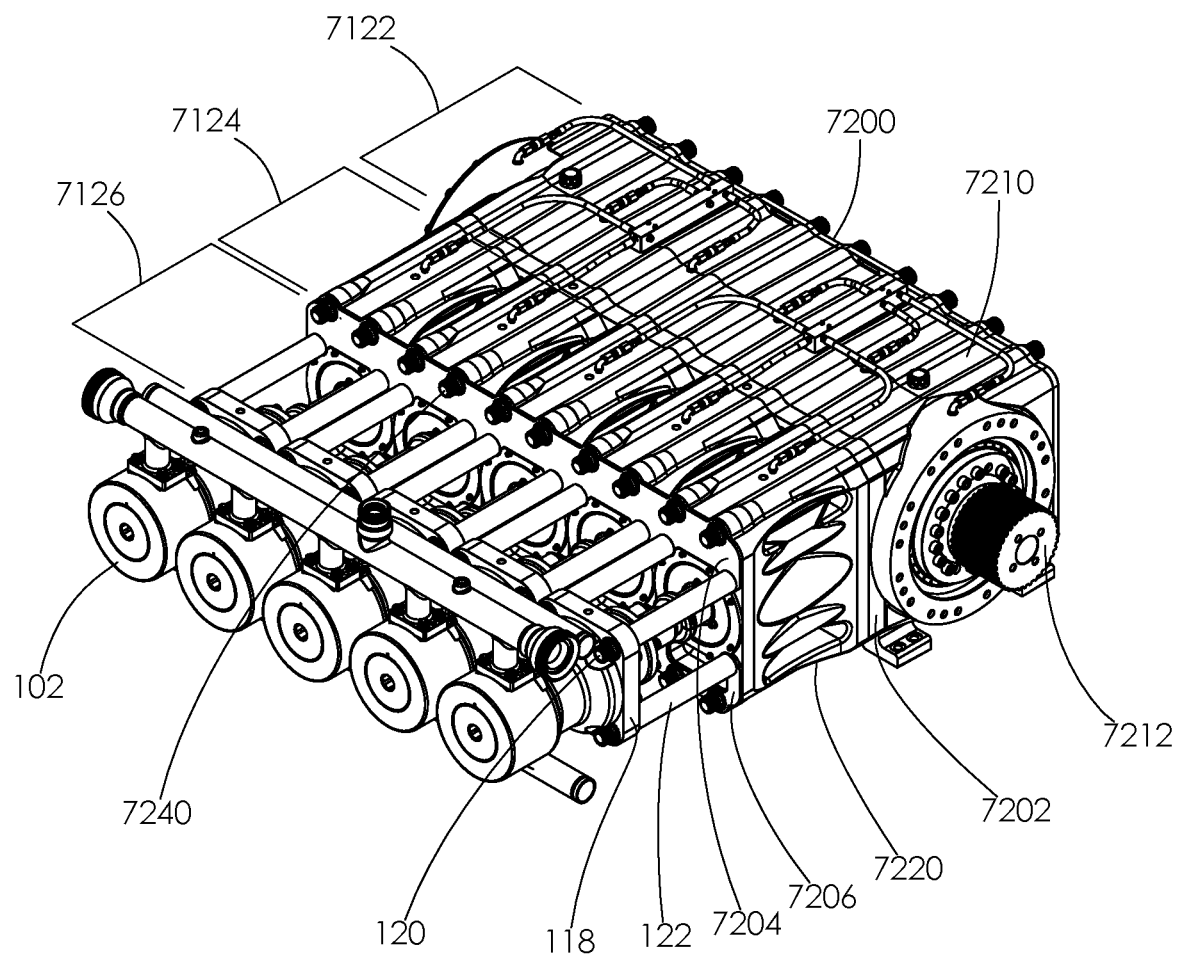
Figure 134:
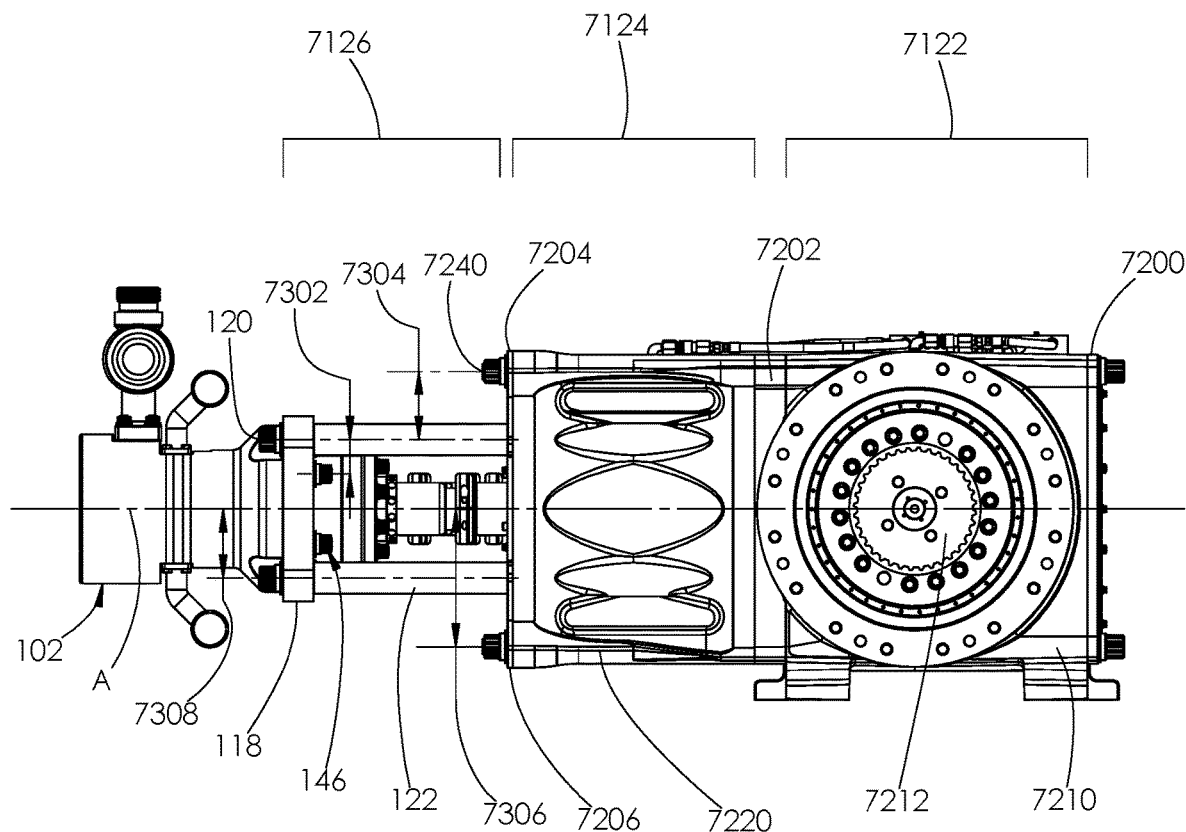
Figure 135:
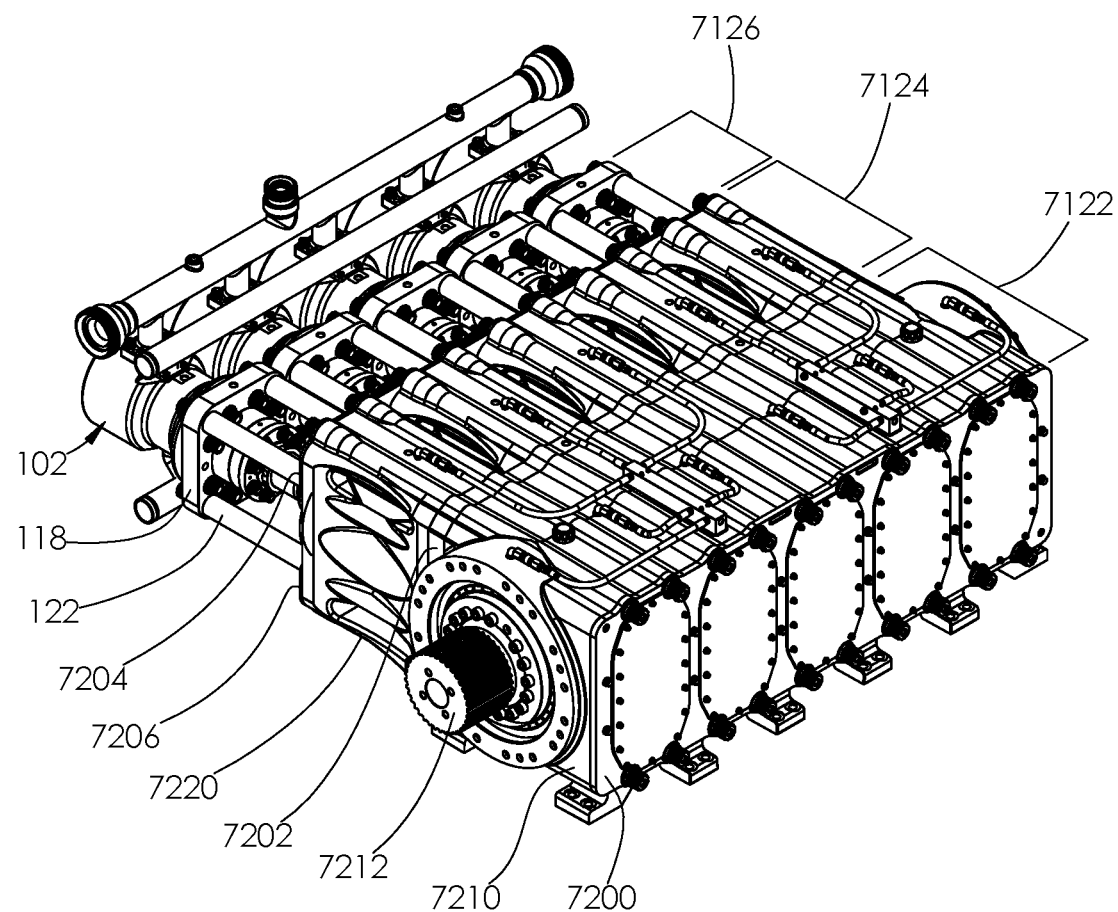
Figure 136:
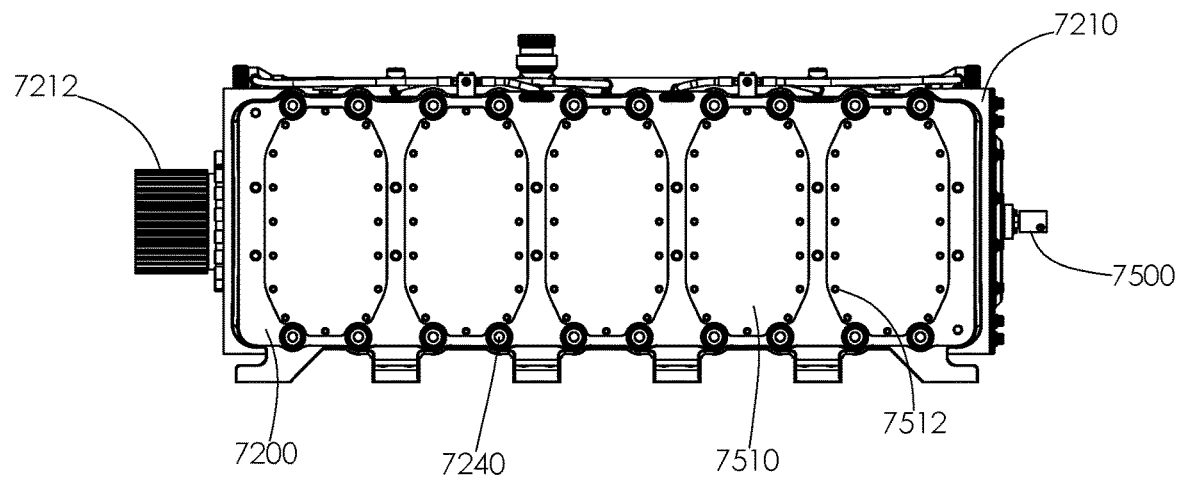
Figure 137:
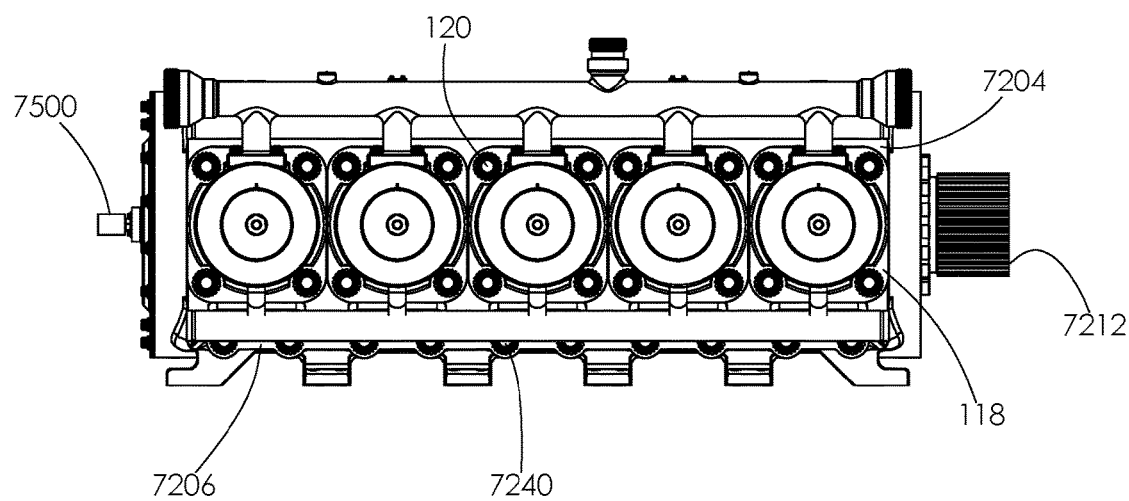
Figure 138:
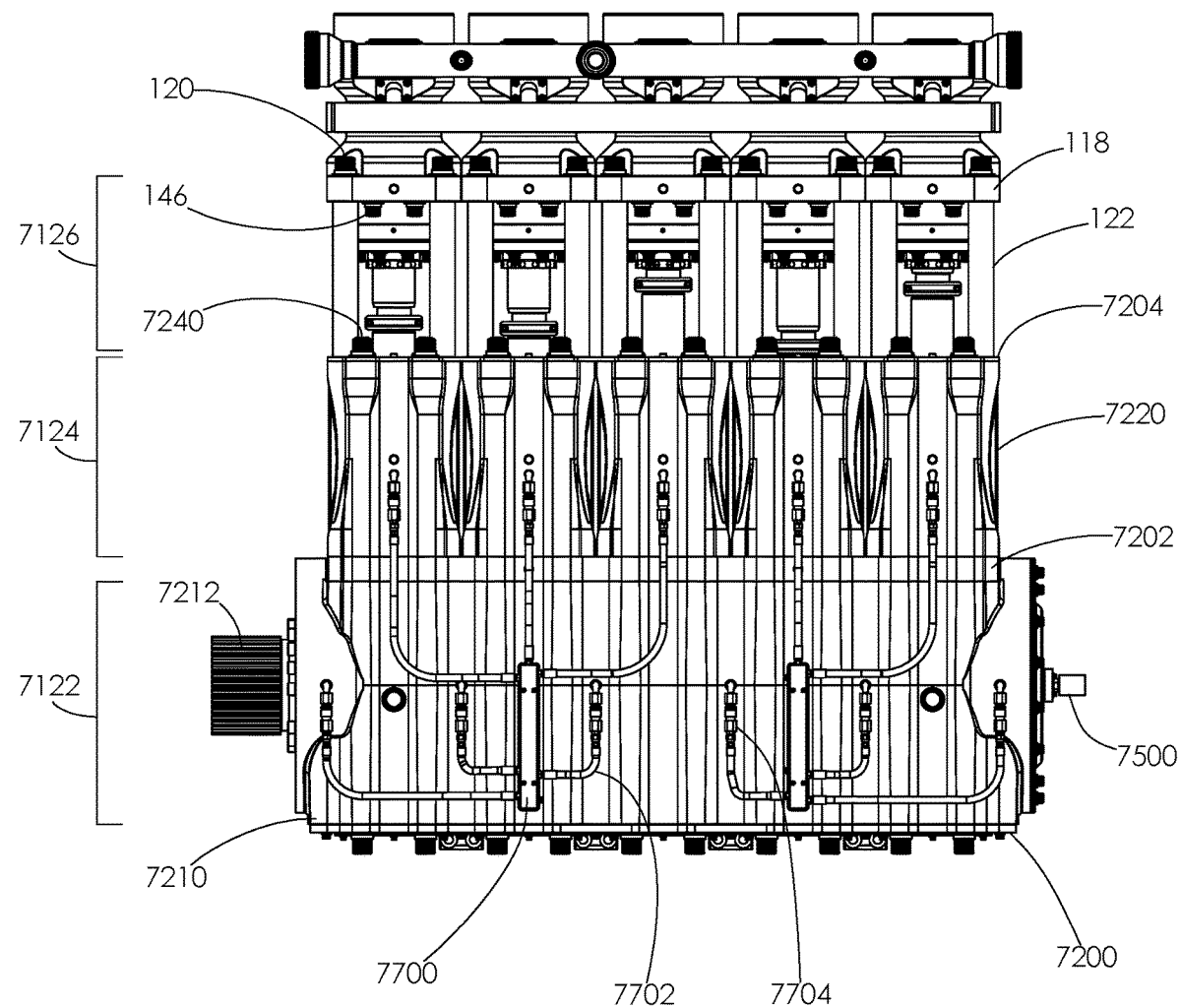

Referring now to FIGS. 133-138, the high pressure pump 101 is shown in further detail with drive section 7130 and base section 7140 removed. FIG. 133 is a front prospective view, FIG. 134 is a side view, FIG. 135 is a rear prospective view, FIG. 136 is a rear elevational view, FIG. 137 is a front elevational view, and FIG. 138 is a top view. In the embodiment shown in FIGS. 133-138, pump 101 includes a plurality of plates and rods that couple the crank section 7122, crosshead section 7124, and connector section 7126 together.

As shown in FIG. 133, such plates include a rear support plate 7200 (also referred to herein as a crank section support plate), a central support plate 7202 (also referred to herein as a center support plate), and one or more front support plates such as a top front support plate 7204 and a bottom front support plate 7206. In various embodiments, rear support plate 7200 is coupled to a rear side of the crank section 7122, central support plate 7202 is coupled to a front side of crank section 7122 and a rear side of crosshead section 7124 (and is thus disposed between crank section 7122 and crosshead section 7124), and top front support plate 7204 and bottom front support plate 7206 are coupled to the front of crosshead section 7124. In the embodiment shown in FIGS. 132-140, two sets of stay rods (also referred herein as sets of rods) hold high pressure pump 100 together: a first set of rods 7240 (also referred to herein as crank stay rods 7240 and stay rods 7240) and a second set of rods 120 (also referred to herein as connect plate stay rods 120 and stay rods 120), which are also discussed with regard to FIG. 6A. In the embodiment shown in FIGS. 132-140, (a) the first set of rods 7240 couples together top front support plate 7204 and bottom front support plate 7206, crosshead section 7124, central support plate 7202, crank section 7122, and rear support plate 7200, and (b) second set of rods 120 couples together connector section 7126, top front support plate 7204 and bottom front support plate 7206, crosshead section 7124, and central support plate 7202. As discussed herein, in various embodiments, fewer than two sets of stay rods may be used, more than two sets of stay rods may be used, and/or the sets of stay rods may be used to couple the crank section 7122, crosshead section 7124, and connector section 7126 differently than shown in FIGS. 133-138. Further, in various embodiments, the various plates 7200, 7202, 7204, and 7206 may have different top and bottom profiles to match the shape of various embodiments of crank section 7122 and crosshead section 7124. Additionally, various embodiments of high-pressure hydraulic fracturing pump discussed herein do not include some or all of plates 7200, 7202, 7204, and 7206. Second set of rods 120 are discussed in further detail herein in reference to FIGS. 144-149A. First set of rods 7240 are discussed in further detail herein in reference to FIGS. 150-162. Rear support plate 7200 is discussed in further detail herein in reference to FIGS. 150 and 180. Central support plate 7202 is discussed in further detail herein in reference to FIGS. 150 and 164. The one or more front support plates (e.g., top front support plate 7204, bottom front support plate 7206) are discussed in further detail herein in reference to FIGS. 150 and 163.

Crank section 7122 includes a crank frame 7210 and crankshaft 7212. As discussed herein, rotational motion is applied to crankshaft 7212 (e.g., by drive section 7130), which in turn rotates within crank frame 7210. Referring now to FIG. 136 individually, in various embodiments in which crank section 7122 is driven by a drive section 7130 on one side (as shown in FIG. 132), crank section 7122 includes a lubrication inlet 7500, which is configured to attach to the crank section 7122 at the side that is opposite to drive section 7130 to facilitate lubrication of crankshaft 7212. In the embodiments shown in FIG. 136, crank section 7122 includes a plurality of maintenance covers 7510 secured to rear support plate 7200 by a plurality of fasteners 7512 (e.g., machine screws that may be driven by a hex driver). The various components of crank section 7122, crank frame 7210, and crankshaft 7212 are discussed in further detail herein in reference to FIGS. 179-189.

In various embodiments, crosshead section 7124 includes a plurality of individual crosshead frames 7220. In such embodiments, the individual crosshead frames 7220 house respective crosshead assemblies (e.g., crosshead assembly 71700 shown in FIG. 144) configured to translate rotational motion from crankshaft 7212 into linear motion useable to drive a plunger of a fluid end section 102 (e.g., plunger 290 shown in FIG. 139). The various components of crosshead section 7124 and crosshead frames 7222 are discussed in further detail herein in reference to FIGS. 162-178.

In various embodiments, connector section 7126 includes a plurality of individual connect plates 118 and a plurality of spacers 122, also shown in FIGS. 6A and 10-13. Referring now to FIG. 134 individually, as discussed above, the individual connect plates 118 are configured to couple to respective fluid end sections 102 using the fastening system 146, also shown in FIG. 17. In various embodiments, the number of individual connect plates 118 (and the number of crosshead frames 7220) corresponds to the number of fluid end plungers (e.g., plunger 290 shown in FIG. 20 and also discussed in reference to FIG. 139) which are powered by power end 103. As discussed above, the fluid end 100 includes a plurality of individual fluid end sections 102 that each has its own plunger 290. In such embodiments, each individual fluid end section 102 has a corresponding individual connect plate 118 and crosshead frame 7220 (e.g., in embodiments with five fluid end sections 102, there are five individual connect plates 118 and crosshead frames 7220). Some embodiments of spacers 122 are discussed below in reference to FIGS. 141-143, and an alternative embodiment of spacers 122A is discussed below in reference to FIG. 149A. In various embodiments of power end 103, either of spacers 122 or spacers 122A may be used with corresponding modifications to connect plate 118 and plates 7204 and 7206.

As shown in FIG. 134, in various embodiments, parts of the fastening system 146 are vertically offset from second set of rods 120 by vertical offset 7302, and second set of rods 120 are vertically offset from first set of rods 7240 by vertical offset 7304. In various embodiments, vertical offset 7302 is between 2 and 4 inches and vertical offset 7304 is between 5 and 7 inches. As shown in FIG. 134, a vertical offset 7306 between the first set of rods 7240 and a longitudinal centerline A of the power end 103 is greater than a vertical offset 7308 between the second set of rods 120 and the centerline A. In various embodiments, vertical offset 7306 is between 12 and 14 inches and vertical offset 7308 is between 5 and 7 inches. In embodiments such as those shown in FIGS. 132-138, the connections coupling power end 103 together and coupling power end 103 to fluid end 100 may be referred to collectively as "step down connections." The stay rods 7240 connect the crank section 7122 to the crosshead section 7124, compressing the central support plate 7202 between them. The connect plate stay rods 120 connect the crosshead section 7124 to the connect plates 118. Then finally the connect plates 118 are connected to the fluid end sections 102 using the fastening system 146. As the connections get closer to the front of the pump 101, they get closer together vertically, or they "step down." The vertical distance between the lowest stay rod 7240 and highest stay rod 7240 (i.e., vertical offset 7306 doubled) is larger than the vertical distance between the lowest connect plate stay rod 120 and the highest connect plate stay rod 120 (i.e., vertical offset 7308 doubled). In like manner, the vertical distance between the lowest connect plate stay rod 120 and the highest connect plate stay rod 120 is greater than the vertical distance between the lowest fastening system 146 and the highest fastening system 146. These step downs minimize flexure in the entire assembly, allow for ease of assembly and disassembly, and generate a better fit between components in various embodiments.

In various embodiments, the first set of rods 7240 couples together top front support plate 7204 and bottom front support plate 7206, crosshead section 7124, central support plate 7202, crank section 7122, and rear support plate 7200 such that when the first set of rods 7240 is in a state of tension (e.g., by applying torque to the nuts 72400 shown in FIG. 150), the top front support plate 7204 and bottom front support plate 7206, crosshead section 7124, central support plate 7202, crank section 7122, and rear support plate 7200 are compressed. Similarly, in various embodiments, the second set of rods 120 couples together connector section 7126, top front support plate 7204 and bottom front support plate 7206, crosshead section 7124, and central support plate 7202 such that when the second set of rods 120 is in a state of tension (e.g., by applying torque to the nuts 7132 shown in FIG. 140) the individual connect plates 118, spacers 122, top front support plate 7204 and bottom front support plate 7206, crosshead section 7124, and central support plate 7202 are compressed. Further, because first set of rods 7240 extends all of the way through the top and bottom of crosshead section 7124 and crank section 7122, the individual crosshead frames 7220 and crank frame 7210 are compressed. Accordingly, these components in compression are preloaded above working loads (e.g., deflection and stress on the individual connect plates 118 from reciprocating plungers of fluid end 100) and from the force of gravity on the fluid end 100.

Thus, in the embodiments discussed herein in reference to FIGS. 132-190, first set of rods 7240 couples together top front support plate 7204 and bottom front support plate 7206, crosshead section 7124, central support plate 7202, crank section 7122, and rear support plate 7200 and second set of rods 120 couples together connector section 7126, top front support plate 7204 and bottom front support plate 7206, crosshead section 7124, and central support plate 7202. Other arrangements of stay rods may be employed in different embodiments, however, while still including other aspects of the disclosure (e.g., individual connect plates 118, individual crosshead frames 7220, single-plunger fluid end sections 102, blind nuts 72408 shown in FIG. 150, various alignment pins and lubrication features discussed herein).

In various embodiments, the individual crosshead frames 7220 and crank frame 7210 are made (at least in part) of ductile iron, and first set of stay rods 7240, second set of stay rods 120, rear support plate 7200, central support plate 7202, top front support plate 7204, and bottom front support plate 7206 are made (at least in part) of high alloy steel. By using different materials in different applications, different beneficial properties of the different materials can be used to improve the overall performance of power end 103. As will be understood, ductile iron (also referred to as ductile cast iron, spheroidal graphite cast iron, or nodular cast iron) has improved impact and fatigue resistance, elongation, and wear resistance due to the spherical (round) graphite structures in the metal. Further, as the individual crosshead frames 7220 and crank frame 7210 are subjected to wear, the graphite embedded in the ductile iron may act as an additional dry lubricant around the crankshaft 7212 and crosshead assembly as they move. Additionally, the geometry of crank frame 7210 and the individual crosshead frames 7220 may be easier to manufacture with ductile iron because crank frame 7210 and the individual crosshead frames 7220 can be cast from molten ductile iron, which may be easier and less expensive than machining crank frame 7210 and the individual crosshead frames 7220 from blocks of high alloy steel in various instances. In contrast, high alloy steel (compared to ductile iron or carbon steel) has greater properties of strength, hardness, toughness, wear resistance, corrosion resistance, hardenability, and hot hardness. Thus, a high alloy steel is better able to accept and distribute stress from tension on first set of rods 7240 and second set of rods 120, and from deflection from the reciprocating plunger and individual connect plates 118. Further, because the rear support plate 7200, central support plate 7202, top front support plate 7204, and bottom front support plate 7206 are plates with various bores and cutouts discussed herein, machining them from larger plates is relatively easier and less expensive than it would be to machine crank frame 7210 and the individual crosshead frames 7220 from blocks of high alloy steel. In various embodiments, first set of rods 7240, second set of rods 120, connect plates 118, spacers 122, and/or fastening system 146 may also be made (at least in part) of high alloy steel, In various embodiments, by using two sets of rods 7240 and 120, the functions performed by the rods 7240 and 120 may be applied more precisely (i.e., compared to embodiments in which a single set of stay rods are used to couple together connector section 7126, crosshead section 7124, and crank section 7122). In such embodiments, second set of rods 120 is configured to remove high deflection and high stress in the connect plate 118 that might not be as effectively removed in an embodiment having a single set of stay rods because the single set of stay rods would be spaced too far from the cylindrical axis of the plunger (i.e. centerline A shown in FIG. 134) to effectively eliminate the deflection and stress if they were the only set of stay rods used. In contrast, by being closer to centerline A, second set of rods 120 decreases deflection and stress on individual connect plates 118, spacers 122, and second set of rods 120 is decreased because the vertical offset 7306 is closer to centerline A. As a result, the service life of these components may be increased.

Referring now to FIG. 138 individually, power end 103 includes a lubrication system 7700 and a plurality of fastening systems 146 that are configured to secure fluid end 100 to connector section 7126. In various embodiments, lubrication system 7700 includes a lubrication distribution manifold 7706 that is coupled to lubrication conduits 7702 and connectors 7704. In various embodiments, lubrication distribution manifold 7706 receives lubricant from a lubrication system (not shown) and distributes lubricant to crank section 7122 and crosshead section 7124 via the lubrication conduits 7702 and connectors 7704. In various embodiments, the lubrication system 7700 for the power end 103 is coupled to a lubrication pump (not shown) to provide pressure to the lubricant to carry the pressurized lubricant to the different input locations on the power end 103 corresponding to the connectors 7704. In various embodiments discussed in further detail in reference to FIGS. 144-179, during operation lubricant is provided to inlet ports of crosshead section 7124 at each crosshead frame 7220 to lubricate crosshead section 7124 (e.g., lubrication inlet bore 71900 shown in FIG. 146) as the crosshead (e.g., crosshead assembly 71700 shown in FIG. 144) reciprocates. In various embodiments discussed in further detail in reference to FIGS. 180-189, lubricant is provided to crank section 7122 on both ends of crankshaft 7212 and at each bearing journal in crank frame 7210 (e.g., at lubrication ports 75422 shown in FIG. 180) to provide lubrication to crankshaft 7212 and the corresponding portions of crank frame 7210. Further, in various embodiments, lubricant is allowed to flow out of crosshead section 7124 and into crank section 7122. After lubricating crank section 7122 and crosshead section 7124, lubricant drains out of the bottom of crank section 7122 (e.g., through drains 71908 shown in FIG. 146). This lubricant can be collected, filtered, supplemented as needed, and recirculated through lubrication system 7700 in various embodiments.

In various embodiments, the lubrication of the power end's 103 moving components is accomplished with a closed lubrication system 7700. In this description, a closed lubricant system is defined as the lubricant being separate and distinct from the fluid being pumped. A closed lubricant system is further defined to reuse the lubricant. Reuse of the lubricant involves gathering the lubricant after use, filtering it, and reusing it. Periodic addition of makeup lubricant is allowed.

Second Set of Rods 120, Connector Section 7126, and Lubrication System 7700

Figure 144:
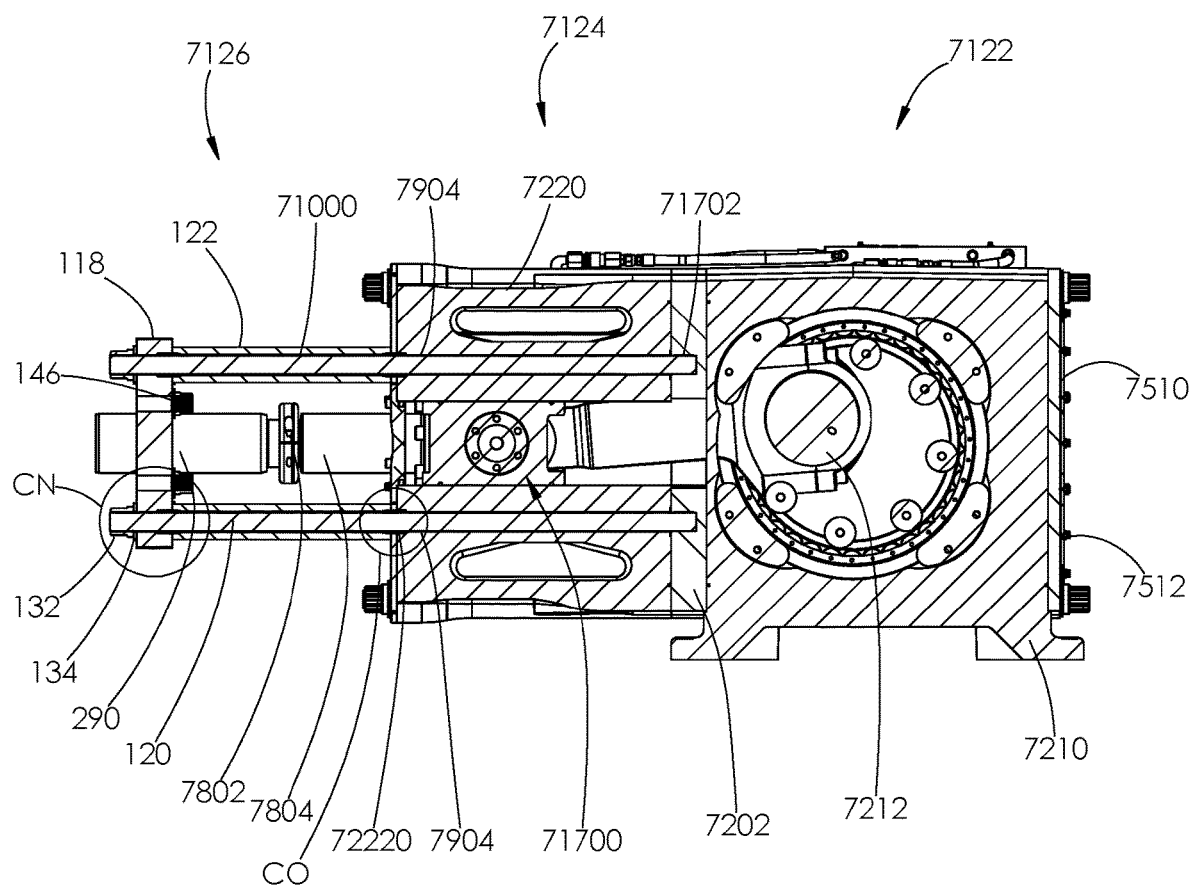
Figure 145:
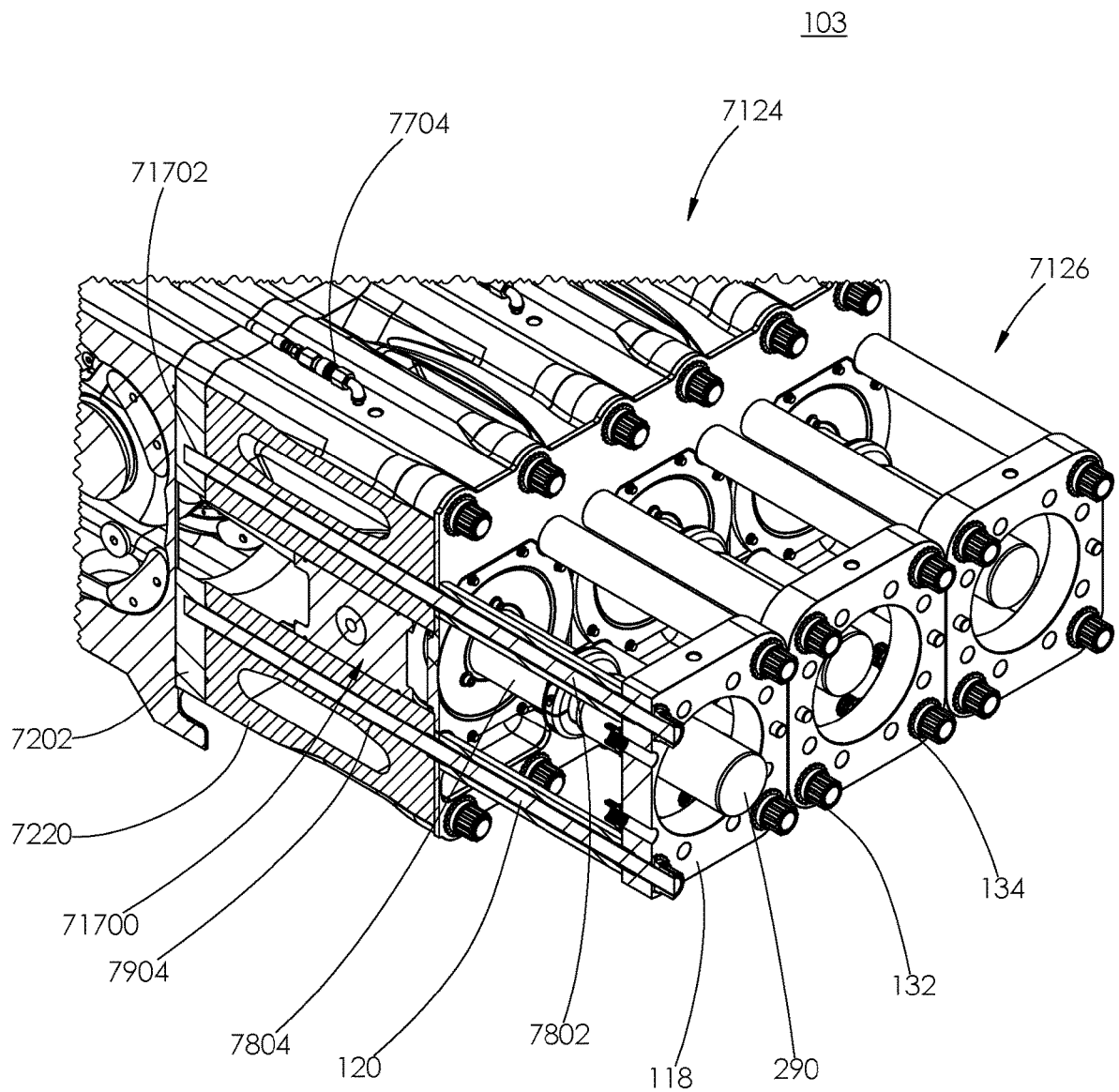
Figure 146:
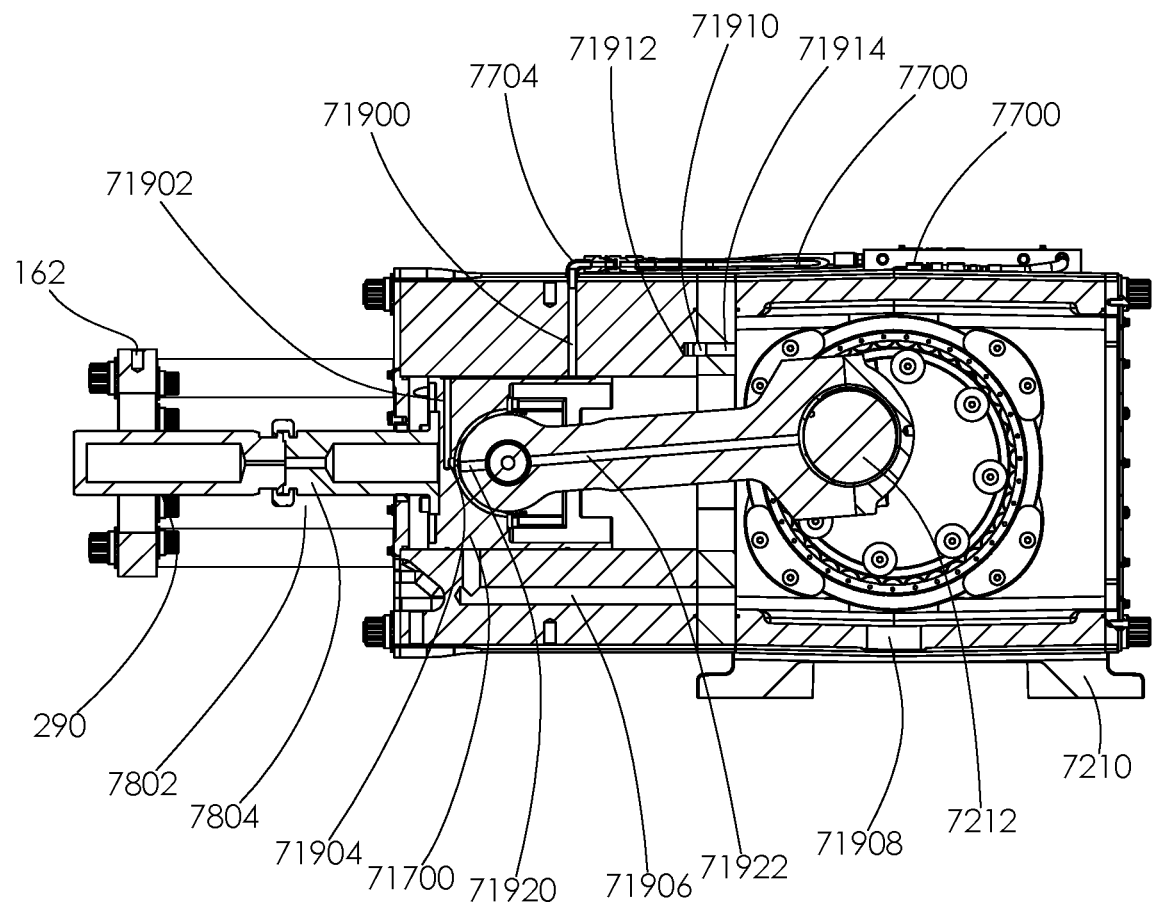
Figure 147:
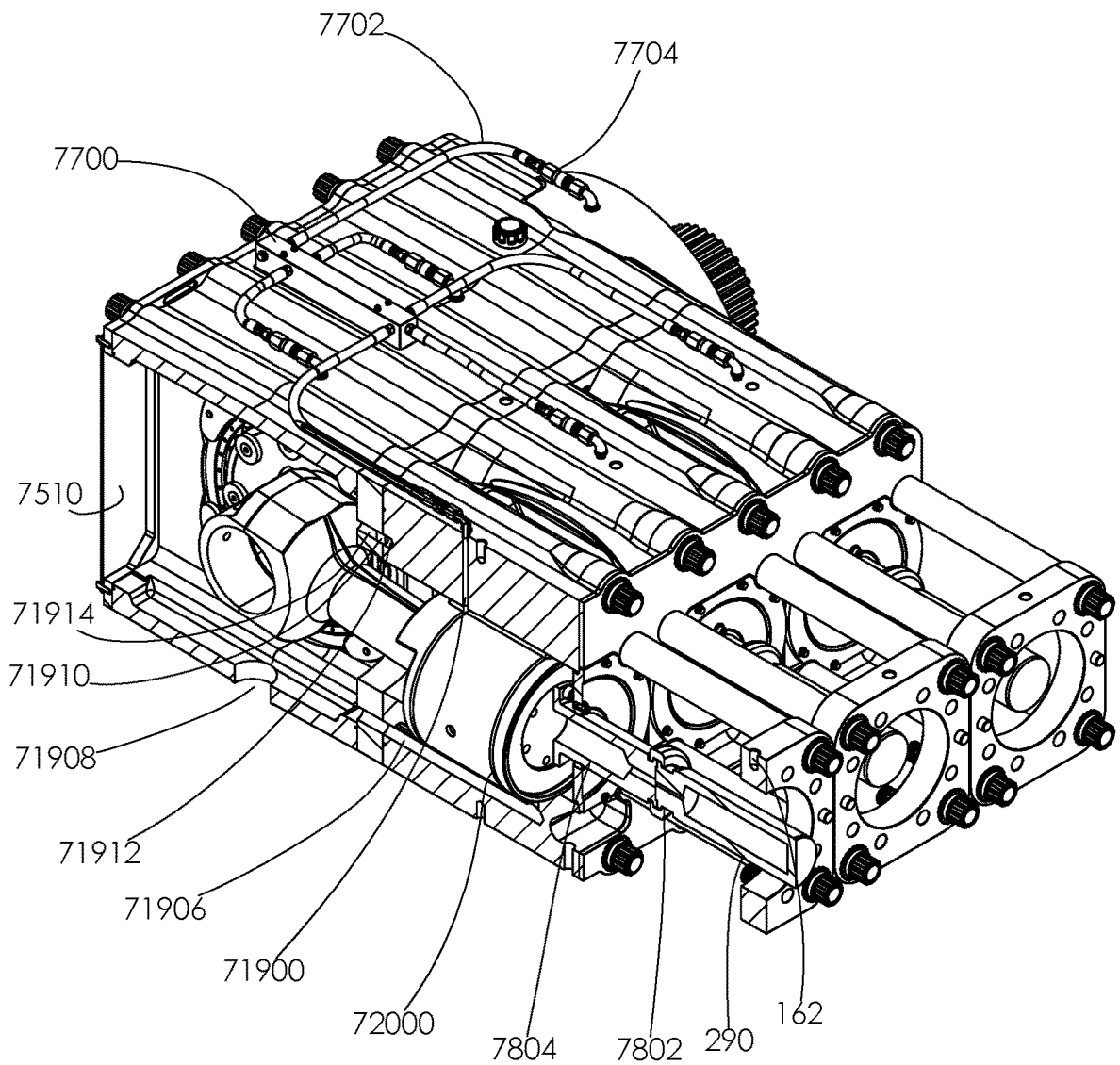
Figure 148:
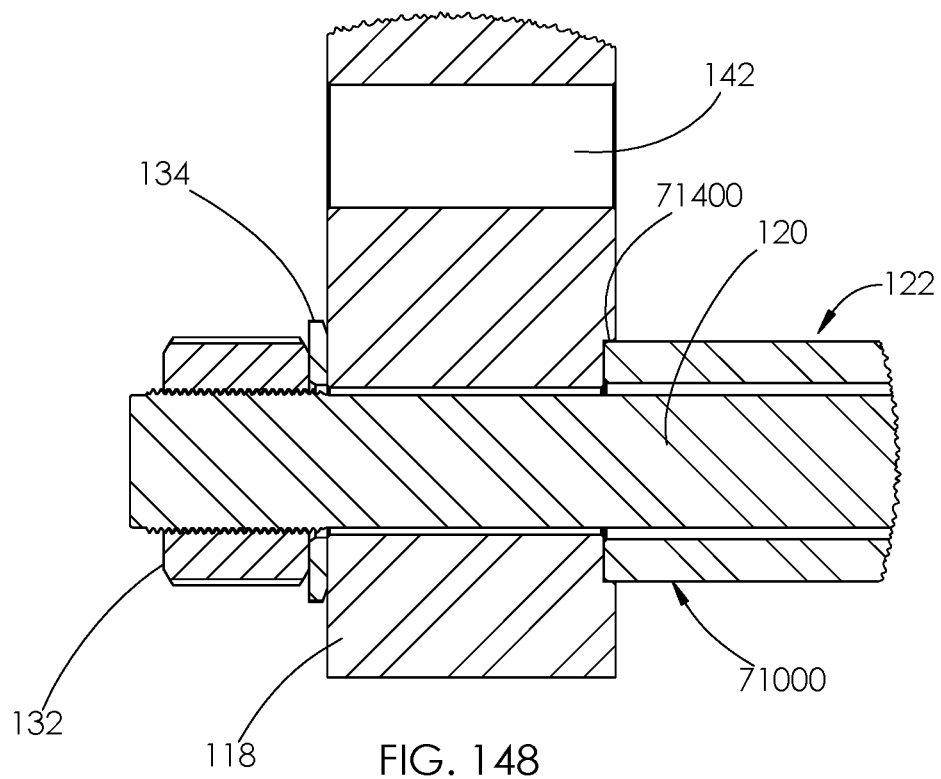
Figure 149:
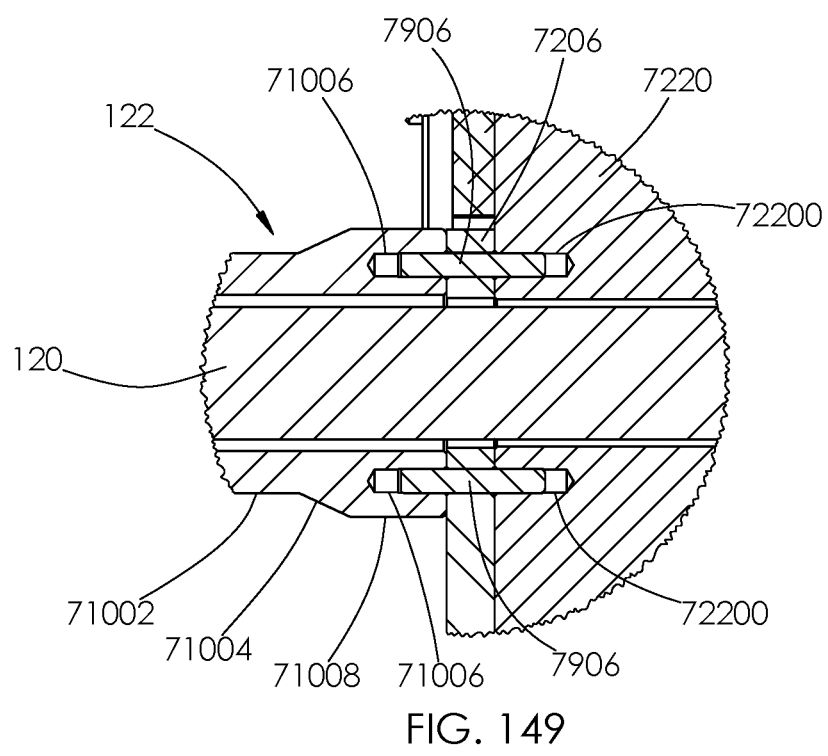
Figure 149A:
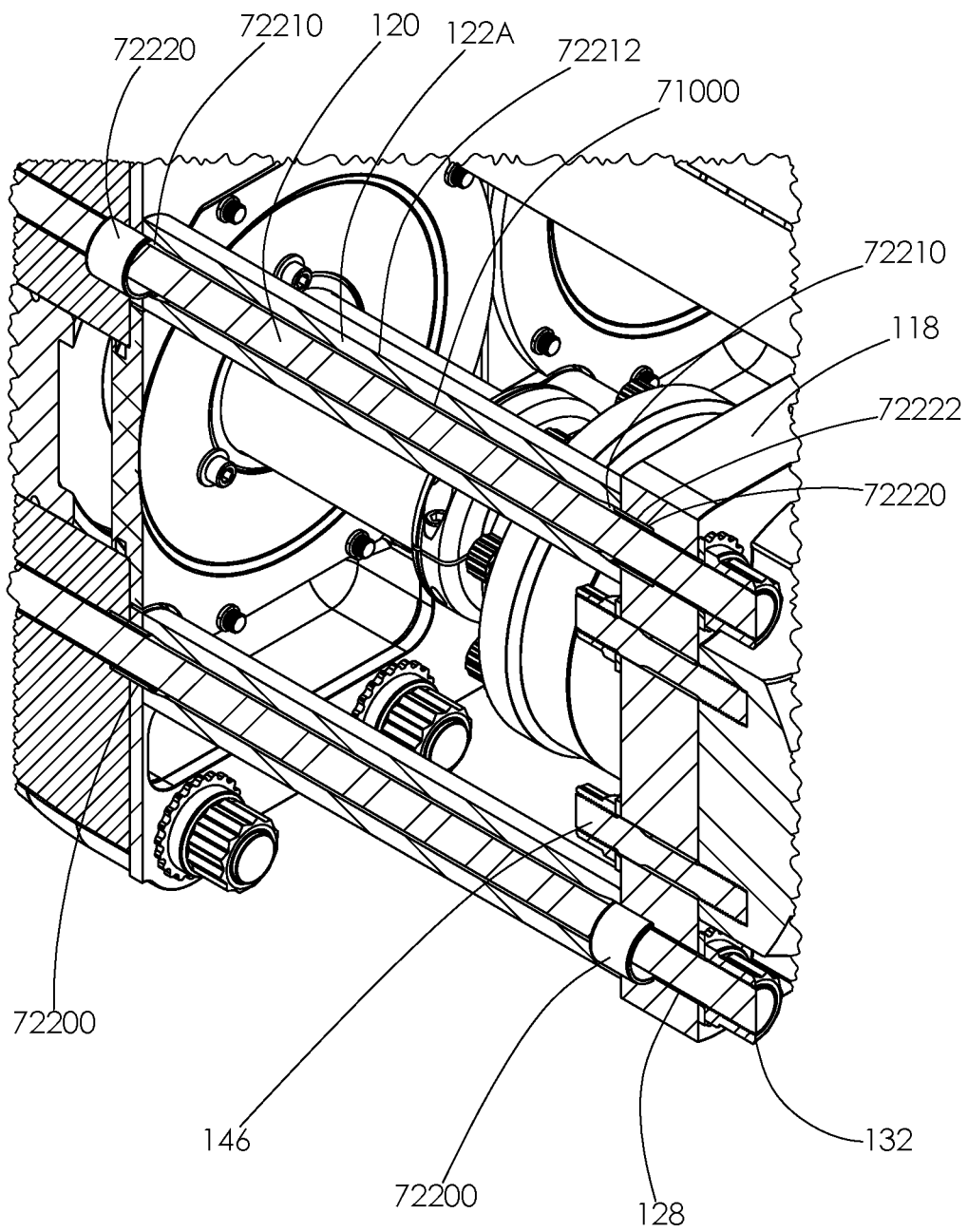

Referring now to FIGS. 139-149A, power end 103 and components thereof (with a particular focus on second set of rods 120, connector section 7126, and lubrication system 7700) are shown in further detail. FIG. 139 is a front perspective view of power end 103, FIG. 140 is a front perspective view of power end 103 with connector section 7126 exploded, FIGS. 141-143 and 147-149 are various views of components of connector section 7126, FIGS. 144 and 146 are cut-away side views of power end 103, and FIGS. 145 and 149A are cut-away front perspective views of power end 103.

Referring individually to FIG. 139, power end 103 is shown with fluid end 100 removed. With fluid end 100 removed, the plurality of plungers 290 that reciprocate within fluid end 100 are easier to view. The individual plungers 290 are coupled to a pony rod 7804 by a pony rod clamp 7802. As discussed in further detail herein, pony rod 7804 is a part of the crosshead assembly (e.g., crosshead assembly 71700 shown in FIG. 144) that reciprocates as a result of the crankshaft 7212 rotating. FIG. 139 also includes two vertical lines CA and CB at which cross-sections are taken to show internal structure of power end 103. Line CA bisects two of the second set of rods 120. Line CB bisects connect plate 118.

Returning to FIG. 140, a front perspective view of power end 103 with a portion of connector section 7126 exploded is shown. As can be seen from FIG. 146, when power end 103 is assembled, individual rods 120 of the second plurality of rods 120 are disposed through bores in connect plate 118, as described with reference to FIGS. 10-13 and 16. In various embodiments, washers 134 are configured so that they eliminate the need for a torque reaction arm when engaging the nuts 132. For example, the washers 134 may be HYTORC™ washers. In various embodiments, the washers 134 may also include a lock washer to prevent the nuts 132 from backing off due to vibration. In various embodiments, during assembly, the washers 134 are placed on the protruding threaded end of the rods 120, and nuts 132 are torqued to between 2500 lb.-ft. and 4000 lb.-ft. In various embodiments, spacers 122 are aligned to top front support plate 7204 and bottom front support plate 7206 using a plurality of alignment dowels 7906 (shown in FIG. 149) that are received by corresponding recesses in spacers 122 and plates 7204 and 7206. In various embodiments, spacers 122A are aligned to connect plate 118, top front support plate 7204, and bottom front support plate 726 using a plurality of sleeves 72220 (discussed in reference to FIG. 149A).

FIGS. 141-143 are a rear perspective view, a rear view, and a cutaway side view of an embodiment of spacer 122. As shown, spacer 122 includes a connect plate stay rod through hole 71000, a smaller diameter linear section 71002, a conical transition section 71004, a larger diameter linear section 71008, and a plurality of alignment dowel pin holes 71006. FIGS. 141 and 142 also include a vertical line CC bisecting alignment dowel pin holes 71006. FIG. 143 is a cutaway side view of a cross section of spacer 122 taken at line CC.

Turning back to FIGS. 10-13, each of the first passages 128 formed in the connect plate 118 have counterbores 129 on the second surface 126 of the connect plate 118. The diameter of the counterbore 129 is the same as the outside diameter of the smaller diameter linear section 71002 of the spacer 122. Using a second plurality of stay rods 120 allows the first passages 128 to be placed closer, vertically, to the second passages 142 formed in the connect plate 118 and used to attach the fluid end section 102 to the connect plate 118. This reduced distance between the two mounting points significantly reduces the deflection of the connect plate 118 during operation, particularly about the transverse axis. While the connect plate 118 shown in FIGS. 10-13 is a substantially flat plate, it will be understood that connect plate 118 may have a concave or convex shape. Further, in some embodiments, each of the first passages 128 may also have counterbores on the first surface 124 of the connect plate 118. In such embodiments, at least part of a nut 132 and washer 134 may be disposed within the counterbore.

Referring now to FIGS. 144 and 145, FIG. 144 is a cutaway side view of power end 103 taken along Line CA, and FIG. 145 is a cutaway front perspective view of power end 103 taken along Line CA, respectively. As shown in FIGS. 144 and 145, Line CA bisects power end 103 at the center of two of the second set of rods 120. In the embodiments shown in FIG. 144, connect plate stay rod holes 7904 extend all of the way through plates 7204, 7206 and crosshead frame 7220 such that the rods 120 pass through the connect plate 118, spacers 122, connect plate stay rod holes 7904 and end within threaded connect plate stay rod holes 71702 in central support plate 7202. In various embodiments, threaded connect plate stay rod holes 71702 are female threaded recesses within central support plate 7202 and are configured to receive a threaded end of a rod 120. In various embodiments, the rods 120 are torqued down such that the rods are "fully engaged" with threaded connect plate stay rod holes 71702. As used herein, "fully engaged" means that a rod 120 has been torqued such that the end of rod 120 inserted into the threaded connect plate stay rod hole 71702 is in contact with the base of threaded connect plate stay rod hole 71702 (also referred to "bottoming out"). In various embodiments, rods 120 are fully engaged with threaded connect plate stay rod holes 71702 when the rods 120 have been torque to between 2500 lb.-ft. and 4000 lb.-ft. As shown in FIG. 144, a crosshead assembly 71700 driving pony rod 7804 is disposed within crosshead section 7124, central support plate 7202, and crank section 7122. Crosshead assembly 71700 is discussed in further detail with reference to FIGS. 164, 165, 177, and 178. FIG. 144 also includes areas which in various embodiments, includes additional features discussed in reference to FIGS. 148 and 149, respectively.

Referring now to FIGS. 146 and 147, FIG. 146 is a cutaway side view of power end 103 taken along Line CB, and FIG. 147 is a cutaway front perspective view of power end 103 taken along Line CB. As shown in FIGS. 146 and 147, Line CB bisects power end 103 at the center of connect plate 118. FIGS. 146 and 147 illustrate various embodiments of how lubrication system 7700 distributes lubrication within power end 103. In the embodiments shown in FIGS. 146 and 147, crosshead frame 7220 includes a lubrication inlet bore 71900 that is coupled to lubrication system 7700 to receive lubricant during operation. As crosshead assembly 71700 moves within crosshead frame 7220, lubricant flows along groove 72000 on the exterior of crosshead assembly 71700 and through channels 71902 and 71904 within crosshead assembly 71700. In various embodiments, channel 71902 is a vertical bore that intersects with horizontal channel 71904. As shown in additional detail in FIG. 178, channel 71902 begins behind the front face at the top and center of the crosshead (e.g., crosshead 73810 discussed in reference to FIG. 164) and continues vertically downward until it intersects the horizontal channel 71904 at the center of the crosshead. As shown in FIG. 146, channel 71904 begins at the base of the curved inner portion of the crosshead (e.g., thrust seat bearing mount 75210 discussed in reference to FIG. 178) on the central longitudinal axis of the crosshead and continues until it intersects channel 71902. Channel 71904 does not intersect the front face of the crosshead in the embodiment shown in FIG. 146. Lubrication is then able to pass through lubrication through bore 71920 and 71922 of the connecting rod of the crosshead assembly (e.g., connecting rod 73830 discussed herein in reference to FIG. 165).

As discussed in further detail in reference to FIGS. 164, 165, 177, and 178, various components of crosshead assembly 71700 move relative to each other such that lubricant is necessary to prevent seizing or damage to the crosshead assembly. Lubricant is able to flow from crosshead frame 7220 and through a hole in central support plate 7202 via a channel 71906 formed in crosshead frame 7220. From there, lubricant from crosshead section 7124 joins with lubricant flowing through crankshaft section (discussed in reference to FIGS. 179-189) and flows through a drain 71908 in the base of crank frame 7210. As discussed in further detail in reference to FIGS. 179-189, crank frame 7210 includes a plurality of drains 71908, each of which is surrounded by a portion of crank frame 7210 that is angled towards drains 71908 to allow lubricant to drain into a sump tank (not shown) from which it is filtered and recirculated in various embodiments. Additionally, in the embodiments shown in FIGS. 146 and 147, a cross-section along line CB also exposes the alignment dowels 71910 useable to align crosshead frame 7220 with central support plate 7202. As shown in FIGS. 146 and 147, alignment dowels 71910 is received by corresponding dowel pin holes 71912 and 71914 in crosshead frame 7220 and central support plate 7202, respectively.

Referring now to FIG. 148, detail CN from FIG. 144 is shown in greater detail. As can be seen in FIG. 148, spacer 122 is received in counterbore 71400 in connect plate 118, rod 120 is disposed within nut 132, washer 134, connect plate 118 (e.g., by first passages 128) and spacer 122 (e.g., by connect plate stay rod through hole 71000). A second passage 142 used for mounting a fluid end section 102 to the connect plate 118 is disposed above rod 120.

Referring now to FIG. 149, an alternative embodiment of detail CO from FIG. 144 is shown in greater detail. As can be seen in FIG. 149, spacer 122 is coupled to bottom front support plate 7206 and crosshead frame 7220 by a pair of alignment dowels 7906 that are received by corresponding alignment dowel pin holes 71006 in spacer 122 and by alignment dowel pin holes 72200 in bottom front support plate 7206 and the lower portion of crosshead frame 7220. In various embodiments, spacers 122 are similarly coupled to top front support plate 7204 and the upper portion of crosshead frame 7220 by alignment dowels 7906 and corresponding alignment dowel pin holes 71006 and 72200 (not shown).

Referring now to FIG. 149A, a perspective cutaway view is shown of an alternative embodiment of power end 103 taken along line CA shown in FIG. 139. In the embodiment shown in FIG. 149A, rather than the spacer 122 and alignment dowels 7906 discussed in FIGS. 148 and 149, this embodiment includes alternative spacers 122A and a set of sleeves 72220 to facilitate alignment of spacers 122A. In this embodiment, rather than a spacer 122 with a connect plate stay rod through hole 71000, a smaller diameter linear section 71002, a conical transition section 71004, a larger diameter linear section 71008, and a plurality of alignment dowel pin holes 71006 (shown in FIGS. 141-143), spacer 122A has a connect plate stay rod through hole 71000 with two larger diameter interior sections 72210 and a single exterior diameter 72212. In the embodiment shown in FIG. 149A, the first passages 128 of connect plate 118 includes a larger diameter interior section 72222 and the connect plate stay rod holes 7904 of the plates 7204 and 7206 are slightly wider (relative to the embodiment shown in FIG. 149). In the embodiment shown in FIG. 149A, sleeves 72220 are disposed within larger diameter interior section 72222 of connect plate 118, within larger diameter interior sections 72210 of spacers 122A, and within connect plate stay rod holes 7904 to facilitate alignment of spacer 122A with plates 7204, 7206, and connect plate 118. In such embodiments, connect plate 118 does not include counterbore 129 and spacer 122A touches but is not received by connect plate 118.

In various embodiments, to assemble the connector section 7126 to the central support plate 7202, a first end of each stay rod 120 is inserted through connect plate stay rod holes 7904 of the plates 7204 and 7206, and connect plate stay rod holes 7904 of a crosshead frame. In various embodiments, the stay rods 120 are torqued into the threaded holes 71702 of the central support plate 7202. The spacers 122 are placed over corresponding rods 120 and coupled to top front support plate 7204 or bottom front support plate 7206, using alignment dowels 7906 to ensure proper alignment in various embodiments. Connect plate 118 is then placed over spacers 122 and rods 120, using counterbores 129 to ensure proper alignment in various embodiments. Washers 134 and nuts 132 are then placed over the protruding ends of the connect plate stay rods 120 and the nuts 132 are torqued on the second end of the stay rods 120 placing the connect plate stay rods 120 in tension and providing a clamping force to the components between the central support plate 7202 and the nut 132 on the second end of the stay rod 120.

First Set of Rods 7240, Front Support Plates 7204, 7206, and Central Support Plate 7202

Referring now to FIGS. 150-161, power end 103 and components thereof (with a particular focus on first set of rods 7240) are shown in further detail. FIG. 150 is a front perspective exploded view of power end 103, FIGS. 151-153 are cutaway views of portions of power end 103, and FIGS. 154-161 are various views of a second nut 72408 from FIG. 150. In this embodiment of a high-pressure pump 101, the crank section 7122 and crosshead section 7124 are assembled to each other first using stay rods 7240, nuts 72400 and 72408, washers 72402 and 72406, as shown in FIGS. 150-153.

Referring individually to FIG. 150, a front perspective exploded view of power end 103 is shown. As shown in FIG. 150, connector section 7126, second set of stay rods 120, and maintenance covers 7510 have been removed. FIG. 150 depicts how the first plurality of rods 7240 couple together the various plates 7200, 7202, 7204, and 7206; crank section 7122; and crosshead section 7124 by exploding these sections relative to rods 7240. In the embodiment shown in FIG.

150, twenty rods 7240 couple rear support plate to crank section 7122, couple crank section 7122 to central support plate 7202, couple central support plate to crosshead section 7124, and couple crosshead section 7124 to top front support plate 7204 and bottom front support plate 7206. Rods 7240 are secured by nuts 72400, first washers 72402, second washers 72406, and second nuts 72408. As shown in FIG. 150, rods 7240 are received by corresponding stay rod through holes 72404 located along the top and bottom periphery of front support plate 7204, bottom front support plate 7206, the individual crosshead frames 7220, central support plate 7202, crank frame 7210, and rear support plate 7200. Thus, in the depicted embodiments, to assemble crank section 7122 to crosshead section 7124, second nuts 72408 are threaded on a first end of each stay rod 7240 and then the second end of each stay rod 7240 is inserted through a second washer 72406, the stay rod through holes 72404 rear support plate 7200, the stay rod through holes 72404 of crank frame 7210, the stay rod through holes 72404 of central support plate 7202, the stay rod through holes 72404 of an individual crosshead frame 7220, the stay rod through holes 72404 of either top front support plate 7204 or bottom front support plate 7206, and finally first washer 72402. Once all the stay rods 7240 are inserted in the components, nuts 72400 are threaded on the second end of the stay rods 7240 and the specified torque (e.g., between 2500 lb.-ft. and 4000 lb.-ft. in various embodiments) is applied to the nuts 72400. Once the specified torque is applied to the nuts 72400 the stay rods 7240 are in tension and provide a clamping force to the components between the nuts 72400 and 72408. FIG. 150 also includes line CD which bisect power end 103 at the center of two of rods 7240.

When assembled, top front support plate 7204 and bottom front support plate 7206 are disposed in front of crosshead section 7124. As discussed herein, crosshead section 7124 includes a plurality of crosshead frames 7220. The profiles of top front support plate 7204 and bottom front support plate 7206 correspond to the profiles of the crosshead frames 7220. In particular, the bottom top front support plate 7204 includes cutaways 72410 around the center bore of the crosshead frames 7220 and the top of top front support plate 7204 includes wider portions 72412 surrounding its stay rod through holes 72404. Similarly, the top of bottom front support plate 7206 includes cutaways 72410 around the center bore of the crosshead frames 7220 and the bottom of bottom front support plate 7206 includes wider portions 72412 surrounding its stay rod through holes 72404. In various embodiments, by having variable profiles corresponding to the top and bottom of crosshead frames 7220, weight can be reduced from top front support plate 7204 and bottom front support plate 7206 while still providing adequate surface area to absorb clamping forces from nuts 72400 and 72408. In various embodiments, top front support plate 7204 and bottom front support plate 7206 are made of high alloy steel and are between 0.490 inches and 0.530 inches thick. Further, in various embodiments, top front support plate 7204 and bottom front support plate 7206 are separate pieces of metal rather than being a unitary piece of metal like rear support plate 7200. By not including metal joining top front support plate 7204 and bottom front support plate 7206, weight can further be reduced. Thus, top front support plate 7204 and bottom front support plate 7206 are substantial enough to reduce deflection of individual components and reduce relative movement between components (e.g., movement between the individual crosshead frames 7220), particularly about the transverse and vertical axes, without unnecessarily increasing weight or material cost in various embodiments.

When assembled, central support plate 7202 is disposed between crosshead section 7124 and crank section 7122. The central support plate 7202 is a generally rectangular plate with a plurality of stay rod through holes 72404 located along the top and bottom periphery. In various embodiments, central support plate 7202 further includes a plurality of the following features: lifting eye holes 72428; a variable top and bottom profile with raised portions 72430 around stay rod through holes 72404; vacuum relief through bores 72432, threaded connect plate stay rod holes 71702, lubricant drain through bores 72434, dowel pin holes 71914 useable for alignment with crosshead section 7124, crosshead ports 72420, and dowel pin holes 72436 useable for alignment with crank section 7122. In various embodiments, lifting eye holes 72428 are configured to facilitate lifting of central support plate 7202 during assembly; vacuum relief through bores 72432 are configured to allow air from the individual crosshead frames 7220 to pass from crosshead frame 7220 to crank section 7122; lubricant drain through bores 72434 are configured to allow lubricant to flow from the individual crosshead frames 7220 to crank section 7122; and dowel pin holes 72436 are configured to receive alignment dowel 72452 which are also received by dowel pin holes 72454 in crank frame 7210. Similarly to the variable profile of top front support plate 7204 and bottom front support plate 7206, variable profile of central support plate 7202 includes a plurality of raised portions 72430 around stay rod through holes 72404. In various embodiments, by having a variable profile, weight can be reduced from central support plate 7202 while still providing adequate surface area to absorb clamping forces from nuts 72400 and 72408. In various embodiments, central support plate 7202 is made of high alloy steel and is between 2.980 inches and 3.020 inches thick. Thus, central support plate 7202 is substantial enough to reduce deflection of individual components and reduce relative movement between components (e.g., movement between the individual crosshead frames 7220), particularly about the transverse and vertical axes, without unnecessarily increasing weight or material cost in various embodiments.

When assembled, rear support plate 7200 is coupled to the back of crank section 7122. Rear support plate 7200 is a generally rectangular plate with a plurality of stay rod through holes 72404 located along the top and bottom periphery. In various embodiments, rear support plate 7200 includes maintenance openings 72444, bolt holes 72442, and a variable top and bottom profile with raised portions 72446 around stay rod through holes 72404. In various embodiments, bolt holes 72442 are configured to receive bolts (not shown in FIG. 150) that hold the center webs of rear support plate 7200 to crank frame 7210 independently of first set of rods 7240 and prevent rear support plate 7200 from bowing under torque load from first set of rods 7240; and maintenance openings 72444 are configured to be covered by maintenance covers 7510 such that when a maintenance cover 7510 is removed a portion of crankshaft 7212 is exposed and can be serviced without removing rear support plate 7200. In various embodiments, by having a variable profile, weight can be reduced from rear support plate 7200 while still providing adequate surface area to absorb clamping forces from nuts 72400 and 72408. In various embodiments, rear support plate 7200 is made of high alloy steel and is between 1.00 inches and 1.02 inches thick. Thus, rear support plate 7200 is substantial enough to reduce deflection of individual components and reduce relative movement between component, particularly about the transverse and vertical axes, without unnecessarily increasing weight or material cost in various embodiments.

Referring now to FIGS. 151-153, FIG. 151 is a cutaway front perspective view of power end 103 taken along Line CD, FIG. 152 is a cutaway side view of power end 103 taken along Line CD, and FIG. 153 is a cutaway side view of detail CE from FIG. 152. FIGS. 151-153 show how a pair of rods 7240 are disposed through first washer 72402; stay rod through holes 72404 in plates 7200, 7202, 7204, and 7206 and crosshead frame 7220 and crank frame 7210; and second washer 72406 and are secured by first nuts 72400 and second nuts 72408. As shown in FIG. 151, in various embodiments, a channel 72500 is defined in crosshead frame 7220 above crosshead assembly 71700. In various embodiments, channel 72500 is configured to allow air to flow between crank section 7122 and crosshead section 7124 to release air that is pressurized by a forward stroke by crosshead assembly 71700 and to relieve a vacuum that is created by a back stroke by crosshead assembly 71700. FIG. 152 includes detail CE at the top and rear of crank section 7122 showing a cross-section of second nut 72408. In various embodiments, including the embodiments shown in FIGS. 151-161, second nut 72408 is a "blind nut."

Referring now to FIGS. 154-161, in various embodiments second nuts 72408 are blind nuts. As used herein, a "blind nut" is a nut with a threaded interior and includes an opening to receive a threaded end of a bolt or rod (e.g., a rod 7240) on one side of the threaded interior and a barrier on the other side of the threaded interior that prevents the threaded end of the bolt or rod from advancing all of the way through the threaded interior. As discussed herein, advancing the threaded end of the bolt or rod until the bolt or rod contacts the barrier and the threaded end of the bolt or rod cannot be further advanced, is referred to as the threaded end of the bolt or rod "bottoming out" such that the bolt or rod is "fully engaged" with the blind nut.

Figure 158:
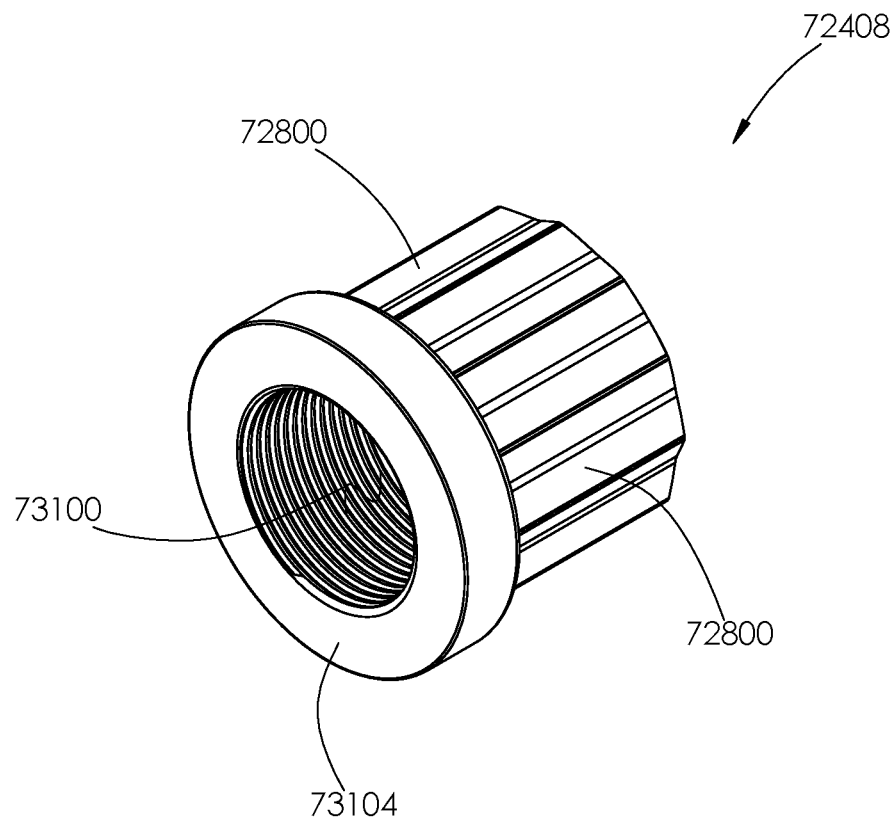
Figure 159:
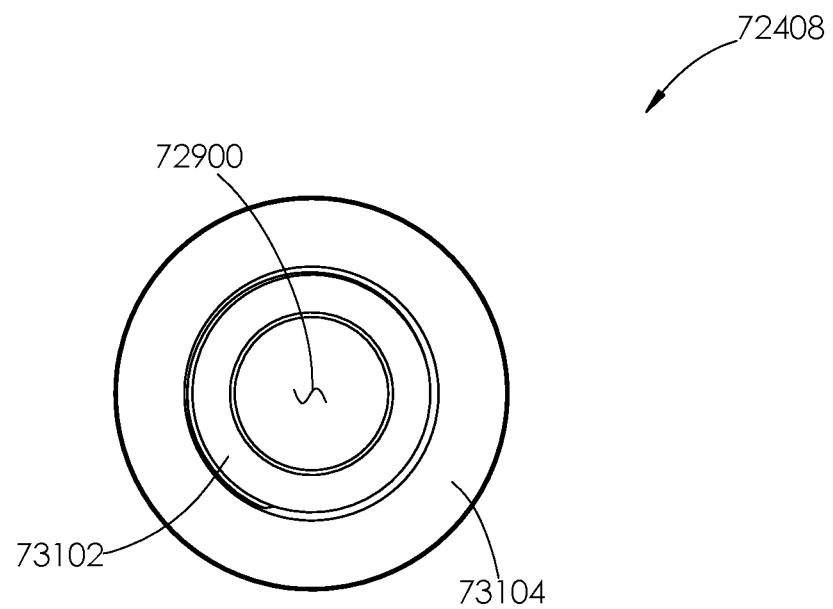
Figure 160:
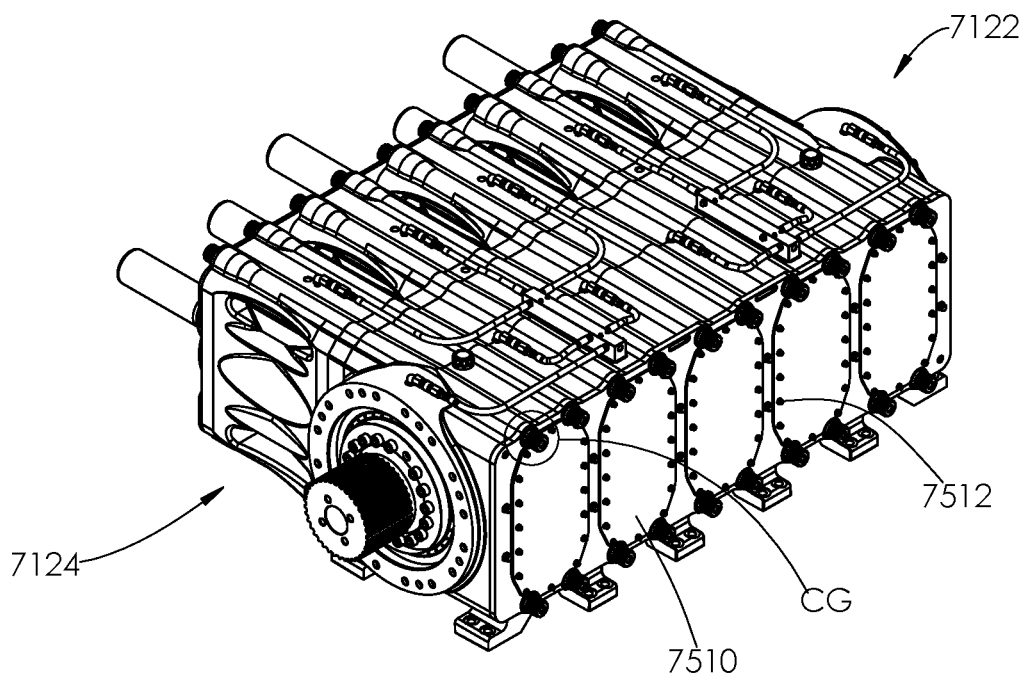
Figure 161:
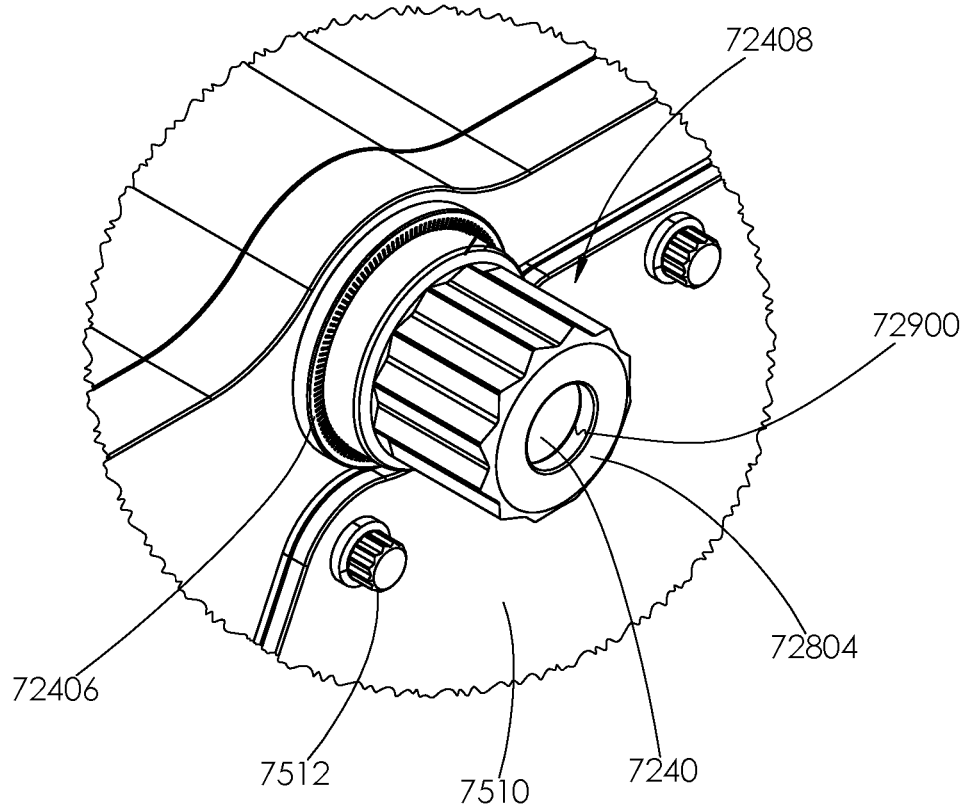

Referring now to FIGS. 154-161, various views of a blind nut 72408 are shown. FIG. 154 is a side view, FIG. 155 is a rear perspective view, FIG. 156 is a rear view, FIG. 157 is a cutaway side view taken along line CF, FIG. 158 is a front perspective view, FIG. 159 is a front view, FIG. 160 is a rear perspective view of blind nut 2408 installed on power end 103, and FIG. 161 is a rear perspective view of detail CG from FIG. 160. As shown in FIGS. 154-161, blind nut 72408 is a 12-point nut, but blind nut 72408 could have any number of points (e.g., 6, 8, 10, etc.). In the embodiments shown in FIGS. 154-161, blind nut 72408 is a 12-point blind nut that has a generally cylindrical shape and includes flats 72800, an internally threaded section 73100, a base 73102, an inspection bore 72900, a front face 72802, and a back face 72804. When torqued onto the threaded portion at the back end of the stay rod 7240, blind nut 72408 will continue to thread on the stay rod 7240 until the back end of the stay rod 7240 contacts the base 73102 of blind nut 72408. In various instances, the position of the stay rod 7240 can be confirmed visually by observation through the inspection bore 72900. It may also be confirmed by measurement with a depth gauge (not shown).

In various instances, the fixed position of blind nut 72408 relative to the end of the stay rod 7240 reduces the possibility of an inadequate threaded engagement between the two components. This positioning also provides a known length of the portion of the stay rod 7240 that is inserted through the components to be assembled. Specifically, it provides a known length of threads extending from the front side of the front support plates 7204 and 7206. In various instances, this known length of thread extension gives confidence that full thread engagement will occur between the first nut 72400 and the threaded front end of the stay rod 7240. Put another way, because the length of rods 7240 is constant and the engagement with rods 7240 by blind nut 72408 is constant (provided blind nut 72408 is installed fully engaged and has not backed off), torqueing first nuts 72400 to the designated amount will result in a constant amount of thread on rod 7240 extending through first nuts 72400. In various instances, visible inspection of this exposed thread may be indicative of backing off by either first nut 72400 and/or blind nut 72408, which may improve ease of maintenance. If either first nut 72400 or blind nut 72408 are observed to be loosening, these nuts 72400, 72408 may be retorqued before causing a failure.

Thus, in various embodiments, to assemble the crank section 7122 to the crosshead section 7124, the blind nut 72408 is torqued onto the threaded portion at the back end of a stay rod 7240 until the blind nut 72408 is fully engaged. The other, or front, end of the stay rod 7240 is then inserted through second washer 72406, the stay rod through holes 72404 of plate 7200 and crank frame 7210, the stay rod through holes 72404 of the central support plate 7202, the stay rod through holes 72404 of the crosshead frame 7220, the stay rod through holes 72404 of the either the top front support plate 7204 or bottom front support plate 7206, and first washer 72402. A first nut 72400 is then torqued on the protruding threaded front end of the stay rod 7240. This process is repeated for each of the plurality of stay rods 7240.

Crosshead Section 7124

Referring now to FIGS. 162-178, power end 103 and components thereof (with a particular focus on crosshead section 7124) are shown in further detail. FIG. 162 is a front perspective view of front support plates 7204, 7206 and crosshead section 7124. FIG. 163 is a rear perspective view of central support plate 7202 and crosshead section 7124. FIG. 164 is a front perspective exploded view of a crosshead frame 7220 (also referred to as a crosshead guide) and crosshead assembly 71700. FIG. 165 is a cutaway sideview of crosshead section 7124. FIGS. 166-168 are various views of pony rod seal housing 73800. FIGS. 169-176 are various views of crosshead frame 7220. FIGS. 177 and 178 are side views of crosshead assembly 71700.

Referring individually to FIG. 162, the fronts of crosshead section 7124, top front support plate 7204, and bottom front support plate 7206 are shown. As shown in FIG. 162, crosshead assembly 71700 has been removed. As can be seen in FIG. 162, the top profile of top front support plate 7204 corresponds with the top profile of the plurality of crosshead frames 7220 and the cutaways 72410 of the top front support plate 7204 corresponds to the central opening of the plurality of crosshead frames 7220. Similarly, the bottom profile of bottom front support plate 7206 corresponds with the bottom profile of the plurality of crosshead frames 7220 and the cutaways 72410 of the bottom front support plate 7206 correspond to the central opening of the plurality of crosshead frames 7220 and the recess disposed beneath each central opening (e.g., base section attachment clearance 74400 discussed in reference to FIGS. 169-176).

Referring now to FIG. 163, the backs of crosshead section 7124 and central support plate 7202 are shown. As shown in FIG. 163, the top and bottom profile of central support plate 7202 corresponds with the top and bottom profile of the plurality of crosshead frames 7220. As discussed elsewhere herein, various holes in central support plate 7202 correspond with holes in the plurality of crosshead frames 7220 (e.g., stay rod through holes 72404; vacuum relief through bores 72432, threaded connect plate stay rod holes 71702, lubricant drain through bores 72434, dowel pin holes 71914, crosshead ports 72420, and dowel pin holes 72436). In the embodiment shown in FIG. 163, central support plate 7202 also includes a lower dowel hole 73700, a threaded jack bolt hole 73702, and a mounting hole 73704. In such embodiments, dowel hole 73700 is configured to receive an alignment dowel 71910 to facilitate alignment with crosshead frames 7220, threaded jack bolt hole 73702 is configured to receive a jack bolt to facilitate disengagement of central support plate 7202 and crosshead frames 7220, and mounting hole 73704 is configured to receive a fastener to mount the central support plate 7202 to the crank frame 7210.

Referring now to FIGS. 164 and 165, a front perspective exploded view and a cutaway side view along line CB (shown in FIG. 139) of a crosshead frame 7220 and a crosshead assembly 71700 are shown, respectively. As shown in FIG. 164, various components of crosshead assembly 71700 are individually shown from pony rod 7804 to the portions of crosshead assembly 71700 that are coupled to crankshaft 7212. Crosshead assembly 71700 includes pony rod clamp 7802, pony rod seal housing 73800, pony rod 7804, crosshead 73810, connecting rod 73830 and various fasteners and bearings. As used herein, crosshead assembly 71700 includes pony rod 7804 and pony rod clamp 7802, but does not include plunger 290. As shown in FIG. 164, portions of crosshead assembly 71700 (e.g., pony rod 7804 and crosshead 73810) reciprocate within the central bore of crosshead frame 7220 (e.g., central bore 74600 discussed in reference to FIGS. 169-176). The internal structure of crosshead assembly 71700 is discussed in further detail herein in reference to FIG. 178.

As discussed herein, pony rod 7804 is coupled to plunger 290 by pony rod clamp 7802. In various embodiments, pony rod clamp 7802 is a ring-shaped clamp that is configured to couple plunger 290 to pony rod 7804. In various embodiments, pony rod clamp 7802 is configured to couple to plunger 290 and pony rod 7804 by receiving a flange 73803 of plunger 290 and a flange 73804 of pony rod 7804. In various embodiments, the flanges 73803 and 73804 are retained using a set of bolts 73806 that are disposed in corresponding holes in pony rod clamp 7802.

Figure 171:
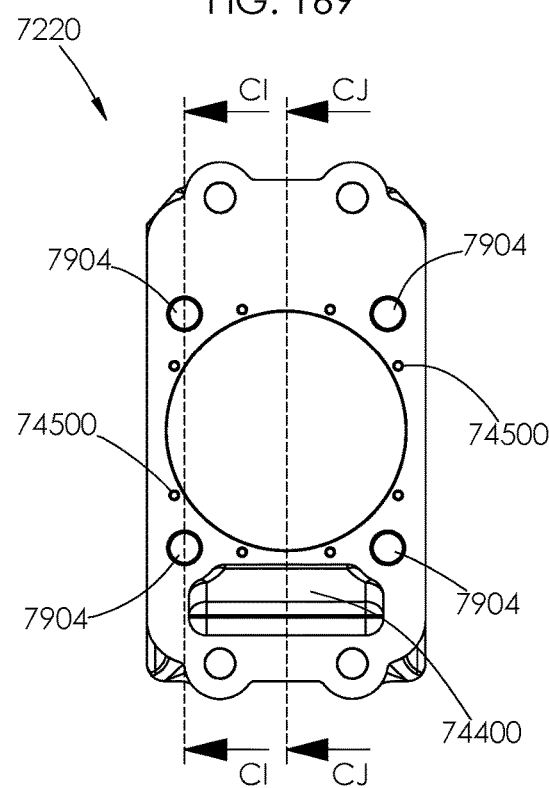

As shown in FIG. 164, pony rod seal housing 73800 is secured to crosshead frame 7220 by inserting a set of fasteners 73802 through pony rod seal housing 73800 and into corresponding holes in crosshead frame 7220 (e.g., threaded holes 74500 shown in FIG. 171). In various embodiments, pony rod 7804 is coupled to crosshead 73810 by fasteners 73820 that are disposed though a mounting flange 73821 of pony rod 7804 and into corresponding bores 73811 of crosshead 73810. In various embodiments, a pony rod seal 73801 is a ring-shaped radial seal that is received by pony rod seal housing 73800 and secured within pony rod seal housing 73800 by fasteners 73808 that are disposed within corresponding holes in pony rod seal housing 73800. In various embodiments, washers 73809 are disposed between fasteners 73808 and pony rod seal housing 73800. In various embodiments, pony rod seal 73801 seals against pony rod 7804 as it reciprocates (e.g., sealing lubricant from crosshead frame 7220 from flowing out of the front of the central bore of crosshead frame 7220, preventing liquids, dust, sand, etc. from entering the central bore of crosshead frame 7220).

Crosshead 73810 as shown in FIGS. 164, 165, 177 and 178, is a generally cylindrical prism. In various embodiments, crosshead 73810 includes a blind bore on the longitudinal axis that begins at the back face of the crosshead 73810. The bore may be to a depth of up to half the length of the crosshead 73810 and the diameter may be large enough to leave a relatively thin wall. In various embodiments, crosshead 73810 includes a pair of main bearing clearance cut outs 73813. In various embodiments, the main bearing clearance cut outs 73813 have a generally rectangular shape as viewed from either side. In various embodiments, crosshead 73810 includes a wrist pin bore 73812. In such embodiments, wrist pin bore 73812 is a through bore with a transverse axis and is approximately longitudinally centered on the crosshead 73810. In various embodiments, wrist pin 73814 is disposed inside wrist pin bore 73812 and secured with a bracket 73816 and fasteners 73818 disposed through bracket 73816 and into corresponding bores set in a counterbore around wrist pin bore 73812. Thrust seat bearing 73822 is disposed within crosshead 73810 (e.g., on a thrust seat bearing mount 75210 shown in FIG. 178) and secured by thrust seat bearing keepers 73824 and fasteners 73826 extending through thrust seat bearing keepers 73824 and into corresponding bores in crosshead 73810. As discussed herein in reference to FIG. 147, a set of grooves 72000 are formed in the outer cylindrical surface of the crosshead 73810 in various embodiments. In such embodiments, grooves 72000 include two circumferential grooves connected by a longitudinal groove 72000, as shown in FIG. 164. In various embodiments, neither the two circumferential grooves 72000 nor the longitudinal groove 72000 intersect the front or the back face of the crosshead 73810.

In various embodiments, thrust seat bearing 73822 has the general form of a thin walled hollow semi-cylinder and includes a through hole 73823 and a plurality of axial grooves and a partial circumferential groove located on the inner surface (not shown). In various embodiments, these axial grooves are formed at an angle to the longitudinal axis of the thrust seat bearing 73822 but generally extend from just inside one end wall to just inside the opposite end wall and do not intersect the end walls. In various embodiments, the partial circumferential groove is centered longitudinally and intersects every axial groove. In various embodiments, through hole 73823 is disposed in the center of the circumferential groove.

In various embodiments, thrust seat bearing keeper 73824 is generally shaped like a rectangular prism with the upper corners at each end of its longitudinal face removed. In various embodiments, the thrust seat bearing keeper 73824 includes two through slots and two through holes originating on the front face, each of which is configured to receive a fastener 73826. In various embodiments, the two holes are spaced equidistant from the longitudinal center and centered vertically, and the two slots are also spaced equidistant from the longitudinal center but are spaced farther apart than the holes and centered vertically.

In various embodiments, a wrist pin bushing 73834 is disposed around wrist pin 73814. In various embodiments, wrist pin bushing 73834 is a thin walled cylinder that is configured to be coupled to connecting rod 73830 such that connecting rod 73830 and wrist pin bushing 73834 are able to rotate around wrist pin 73814 as crosshead assembly 71700 operates.

In various embodiments, connecting rod 73830 generally appears as a first cylinder having a shorter second cylinder formed on one end and a shorter semi-cylinder formed on the opposite end. The longitudinal axes of the second cylinder and the semi-cylinder are parallel to each other and transverse to the longitudinal axis of the first cylinder. In various embodiments, connecting rod 73830 includes: a first end proximate to the wrist pin and a second end proximate to the crankshaft 7212, a wrist pin bore 73835, and a lubrication through bore 71920. The first end includes a curved exterior thrust seat that faces the front of power end 103. The wrist pin bore 73835 is a through bore through the center of the first end. The wrist pin bore 73835 axis is transverse to the connecting rod 73830 longitudinal axis. The lubrication conduit 71920 has a longitudinal axis and is centered transversely on the thrust seat. The lubrication through bore 71920 begins at the thrust seat and continues into the wrist pin bore 73835. The lubrication through bore 71920 is aligned with a lubrication through bore in the second end (e.g., lubrication through bore 71922 shown in FIGS. 146 and 165). At the second end, connecting rod 73830 includes a crankshaft bearing mount surface 73832. In various embodiments, the crankshaft bearing mount surface 73832 is semi-cylindrical with an axis transverse to the longitudinal axis of the connecting rod and parallel to the wrist pin bore 73835 axis. In various embodiments, connecting rod 73830 is a unitary body that is more than 24.5 inches long center-to-center (e.g., from wrist pin bore 73835 to the center of crankshaft bearing mount surface 73832). In some embodiments, connecting rod 73830 is 26.75 inches long center-to-center. In various embodiments, connecting rod 73830 is more than three times longer than the stroke of the power end assembly (i.e., the amount of movement of plunger 290 between the furthest extent of a forward stroke of crosshead assembly 71700 and the furthest extent of a back stroke of crosshead assembly 71700).

In various embodiments, connecting rod 73830 is coupled to crankshaft 7212 using a two-piece connecting rod bearing that includes a connecting rod bearing (rod side) 73838 and connecting rod bearing (cap side) 73842. In such embodiments, the two-piece connecting rod bearing is secured to connecting rod 73830 by a connecting rod cap 73844 that is secured using a plurality of fasteners 73846 that are disposed through connecting rod cap 73844 and into corresponding bores in the walls of crankshaft bearing mount surface 73832. In various embodiments, alignment pins 73836 are also received by connecting rod 73830 and connecting rod cap 73844 to aid alignment. In various embodiments, connecting rod bearing (cap side) 73842 and connecting rod bearing (rod side) 73838 have a general shape of a hollow semi-cylinder. In various embodiments, connecting rod bearing (rod side) 73838 includes a lubricant through hole (not shown) that, when installed, is aligned with the lubrication through bore 71922 of connecting rod 73830.

Referring now individually to FIG. 165, a cutaway side view along line CB (shown in FIG. 139) of crosshead frame 7220 and part of crosshead assembly 71700 is shown. In particular, FIG. 165 shows a spatial relationship between various embodiments of pony rod 7804 and other portions of crosshead assembly 71700, pony rod seal 73801, pony rod seal housing 73800, and crosshead frame 7220. As shown in FIG. 165, pony rod 7804 is disposed through pony rod seal 73801 and pony rod seal housing 73800 such that pony rod seal 73801 seals against pony rod 7804. In various embodiments, pony rod seal housing 73800 is disposed on a front face of the crosshead frame 7220 and includes a circumferential groove that receives a seal 73902 that seals the outer circumference of pony rod seal housing 73800 against the wall that defines the central bore of crosshead frame 7220. In various embodiments, pony rod seal housing 73800 includes a recess 73900 configured to provide additional clearance for pony rod clamp 7802 as it reciprocates within connector section 7126. Further, FIG. 165 illustrates as a dotted line 73910 path in which lubrication is able to flow through crosshead assembly 71700 in the various conduits discussed herein.

Referring now to FIGS. 166-168, a cutaway side view, a front perspective view, and a front view of pony rod seal housing 73800 are shown, respectively. In various embodiments, pony rod seal housing 73800 is a generally flat plate with a generally octagonal shape. In the embodiments shown in FIGS. 166-168, pony rod seal housing 73800 includes recess 73900, a central through hole 74000, a seal groove 74002, a plurality of through holes 74100, and a plurality of through holes 74102. In various embodiments, seal groove 74002 is a circumferential groove in the wall of the central through hole 74000 and is configured to receive at least a portion of pony rod seal 73801. In various embodiments, the plurality of through holes 74100 have longitudinal axes and may be spaced around the circumference of the pony rod seal housing 73800. In various embodiments, through holes 74100 receive fasteners 73802 to couple pony rod seal housing 73800 to crosshead frame 7220. In various embodiments, the plurality of through holes 74102 are positioned around central through hole 74000 and are configured to receive fasteners 73808 to secure pony rod seal 73801 within seal groove 74002.

Figure 169:
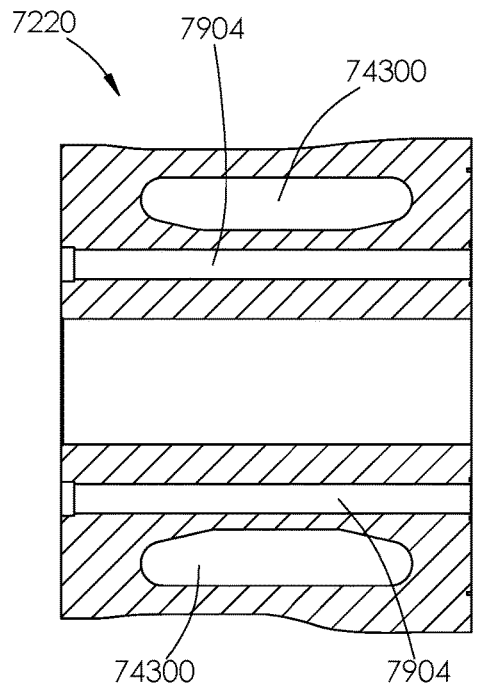
Figure 170:
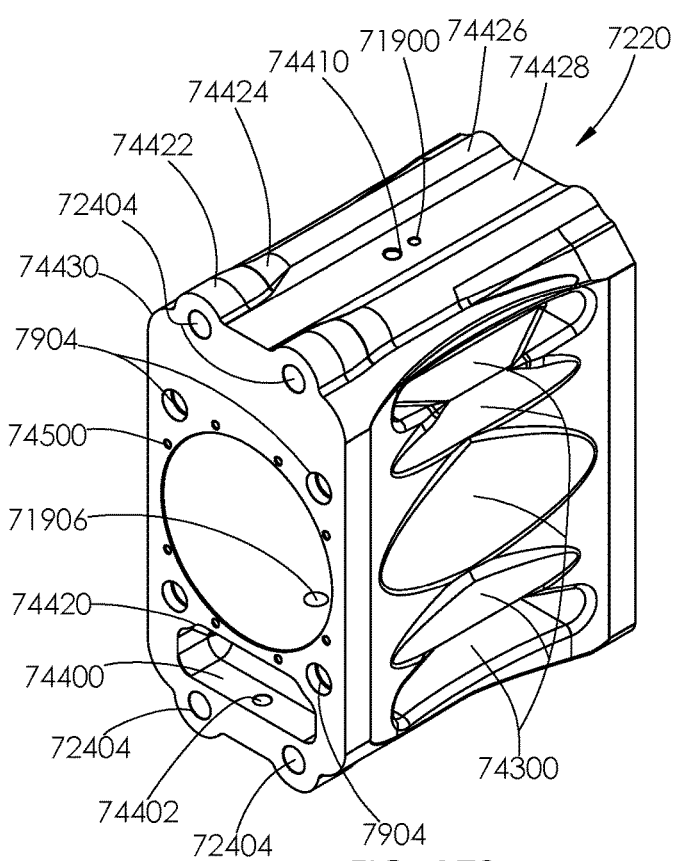
Figure 172:
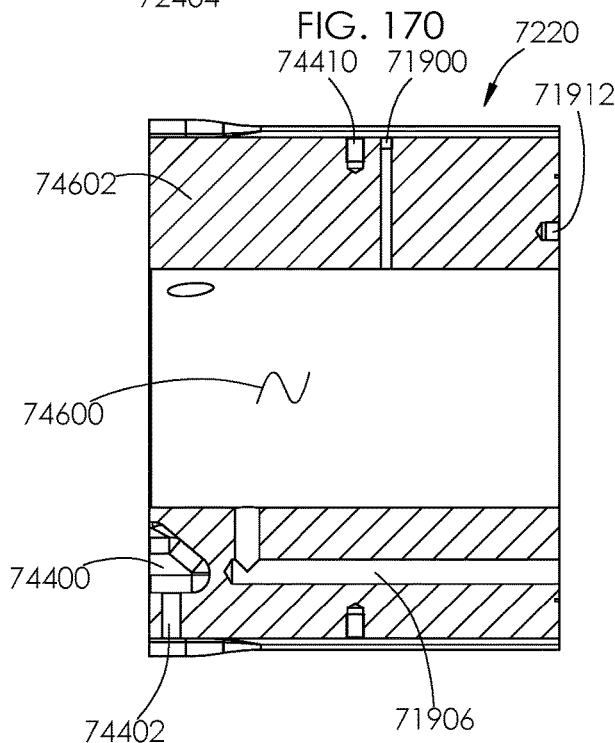
Figure 173:
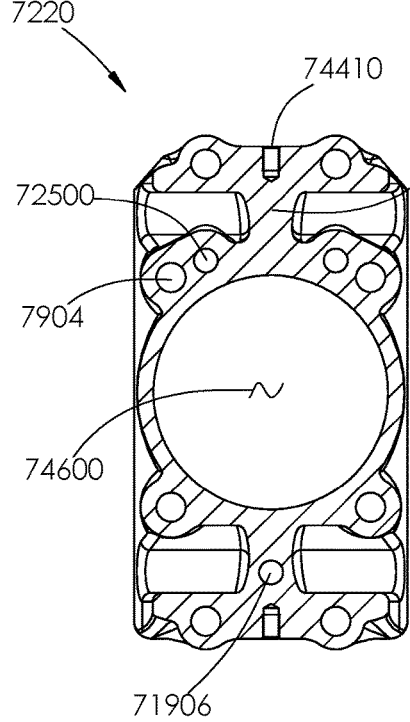
Figure 174:
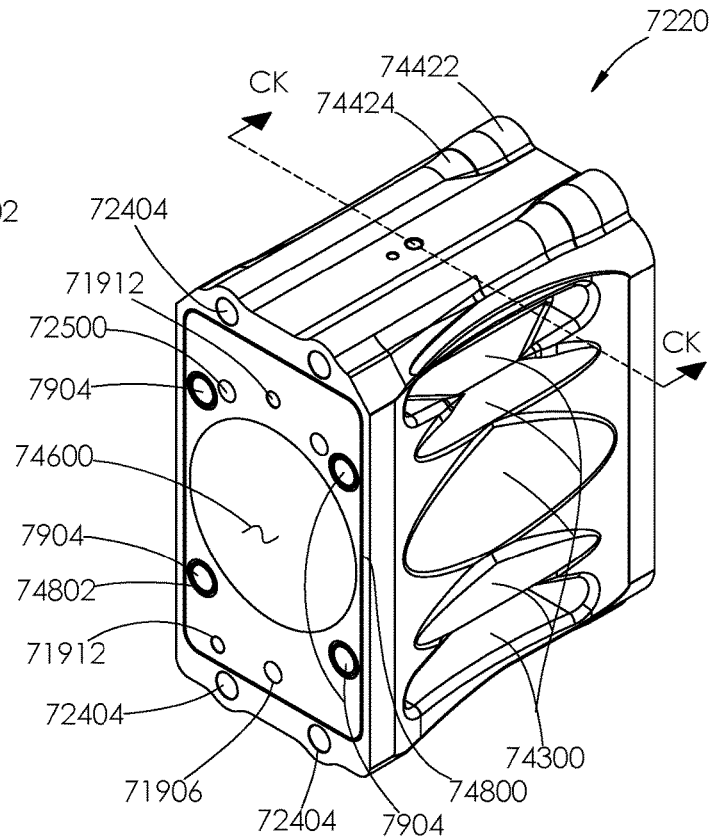
Figure 175:
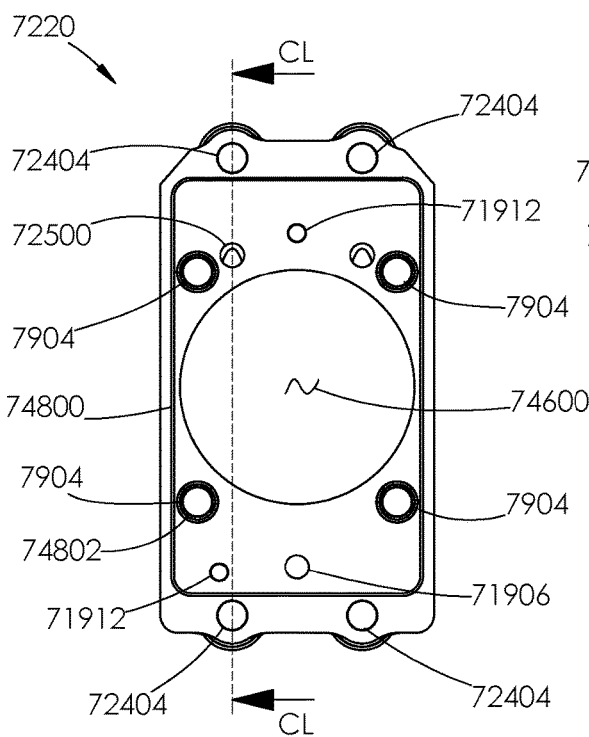
Figure 176:
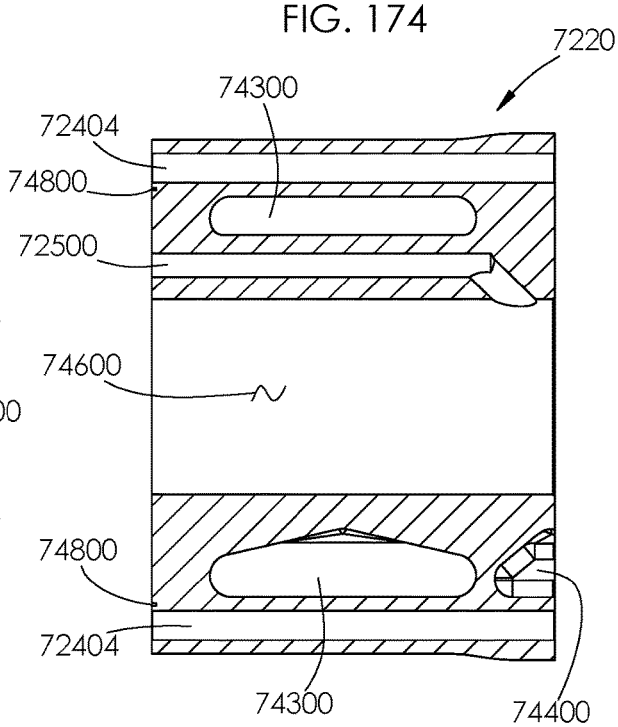

Referring now to FIGS. 169-176, various views of an embodiment of individual crosshead frame 7220 are shown: FIG. 169 is a cutaway sideview along line CI; FIG. 170 is a front perspective view; FIG. 171 is a front view; FIG. 172 is a cutaway sideview along line CJ; FIG. 173 is a cutaway front view along line CK; FIG. 174 is a rear perspective view; FIG. 175 is a rear view, and FIG. 176 is a cutaway side view along line CL In the embodiment shown in FIGS. 169-176, the individual crosshead frames 7220 are generally rectangular prisms defining a plurality of bores including connect plate stay rod holes 7904, stay rod through holes 72404, a central bore 74600, a plurality of weight reducing cut out sections 74300, a center web support 74602, a base section attachment clearance 74400, and various other bores configured to receive alignment dowels, fasteners, or permit the flow of air or lubricant as discussed herein. As discussed herein, in various embodiments, crosshead frame 7220 is made of cast ductile iron.

In various embodiments, central bore 74600 is centered on the front face of crosshead frame 7220 and is a through bore configured to receive a portion of crosshead assembly 71700 (e.g., pony rod 7804, crosshead 73810, etc.). As shown in FIGS. 169-176, central bore 74600 is much larger than the various other bores in crosshead frame 7220. In various embodiments, the walls of crosshead frame that defines the central bore 74600 maintain at least a minimum thickness (e.g., at least 0.5 inches thick) throughout but also define various weight reduction features such as weight reducing cut out sections 74300.

In various embodiments, each individual crosshead frame 7220 defines four connect plate stay rod holes 7904 and four stay rod through holes 72404. In various embodiments, connect plate stay rod holes 7904 and stay rod through holes 72404 are smooth bores through crosshead frame 7220. As discussed herein, in various embodiments, connect plate stay rod holes 7904 are located near the center of crosshead frame 7220 and stay rod through holes 72404 are located close to the top and bottom of crosshead frame 7220 as shown in FIGS. 169-176. In various embodiments, the walls of crosshead frame that defines the connect plate stay rod holes 7904 and stay rod through holes 72404 maintain at least a minimum thickness (e.g., at least 0.5 inches thick) throughout but also define various weight reduction features. Such weight reduction features include weight reducing cut out sections 74300, base section attachment clearance 74400, and/or the variable top and bottom profile of crosshead frame 7220 in various embodiments. In various embodiments, the walls of crosshead frame 7220 that define connect plate stay rod holes 7904 and stay rod through holes 72404 are thicker at the front of crosshead frame 7220 than at the back of crosshead frame 7220 to transfer compression from first nuts 72400 and nuts 132. For example, the walls of crosshead frame 7220 around connect plate stay rod holes 7904 at the top and bottom of crosshead frame 7220 define ribs that include a thicker portion 74422, a thinner portion 74426, and a transition portion 74424 in between. In various embodiments, for example, the walls of thicker portion 74422 are twice as thick as the walls of thinner portion 74426. Between the ribs defining connect plate stay rod holes 7204 is a recessed portion 74428, and on the sides of the walls defining connect plate stay rod holes 7204 are corners 74430. In contrast to a crosshead frame in which all of the top and bottom of crosshead frame is as thick as thicker portion 74422, by defining thinner portion 74426, transition portion 74424, recessed portion 74428, and corners 74430 material can be omitted from crosshead frame 7220, thereby reducing its weight in various embodiments. Further, because in various embodiments crosshead frame 7220 is cast, these features also reduce the material cost of the crosshead frame 7220.

In various embodiments, crosshead frame 7220 includes a plurality of weight reducing cut out sections 74300 in the sides of crosshead frame 7220. In various embodiments, there is a weight reducing cut out section 74300 on either side of crosshead frame 7220. As discussed herein, the walls of crosshead frame 7220 maintain a minimum thickness around central bore 74600, connect plate stay rod holes 7904, and stay rod through holes 72404. In various embodiments, weight reducing cut out section 74300 are shaped such that this minimum thickness is maintained while weight is removed. Further, because in various embodiments crosshead frame 7220 is cast, weight reducing cut out section 74300 also reduces the material cost of the crosshead frame 7220. As shown in FIGS. 170, 173, and 174 the front and rear faces of crosshead frame 7220 are thicker than interior portions in various embodiments. In such embodiments, by having the front and rear faces be relatively thicker, compression on crosshead frame 7220 can be absorbed at the faces being compressed and distributed though out the interior portions of crosshead frame. In various embodiments (and as shown in FIG. 173), the weight reducing cut out sections 74300 do not extend from one side of crosshead frame 7220 to the other, and have a center web support 74602 between them at the top and the walls of crosshead frame 7220 defining channel 71906 between them at the bottom.

Referring to FIGS. 170-172, in various embodiments, crosshead frame 7220 includes a base section attachment clearance 74400. In various embodiments, base section attachment clearance 74400 is a generally triangular-shaped recess with a blunted interior corner. In various embodiments, a base section attachment hole 74402 is defined in the bottom of base section attachment clearance 74400 and is configured to receive a fastener (e.g., a stud 76402 and a nut 76404 shown in FIG. 190) that secures crosshead frame 7220 to base section 7140. In various embodiments, base section attachment clearance 74400 is shaped to enable sufficient room for a tool (e.g., a wrench) to access a fastener disposed in base section attachment hole 74402 such that crosshead frame 7220 may be removed from base section 7140 or installed on base section 7140. In various embodiments, base section attachment clearance 74400 also serves to further reduce the weight of crosshead frame 7220. In various embodiments, the top corners 74420 of base section attachment clearance 74400 extend toward the interior of crosshead frame 7220 to ensure the minimum thickness of connect plate stay rod holes 7904.

Referring to FIGS. 174-176, in various embodiments, crosshead frame 7220 includes a seal 74800 around the various holes and bores discussed herein (other than holes 72404). Seal 74800 engages with central support plate 7202 to help prevent lubrication from leaking out of crosshead frame 7220 at the joint with central support plate 7202. In various embodiments, seal 74800 is an extruded and spliced seal that is positioned in a groove formed in the rear side of crosshead frame 7220. In various embodiments, by using a seal 74800 instead of a gasket, various drawbacks associated with gaskets (e.g., saturation, over compression) may be avoided. In various embodiments, crosshead frame 7220 also includes seals 74802 around connect plate stay rod holes 7904. The seals 74802 engage with central support plate 7202 to prevent lubrication from entering connect plate stay rod holes 7904 and leaking out of crosshead frame 7220.

In various embodiments, the front face of crosshead frame 7220 includes a plurality of threaded holes 74500 disposed around central bore 74600. As discussed herein, in various embodiments, threaded holes 74500 receive fasteners 73802, thereby securing pony rod seal housing 73800 to the front of central bore 74600. In various embodiments, the top of crosshead section includes at least two holes: lubrication inlet bore 71900 that is coupled to lubrication conduit 7702 to receive lubricant during operation as discussed herein, and a lifting eye bore 74410 which is configured to facilitate lifting of crosshead frame 7220 during assembly. In various embodiments, lubrication inlet bore 71900 is partially threaded at the top. The threaded portion begins at the top surface and may extend to half of the bore depth. The threaded portion is configured to receive connector 7704 from the lubrication system 7700. In various embodiments, a conduit may be disposed within lubrication inlet bore 71900 to facilitate lubrication. In addition to lubrication inlet bore 71900, crosshead frame 7220 also defines channel 71906 configured to allow lubrication to flow into crank section 7122 and channel 72500 that allows air to flow between crank section 7122 and crosshead section 7124 to release air that is pressurized by a forward stroke by crosshead assembly 71700 and to relieve a vacuum that is created by a back stroke by crosshead assembly 71700. In various embodiments, channel 71906 and channel 72500 open to central bore 74600 and the rear face of crosshead frame 7220, but neither of channel 71906 nor channel 72500 open to the front face of crosshead frame 7220.

In various embodiments, employing individual crosshead frames 7220 allows for further weight reduction relative to a unitary crosshead section. For example, if two crosshead frames 7220 are arranged side-by-side, weight reducing cut out sections 74300 of the adjacent sides of the crosshead frames 7220 result in at least some of the area between the central bores 74600 of the crosshead frames 7220 to be negative space rather than solid material that would connect a unitary crosshead section. Additionally, using individual crosshead frames 7220 means that if a single crosshead frame 7220 in a crosshead section 7124 fails (e.g., because crosshead 73810 has eroded central bore 74600 of the crosshead frame 7220), the failed crosshead frame 7220 may be individually replaced rather than replacing the entire crosshead section 7124. Replacement may be further aided by the various alignment pins discussed herein helping to align the replacement with the rest of power end assembly 7120. Further, because replacing an individual crosshead frame 7220 with a new crosshead frame 7220 will take less time than repairing a damaged crosshead frame, power end 103 may be brought back into service faster relative to repairing a unitary crosshead section. In various instances, it is also easier and/or less costly to cast a smaller piece such as an individual crosshead frame 7220 rather than a unitary crosshead section. In various embodiments, constructing a crosshead section 7124 using a plurality of individual crosshead frames 7220 may result in weight reduction, cost savings, less down time, and various other improvements relative to a unitary crosshead section.

Referring now to FIGS. 177 and 178, a sideview and cutaway sideview of plunger 290 and crosshead assembly 71700 are shown respectively. FIGS. 177 and 178 show how various components shown in FIGS. 164 and 165 interface with each other when crosshead assembly 71700 is assembled. As shown, the spatial relationship between main bearing clearance cut outs 73813 of crosshead 73810, a narrow portion 75110 of connecting rod 73830, and a wider portion of connecting rod 73830 results in clearance 75100 between connecting rod 73830 and crosshead 73810. In various embodiments, by reducing weight in the sides of crosshead 73810 (e.g., with main bearing clearance cut outs 73813), overall weight of crosshead 73810 can be reduced without reducing the amount of material on the top and bottom of crosshead 73810. In various embodiments, because the top and bottom of crosshead 73810 contact the walls of crosshead frame 7220 that define central bore 74600 as crosshead assembly 71700 reciprocates, it is on the top and bottom of crosshead 73810 and the corresponding portions of crosshead frame 7220 that experience the most wear. Further, clearance 75100 allows more room such that connecting rod 73820 can be longer. Compared to crossheads used in other types of power ends, crosshead 73810 is both longer and has a wider diameter. Additionally, as discussed herein, connecting rod 73830 is longer than connecting rods in other power ends. As a result, pressure-velocity loading on the linear portions of crosshead assembly 71700 and crosshead frame 7220 can be reduced. Further, main bearing clearance cut outs 73813 also provides clearance around crankshaft 7212 when crosshead assembly 71700 is backstroking. Additionally, in various embodiments, connecting rod 73830 is made of a single piece, which may reduce manufacturing and labor costs compared to a connecting rod made of multiple pieces.

Referring now to FIG. 178, a cutaway sideview of plunger 290 and crosshead assembly 71700 is shown. As shown in FIG. 178, connecting rod cap 73844 is coupled to the back of connecting rod 73830, trapping a connecting rod bearing (rod side) 73838 and connecting rod bearing (cap side) 73842, which are wrapped around crankshaft 7212 (not shown in FIG. 178). In various embodiments, connecting rod cap 73844 includes a threaded hole 75200 configured to facilitate separating connecting rod cap 73844 from crosshead assembly 71700. As shown in FIG. 178, an interior surface of crosshead 73810 defines a thrust seat bearing mount 75210 that receives thrust seat bearing 73822 and fasteners 73826 and are attached to the interior of crosshead 73810. In various embodiments, both plunger 290 and pony rod 7804 are hollow. In the embodiment shown in FIG. 178, pony rod 7804 includes a thinner-walled portion 75220 proximate to crosshead 73810 and a thicker walled portion 75222 proximate to plunger 290. Similarly, plunger 290 includes a thinner-walled portion 75230 proximate to fluid end section 102 and a thicker-walled portion 75232 proximate to pony rod 7804. In other embodiments, however, either or both of plunger 290 and pony rod 7804 may be solid (i.e., the hollow areas defined by thinner-walled portion 75220 and thicker walled portion 75222 in pony rod 7804 and thinner-walled portion 75230 and thicker-walled portion 75232 of plunger 290 are not present). FIG. 178 also includes dotted line 73910 that illustrates the path that lubrication is able to flow through crosshead assembly 71700 in the various conduits discussed herein. As shown in FIG. 178, lubrication is able to flow from crosshead 73810 to connecting rod 73830 and then to lubricate connecting rod bearing (rod side) 73838 and connecting rod bearing (cap side) 73842.

Crank Section 7122

Figure 182:
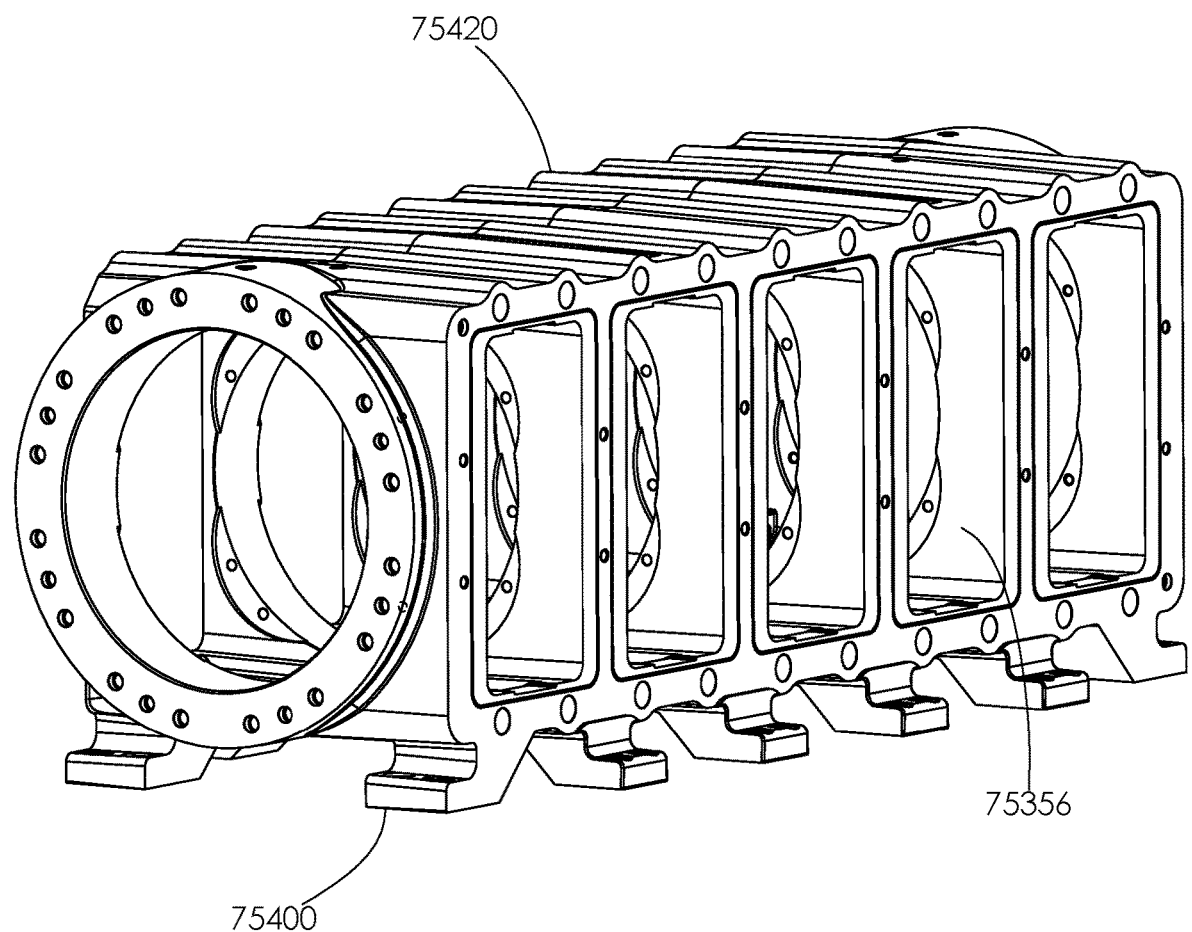
Figure 183:
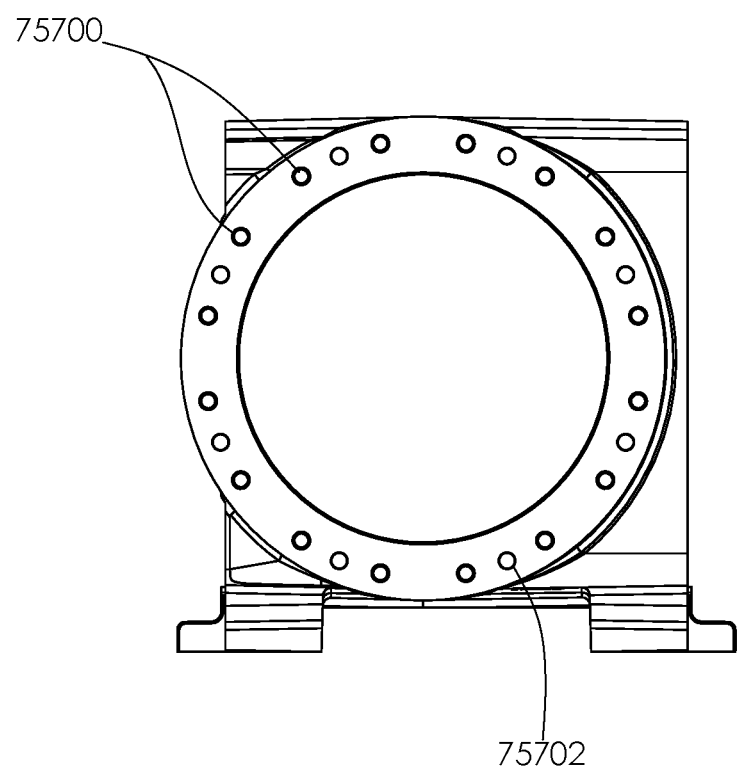
Figure 184:
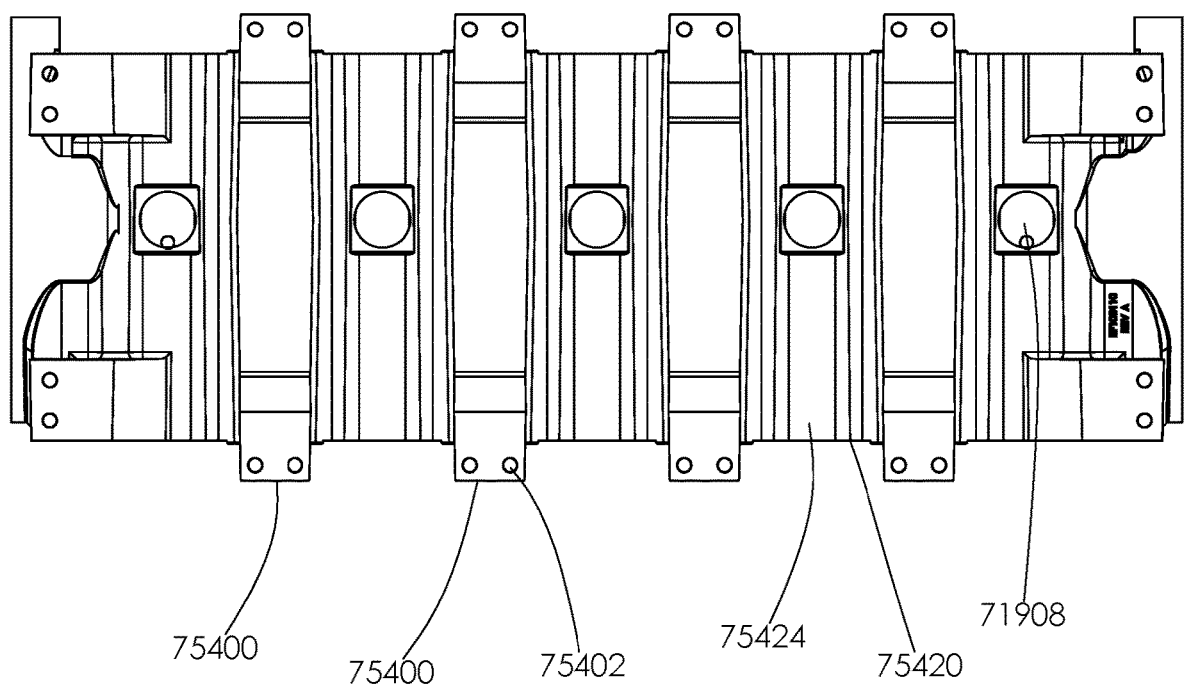
Figure 185:
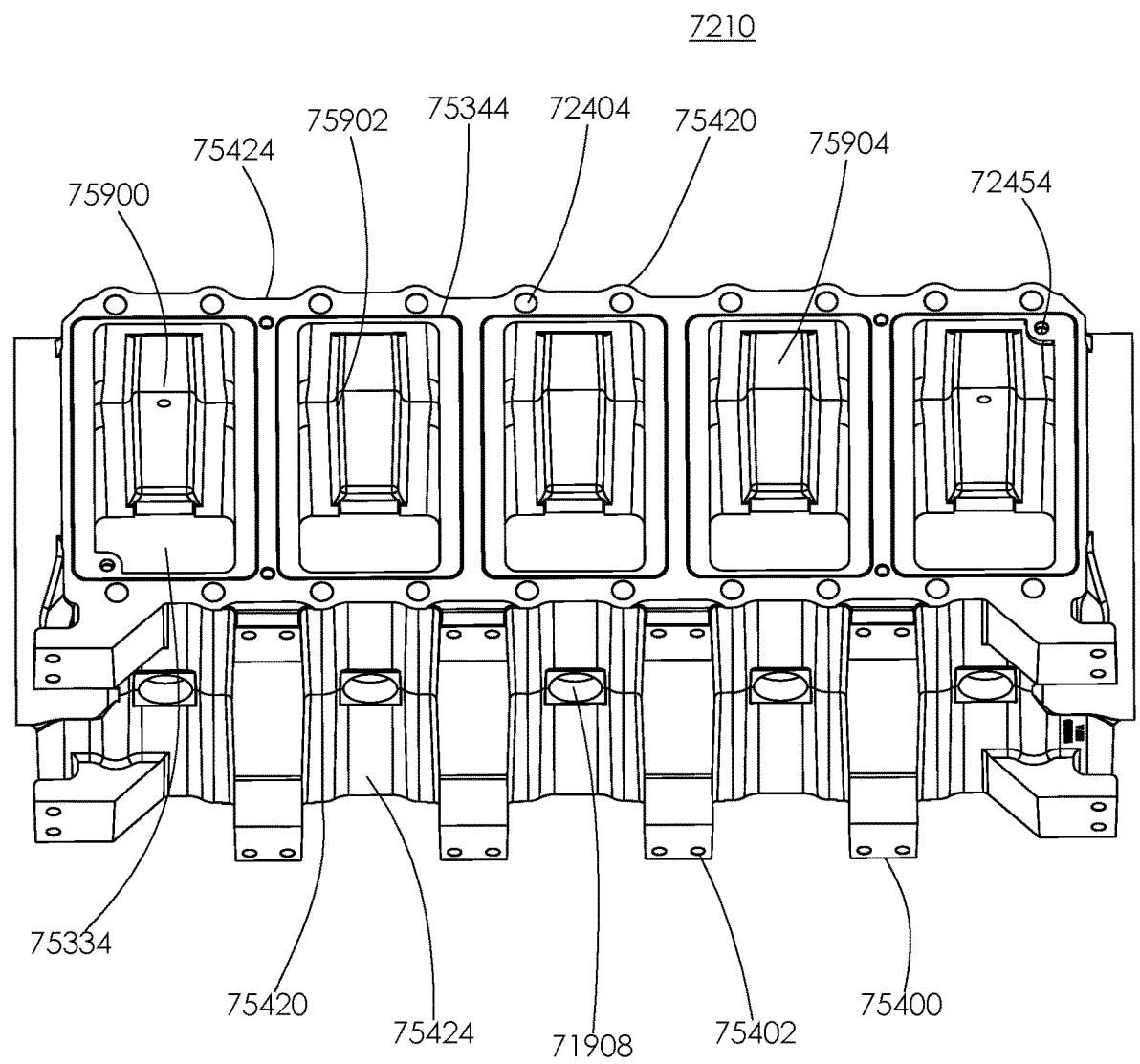
Figure 186:
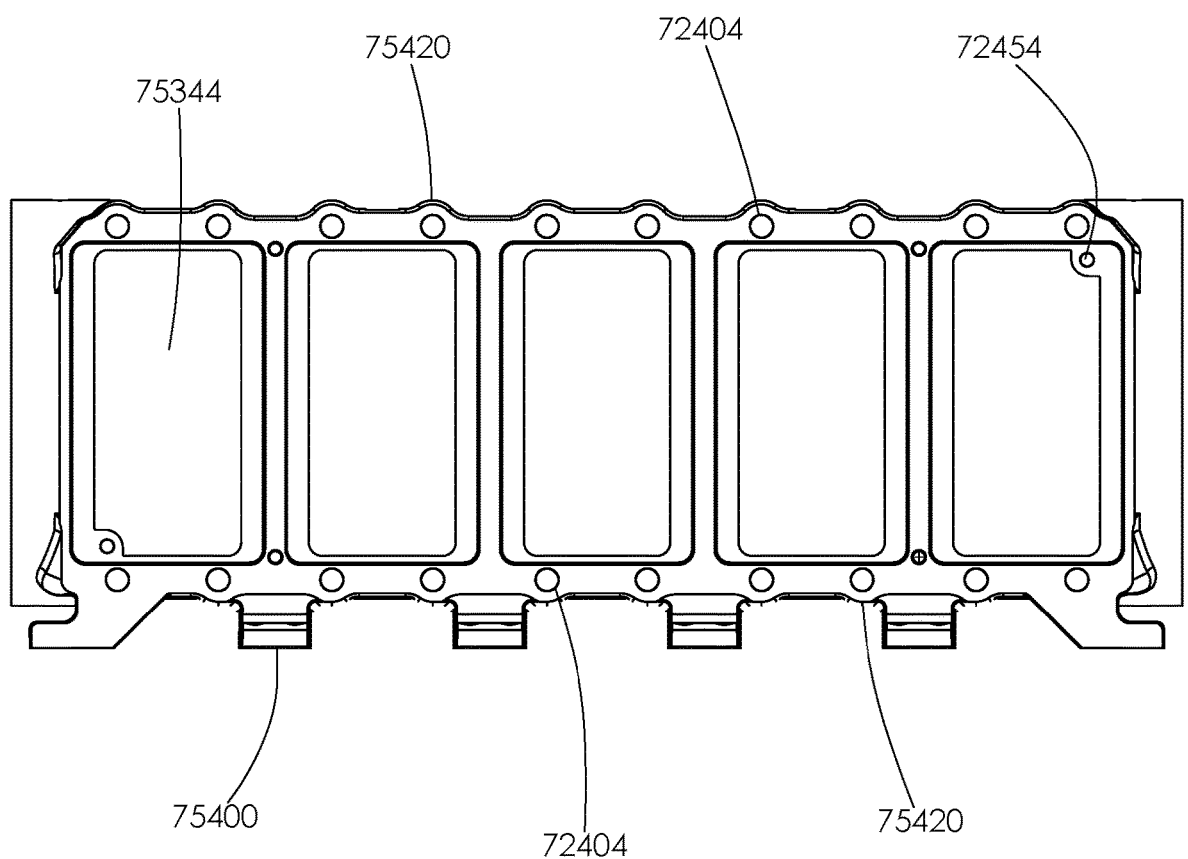

Referring now to FIGS. 179-189, power end 103 and components thereof (with a particular focus on crank section 7122) are shown in further detail. FIG. 179 is a front perspective exploded view of crank section 7122 and rear support plate 7200. FIG. 180 is a rear perspective view of crank section 7122, rear support plate 7200, and first set of rods 7240. FIG. 181 is a cutaway sideview of crank section 7122. FIG. 182 is a perspective rear view of crank frame 7210. FIG. 183 is a side view of the crank frame 7210. FIG. 184 is a bottom view of crank frame 7210. FIG. 185 is a perspective bottom view of crank frame 7210. FIG. 186 is a front view of crank frame 7210. FIG. 187 is a perspective view of an embodiment of crankshaft 7212. FIG. 188 is a perspective view of another embodiment of crankshaft 7212. FIG. 189 is side view of crankshaft 7212 with dashed lines showing various internal structures of crankshaft 7212.

Referring now to FIG. 179, various components of crank section 7122 and rear support plate 7200 are shown separately in exploded form. As shown in FIG. 179, crank section 7122 includes crank frame 7210 and a crankshaft 7212 made of various subcomponents and coupled to crank frame 7210 by brackets and fasteners. In the embodiment shown in FIG. 178, rear support plate 7200 is configured to couple to the back of crank section 7122 (e.g., using first plurality of rods 7240) and in turn has a plurality of components coupled to its back.

In the embodiment shown in FIG. 179, crank section 7122 includes crank frame 7210, a plurality of main bearings 75300, a plurality of sets of brackets 75350 and fasteners 75352, and crankshaft 7212. In various embodiments, main bearings 75300 include an inner race, a roller cage, and an outer race. In various embodiments, the outer race includes one or more radial holes to allow lubricant access to the inner race and roller cage. In various embodiments, the outer race includes one or more grooves that act as reservoirs for lubricant. In the embodiment shown in FIG. 179, an endplate 75320 is attached to crank frame 7320 by a plurality of fasteners 75322. In various embodiments, endplate 75320 covers the exterior facing side of the outer main bearings 75300. This reduces contamination in the main bearings 75300 and also keeps lubricant contained in the crank frame 7210 so that it may exit through the drains 71908 instead of leaking out of the crank frame 7210 requiring replacement lubricant be added to the power end lubrication system. As shown in FIG. 179, a lubrication inlet 7500 includes an interior portion 75318 that is received by a hole through endplate 75320. In various embodiments, lubrication inlet 7500 is stationary as crankshaft 7212 rotates while interior portion 75318 rotates with crankshaft 7212. In the embodiment shown in FIG. 179, on the opposite side of crank from 7210 from endplate 75320, a connecting adapter 75308 is coupled to crankshaft 7212 by a plurality of fasteners 75310. One or more locating pins 75306 is configured to aid in the alignment of connecting adapter 75308, a fixed bearing retention ring 75312 is disposed around a fixed center main bearing 75300 that prevents crankshaft 7212 movement, and a gearbox adapter flange 75316 coupled to crank frame 7210. In various embodiments, a plurality of fasteners 75314 and a plurality of dowels 75315 are received by corresponding holes formed in the side of crank frame 7210 (holes 75700 and 75702, respectively shown in FIG. 183) and corresponding holes in gearbox adapter flange 75316 to secure gearbox adapter flange 75316 to crank frame 7210 and to prevent failures in crank frame 7210 (e.g., due to misalignment), respectively. In various embodiments, gearbox adapter flange 75316 and connecting adapter 75308 are configured to attach to drive section 7130 such that drive section 7130 turns connecting adapter 75308 to cause crankshaft 7212 to rotate within crank frame 210 on main bearings 75300.

In various embodiments, crank frame 7210 is a unitary body that receives crankshaft 72122 and facilitates the operation of crankshaft 7212 within crank frame 7210. In various embodiments, crank frame 7210 is roughly shaped as a rectangular prism with flat front and rear surfaces that couple to plates 7202 and 7200, respectively, and roughly square left and right surfaces with protruding flat circular surfaces that couple to drive section 7130 on one or both sides. As discussed herein, crank frame 7210 defines main bearing bore 75340 and receives crankshaft 7212 and main bearings 75300. In various embodiments, crank frame 7210 protects crankshaft 7212 by preventing damage to the various moving parts of crankshaft 7212 and facilitates the operations of crankshaft 7212. In various embodiments, main bearings 75300 may be secured within a plurality of bearing support walls 75356 that are evenly spaced transversely across the crank frame 7210. Each bearing support wall 75356 defines a main bearing bore 75340 and includes a plurality of through holes 75354. In various embodiments, main bearing bore 75340 is centered in the bearing support walls 75356 and bored transversely through them, and through holes 75354 are located around the edge of the main bearing bore 75340. In various embodiments, a main bearing 75300 is disposed within main bearing bore 75340 at each bearing support walls 75356. The main bearings 75300 are secured by sets of brackets 75350 and fasteners 75352. In various embodiments, sets of four brackets 75350 secure the main bearings 75300 at both ends of crank frame 7210 and sets eight brackets 75350 secure the main bearings 75300 between the two ends. In various embodiments, main bearings are secured by the brackets 75350 trapping the main bearings 75300 within main bearing bore 75340 and are secured by fasteners 75352 that are received by corresponding holes though brackets 75350 and holes 75354.

In various embodiments, crank frame 7210 includes a plurality of connecting rod cut outs 75342 between the bearing support walls 75356 through which crosshead assembly 71700 (not shown in FIG. 179) reciprocates. In various embodiments, a plurality of seals 75344 are disposed around connecting rod cut outs 75342 (e.g., the prevent lubricant from leaking out of power end 103, to prevent contaminants from entering power end 103). In some of such embodiments, seals 75344 are extruded and spliced seals and are positioned in grooves around each connecting rod cut out 75342. In various embodiments, by using a seal 75344 instead of a gasket, various drawbacks associated with gaskets (e.g., saturation, over compression) may be avoided. In various embodiments, the front of crank frame 7210 includes one or more dowel pin holes 72454 useable to facilitate alignment of central support plate 7202 and the various crosshead frames 7220 as discussed herein.

In various embodiments, rear support plate 7200 is coupled to the back of crank section 7122. The rear support plate 7200 is a generally rectangular plate with a plurality of stay rod through holes 72404 located along the top and bottom periphery. In various embodiments, rear support plate 7200 includes maintenance openings 72444, holes 72442, and a variable top and bottom profile with raised portions 72446 around stay rod through holes 72404. In various embodiments, holes 72442 are configured to receive fasteners 75336 to facilitate covering of maintenance openings 72444 by maintenance covers 7510 such that when a maintenance cover 7510 is removed a portion of crankshaft 7212 is exposed and can be serviced without removing rear support plate 7200. In some embodiments, a maintenance cover gasket 75330 is coupled to rear support plate 7200 by fasteners 75336 and maintenance cover 7510 is in turn coupled to maintenance cover gasket 75330 by fasteners 7512. In such embodiments, maintenance cover gasket 75330 includes a molded seal on a metal sheet backing and is configured to seal the joint between rear support plate 7200 and maintenance covers 7510. In such embodiments, therefore, common drawbacks with other types of gaskets (e.g., saturation, over compression) may be avoided. In other embodiments, no maintenance cover gasket 75330 is present and maintenance cover 7510 is coupled directly to rear support plate 7200 (e.g., by fasteners 7512). In some of such embodiments, grooves are cut around maintenance openings 72444 and a seal is positioned in the grooves to seal against maintenance covers 7510.

Maintenance covers 7510 are generally flat plates with a plurality of holes around the periphery to access fasteners 7512. In various embodiments, there is one maintenance cover 7510 (and in some embodiments, one maintenance cover gasket 75330) for each maintenance openings 72444.

Referring now to FIGS. 180-186, various views of an embodiment of crank frame 7210 are shown. FIG. 180 is a rear perspective view of crank section 7122, rear support plate 7200, and first set of rods 7240. FIG. 181 is a cutaway sideview of crank section 7122. FIG. 182 is a perspective rear view of crank frame 7210. FIG. 183 is a side view of crank frame 7210. FIG. 7184 is a bottom view of crank frame 7210. FIG. 185 is a perspective bottom view of crank frame 7210. FIG. 186 is a front view of crank frame 7210. In various embodiments, crank frame 7210 is a generally hollow rectangular prism with the long sides perpendicular to the defined longitudinal axis and a plurality of evenly spaced bearing support walls 75356. As discussed herein, crank frame 7210 and rear support plate 7200 include a plurality of stay rod through holes 72404 located along the top and bottom periphery that are configured to receive rods 7240. In various embodiments, crank frame 7210 includes a plurality of feet 75400 at various positions around the base of crank frame 7210, a plurality of lubrication ports 75422, and/or a plurality of weight-reduction recesses discussed herein.

Referring now to FIGS. 180 and 182-186, in various embodiments, crank frame 7210 defines twenty stay rod through holes 72404 and various weight reducing features. In various embodiments, stay rod through holes 72404 are smooth bores through crank frame 7210. As discussed herein, in various embodiments, stay rod through holes 72404 are located close to the top and bottom of crank frame 7210. In various embodiments, the walls of crank frame 7210 that defines the stay rod through holes 72404 maintain at least a minimum thickness (e.g., at least 0.750 inches thick) throughout but also define various weight reduction features. Such weight reduction features include weight-reduction recesses in the bearing support walls 75356 (not shown) and 75900 (shown in FIG. 185) and/or the variable top and bottom profile of crank frame 7210 (shown in FIGS. 180 and 182-185) in various embodiments. In various embodiments, weight-reduction recesses 75900 are areas of decreased wall thickness that may be cast into crank frame 7210 or machined out after casting. In various embodiments, weight reduction features may be defined in bearing support walls 75356 as areas of reduced wall thickness but are not defined by penetrating bearing support walls 75356. In various instances, by cutting out weight-reduction recesses 75410 rather than casting them, may be more cost effective and ensure better quality control (e.g., ensuring the integrity of bearing support walls 75356).

In various embodiments, the walls of crank frame 7210 that define stay rod through holes 72404 define raised ribs 75420 separated by recessed portions 75424. Referring now to FIG. 185, in various embodiments, weight-reduction recesses 75900 correspond with the opposite side of recessed portions 75424. In the embodiment shown, a weight-reduction recesses 75900 is disposed between each bearing support wall 75356 and is defined by a deeper portion 75904 and a transition portion 75902 corresponding to each stay rod through holes 72404 to ensure the minimum wall thickness discussed herein. In various embodiments, therefore, various weight reduction features are defined in crank frame 7210 between the bearing support walls 75356 and within bearing support walls 75356. Further, because in various embodiments crank frame 7210 is cast, these features also reduce the material cost of the crank frame 7210.

In various embodiments, the top of crank frame 7210 includes a plurality of lubrication ports 75422 disposed between the raised ribs 75420. In various embodiments, lubrication ports 75422 are centered longitudinally and spaced transversely such that they are positioned directly over the outer race of each main bearing 75300 when mounted in the crank frame 7210. The lubrication ports 75422 may be threaded to accept a lubrication hose (not shown) of lubrication system 7700.

Referring now individually to FIG. 183, a plurality of holes 75700 and 75702 are formed in the side of crank frame 7210. In various embodiments, holes 75700 are configured to receive fasteners 75314 to secure gearbox adapter flange 75316 to crank frame 7210. In various embodiments, holes 75702 are configured to receive dowels 75315 which are used to align crank frame 7210 with gearbox adapter flange 75316 to prevent misalignment between gearbox adapter flange 75316 to crank frame 7210, which might result the failure of either or both.

Referring to FIGS. 180 and 182-186, a plurality of feet 75400 are disposed at various positions around the base of crank frame 7210. In various embodiments, a pair of feet 75400 correspond to each main bearing 75300. In various embodiments, each foot 75400 includes a pair of holes 75402 configured to receive a fastener (e.g., a stud 76402 secured by a nut 76404 as shown in FIG. 190) that couples the foot 75400 to base section 7140. As shown in FIG. 184, each foot 75400 at the front of crank frame 7210 corresponds to a foot 75400 at the rear of crank frame 7210 with a raised rid between them. However, various other configurations of feet may be used in various embodiments. For example, crank frame 210 may include more feet, fewer feet, or even no feet. FIG. 180 also includes line CM which bisects crank frame 7210 between raised ribs 75420.

Referring now to FIG. 181, a cutaway side view of crank frame 7210 taken along line CM from FIG. 180 is shown. FIG. 181 includes a portion of lubrication system 7700 coupled to the top of crank frame 7210. As discussed herein, in various embodiments, lubrication system 7700 distributes lubricant to main bearings 75300 and to crankshaft 7212. After circulating through main bearings 75300 and crankshaft 7212, lubricant exits crank frame 7210 at a plurality of drains 71908 (also shown in FIGS. 184 and 185). As shown in FIG. 181, drains 71908 are disposed roughly equidistant between the front and rear of crank frame 7210, and roughly equidistant between main bearings 75300. As shown in FIG. 181, drains 71908 define an exit port though the bottom of crank frame 7210 with journaling defining a slope 75500 between drain 71908 and the highest portion 75502 of the interior base surface of crank frame 7210. Accordingly, if crank frame 7210 is level, lubricant will flow from various parts of crank section 7122 down through the drains 71908.

Referring now to FIGS. 187-189, various views of crankshaft 7212 are shown. FIGS. 187 and 189 relate to a first embodiment of crankshaft 7212 that is labeled crankshaft 7212A. FIG. 188 relates to a second embodiment of crankshaft 7212 that is labeled crankshaft 7212B. As discussed in additional detail herein, crankshaft 7212A and crankshaft 7212B include internal mechanisms for receiving and distributing lubricant and primarily differ by having different weight reduction features. Referring now to FIG. 170, a first embodiment of crankshaft 7212A includes a plurality of bearing journals 76100, bearing journal cut outs 76110, crank journals 76108, crank journal radii 76112, threaded holes 76102, and outlet ports 76104. Crankshaft 7212A includes a lubrication conduit 76300 (shown in FIG. 189), inlet ports 76114, outlet ports 76104, and plugs (not shown) that are also components of the power end lubrication system.

In various embodiments, the outside diameter of the bearing journals 76100 are sized to have an interference fit with the inner race of the main bearings 75300, as shown in FIG. 181. As shown in FIG. 187, bearing journal cut outs 76110 are non-penetrative recesses that reduce the weight of crankshaft 7212A.

Continuing with FIGS. 187-189, crank journal radii 76112 are the radii in the transition between the crank journal 76108 and bearing journal 76100. In prior art crankshafts, these radii do not exist or are not fully formed because the position of the outside diameter of the crank journal 76108 is close to the position of the outside diameter of the bearing journal 76100. This position is measured radially from the central rotation axis of the crankshafts 7212A and 7212B which is parallel to the transverse axis of power end 103. This lack of a full crank journal radius 76112 in the prior art generates a stress concentration at this point and is a common failure point of crankshafts. The ability to form a full crank journal radius 76112 at this point eliminates the stress concentration present in the prior art increasing the service life of the crankshafts 7212A and 7212B.

The threaded holes 76102 receive fasteners 75310 to mount the connecting adapter 75308 to the crankshaft 7212A/7212B. There may be threaded holes 76102 on one or both ends of the crankshaft 7212A/7212B depending on whether it is known if the power end 103 will be driven from one end or both ends. One or more of the holes 76102 may not be threaded but instead receive locating pins 75306 (shown in FIG. 179) to aid in the attachment of any connecting adapters 75308.

Referring now to FIG. 188, a view of crankshaft 7212A showing lubrication distribution bores through crankshaft 7212 is shown. A lubrication conduit 76300 formed by bores between inlet ports 76114 and outlet ports 76104. For simplicity, only lubrication conduit 76300 is shown in FIG. 189 in order to illustrate the lubricant path. Other bores through crankshaft 7212A that are not a part of the lubricant conduit 76300 are omitted for clarity. To fabricate the lubrication conduit 76300 the intersecting bores 7303 are made diagonally from the outside diameter of the bearing journal 76100 to the center of each crank journal 76108. The inlet ports 76114 are at the center of the bearing journals 76100. Inlet ports 76114 are attached to the power end lubrication system (not shown). The outlet ports 76104 are centered axially on each crank journal 76108 so that as lubricant is forced out of the outlet port 76104 it will lubricate the area between the crank journal 76108 and connecting rod bearing (cap side) 73842, shown in FIG. 178.

Base Section 7140

Referring now to FIG. 190, base section 7140 of power end 103 is shown in further detail. The embodiment of base section 7140 shown in FIG. 190 includes a frame 76400, a plurality of studs 76402, a plurality of nuts 76404, and a drive section support 76420. In various embodiments, frame 76400 may be made from any type of structural steel and includes various structural components 76406 between transverse bars 76408, mount blocks 76410, and threaded stud holes 76412. In various embodiments, the size and location of each of these components will vary based on the specific mounting needs of the particular embodiment of high pressure pump 101. In various embodiments, crosshead section 7124 and crank section 7122 are secured to base section 7140 by each crosshead frame 7220 (e.g., using base section attachment hole 74402 that receives a stud 76402 that is secured by a nut 76404) and each foot (e.g., foot 75400) of crank frame 210 (e.g., using holes 75402 that receive respective studs 76402 that are secured by a respective nut 76404). In some embodiments, however, not every crosshead frame 7220 or each foot of crank frame 7210 are secured to base section 7140. In some embodiments, some or all of plates 7202, 7204, and 7208 may be secured to base section 7140 (e.g., via flanges extending from the various plates) (not shown).

In various embodiments, drive section support 76420 is a saddle-shaped feature on which drive section 7130 rests. In various embodiments, drive section support 76420 is integral to the rest of base section 7140, but in other embodiments drive section support 76420 may be bolted and/or welded on. In various embodiments, drive section 7130 accounts for about 20% of the total weight of pump 101. If this weight is left hanging off the side of crank section 7122, undue stress may be placed on the side of crank frame 7210. Accordingly, drive section support 76420 is configured to carry the full weight of drive section 7130. In various embodiments, drive section support 76420 includes a plurality of set screws usable to adjust contact with drive section 7130 (e.g., to ensure a proper fit).

Assembly of Power End 103

In accordance with various embodiments discussed herein, power end 103 may be assembled as follows: a crankshaft 7212 is inserted into a crank frame 7210 to form crank section 7122. A rear support plate 7200 is coupled to the back of crank frame 7210. A plurality of crosshead assemblies 71700 are coupled to crankshaft 7212. In various embodiments, crosshead assembly 71700 is coupled to crankshaft 7212 by installing components through the front of crank section 7122 and through the rear (e.g., through maintenance openings 72444). A central support plate 7202 is coupled to the front of crank section 7122 (using the alignment dowels 72452) such that the crosshead assemblies 71700 are disposed through crosshead ports 72420 of central support plate 7202. Crosshead section 7124 is formed by coupling a plurality of crosshead frames 7220 to central support plate 7202 (using alignment dowels 71910) such that the crosshead assemblies 71700 are disposed within central bores 74600 of crosshead frames 7220 and pony rod clamp 7802 is disposed outside the crosshead frames 7220 and sealed using pony rod seal housing 73800.

Washers 72406 and nuts 72408 are disposed around a first set of rods 120, and nuts 72408 are tightened on one end of each of the first set of rods 7240 such that nuts 72408 are fully engaged. The other ends of the first set of rods 7240 are inserted through rear support plate 7200, through crank section 7122, through central support plate 7202, and through the individual crosshead frames 7220. A top front support plate 7204 and bottom front support plate 7206 are placed over the ends of first set of rods 7240 protruding from crosshead frames 7220. Washers 72402 and nuts 72400 are then placed over the ends of first set of rods 7240 protruding from a top front support plate 7204 and bottom front support plate 7206, and nuts 72400 are torqued down as discussed herein. As a result, first set of rods 7240 are in a state of tension and plates 7200, 7202, 7204, and 7206 as well as crank section 7122 and crosshead section 7124 are compressed.

Then a second set of rods 120 are inserted through top front support plate 7204, bottom front support plate 7206, and crosshead frames 7220 and torqued into threaded connect plate stay rod holes 71702 in central support plate 7202 such that the second set of rods 120 are fully engaged with central support plate 7202. A plurality of spacers 122 are installed (using alignment pins 7906) around the protruding ends of the second set of rods 120 followed by a plurality of individual connect plates 118. Washers 134 and nuts 132 are then placed over the ends of second set of rods 120 protruding from individual connect plates 118 and are torqued down as discussed herein. As a result, second set of rods 120 are in a state of tension and plates 7202, 7204, and 7206 as well as crosshead section 7124 and connect section 7126 are compressed. Lubrication system 7700 is coupled to power end 103, and fluid end 100 is coupled to power end 103 by coupling the various fluid end sections 102 to the individual connect plates 118 and coupling plungers 290 of the fluid end 100 to pony rod claim 802.

Maintenance of Power End 103

As discussed herein, in contrast to traditional power ends, like the power end 34 shown in FIG. 3, power end 103 employs a modular design in which various individual components may be removed and replaced as needed (e.g., when a component wears out or fails). In particular, crosshead frames 7220, crosshead assemblies 71700, connect plates 118, and spacers 122 may be replaced. As discussed herein, stress on these components that result from compressing fluid in fluid end 100 may result in wear and failure to these pieces. Additionally, if lubrication system 7700 fails (e.g., a line becomes clogged), crosshead frame 7220 and/or crosshead assembly 71700 might be damaged. Accordingly, by replacing various modular components, power end 103 may be more quickly brought back into service by loosening nuts (e.g., nuts 132, 72400), installing a replacement component, and torqueing down nuts. In contrast, prior power end assemblies might have required field wielding or other more labor-intensive repairs.

Thus, in accordance with various embodiments discussed herein, power end 103 may be assembled as follows: a plurality of nuts 132 are disengaged; at least a portion of connector section 7126 is removed (e.g., connect plate 118, spacers 122). If connecter section 7126 was the only reason for maintenance, then replacement connect plates 118 or spacers 122 may be installed and nuts 132 may be installed and torqued down as discussed herein. If a particular connect plate 118 does not need to be replaced, the fluid end section 102 that is coupled thereto does not need to be disengaged from that particular connect plate 118. If components of crosshead section 7124 are to be replaced, nuts 72400 are disengaged, plates 7204 and 7206 are removed, and one or more crosshead frames 7220 are removed. Repairs may be made to crosshead assembly 71700 if required from the front and/or from the rear (e.g., by removing maintenance cover 7510). A replacement crosshead frame 7220 may be installed, and plates 7204 and 7206 may be replaced. Nuts 72400 may then be reengaged and connector section 7126 and second set of rods 120 may be replaced.

As used herein, "modular" means an apparatus that is comprised of a plurality of components joined together to form a complete apparatus. Such components may be removable and replaceable with like components, if needed. For example, in some embodiments of the power end 103 described herein, the power end 103 comprises a plurality of crosshead frames joined together to form the crosshead section of the power end 103. Each crosshead frame is removable and may be replaced with a new crosshead frame, if needed. Likewise, in some embodiments of the fluid end 100 described herein, the fluid end 100 comprises a plurality of fluid end sections 102 joined together to form the fluid end 100. Each fluid end section 102 may be removed and replaced with a new fluid end section 102, if needed.

In some cases, components making up the modular apparatus are numerically related to other module components in the apparatus. For example, in some embodiments of the power end 103, the crosshead frames, crosshead assemblies, spacers, and connect plates are individually replaceable and are related in number (e.g., for each crosshead frame there is one crosshead assembly, one connect plate, and four spacers). Similarly, in various embodiments of the fluid end 100, the fluid end 100 is composed of individual fluid end sections 102, and for each fluid end section 102, there may be one housing, one fluid routing plug, one plunger, one discharge valve, one suction valve, one discharge valve guide, and one suction valve guide, each of which is individually replaceable.

In alternative embodiments, the various features described herein may be constructed like one or more of those embodiments described in U.S. patent application Ser. No. 16/951,605, authored by Thomas et al., filed on Nov. 18, 2020, and titled "Fluid Routing Plug"; U.S. patent application Ser. No. 16/951,741, authored by Thomas et al., filed on Nov. 18, 2020, and titled "Fluid End"; and U.S. patent application Ser. No. 16/951,844, authored by Foster et al., filed on Nov. 18, 2020, and titled "Modular Power End", the entire contents of which are incorporated herein by reference.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed. Changes may be made in the construction, operation and arrangement of the various parts, elements, steps and procedures described herein without departing from the spirit and scope of the invention as described in the following claims.

The invention claimed is:

1. An apparatus comprising:
 a modular power end assembly secured together by a plurality of first stay rods, each of the plurality of first stay rods traversing a length of the modular power end assembly and terminating at opposed ends of the modular power end assembly; and
 a modular fluid end assembly coupled to the modular power end assembly using a plurality of second stay rods, each of the plurality of second stay rods projecting from one of the opposed ends of the modular power end assembly;
 in which each of the plurality of first stay rods is in a spaced-relationship with each of the plurality of second stay rods.

2. The apparatus of claim 1, in which each of the plurality of first stay rods has a first longitudinal axis; in which each of the plurality of second stay rods has a second longitudinal axis; and in which the first longitudinal axis is offset from the second longitudinal axis.

3. The apparatus of claim 1, further comprising:
 a sleeve disposed around each of the plurality of second stay rods and interposed between the modular fluid end assembly and the modular power end assembly.

4. The apparatus of claim 1, in which the apparatus is situated in an ambient environment; and in which the opposed ends of the modular power end assembly are exposed to the ambient environment.

5. The apparatus of claim 1, further comprising:
 an upper intake manifold attached to the modular fluid end assembly;
 a lower intake manifold attached to the modular fluid end assembly; and
 a discharge manifold attached to the modular fluid end assembly.

6. A system, comprising:
 the apparatus of claim 5;
 a first fluid flowing within at least a portion of the upper fluid intake manifold; and
 a second fluid flowing within at least a portion of the lower fluid intake manifold;
 in which the first and second fluids contain differing levels of proppant.

7. The apparatus of claim 1, in which the modular fluid end assembly comprises:
 a plurality of fluid end sections situated in a side-by-side and spaced relationship, each of the plurality of fluid end sections attached to at least one of the plurality of the second stay rods.

8. The apparatus of claim 7, in which each of the plurality of fluid end sections is attached to a connect plate in a one-to-one relationship; and in which the at least one of the plurality of the second stay rods is attached to the connect plate.

9. The apparatus of claim 7, in which each of the plurality of fluid end sections comprises:
a housing having a horizontal bore formed therein; and
a fluid routing plug installed within the horizontal bore.

10. The apparatus of claim 9, in which the housing further comprises:
a beveled surface formed in a wall or walls of the housing and surrounding the horizontal bore; and
in which the fluid routing plug comprises:
a beveled surface formed on an outer surface of the fluid routing plug;
in which the beveled surface of the fluid routing plug engages the beveled surface of the housing.

11. The apparatus of claim 1, wherein the modular power end assembly comprises:
a crank section comprising a crank shaft; and
a crosshead section offset from the crank section and comprising a plurality of crossheads.

12. The apparatus of claim 11, wherein the crosshead section comprises:
a plurality of individual crosshead frames situated in a side-by-side relationship, wherein the individual crosshead frames are configured to be removed from the modular power end assembly and replaced with a replacement individual crosshead frame.

13. The apparatus of claim 11, in which the modular power end assembly further comprises:
a central plane extending through the crosshead section and situated on a central longitudinal axis of each of the plurality of crossheads;
in which each of the plurality of second stay rods is positioned closer to the central plane than any of the plurality of first stay rods.

14. The apparatus of claim 11, in which each of the plurality of second stay rods traverses the crosshead section, but not the crank section.

15. The apparatus of claim 11, in which the modular power end assembly further comprises:
a central support plate positioned between the crank section and the crosshead section;
in which each of the plurality of second stay rods is attached to the central support plate and traverses the crosshead section, but not the crank section.

16. The apparatus of claim 15, in which the central support plate is of single-piece construction.

17. The apparatus of claim 11, wherein the modular power end assembly comprises:
a rear support plate; and
a central support plate;
wherein the plurality of first stay rods traverse the rear support plate, the crank section, the central support plate, and the crosshead section;
wherein the crank section is disposed between the rear support plate and the central support plate; and
wherein the central support plate is disposed between the crosshead section and the crank section.

18. The apparatus of claim 17,
wherein the rear support plate and the central support plate are made of a material comprising alloy steel; and
wherein the crank section and the crosshead section are made of a material comprising ductile iron.

* * * * *

UNITED STATES PATENT AND TRADEMARK OFFICE
CERTIFICATE OF CORRECTION

PATENT NO. : 11,346,339 B2
APPLICATION NO. : 16/951895
DATED : May 31, 2022
INVENTOR(S) : Nowell et al.

It is certified that error appears in the above-identified patent and that said Letters Patent is hereby corrected as shown below:

In the Specification

Column 6, Line 39, please insert --FIG. 30.--.
Column 6, Line 40, please delete "FIG. 30.".
Column 36, Line 32, please delete "Boo" and substitute therefor "800".
Column 36, Line 33, please delete "Boo" and substitute therefor "800".
Column 36, Line 34, please delete "Boo" and substitute therefor "800".
Column 36, Line 39, please delete "Boo" and substitute therefor "800".
Column 36, Line 60, please delete "Boo" and substitute therefor "800".
Column 36, Line 61, please delete "Boo" and substitute therefor "800".
Column 38, Line 54, please delete "woo" and substitute therefor "1000".
Column 39, Line 11, please delete "Boo" and substitute therefor "800".
Column 42, Line 15, please delete "Dm" and substitute therefor "100".

Signed and Sealed this
Fifth Day of July, 2022

Katherine Kelly Vidal
*Director of the United States Patent and Trademark Office*